(12) United States Patent
Kramer et al.

(10) Patent No.: US 10,664,860 B2
(45) Date of Patent: *May 26, 2020

(54) VERIFICATION OF REDEMPTION OF AN ELECTRONIC OFFER

(71) Applicant: Groupon, Inc., Chicago, IL (US)

(72) Inventors: James F. Kramer, Foster City, CA (US); Paul C. Ning, Foster City, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,914

(22) Filed: Oct. 9, 2018

(65) Prior Publication Data

US 2019/0220884 A1 Jul. 18, 2019

Related U.S. Application Data

(63) Continuation of application No. 15/598,879, filed on May 18, 2017, now Pat. No. 10,102,539, which is a (Continued)

(51) Int. Cl.
*G06Q 30/02* (2012.01)
*H04W 4/029* (2018.01)
(Continued)

(52) U.S. Cl.
CPC ......... *G06Q 30/0225* (2013.01); *G06Q 30/02* (2013.01); *G06Q 30/0261* (2013.01);
(Continued)

(58) Field of Classification Search
CPC ............... G06Q 30/0225; G06Q 30/02; G06Q 30/0261; G06Q 30/0605; G06Q 50/01;
(Continued)

(56) References Cited

U.S. PATENT DOCUMENTS 5,209,323 A 5/1993 Hopkins
5,471,593 A 11/1995 Branigin
(Continued)

FOREIGN PATENT DOCUMENTS

WO WO 2002/001405 1/2002
WO WO 07/090133 6/2013

OTHER PUBLICATIONS

"LBS Startups to Watch: A slew of location-based services startups are hoping to make serendipity a little more regular," Red Herring Magazine, Oct. 17, 2005, 5 pages.
(Continued)

*Primary Examiner* — Mong-Thuy T Tran
(74) *Attorney, Agent, or Firm* — Alston & Bird LLP

(57) ABSTRACT

A system can determine that a mobile device, located at a physical place of business transmits a first electronic communication for redemption of an electronic offer at the physical place of business. The system can further detect a second electronic communication transmitted from the mobile device, which indicates a first identifier. The first identifier can be associated with a verifier of the electronic offer (e.g., a staff member) at the physical place of business. The system can further determine, based on analysis of the first identifier, a second identifier (e.g., contact data, a telephone number, etc.), that corresponds to the verifier, without providing the second identifier to the mobile device. The system can further electronically transmit, utilizing the second identifier, a third electronic communication that indicates information about the redemption of the electronic offer.

28 Claims, 99 Drawing Sheets

Related U.S. Application Data continuation of application No. 14/803,993, filed on Jul. 20, 2015, now Pat. No. 9,824,371, which is a continuation of application No. 13/751,035, filed on Jan. 25, 2013, now Pat. No. 9,105,039, and a continuation-in-part of application No. 12/973,947, filed on Dec. 21, 2010, now abandoned, and a continuation-in-part of application No. 12/161,554, filed as application No. PCT/US2007/061328 on Jan. 30, 2007, now Pat. No. 7,856,360, which is a continuation-in-part of application No. 11/307,262, filed on Jan. 30, 2006, now Pat. No. 7,788,188.

(60) Provisional application No. 61/590,733, filed on Jan. 25, 2012, provisional application No. 61/313,132, filed on Mar. 12, 2010, provisional application No. 60/823,573, filed on Aug. 25, 2006.

(51) Int. Cl.
  *G06Q 50/00* (2012.01)
  *G06Q 30/06* (2012.01)
  *H04W 4/021* (2018.01)
  *H04W 4/14* (2009.01)
  *H04W 4/02* (2018.01)
  *H04W 24/00* (2009.01)

(52) U.S. Cl.
  CPC ......... *G06Q 30/0605* (2013.01); *G06Q 50/01* (2013.01); *H04W 4/02* (2013.01); *H04W 4/021* (2013.01); *H04W 4/029* (2018.02); *H04W 4/14* (2013.01); *H04W 24/00* (2013.01)

(58) Field of Classification Search
  CPC ......... H04W 4/02; H04W 4/021; H04W 4/14; H04W 24/00
  USPC ...................................................... 455/456.3
  See application file for complete search history.

(56) References Cited

U.S. PATENT DOCUMENTS

| | | |
|---|---|---|
| 5,697,844 A | 12/1997 | Von Kohorn |
| 6,259,405 B1 | 7/2001 | Stewart et al. |
| 6,414,635 B1 | 7/2002 | Stewart et al. |
| 6,480,885 B1 | 11/2002 | Olivier |
| 6,549,768 B1 | 4/2003 | Fraccaroli |
| 6,571,279 B1 | 5/2003 | Herz et al. |
| 6,618,593 B1 | 9/2003 | Drutman et al. |
| 6,731,940 B1 | 5/2004 | Nagendran |
| 6,751,669 B1 | 6/2004 | Ahuja et al. |
| 6,819,919 B1 | 11/2004 | Tanaka |
| 6,829,478 B1 | 12/2004 | Layton et al. |
| 6,834,195 B2 | 12/2004 | Brandenberg et al. |
| 6,848,542 B2 | 2/2005 | Gailey et al. |
| 6,915,271 B1 | 7/2005 | Meyer et al. |
| 6,934,684 B2 | 8/2005 | Alpdemir et al. |
| 6,944,447 B2 | 9/2005 | Portman et al. |
| 6,996,413 B2 | 2/2006 | Inselberg |
| 7,027,801 B1 | 4/2006 | Hall et al. |
| 7,071,842 B1* | 7/2006 | Brady, Jr. ............. H04W 4/029 340/988 |
| 7,110,971 B2 | 9/2006 | Wallman |
| 7,155,455 B2 | 12/2006 | Clendenin |
| 7,308,254 B1 | 12/2007 | Rissanen |
| 7,319,986 B2 | 1/2008 | Praisner et al. |
| 7,543,232 B2 | 6/2009 | Easton, Jr. et al. |
| 7,593,740 B2 | 9/2009 | Crowley et al. |
| 7,788,188 B2 | 8/2010 | Kramer |
| 7,856,360 B2 | 12/2010 | Kramer et al. |
| 8,027,861 B2 | 9/2011 | Brintle |
| 8,103,519 B2 | 1/2012 | Kramer et al. |
| 8,182,328 B2 | 5/2012 | Odom et al. |
| 8,300,556 B2 | 10/2012 | Kalipatnapu et al. |
| 8,577,346 B2 | 11/2013 | Dragt |
| 8,583,447 B2 | 11/2013 | Kramer et al. |
| 8,583,477 B2 | 11/2013 | Kramer et al. |
| 8,599,832 B2 | 12/2013 | Altberg et al. |
| 8,965,784 B2 | 2/2015 | Postrel |
| 2001/0014868 A1* | 8/2001 | Herz .................. G06Q 10/0637 705/14.38 |
| 2001/0042002 A1 | 11/2001 | Koopersmith |
| 2001/0042010 A1 | 11/2001 | Hassell |
| 2001/0043232 A1 | 11/2001 | Abbott et al. |
| 2001/0051973 A1 | 12/2001 | Green et al. |
| 2002/0010584 A1 | 1/2002 | Schultz et al. |
| 2002/0013815 A1 | 1/2002 | Obradovich |
| 2002/0016461 A1 | 2/2002 | Albers et al. |
| 2002/0022488 A1 | 2/2002 | Srinivasan et al. |
| 2002/0034292 A1 | 3/2002 | Tuoriniemi et al. |
| 2002/0047861 A1 | 4/2002 | Labrie et al. |
| 2002/0068585 A1 | 6/2002 | Chan et al. |
| 2002/0087525 A1 | 7/2002 | Abbott et al. |
| 2002/0095333 A1 | 7/2002 | Jokinen et al. |
| 2002/0111164 A1 | 8/2002 | Ritter |
| 2002/0116461 A1 | 8/2002 | Diacakis et al. |
| 2002/0120774 A1 | 8/2002 | Diacakis |
| 2002/0123934 A1 | 9/2002 | Tanaka et al. |
| 2002/0138325 A1 | 9/2002 | Mashimo et al. |
| 2002/0151315 A1 | 10/2002 | Hendrey |
| 2002/0160766 A1 | 10/2002 | Portman et al. |
| 2002/0161657 A1 | 10/2002 | Kojac et al. |
| 2002/0184653 A1 | 12/2002 | Pierce et al. |
| 2003/0004802 A1 | 1/2003 | Callegari |
| 2003/0014275 A1 | 1/2003 | Bearden, III et al. |
| 2003/0060214 A1 | 3/2003 | Hendrey et al. |
| 2003/0073406 A1 | 4/2003 | Benjamin et al. |
| 2003/0100337 A1 | 5/2003 | Chotkowski et al. |
| 2003/0115288 A1 | 6/2003 | Ljubicich et al. |
| 2003/0117432 A1 | 6/2003 | Kautto-Kiovula et al. |
| 2003/0220835 A1 | 11/2003 | Barnes, Jr. |
| 2003/0233278 A1 | 12/2003 | Marshall |
| 2003/0233332 A1 | 12/2003 | Keeler et al. |
| 2004/0006478 A1 | 1/2004 | Alpdemir et al. |
| 2004/0006548 A1 | 1/2004 | Mahmood |
| 2004/0010608 A1 | 1/2004 | Piccionelli et al. |
| 2004/0015562 A1 | 1/2004 | Harper et al. |
| 2004/0024846 A1 | 2/2004 | Randall et al. |
| 2004/0081120 A1 | 4/2004 | Chaskar |
| 2004/0088551 A1 | 5/2004 | Dor |
| 2004/0093281 A1 | 5/2004 | Silverstein et al. |
| 2004/0107283 A1 | 6/2004 | Paddon |
| 2004/0111476 A1 | 6/2004 | Trossen et al. |
| 2004/0122810 A1 | 6/2004 | Mayer |
| 2004/0133480 A1 | 7/2004 | Domes |
| 2004/0137882 A1 | 7/2004 | Forsyth |
| 2004/0148638 A1 | 7/2004 | Weisman et al. |
| 2004/0151315 A1 | 8/2004 | Kim |
| 2004/0155903 A1 | 8/2004 | Schneeberg |
| 2004/0193489 A1 | 9/2004 | Boyd et al. |
| 2004/0203363 A1 | 10/2004 | Carlton et al. |
| 2004/0203746 A1 | 10/2004 | Knauerhase et al. |
| 2004/0215793 A1 | 10/2004 | Ryan et al. |
| 2004/0220922 A1 | 11/2004 | Lovison et al. |
| 2004/0224703 A1 | 11/2004 | Takaki et al. |
| 2004/0243478 A1 | 12/2004 | Walker et al. |
| 2004/0249846 A1 | 12/2004 | Randall et al. |
| 2004/0266457 A1 | 12/2004 | Dupray |
| 2004/0266480 A1 | 12/2004 | Hjelt et al. |
| 2005/0003759 A1 | 1/2005 | Alley |
| 2005/0038876 A1 | 2/2005 | Chaudhuri |
| 2005/0043060 A1 | 2/2005 | Brandenberg et al. |
| 2005/0054352 A1 | 3/2005 | Karaizman |
| 2005/0054439 A1 | 3/2005 | Rowe et al. |
| 2005/0076078 A1 | 4/2005 | Salton |
| 2005/0078088 A1 | 4/2005 | Davis et al. |
| 2005/0102180 A1 | 5/2005 | Gailey et al. |
| 2005/0130634 A1 | 6/2005 | Godfrey |
| 2005/0132305 A1 | 6/2005 | Guichard et al. |
| 2005/0135305 A1 | 6/2005 | Wentink |
| 2005/0136949 A1 | 6/2005 | Barnes, Jr. |
| 2005/0169446 A1 | 8/2005 | Randall et al. |

(56) References Cited

U.S. PATENT DOCUMENTS

| | | |
|---|---|---|
| 2005/0174975 A1 | 8/2005 | Mgrdechian et al. |
| 2005/0177385 A1 | 8/2005 | Hull et al. |
| 2005/0177614 A1 | 8/2005 | Bourne |
| 2005/0181803 A1 | 8/2005 | Weaver et al. |
| 2005/0193054 A1 | 9/2005 | Wilson et al. |
| 2005/0202817 A1 | 9/2005 | Sudit |
| 2005/0210387 A1 | 9/2005 | Alagappan et al. |
| 2005/0227676 A1 | 10/2005 | De Vries |
| 2005/0228719 A1 | 10/2005 | Roberts et al. |
| 2005/0251440 A1 | 11/2005 | Bednarek |
| 2006/0015404 A1 | 1/2006 | Tran |
| 2006/0026067 A1 | 2/2006 | Nicholas et al. |
| 2006/0180664 A1 | 8/2006 | Barrett et al. |
| 2006/0195361 A1 | 8/2006 | Rosenberg |
| 2006/0217135 A1 | 9/2006 | Moore et al. |
| 2007/0030824 A1 | 2/2007 | Ribaudo et al. |
| 2007/0071208 A1 | 3/2007 | Morris |
| 2007/0072591 A1 | 3/2007 | McGary et al. |
| 2007/0078965 A1 | 4/2007 | Shimamura et al. |
| 2007/0112762 A1 | 5/2007 | Brubaker |
| 2007/0162337 A1 | 7/2007 | Hawkins et al. |
| 2007/0179792 A1 | 8/2007 | Kramer |
| 2007/0216535 A1 | 9/2007 | Carrino et al. |
| 2007/0281689 A1 | 12/2007 | Altman et al. |
| 2007/0282621 A1 | 12/2007 | Altman et al. |
| 2007/0287473 A1 | 12/2007 | Dupray |
| 2008/0033776 A1 | 2/2008 | Marchese |
| 2008/0040187 A1 | 2/2008 | Carraher et al. |
| 2008/0125965 A1 | 5/2008 | Carani et al. |
| 2008/0255939 A1 | 10/2008 | Harmon et al. |
| 2008/0306826 A1 | 12/2008 | Kramer et al. |
| 2008/0319846 A1 | 12/2008 | Leming et al. |
| 2009/0024477 A1 | 1/2009 | Kramer et al. |
| 2009/0070230 A1 | 3/2009 | Silverstein et al. |
| 2009/0076911 A1 | 3/2009 | Vo et al. |
| 2009/0254930 A1 | 10/2009 | Lo et al. |
| 2009/0254971 A1 | 10/2009 | Herz et al. |
| 2010/0049702 A1 | 2/2010 | Martinez et al. |
| 2011/0071895 A1 | 3/2011 | Masri |
| 2011/0093340 A1 | 4/2011 | Kramer et al. |
| 2011/0191152 A1 | 8/2011 | Schwartz |
| 2012/0089453 A1 | 4/2012 | Kramer et al. |
| 2012/0270563 A1 | 10/2012 | Sayed |
| 2013/0137464 A1 | 5/2013 | Kramer et al. |
| 2013/0282490 A1 | 10/2013 | Kramer et al. |
| 2013/0311291 A1* | 11/2013 | Ward ................. G06Q 30/0264 705/14.58 |
| 2014/0006129 A1 | 1/2014 | Heath |
| 2014/0195322 A1 | 7/2014 | Kramer et al. |
| 2014/0207584 A1 | 7/2014 | Wicha |
| 2016/0048863 A1 | 2/2016 | Kramer et al. |

OTHER PUBLICATIONS

"Mobido website", www.mobido.com, Dec. 5, 2015, 10 pages.
"WaveMarket website", www. sixsense.com, Dec. 5, 2005, 11 pages.
6th Sense website, www.sixsense.com, 11 pages, (2004).
Kirk, "Mobile Phone Location Technology Fights Card Fraud," PC World, Business Center, 2 pages, (2009). [Retrieved from the Internet Jun. 19, 2009: <URL: http://www.pcworld.comibusinesscenter/article/165468/mobile_phone1>].
Marriott, "With GPS, getting around gets easier", C-Net, www.new.com/With+GPS%2C+getting+around+gets+easier/2100-1041_3-5998828.html, Dec. 18, 2005, 4 pages.
Vaugh-Nichols, "FAQ: How Google Latitude locates you," ComputerWorld, www.computerworld.com, 3 pages, (2009). [Retrieved from the Internet Jun. 19, 2009: <URL: http://www.computerworld.com/s/article/9127462/FAQ_How_Google_Latitude_locates_you_>].
WaveMarket website, www.wavemarket.com, 11 pages, (2004).
PCT International Search Report for application PCT/US2007/061328 dated Sep. 11, 2007.
Written Opinion for International Application No. PCT/US2007/061328 dated Sep. 11, 2007.
"U.S. Appl. No. 13/751,035 Office Action", dated May 6, 2014, 11 pages.
"U.S. Appl. No. 13/751,035 Final Office Action", dated Sep. 26, 2014, 19 pages.
Co-Pending U.S. Appl. No. 14/803,084, filed Jul. 20, 2015, 226 pages.
"U.S. Appl. No. 13/919,944 Office Action", dated May 12, 2016, 11 pages.
Complaint for Patent Infringement, United States District Court for the Northern District of Illinois Easter Division, Civil Action No. 1:16-cv-5064, *Groupon, Inc.*, Plaintiff v. *International Business Machines Corporation* (May 9, 2016) 14 pages; Exhibit A, 79 pages.
Motion to Dismiss Groupon's Complaint for Failure to State a Claim Upon Which Relief Can be Granted, United States District Court for the Northern District of Illinois Easter Division, Civil Action No. 1:16-cv-5064, *Groupon, Inc.*, Plaintiff v. *International Business Machines Corporation*, filed by Defendants (Aug. 15, 2016) 3 pages.
Defendant IBM's Memorandum in Support of Its Motion to Dismiss Groupon's Complaint for Failure to State a Claim Upon Which Relief Can Be Granted, United States District Court for the Northern District of Illinois Easter Division, Civil Action No. 1:16-cv-5064, *Groupon, Inc.*, Plaintiff v. *International Machines Corporation*, filed by Defendants (Aug. 15, 2016) 20 pages.
Opposition of Plaintiff Groupon, Inc. to Motion to Dismiss, United States District Court for the Northern District of Illinois Easter Division, Civil Action No. 1:16-cv-5064, *Groupon, Inc.*, Plaintiff v. *International Business Machines Corporation*, filed by Defendants (Sep. 8, 2016) 23 pages.
Defendant IBM's Reply Brief in Support of Its Motion to Dismiss Groupon's Complaint for Failure to State a Claim Upon Which Relief Can Be Granted, United States District Court for the Northern District of Illinois Easter Division, Civil Action No. 1:16-cv-5064, *Groupon, Inc.*, Plaintiff v. *International Business Machines Corporation*, filed by Defendants (Sep. 13, 2016) 22 pages.
Defendant IBM's Answer to Plaintiff Groupon, Inc.'s Complaint for Patent Infringement, United States District Court for the Northern District of Illinois Eastern Division, Civil Action No. 1:16-cv-05064, *Groupon, Inc.*, Plaintiff v. *International Business Machines Corporation*, filed by Defendants (Jan. 18, 2017) 13 pages.
Defendant IBM's Opening Claim Construction Brief, United States District Court for the Northern District of Illinois Eastern Division, Civil Action No. 1:16-cv-05064, *Groupon, Inc.*, Plaintiff v. *International Business Machines Corporation*, filed by Defendants (Feb. 17, 2017) 30 pages.
Appendix to Defendant IBM's Opening Claim Construction Brief, United States District Court for the Northern District of Illinois Eastern Division, Civil Action No. 1:16-cv-05064, *Groupon, Inc.*, Plaintiff v. *International Business Machines Corporation*, filed by Defendants (Feb. 17, 2017) 11 pages.
Plaintiff Groupon, Inc.'s Responsive Claim Construction, United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 31 pages.
Appendix to Plaintiff Groupon, Inc.'s Responsive Claim Construction, Part I, United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 202 pages.
Appendix to Plaintiff Groupon, Inc.'s Responsive Claim Construction, Part II, United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 183 pages.
Plaintiff Groupon, Inc.'s Declaration of Dr. Michael I. Shamos in Support of Responsive Claim Construction Brief of Groupon, Inc., United States District Court for the Northern District of Illinois Eastern Division, Civil Action No. 1:16-cv-05064, *Groupon, Inc.*,

(56) References Cited

OTHER PUBLICATIONS

Plaintiff v. *International Business Machines Corporation*, filed by Defendants (Mar. 6, 2017) 27 pages.
Appendix to Plaintiff Groupon, Inc.'s Declaration of Dr. Michael I. Shamos in Support of Responsive Claim Construction Brief of Groupon, Inc., United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 50 pages.
Defendant IBM's Reply Claim Construction Brief, United States District Court for the Northern District of Illinois Eastern Division, Civil Action No. 1:16-cv-05064, *Groupon, Inc.*, Plaintiff v. *International Business Machines Corporation*, filed by Defendants (Mar. 13, 2017) 21 pages.
Petitioner IBM's Petition for Inter Partes Review, IPR2017-01451, dated May 18, 2017, 90 pages.
Petitioner IBM's Petition for Inter Partes Review, IPR2017-01452, dated May 18, 2017, 88 pages.
Claim Construction Hearing Before the Honorable Rebecca Pallmeyer (Transcript), United States District Court for the Northern District of Illinois Eastern Division, Civil Action No. 1:16-cv-05064, *Groupon, Inc.*, Plaintiff v. *International Business Machines Corporation*, filed by Defendants (Jun. 7, 2017) 93 pages.
Patent Owner's Preliminary Response, *International Business Machines Corp.* Petitioner v. *Groupon, Inc.* Patent Owner, Case IPR2017-01451, U.S. Pat. No. 7,856,360 B2 (dated Sep. 6, 2017) 63 pages.
Patent Owner's Preliminary Response, *International Business Machines Corp.* Petitioner v. *Groupon, Inc.* Patent Owner, Case IPR2017-01452, U.S. Pat. No. 7,856,360 B2 (dated Sep. 6, 2017) 75 pages.
Decision, Denying Institution of Inter Partes Review 37 C.R.F. § 42.108, Case IPR2017-01452, *International Business Machines Corp.* v. *Groupon, Inc.*, Patent Trial and Appeal Board, Dec. 5, 2017, 29 pages.
Decision, Institution of Inter Partes Review 37 C.R.F. § 42.108, Case IPR2017-01451, *International Business Machines Corp.* v. *Groupon, Inc.*, Patent Trial and Appeal Board, Dec. 5, 2017, 33 pages.
Patent Owner's Response, *International Business Machines Corp.* Petitioner v. *Groupon, Inc.* Patent Owner, Case IPR2017-01451, U.S. Pat. No. 7,856,360 B2 (dated Mar. 22, 2018) 68 pages.
Exhibit 2008 of Patent Owner's Response—Transcript of Susan Spielman's Testimony, *International Business Machines Corp.* Petitioner v. *Groupon, Inc.* Patent Owner, Case IPR2017-01451, U.S. Pat. No. 7,856,360 B2 (dated Feb. 21, 2018) 355 pages.
Declaration of Sigurd Meldal, Dr. Sc., *International Business Machines Corp.* Petitioner v. *Groupon, Inc.* Patent Owner, Case IPR2017-01451, U.S. Pat. No. 7,856,360 B2 (dated Mar. 22, 2018) 121 pages.
Supplemental Patent Owner's Response, IPR2017-01451, dated May 31, 2018, 11 pages.
Exhibit 2009 to Supplemental Patent Owner's Response—Supplemental Declaration of Sigurd Meldal, Dr. Sc . . . , *International Business Machines Corp.* Petitioner v. *Groupon, Inc.* Patent Owner, Case IPR2017-01451, U.S. Pat. No. 7,856,360 B2 (dated May 31, 2018) 18 pages.
International Business Machines Corporation's Reply in Support of its Petition, Case IPR2017-01451, U.S. Pat. No. 7,856,360 dated Jul. 2, 2018 (30 pages of Reply) and including Exhibits Nos. 1021, 1022, 1023, 1024, and 1025.
Response to Final Invalidity Contentions of Plaintiff Groupon, Inc. in *Groupon, Inc.* v. *Int'l Bus. Machs. Corp.*, Civil Action No. 1:16-cv-5064 (N.D. Ill) (May 17, 2017) (Exhibit 1021) 215 pages.
Deposition Transcript of Sigurd Meldal, Dr. Sc. (Jun. 13, 2018) (cited as "Meldal Dep. Tr."). (Exhibit 1022) 289 pages.
Complaint in *Groupon, Inc.* v. *Int'l Bus. Machs. Corp.*, Civil Action No. 1:16-cv-5064 (May 9, 2016) (Exhibit 1023) 93 pages.
Transcript of Claim Construction Hearing in *Groupon, Inc.* v. *Int'l Bus. Machs. Corp.*, Civil Action No. 1:16-cv-5064 (N.D. Ill.) (Apr. 3, 2017). (Exhibit 1024) 93 pages.
Applicant's Opposition to the Motion to Dismiss in *Groupon, Inc.* v. *Int'l Bus. Machs. Corp.*, Civil Action No. 1:16-cv-5064 (N.D. Ill.) (Sep. 8, 2016), (Exhibit 1025) 23 pages.
IBM's 1451 Demonstrative Exhibits for Sep. 5, 2018 Oral Hearing, in Case IRP2017-01451 (Sep. 4, 2018) (49 pages).
Patent Owner's Demonstratives Under 42.70b for Sep. 5, 2018 Oral Hearing, in Case IRP2017-01451 (Sep. 4, 2018) (63 pages).
Record of Oral Hearing, which was held on Sep. 5, 2018, in in Case IRP2017-01451 (Sep. 5, 2018) (76 pages).

\* cited by examiner

800 — 801

┌─ Microsoft Internet Explorer ─────────────────────┐
│ File Edit View Favorites Tools Help               │
│                                                   │
│ 802        803    New Registration                │
│                                                   │
│        Username       rwinters                    │
│        Password       **********                  │
│        Re-type password ********                  │
│        Display name   racewinner                  │
│        First name     Rachael                     │
│        Last name      Winters                     │
│        Email          rwinters2@gmail.com         │
│        Mobile number  415-555-1234                │
│        Mobile carrier Cingular        ▼ — 804     │
│        Cellphone model Motorola RAZR V3 ▼ — 805   │
│                                                   │
│                              Submit   Cancel      │
│              (c) Hoozware, Inc. 2006   806   807  │
└───────────────────────────────────────────────────┘

┌─ Microsoft Internet Explorer ─────────────────────┐ 911
│ File Edit View Favorites Tools Help               │
│                    Rachael's Profile              │
│                                                   │
│ Demographic Information (Required)                │
│ Used for crowd statistics; viewable by all members. 905 │
│ ─────────────────────────────────────────────     │
│ 902 — Gender      ☐ Man   ☒ Woman     908         │
│ 907 — Date of birth  Jun ▼ 17 ▼ 1981 ▼ (Only age is displayed.) │
│ 910 — Zipcode     94114 ▼ (Only displayed as distance from other members.) │
│                                        909        │
│              (c) Hoozware, Inc. 2006              │
└───────────────────────────────────────────────────┘

FIG. 9

Rachael's Profile

*Social Information (Optional)*
Viewable by all members.

Statement: Just moved from Ohio. The Mission District is awesome, and I'm discovering all the other great 'hoods in SF as well.

[Media Files]

Residence: CA ▼ San Francisco ▼  Hometown: OH ▼ Cleveland ▼

Interests
- Music: ☒ Yes ☐ No  ☐ Pop ☐ Rock ☐ Hip-hop ☒ Jazz ☐ Classical...
- Dancing: ☒ Yes ☐ No
- Movies: ☒ Yes ☐ No  ☐ Drama ☐ Action ☒ Romance ☐ Sci-fi ☒ Comedy...
- Television: ☐ Yes ☒ No  ☐ Sitcom ☐ Game ☐ Reality ☐ Talk ☐ Documentary...

(c) Hoozware, Inc. 2006

Rachael's Profile

*Crush Information (Optional)*
Only viewable by members you allow.

☒ Yes, I'm participating in Crush Matching

About me: I'm a romantic at heart and hoping chivalry is not dead. So for now, keeping all options open and trying out new ways to meet people.

[Media Files]

| | | | |
|---|---|---|---|
| Status | Single ▼ | | |
| Orientation | Straight ▼ | Ethnicity | Caucasian ▼ |
| Body type | Athletic ▼ | Religion | Catholic ▼ |
| Height | 5'4" to 5'7" ▼ | Income | 50k-75k ▼ |
| Smoking | Never ▼ | Have children | None ▼ |
| Drinking | 1-2x per week ▼ | Want children | Eventually ▼ |

(c) Hoozware, Inc. 2006

FIG. 11

1600
1601 Filter: Cool Guy
Specify requirements for this filter.
Demographic Information Requirements
1602 — Gender [Man ▼]
1603 — Age [25 ▼] to [30 ▼]
1604 — Distance up to [20 mi ▼]
1605 — Social Information Requirements
1606 — Residence [CA ▼] [San Fransisco ▼] Hometown [Any ▼] [Any ▼] — 1607
1608 — Interests
1609 — Music ☒ Yes ☐ No
☐ Pop ☐ Rock ☐ Hip-hop ☐ Jazz ☐ Classical...
Dancing ☒ Yes ☐ No
Movies ☒ Yes ☐ No
☐ Drama ☐ Action ☐ Romance ☐ Sci-fi ☐ Comedy...
Television ☐ Yes ☐ No
☐ Sitcom ☐ Game ☐ Reality ☐ Talk ☐ Documentary...

1610

(c) Hoozware, Inc. 2006

FIG. 16

1700
Crush Information Requirements
1701 — Status [Single ▼]
Orientation [Straight ▼]   Ethnicity [Any ▼]
Body type [Any ▼]          Religion [Any ▼]
Height [Any ▼]             Income [Any ▼]
Smoking [Never ▼]          Have children [Any ▼]
Drinking [Any ▼]           Want children [Any ▼]

1705

[Save] [Save As] [Cancel]
   1702   1703    1704

(c) Hoozware, Inc. 2006

FIG. 17

(c) Hoozware, Inc. 2006

(c) Hoozware, Inc. 2006

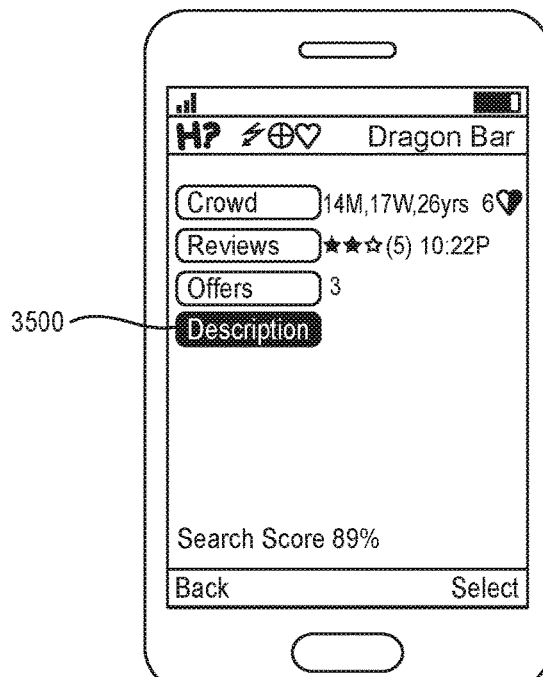
FIG. 35
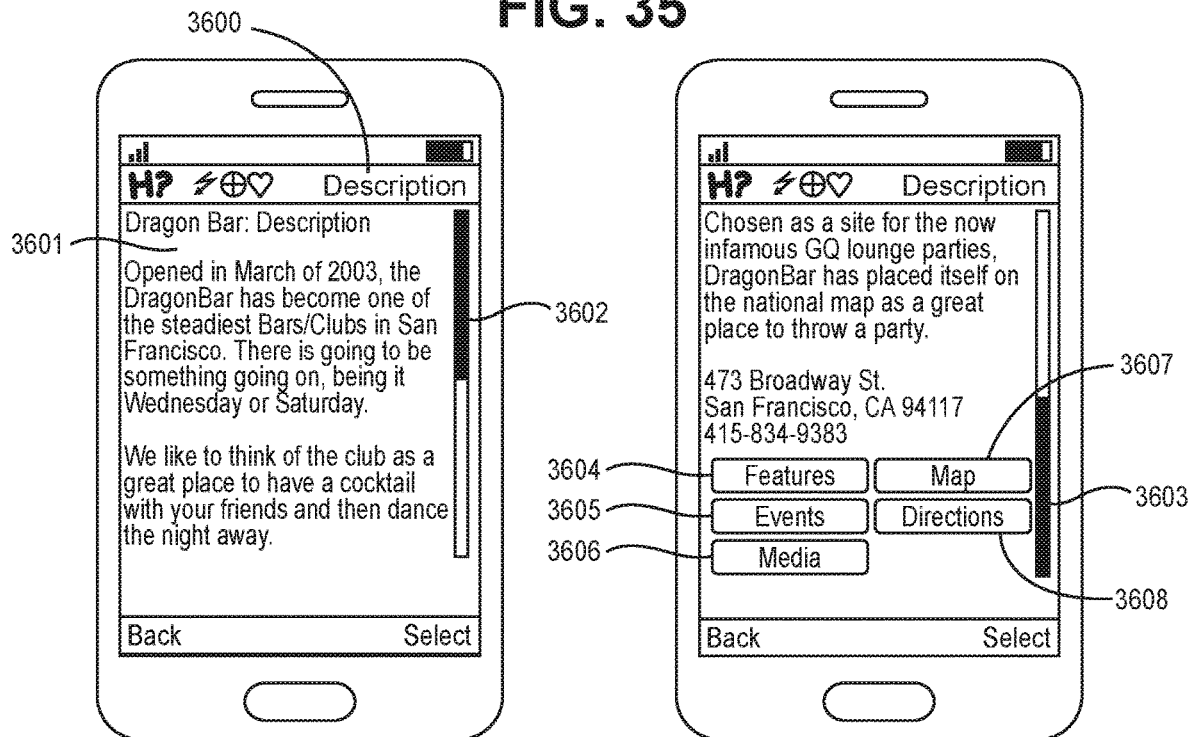
FIG. 36A
FIG. 36B

H? Hoozwhere? BETA
...for Nightlife Networking

Hi, Mark. [sign out]    Invite to Join or [f] Invite

HOME   OFFERS   EVENTS   PLANS   MESSAGES   FIND BARS/CLUBS   FIND MEMBERS   SETTINGS

Hooz™ HOT

*captnpepsi*

*soCalBeachCutie*

*"Miranda Nunez"*

*"Kevin Nakao"*

Plans

These are the recent and upcoming plans to be checked in at bars/clubs. Add plans to conveniently let your friends know where you'll be hanging out.

◎ Hooz Time Today, Now+projections — 8402

Sort [When ▼] Show [Friends & you ▼]

| By | Bar/Club | Comments | When |
|---|---|---|---|
| "Mark Smith" | The Milk Bar | Hey, I'm heading over to Milk Bar... | Today, 5:00P-7:00P |
| "Rhonda Johnson" | Kells | I'll be there. Come and join me! | Today, 6:30P-8:30P |
| "Cindy Hartnell" | Kells | Heard this was the best time to go | Today, 6:30P-8:30P |
| "Rhonda Johnson" | Ruby Skye | Hey, I'll just be chillin | Tomorrow, 7:00P-9:00P |
| "Cindy Hartnell" | Ruby Skye | I'll be there. Come and join me! | Tomorrow, 7:00P-9:00P |
| "Rhonda Johnson" | Edge | I'll be there. Come and join me! | Wed, 1/25/12, 7:30P-9:30P |
| "Cindy Hartnell" | Edge | Dudes and dudettes, let's get it s... | Wed, 1/25/12, 7:30P-9:30P |
| "Rhonda Johnson" | Californi... | I'll be there. Come and join me! | Thu, 1/26/12, 8:00P-10:00P |
| "Cindy Hartnell" | Californi... | Having a party for Jen with a few... | Thu, 1/26/12, 8:00P-10:00P |
| "Rhonda Johnson" | Infusion Bar | Should be there after the big show... | Fri, 1/27/12, 5:30P-8:00P |
| "Cindy Hartnell" | Infusion Bar | I'll be there. Come and join me! | Fri, 1/27/12, 5:30P-8:00P |
| "Rhonda Johnson" | Suite One... | I'll be there. Come and join me! | Sat, 1/28/12, 6:00P-8:30P |
| "Cindy Hartnell" | Suite One... | ...feel like dancing, I'm going to... | Sat, 1/28/12, 6:00P-8:30P |
| "Rhonda Johnson" | Gravity | Another round on me :) | Sun, 1/29/12, 2:00P-4:00P |
| "Cindy Hartnell" | Impala | The more the merrier | Sun, 1/29/12, 4:00P-8:00P |
| "Rhonda Johnson" | Jade Bar | let the good times roll | Sun, 1/29/12, 8:00P-11:00P |
| "Cindy Hartnell" | Jade Bar | There's going to be a book reading... | Mon, 1/30/12, 7:00P-9:30P |
| "Rhonda Johnson" | Jade Bar | I'll be there. Come and join me! | Mon, 1/30/12, 7:00P-9:30P |
| "Cindy Hartnell" | Kells | beer pong and chicken wingssound | Tue, 1/31/12, 7:30P-10:00P |
| "Rhonda Johnson" | Kells | I'll be there. Come and join me! | Tue, 1/31/12, 7:30P-10:00P |

1-20 of 20 First | Prev | Next | Last

[Add New]

Find Members

*Lookup by Keyword*
real name, display name,
phone or email

[ Go ]

*Search by Criteria*
My Member Searches
[ My Crush Matches Search ▼ ]
[ Go ]

Edit Criteria
[ Update Results ]
[ Save Search ]
[ Save Search As... ]

Demographic Info
Consider Only (Any)
Has Photo (Any)
Age 25 to 35
Residence
City Foster City
State CA
Distance From My
Zipcode Up to 50 mi

Social Info
Hometown
City (Any)
State (Any)
Country (Any)
Drinks Socially
Bar/Club Fave *The Milk Bar*
Interests *Dancing (Nightclub), Dining*
Movies / Videos
Exercise/Sports
Participation Racquet
sports, Walking/Hiking
Occupation (Any)
Education Bachelors degree
Languages English
Ethnicity (Any)

---

© Hooz Time   Today, Now+projections

Using "Search by Criteria"
Here are the three basic steps for searching by criteria.

1. Select Search
Select "(New Search)" or any search previously saved and listed under "My Member Searches". The criteria for the selected search will be automatically filled in under "Edit Criteria".

2. Run Search
Click "Go" to run the selected search and get results.

3. Edit Criteria
If you want to edit the criteria used by the selected search, just make changes in the "Edit Criteria" section, and click "Update Results" to get new search results.

If you want to save your edited criteria, click "Save Search" to save over the selected search name, or "Save Search As..." to save as another search name.

Caution: If you click "Go" after editing the criteria but before saving the search, the search that is currently selected in the drop-down will be rerun. Its associated criteria will overwrite the "Edit Criteria" section, and your changes will be discarded.

NOTE:
Search results are based on available member information that is viewable by you, and are sorted in order of Relevance to the search criteria. If you check "Preference Only, Not Mandatory" for a criterion, that criterion will be used as a preference for Relevance sorting only, but it's not required in the search results.

---

Hooz™
HOT

*"Kevin Nakao"*

*soCalBeachCutie*

*"Miranda Nunez"*

*captnpepsi*

*@Dragon Bar*

FIG. 87B

Demographic Info
Age 25 to 35
Residence
City Foster City
State CA
Distance From My
Zipcode Up to 50 mi

Social Info
Hometown
City (Any)
State (Any)
Country (Any)
Drinks Socially
Bar/Club Fave The Milk Bar
Interests Dancing (Nightclub), Dining
Movies / Videos
Exercise/Sports
Participation Racquet sports, Walking/Hiking
Occupation (Any)
Education Bachelors degree
Languages English
Ethnicity (Any)
Political Views Liberal

Crush Info
Interested In Men
Single Status (Any)
Height 5'6" to 5'10"
Body Type Slender, Trim & toned
Eye Color (Any)
Hair Color (Any)
Body Art (Any)
Smokes Never
Exercise Weekly
Diet (Any)
Religion (Any)
Income (Any)
Living Situation (Any)
Has Kids No
Wants Kids Someday Maybe
Has Pets (Any)
Astrological Sign (Any)

8709

NOTE:
Its associated criteria will overwrite the "Edit Criteria" section, and your changes will be discarded.

Search results are based on available member information that is viewable to the search criteria. If you check "Preference Only, Not Mandatory" for a criterion, that criterion will be used as a preference for Relevance sorting only, buy it's not required in the search results. Search results are sorted in order of Relevance to the search criteria.

"Kevin Nakao"

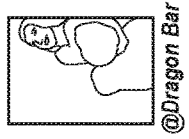
@Dragon Bar

FIG. 87C

H? Hoozvidr? BETA  Hi, Mark. [sign out]    Invite to Join  or  [f Invite]
...for Nightlife Networking  HOME  OFFERS  EVENTS  PLANS  MESSAGES  FIND BARS/CLUBS  FIND MEMBERS  SETTINGS

My Bar/Club Searches

Define searches for finding cool bars, nightclubs and lounges. The first search below determines My Top Bars/Clubs displayed on your home page; the search may be edited but not deleted.

- My Top Bars/Clubs Search (cannot deleted this search)
- ■ Any (pref. Friends & Offers)
- ■ Chatting (pref. Light Crowd)
- ■ Dance Club (pref. Crowded)
- ■ Higher Rating (pref. Crowded)
- ■ Irish Pubs (pref. Offers)
- ■ Near My Zip (pref. Offers)
- ■ Open Late (pref. DJ Music)
- ■ Singles Scene (pref. Crushes)
- ■ Trendy (pref. Live Music)

1-10 of 10 First | Prev | Next | Last

[Delete] 8901  [Add New] 8902

8900

Hooz™ HOT
"Kevin Nakao"
soCalBeachCutie
"Miranda Nunez"
captnpepsi

Alerts on Bars/Clubs

Get a mobile alert when any of the following bars/clubs has offers becoming valid in 2 hours, crowds becoming packed, or changes to events for today (until 4:00A).

Individual Bars/Clubs — 9107

Dragon Bar — 9109
— 9110

(Comma-separated list of bar/club names. When viewing a bar/club, selecting "Get Mobile Alerts" will add its name to this list.)

☑ My Saved Bars/Clubs

*Categories of Bars/Clubs*

...and also get a mobile alert when any of the following bars/clubs has offers becoming valid in 2 hours:

*Additional Bars/Clubs for Other Alerts*  [All bars/clubs ▼]

...but *limit* any mobile alerts on bars/clubs to the following location:

*Limit Bars/Clubs to This Location*  SF Metro > [All SF Metro (26) ▼]

Other Notices

If you are unable to checkin because 15 mins have not elapsed since your last checkin, get a mobile alert when you are once again eligible to checkin.

*Checkin Eligibility* ☑

If you are unable to play a "Checkin Prize" game because 2 hours have not elapsed since your last game at the same bar/club, get a mobile alert when you are once again eligible to play.

*"Checkin Prize" Game Eligibility* ☑

If you are about to be automatically checked out because almost 2 hours have elapsed since your last checkin, get a mobile alert reminding you to checkin again.

*Auto-Checkout Warning* ☑

If you have added a plan to be checked in, get a mobile alert reminding you of the plan 2 hours before it starts.

*Plan Reminder* ☑

[Save]  [Cancel]

Hi? Hoozhere? BETA
...for Nightlife Networking

Hi, Mark. [sign out]     Invite to Join or [f] Invite

HOME   OFFERS   EVENTS   PLANS   MESSAGES   FIND BARS/CLUBS   FIND MEMBERS   SETTINGS

Hooz™ HOT

*captnpepsi*

*soCalBeachCutie*

*"Miranda Nunez"*

*"Kevin Nakao"*

My Checking Viewability

Checkin Viewability lets you control who sees your checkins. Turning Checkin Viewability ON lets you show your checkins to anyone you'd like so they know where it's happening. Turning it OFF lets you checkin anonymously. [more]

Checkin Viewability   ● ON    ○ OFF
          9201      9202

When Checkin Viewability is ON, your checkin is shown as you indicate below (but excluding My Blocked Members).

Edit My Crush Viewability Setup

Show my checkin to any of the following:

Individual Members    [captnpepsi, Miranda Nunez]     — 9205

(Comma-separated list of member display names; real names of Friends may also be used. When viewing a member, selecting "Show My Crush Info" will add their name to this list. Note: when saved and re-edited, Friends will be listed using both their real and display names, e.g., *"John Smith" here;johnny.*)

Categories or Members
- ☑ My Friends          ☑ Friends of Friends
- ☑ My Crush Members   ☑ My Saved Members
- ☑ Members where I'm checked in   ☑ All members*

9204

(* If "All members" is selected, non-member guests can also see if you're checked in, but not where.)

[Save]   [Cancel]

+You Web Images Videos Maps News Gmail More ▼

Google | britannia arms san jose |

Britannia Arms Downtown
173 West Santa Clara Street, San Jose, CA 95113-1707
(408) 278-1400
britanniaarmsdowntown.com
Directions  Search nearby  more ▼

WRITE A REVIEW | upload a photo

Categories: Bar, Restaurant
Price: $$
▶Hours: Today 11:00-2:00 am
Transit: Santa Clara Station (0) (0.2 mi NE)■ 901,902

★★★☆☆ 19 reviews   Your rating: ☆☆☆☆☆

At a glance: fish and chips · happy hour · shepherd's pie · music concerts · night football What's up now (10:42)
- Packed crowd & even gender mix
- 5 checked in (2 men, 3 women, 24 yrs, 2☺, 1♥)
- $1 drink, 50% off appetizer
- Live music, dancing hoozware.com britanniaarmsdowntown.com This band is rockin' the house!

Upcoming events

Dec 16  4:00pm  UFC Fights @ Downtown Brit - UFC fight shown @ Downtown Brit...full card...full bar and full of...
                more - Sport - Add to calendar
Dec 16  10:00pm Sunday NFL Ticket - NFL Ticket Sunday @ Downtown Brit just got bigger. Covered/Heated Patio just
                in... more - Sport  - Add to calendar
sfstation.com

H? Hoozwhere? BETA
...for Nightlife Networking

Welcome, O'Neill's. [sign out]
HOME  CAMPAIGNS  EVENTS  REDEMPTIONS  REPORTS  FIND MEMBERS  SETTINGS VENUE
Home
O'Neill's Campaigns 1 today
Events 1 today
Hooz Here 1W, 32yrs
Survey Sez Packed, Mostly men
★★★★

Today's Activity: Mon, 1/23/12, 6:44P
Checkins: 10
Redeemed offers (prizes): 0 (0)

◉ See how members view my venue

10818

| Campaigns (summary) | Events (summary) | Hooz Visited | Survey Sez | Reviews |
|---|---|---|---|---|

| Crowded? | Gender Mix? | When (Recent consensus) |
|---|---|---|
| Packed | Mostly men | |
| Packed | Mostly men | Today, 5:55P |
| Packed | Mostly men | Today, 4:58P |
| Light | Mostly men | Today, 4:57P |
| Medium | Mostly men | Today, 2:55P |
| Medium | Mostly men | Today, 1:58P |
| Medium | Mostly women | Today, 11:57A |
| Light | Mostly women | Today, 10:56A |
| Light | Mostly women | Today, 10:56A |
| Packed | Even mix | Today, 5:56A |
| Light | Mostly men | Today, 2:55A |

1-10 of 22 First | Prev | Next | Last

10819

Hooz™ Visited sportschic_79 ✓

Samantha1779 lover_3

Bay_Bhee rice_cracker

Discount (%)
10905 — 10%

*Offer Item [Appetizer ∨]

Special Item

10906 — Offer Note [does not include sliders]
(Optional: Enter additional description, e.g., "Bud only", "except Patron".)

10907 — ☑ Recipient Limitations

All Hoozware members will receive the offer unless limitations are indicated below. Each red label allows you to indicate a further limitation, where checking or selecting an option other than "(Any)" *reduces* the number of target recipients. (For instance, students as well as non-students are both included as target recipients unless you check "Student=Yes", in which case all recipients must at least be students, in addition to being limited by all other checked or selected options.)

Personal Info Limitations

Gender [(Any) ∨]
(further limit by gender)

10908 — Age [21 ∨] to [(Any) ∨]
(further limit by age range)

Residence Distance [5 mi ∨] to [10 mi ∨]
(further limit by range of residence distance from my venue)

Drinks  ☑ (Any)        ☐ Never
        ☐ Socially     ☐ Regularly
(further limit to selected drinking frequencies)

FIG. 109B

Lists my venue as a "Bar/Club Fave"  ☑ Yes
(further limit to anyone who lists my venue as one of their Bar/Club Faves)

Interests
- ☐ (Any)
- ☐ Cards / Games / Puzzles
- ☐ Dancing (Ballroom)
- ☐ Dining
- ☐ Music (Live / Concerts)
- ☐ Pool / Billiards
- ☑ Video games
- ☐ Wine tasting (further limit to selected interests)

10909

Student ☐ Yes
(further limit to students)

Gay/Lesbian/Bi ☐ Yes
(further limit to orientation)

Income
- ☑ (Any)
- ☐ $25K-$50K
- ☐ $75K-$100K
- ☐ More than $150K
- ☐ Less than $25K
- ☐ $50K-$75K
- ☐ $100K-$150K (further limit to selected income ranges)

Behavior Info Limitations

Has not visited my venue in the past [1 week ▾] — 10912
(further limit to who has not checked in to my venue recently)

Visited my venue in the past [3 months ▾]
(further limit to who has checked in to my venue recently)

Gets mobile alerts for my offers [✓] Yes — 10913
(further limit to who gets mobile alerts for my offers; alerts are received 2 hours prior to offer becoming valid)

Most recent search ranks my venue in [Top 5 ▾] — 10914
(further limit to anyone whose most recent venue search highly ranks my venue)

Interested in a "singles night" [ ] Yes
(further limit to participants in Crush Matching for dating)

List Limitations

Guest List [VIPs ▾] — 10915
(further limit to who is on one of my venue's guest lists)

Has profile photo in "Hooz Hot" [Top 50 ▾] — 10916
(further limit to who is voted by members to be on the "Hooz Hot" list)

Recipients Limitation

Limit # recipients to a maximum of [50] — 10917
(overall limit: # recipients will never exceed this number)
(If Recurrence is checked below, overall limit is re-applied)

Date/Time

Please specify the date/time for when the campaign's offer is valid. You can also indicate how far in advance to send out the offer in "When to Send Out Offer". (If Recurrence is checked below and there are recurrences on multiple days, then Date refers to the earliest day.)

Date [01/25/2012] 📅  Start Time [11:00A ▼]  End Time [1:30A ▼] — 10920

10918       10919

(A campaign's offer can be valid from 30 mins to 24 hours. If End Time is before or at Start Time, End Time is assumed to be on the next dat. Ex: 11:00A-1:20A means the offer starts at 11:00A one day and runs until 1:30A the next day.)

When to Send Out Offer

Please specift how far in advance to send out the offer relative to when the offer becomes valid. The advance time may be specified directly, e.g., "1 week before offer starts", or indirectly with "Now". All advance times are aprosimate. (If Recurrence is checked below, the advance time is re-applied for each offer of the recurrence, and if "Now" is also selected, the advance time is 30 days.)

⦿ [1 week ▼] before offer starts
○ Now

10921

☑ Recurrence — 10923

This campaign has recurrences on multiple days according to the pattern and range indicated below. Each recurring day represents another day that the campaign's offers are valid. Note that offers may actually be sent out on non-recurring days since they are sent in advance of when they become valid.

FIG. 109E

Pattern

- ○ Daily
- ● Weekly
- ○ Monthly
- ○ Yearly

Every [ ] week(s)

- [ ] Monday
- [ ] Tuesday
- [✓] Wednesday
- [ ] Thursday
- [ ] Friday
- [ ] Saturday
- [ ] Sunday

Range

- ● No end date
- ○ End after [1] pattern(s)
- ○ End after [mm/dd/yyyy]

How to Send Out Offer

Please specify how recurring days are converted to sent offers. Each sent offer may be redeemed only one time but, depending on this selection, may be redeemed on one or more of the recurring days.

- ○ Send out one offer per recurring day ← 10922
  (Each recurring day will have its own redeemable offer.)
- ● Send out one offer per recurring week for a weekly recurrence pattern ← 10924
  (Each weekly offer is redeemable on any recurring day of the weekly recurrence pattern, but may be redeemed only one time.)
- ○ Send out only one offer
  (This one offer is redeemable on any recurring day, but may be redeemed only one time.)

[Submit] [Cancel]

FIG. 109F

VERIFICATION OF REDEMPTION OF AN ELECTRONIC OFFER

RELATED APPLICATIONS

This application is a continuation of, and claims the priority benefit of U.S. application Ser. No. 15/598,879, filed May 18, 2017 and is a continuation of, and claims the priority benefit of U.S. application Ser. No. 14/803,993, filed Jul. 20, 2015, now U.S. Pat. No. 9,824,371, issued Nov. 21, 2017, which is a continuation of, and claims the priority benefit of U.S. application Ser. No. 13/751,035 filed Jan. 25, 2013, now U.S. Pat. No. 9,105,039, issued Aug. 11, 2015, which claims priority to U.S. provisional patent application Ser. No. 61/590,733, filed on Jan. 25, 2012, where the Ser. No. 13/751,035 application is a continuation-in-part of and claims priority benefit to U.S. patent application Ser. No. 12/973,947, filed on Dec. 21, 2010, which claims priority to U.S. provisional patent application Ser. No. 61/313,132, filed on Mar. 12, 2010, and where the Ser. No. 12/973,947 application is a continuation-in-part of and claims priority benefit to U.S. patent application Ser. No. 12/161,554, filed on Jul. 18, 2008, now U.S. Pat. No. 7,856,360, issued Dec. 21, 2010, where the Ser. No. 12/161,554 application is a U.S. national stage entry under 35 USC 371 of PCT application serial no. PCT/US2007/061328, filed on Jan. 30, 2007, which is a continuation-in-part of U.S. patent application Ser. No. 11/307,262, filed on Jan. 30, 2006, now U.S. Pat. No. 7,788,188, issued Aug. 31, 2010, and where the PCT/US2007/061328 Application also claims priority to U.S. provisional patent application Ser. No. 60/823,573, filed on Aug. 25, 2006.

BACKGROUND

MoSoSo (short for "mobile social software") has become a recent phenomenon for social networking. The efforts are primarily directed to either meeting new people or providing a simplified method for keeping track of acquaintances. Various approaches are employed using individual terminology and somewhat different protocols. Some of the existing approaches are concerned with the manner of introducing people to each other.

For example, Mobido™ (www.mobido.com) collects photographs of members and can provide the photograph to another member under certain restricted circumstances. It also provides for individuals or businesses to be contacted through the use of "tags."

Wave Market promotes StreetHive™ (www.streethive.com) which provides social networking and location tagging between friends. It allows people to know where others are and to contact such people.

Dodgeball™ (www.dodgeball.com) provides another social cell phone capability, where you can communicate with groups of friends. It also provides addresses of venues.

There are a number of other groups that provide for similar services that can be found at www.zogo.com, www.meetro.com, www.plazes.com, www.bedd.com, www.smallplanet.com, www.sixsense.com, www.jambo.net, www.mobiluck.com, www.icontact.com, www.imahima.com, www.proxpro.com, www.ravewireless.com, www.intercastingcorp.com, www.loopt.com, www.jaiku.com and www.satelx.com.

For the most part the MoSoSo capabilities are primarily for the users of the system to allow for meeting people and locating a defined group of people. They do not concern themselves with providing opportunities for businesses to direct their communications to likely patrons. Rather, their attention is directed to the individual subscribers and looking for points of similarity between the subscribers to bring one subscriber to the attention of another.

There is substantial interest in providing venues, where people perform individual transactions, with information that allows them to attract clientele to their venue based on the traits, behavior and demographics of people at the venue and the desired traits, behavior and demographics that the venue wishes to achieve. By demographics is meant a statistic concerning a selected population, often a population where each person possesses the same trait or traits. Systems and methods are valuable that empower the venues to compete for desirable clientele based on reliable information about potential clientele and provide for efficient use of the venue's resources, while enabling the client to select a venue based on current information, including promotions, regarding the venue.

RELEVANT LITERATURE

Hancock, John, WO 02/01405 A1, describes a people networking and locating system. Lovison et al., US 2004/0220922 A1, describes a system for meeting people via wireless communication. Randall et al., US 2004/0249846 A1, describes a database for use with a wireless information device. Randall et al., US 2004/0024846 A1, describes a method of enabling a wireless information device to access data services. Knauerhase et al., US 2004/0203746 A1, describes location-specific collaboration for mobile devices. Piccionelli et al., US 2004/0010608 A1, describes a remote dating method. Salton, US2005/0076078 A1, describes an event based communication system. Forsyth, US 2004/0137882 A1, describes a group communication method for a wireless communication device. Alpdemir et al., U.S. Pat. No. 6,934,684 B2, describes a voice-interactive marketplace providing promotion and promotion tracking, loyalty reward and redemption, and other features. Alpdemir et al., US 2004/0006478 A1, describes a voice-interactive marketplace providing promotion and promotion tracking, loyalty reward and redemption, and other features. Carlton et al., US 2004/0203363 A1, describes a portable communication apparatus and method for match-making with unique user ID. Hendry, US 2004/0151315 A1, describes a technique for managing and querying moving point data. LaBrie et al., US 2002/0047861 A1, describes a site information system and method. Srinivasan et al., US 2002/0022488 A1, describes a method and apparatus for time-aware and location-aware marketing. Alley, US 2005/0003759 A1, describes and anonymous communication device. Guichard et al., US 2005/0132305 A1, describes an electronic information access system, methods for creation and related commercial models. Tanaka, U.S. Pat. No. 6,819,919 B1, describes a method for providing matching and introduction services to proximate mobile users and service providers. Nagendran, U.S. Pat. No. 6,731,940 B1, describes methods of using wireless geolocation to customize content and delivery of information to wireless communication devices. Drutman et al., U.S. Pat. No. 6,618,593 B1, describes a location dependent user matching system. Hertz et al., U.S. Pat. No. 6,571,279 B1, describes a location enhanced information delivery system. Fraccaroli, U.S. Pat. No. 6,549,768 B1, describes a mobile communications matching system. Olivier, U.S. Pat. No. 6,480,885 B1, describes dynamically matching users for group communications based on a threshold degree of matching of sender and recipient predetermined acceptance criteria. Alagappan et al., US 2005/

0210387 A1, describes a system and method for the aggregation and matching of information. Sudit, US 2005/0202817 A1, describes a system and method for exchange of geographic location and user profiles over a wireless network. Wilson et al., US 2005/0193054 A1, describes a multi-user social interaction network. Weaver et al., US 2005/0181803 A1, describes a system for combining geographic location information, database-derived affinity matches, and user control in order to permit individuals to rendezvous. Bourne, US 2005/0177614 A1, describes a method and computer system for matching mobile devices users for business and social networking. Mgrdechian et al., US 2005/0174975 A1, describes a system and method for wireless communication between previously known and unknown users. Karaizman, US 2005/0054352 A1, describes introduction system and method utilizing mobile communication. Brandenberg et al., US 2005/0043060 A1, describes method and apparatus for scheduling presentation of digital content on a personal communication device. Chaudhuri, US 2005/0038876 A1, describes a system and method for instant match based on location, presence, personalization and communication. Ryan et al., US 2004/0215793 A1, describes a personal contact network. Mayer, US 2004/0122810 A1, describes a system and method for searching, finding and contacting dates on the internet in instant messaging networks and/or in other methods that enable immediate finding and creating immediate contact. Paddon, US 2004/0107283 A1, describes a system and method for the aggregation and matching of personal information. Mahmood, US 2004/0006548 A1, describes a subscriber profile matching and positioning system for mobile units in a communication system. Marshall, US 2003/0233278 A1, describes a method and system for tracking and providing incentives for tasks and activities and other behavioral influences related to money, individuals, technology and other assets. Kautto-Kiovula et al., US 2003/0117432 A1, describes a method, system and apparatus for constructing fully personalized and contextualized user interfaces for terminals in mobile use. Hendrey et al., US 2003/0060214 A1, describes a system and method for initiating responses to location-based events. Bearden, III et al., US 2003/0014275 A1, describes an attendee electronic sporting event information transmitting and storage systems. Pierce et al., US 2002/0184653 A1, describes services based on position location using broadcast digital television signals. Kojac et al., US 2002/0161657 A1, describes a system for rapid identification of vehicle occupants for the purpose of facilitating mobile sales marketing, communication and safety. Chan et al., US 2002/0068585 A1, describes an intelligent mobile information system. Tuoriniemi et al., US 2002/0034292 A1, describes a system and a method to match demand and supply based on geographical location derived from a positioning system. Schultz et al., US 2002/0010584 A1, describes an interactive voice communication method and system for information and entertainment. Portman et al., U.S. Pat. No. 6,944,447 B2, describes location-based services. Gailey et al., U.S. Pat. No. 6,848,542 B2, describes a method for passive mining of usage information in a location-based services system. Brandenberg et al, U.S. Pat. No. 6,834,195 B2, describes a method and apparatus for scheduling presentation of digital content on a personal communication device. Stewart et al., U.S. Pat. No. 6,414,635 B1, describes a geographic-based communication service system with more precise determination of a user's known geographic location. Stewart et al., U.S. Pat. No. 6,259,405 B1, describes a geographic based communications service. De Vries, US 2005/0227676 A1, describes place specific buddy list services. Randall et al., US 2005/0169446 A1, describes a method of and apparatus for communicating user related information using a wireless information device. Barnes, J R., US 2005/0136949 A1, describes a portable communications device and method of use. Wentink, US 2005/0135305 A1, describes automatic peer discovery. Godfrey, US 2005/0130634 A1, describes location awareness in wireless networks. Gailey et al., US 2005/0102180 A1, describes passive mining of usage information in a location-based services system. Davis et al., US 2005/0078088 A1, describes an enhanced input peripheral. Hjelt et al., US 2004/0266480 A1, describes a system and method for implementing sensor functionality in mobile devices. Ryan et al., US 2004/0215793 A1, describes a personal contact network. Weisman et al., US 2004/0148638 A1, describes a method and apparatus for entertainment and information services delivered via mobile telecommunications devices. Dor et al., US 2004/0088551 A1, describes identifying persons seeking access to computers and networks. Chaskar, US 2004/0081120 A1, describes a method and apparatus providing user programmable, personalized location-aware services. Harper et al., US 2004/0015562 A1, describes a method, apparatus and system for management of information content for enhanced accessibility over wireless communication networks. Keeler et al., US 2003/0233332 A1, describes a system and method for user access to a distributed network communication system using persistent identification of subscribers. Marshall, US 2003/0233278 A1, describes a method and system for tracking and providing incentives for tasks and activities and other behavioral influences related to money, individuals, technology and other assets. Barnes, J R., US 2003/0220835 A1, describes a system, method, and computer program product for providing location based services and mobile e-commerce. Ljubicich et al., US 2003/0115288 A1, describes a technique for effective management of information and communications using a mobile device. Benjamin et al., US 2003/0073406 A1, describes multi-sensor fusion. Portman et al., US 2002/0160766 A1, describes location-based services. Mashimo, US 2002/0138325 A1, describes an event invitation method and system. Tanaka et al., US 2002/0123934 A1, describes a method and apparatus for location-sensitive, subsidized cell phone billing. Diacakis, US 2002/0120774 A1, describes a method of sending a communication from a first terminal to a second terminal via a host. Diacakis, US 2002/0116461 A1, describes a presence and availability management system. Abbott et al., US 2002/0087525 A1, describes soliciting information based on a computer user's context. Chan et al., US 2002/0068585 A1, describes an intelligent mobile information system. Obradovich et al., US 2002/0013815 A1, describes a technique for effective organization and communication of information. Green et al., US 2001/0051973 A1, describes a system, method and computer program product for a locator service. Abbott et al., US 2001/0043232 A1, describes thematic response to a computer user's context, such as by a wearable personal computer. Koopersmith, US 2001/0042002 A1, describes a method and system for communicating targeted information. An article in Red Herring Magazine, "LBS Startups to Watch: A slew of location-based services startups are hoping to make serendipity a little more regular," Oct. 17, 2005 Print Issue, online at: http://www.redherring.com/Article.aspx?a=14210&hed=LB S+Startups+to+Watch, describes companies developing mobile social software.

SUMMARY OF THE DISCLOSURE

One embodiment of the subject invention provides a system for providing a service to venues where people aggregate. Another embodiment of the subject invention provides a system for providing a service to venues where people perform individual transactions. The system provides a mobile promotion system for advertisement and offers, collectively referred to as promotions. The system is also capable of providing a service to sponsors, where venues and sponsors are collectively referred to here as "promoters." A system data processor can receive promotions from promoters wanting the attention of members, particularly members at a desired location, and, optionally using instructions from such promoters, can forward the promotions to members of the system. Such instructions may comprise directions for how a particular promotion should be directed to members of a desired demographic group, a member possessing a desired trait or a member exhibiting a desired behavior, any of who are at a desired location.

The system includes a number of parameters which, depending upon the particular service, may share a plurality of the parameters. Among the parameters is the ability to identify the location of a person and a transaction between such person and a venue. Another parameter provides for social networking. Depending upon the application of the system, several of the parameters will be employed together. Transactions typically involve (1) a purchase transaction using an electronic transaction, such as a credit, debit or charge transaction, or (2) a redemption transaction for the redemption of an offer.

One parameter involves information concerning the traits, behaviors or demographics of people who attend the venues. Such information will be of interest to some of the venues and people. In all cases, the people are members of an organization, such as Hoozware™ interested in the presence of the members at the venues. The organization uses a system data processor that receives location information and processes and provides organization information to the members and in some applications to the venues. The venues have characteristics or promotions of interest to the members, and which may be provided to the members with organization information.

The system includes at least (1) mobile communication devices of members, and (2) a system data processor having data comprising location and optionally traits of people who are members of the organization. The system data processor can be a computer server and typically includes at least a system microprocessor and system computer memory and either has or has access to a system database of information. The system data processor can be a cloud computing system. The system data processor provides member-intended information to be viewed on mobile communication devices of members, where the member-intended information comprises characteristics and/or promotions of the venue(s). In addition, the system data processor can also include trait and behavior information of members, location information received from the mobile communication devices or venues, and can include characteristic information concerning the venues. Location information is obtained by virtue of an action by a member; although the mobile communication devices may comprise global positioning system (GPS) capability to provide location information. The system data processor can process the information present in the system computer memory and system database and provide venue-intended information that may include trait information, behavior information, and demographics of the members or non-members; and/or member-intended information that may include in addition to the other information indicated above, characteristic information and promotions relating to venues. The system data processor can also serve to receive (1) information from the venues, such as characteristic information and promotions, and (2) information from the members, such as location information and characteristic information. The system data processor may also help facilitate communication between members.

Typically the system data processor stores information concerning traits, behaviors and demographics of the members, venue characteristics, and other information, in a system database. In one application, the subject invention has applicability where a member performs an action at a primary venue, and the primary venue or secondary venues may have an interest in providing characteristics and/or promotions to the member at the primary venue. The organization will have a commercial relationship with at least one of the venues. This application is not directed to social networking and is based on information received from the member or a third party. The member may be at the primary venue to purchase a product or redeem an offer provided by the organization on behalf of a venue.

In the case of a product purchase, when the member makes a purchase transaction, such as an electronic transaction using a debit card, credit card, charge card, PayPal®, Google Pay®, a mobile phone, and the like, the organization can have a relationship with the entity governing the purchase transaction, referred to here as the purchase-transaction entity, whereby the purchase-transaction entity will promptly provide the location information of the purchase transaction, and optionally the nature of the purchase, to the organization. The purchase-transaction entity will provide the vehicle by which the purchase transaction is accomplished. Typically, when permission is granted by the member, the purchase-transaction entity provides the organization with a member identifier, or member ID code, for the member that is associated with the purchase transaction.

In the case where the member is redeeming an offer, the offer will be displayed on the member's mobile communication device. The offer will include the particular venue at which the redemption is to occur, or when there is a related chain of venues, provide coding to indicate at which of the venues of the related chain the redemption is to occur. When the member redeems the offer in accordance with the organization's protocol, the data processor will determine or infer the location information of the member by virtue of knowing at which venue the redemption occurred and knowing the location of that venue. Once the system data processor has determined the location information of the member, promotions or characteristics of the primary and/or secondary venues can be viewed using the member's mobile communication device. In some instances the mobile communication device may have GPS capability, and with the permission of the member, upon the occurrence of a transaction, for example as notified by the purchase-transaction entity (or other transaction entity), location information will be retrieved by the system data processor from the mobile communication device having GPS capability.

The organization's redemption protocol may include any convenient redemption protocol. The redemption protocol may include the member viewing a promotion on their mobile phone and showing the promotion on their phone to a venue representative. Optionally, the member may make a selection on their phone indicating that they wish to redeem the promotion, or the member may send indication of their desire to redeem the promotion to a venue representative. The member may then need to show or send the redeemed promotion on their phone to the venue representative, or may be requested to select another option on their phone to verify the redemption. Such a verification step may cause a message to be sent to the venue or the venue representative, including the venue representative's mobile phone. Alternatively, to redeem a promotion, the member may show their mobile phone to a venue representative, where the mobile phone may display a code, such as a bar code, that the venue representative scans in order to redeem the promotion or otherwise perform a transaction.

In effect, the data processor can receive the location information in a variety of ways, including: (1) the location information is transferred to the data processor by virtue of a purchase transaction, such as an electronic transaction, by a purchase-transaction entity; (2) the location information is determined by virtue of the offer redemption transaction, such as at a venue of a known location, by a redemption-transaction entity; or (3) the location information is retrieved from a mobile communication device having GPS capability. Both the purchase transaction and redemption transaction are transactions, and the purchase-transaction entity and the redemption-transaction entity are transaction entities. The organization can be a transaction entity.

Location information typically includes both "when" and "where" related to a transaction. Different transaction entities provide location information with different temporal and positional resolutions and accuracies. Transaction entity policy, as well as technical reasons, may be responsible for a particular resolution employed or resulting accuracy.

Location information typically comprises a narrow range of time (i.e., timeframe) for a transaction and a narrow vicinity of location of a member initiating, performing or otherwise related to the transaction. A narrow range of time may include within the last second, within the past minute, within the past 5 minutes, within the past 15 minutes, within the past half hour, within the past hour, within the past two hours, and the like. A narrow vicinity may include any of the following, or a radius from any of the following: a latitude and longitude; a name of a venue such as a department store, specialty store, grocery store, restaurant or bar; the name of a group of venues; the name of a neighborhood; the name of an intersection; a range of streets providing a bounding; the name of a shopping center; the name of an airport or other transit station; the name of a park; the name of a public place; the name of a landmark; and the like. The choice of radius depends on whether walking or driving distance is desired. For walking, a convenient radius is from a few feet to a mile. For driving, a convenient radius is from a few feet to 30 miles.

A computer program running on the system data processor can use the location and trait information of members to determine the demographics of members, including the number of members at the venues, and optionally estimate the demographics of attendees (i.e., including non-members) at the venues. The computer program may also determine the demographics of members, and estimate the demographics of people, in the vicinity of the venues. The computer program may also predict, based on the number of members using the system, how many people may soon arrive to a venue.

The system of the subject invention applies generally to any venue where people assemble or goods are sold, such as department stores, supermarkets, stores at malls, night clubs, restaurants, bars, etc., that is, places where people go to obtain goods, usually purchase goods and places associated with groups of people who typically don't know each other and are interested in an enjoyable experience that may be associated with shopping, eating or entertainment. To clarify how the subject invention may be practiced, the description below will primarily focus on two embodiments: one where the venue is where goods are sold and the other where the venue is for socializing and entertainment.

The system of the subject invention is referred to here as the "Hoozware$^{SM}$" system, a play on the phrase, "Who's where?" "Hoozware$^{SM}$", "Hoozware?$^{SM}$", "H?$^{SM}$" "Hoozware . . . so you know who's where.$^{SM}$" and "Hoozware . . . who's where, what's happening, right now!$^{SM}$" are all service marks of Hoozware, Inc. The Hoozware system is a service which helps promoters target advertisements to specific desired clientele who are members of the Hoozware system. Members of the Hoozware system in turn are encouraged to use the Hoozware system in order to receive rewards, including: financial rewards from the organization, which in this case is the operator of the Hoozware system, rewards such as promotions from promoters and receiving information regarding the characteristics of the venues.

In the case of a venue for the transfer of goods, the member will generally be present at the venue to obtain goods, by purchase and/or by redemption of a promotional coupon. The venue at which the member is present or other venues in the vicinity have the opportunity to inform the member of promotions. Since the member will usually be shopping, the promotion has a greater likelihood of being acted upon than an advertisement in a newspaper or other promotion distant from the venue.

In the case of a venue for socializing and entertainment, such as a nightclub, much of the information comes in real time from other members of the Hoozware system who are attending, or recently attended, the venue. The Hoozware system helps the managers efficiently and effectively determine which members fit the profile of clientele they seek to entice to their establishment at a particular moment in time. The Hoozware system also helps its members efficiently use their time to determine which venue has the atmosphere, music, crowd, etc., they desire at a particular moment in time. Hotels could provide their hotel guests with a "guest" membership to the Hoozware system to use while they're staying at the hotel to aid their guests in efficiently using their time to find a local hot spot to hang out at after they've finished with their business for the day.

Members can be incentivized to provide their location information to the system data processor by checking in at the venue using their mobile phone. An example incentive is qualification to participate in a game, including a game of chance. The game may be against a computer, including a program running on the mobile phone or the Hoozware server. The game may also be against other people, including other members. In one example, after checking in, a simulated roulette wheel can be presented on the phone display, where the member may press a key to initiate the spin and determine whether s/he receives a prize, e.g., a 2-for-1 drink or even a free drink. Another exemplary game is a "shell game" game of chance where there are four shells, or even four drink shakers, displayed. The member selects one of the shakers which causes it, or up to all the shakers, to be raised on the display showing what is virtually beneath them. If beneath the selected shaker is a full drink glass, the member wins. Underneath "non-winning shakers" an empty glass may be displayed. Limiting the time in which the prize can be redeemed by the member at the venue ensures that the member is checked in at the venue prior to playing the game. Depending upon the nature of the venue, different scenarios can be employed for the game.

The Hoozware system helps a promoter find answers to one or more of the following questions and contact relevant members with promotions: (1) Who is currently at other venues; (2) who is in the vicinity; (3) who is out now who was previously at their venue; (4) who has not already been to their venue; (5) who likes the type of goods or entertainment, including type of music, that their venue is offering; and the like.

The Hoozware system relies largely on Hoozware system members for automatically and voluntarily providing data which are compiled by the Hoozware system and used by the promoters to address desired customers, and used by other Hoozware system members to determine desirable venue destinations. For goods-selling venues, one way to locate a member is by the member performing a transaction. The transaction may be a purchase transaction, such as an electronic transaction, where the cost may be paid through a third party, or the transaction may be a redemption of a coupon using the member's mobile phone, which coupon is provided by Hoozware on behalf of a promoter. In the case where the cost is paid through a third party, the third party can have an agreement with Hoozware to notify Hoozware of the location of the transaction of the Hoozware member.

A first important example of the subject invention includes a system comprising a network of venues and an organization communicating with the venues, the organization having people as members, the venues having promotions or characteristics of interest to the members, wherein when a member transacts a transaction at a venue, the location and time of the transaction is communicated to the organization, the system comprising: mobile communication devices of the members; a system data processor having data comprising: (A) member and venue information; (B) location information received by the data processor in the timeframe of the transaction, the location information comprising the location and time of the transaction; and (C) the characteristics or promotion of at least one venue; wherein when the transaction is transacted the location information is transmitted from the site of the venue to the data processor; the data processor transmits the location information to at least one venue or the data processor has previous instructions from the at least one venue as to whom should receive characteristic or promotion information; the at least one venue may transmit characteristic or promotion information based on the location information to the data processor or may transmit characteristic or promotion information prior to receipt of the location information; and the data processor transmits the characteristic or promotion information received from the at least one venue to the mobile communication device.

A second important example of the subject invention includes a system for providing a service to promoters associated with an organization having people as members, the promoters having characteristics or promotions of interest to the members, the system comprising: mobile communication devices of the members; a system data processor having system data comprising: (A) location information as a result of a transaction of a member at a venue; and (B) the characteristics or the promotions; and the system data processor processing and providing a member member-intended information comprising at least a portion of the characteristics or the promotions.

This second important example includes a number of important variations, including:

1. wherein the location information includes a narrow range of time for the transaction;
2. wherein the location information includes a narrow vicinity of location;
3. wherein the mobile communication device of the member has position-sensing capability and at the time of the transaction provides the location information; and optionally (i) wherein the location information includes the location of the member, or (ii) wherein the position-sensing capability employs at least one of GPS, A-GPS, cell-towers, WiFi access points, WiMAX and IP addresses;
4. wherein the member-intended information is viewable on the mobile communication device of a member;
5. wherein at least a portion of the traits, behaviors or demographics of people who attend the venue is provided to the promoter;
6. wherein the promoter is associated with the venue;
7. wherein the promoter is not associated with the venue;
8. wherein a transaction entity provides (A) the location information to the system data processor, and optionally the system data processor refines the location information, or (B) the transaction occurrence time when the transaction occurs, wherein the mobile communication device of the member provides the location information associated with the transaction occurrence time to the system data processor, and wherein the mobile communication device receives the location information from at least one of (a) position-sensing capability, (b) data provided by the member and (c) another organization; and optionally (i) wherein the another organization determines the location information from position-sensing capability associated with the mobile communication device or from data provided by the member, (ii) wherein the position-sensing capability is associated with the mobile communication device, (iii) wherein the transaction is a redemption transaction or a purchase transaction, (iv) wherein the transaction entity is the organization, or (v) wherein the location information comprises at least one of (a) latitude and longitude, (b) a code, (c) Zipcode, (d) name of the venue and (e) location center and radius;
9. wherein the transaction is a redemption, and the system data processor determines the location information from the location of the venue where the redemption Occurs;
10. wherein the transaction is a purchase transaction and a purchase transaction entity provides the location information to the system data processor; and
11. wherein the transaction is a purchase transaction, a purchase transaction entity notifies the system data processor of the purchase transaction, and the mobile communication device having the position-sensing capability provides the location information to the system data processor.

For socializing and entertainment, members can "opt in" to the Hoozware system by signing up with Hoozware to use the web version or by loading Hoozware system software onto their mobile telephone, which may be GPS-capable and sometimes simply referred to here as their "GPS mobile phone". In brief, the Hoozware system records the location of its members and compiles data and statistics about the members that are attending each venue and makes the data and statistics available to the venue managers and optionally to other members.

Data provided by members of the Hoozware system are sent to a Hoozware system server computer using the member's mobile phones. When a member with a GPS mobile phone selectively provides to the Hoozware system server the GPS location of their mobile phone, the location is also assumed to be the location of the member. The Hoozware system server runs a computer program with a computer algorithm which compares each member's updated variable position to the known fixed position of each venue, which for example, is a nightclub. The computer program may classify a member as: a nightclub candidate, in proximity to a nightclub, on the way to a nightclub, at a nightclub, etc. Such classification may be used by nightclub managers to determine which targeted advertisement to send to the member. Such advertisements are sent by the nightclub manager to the Hoozware system which then directs the advertisement message to the desired member's mobile phone or their account.

A member might be classified by their location (such as if they're in a particular neighborhood or restaurant), proximity to other members, the day of the week and time of day, as well as their previous venue history or previous pre-venue activity, to be a "venue candidate." If persistent GPS location information is provided by a member in order to track their particular route or trajectory, a member might be classified as "on the way to a venue." By using the GPS location information of a member to track their trajectory to a venue and then observing that the GPS signal disappeared while the member's GPS mobile phone is still turned on, the member might be classified as "inside a venue."

A Hoozware system member's GPS mobile phone may persistently submit their position to the Hoozware system server for behavior analysis and comparison with venue locations. Alternately, a member might allow their position information only to be sent to the server at specific times.

In one application, a member is only permitted to inquire about nightclubs and other members at nightclubs during the time when their own information is provided to the Hoozware system server, thus encouraging members to make their own information known as much as possible. For instance, for privacy reasons, a member might restrict that their position information only be provided to the Hoozware system server on Thursdays, Fridays and Saturdays from 9:00 p.m. to 3:00 a.m. the following morning. In this case, the member would only be allowed to inquire and access statistics of other Hoozware system members and nightclub characteristics during that same timeframe to see where the hot nightclubs are located. In another scenario, a member might restrict their position information to be updated Tuesdays through Saturdays between the hours of 3:00 p.m. to 3:00 a.m. In this case, the member would be allowed to inquire and access statistics of other Hoozware system members and nightclubs (or bars) to additionally know which venues are the hot happy hour locations. In another scenario, a member's position information may be sent to the Hoozware system server for a period of time after they have done a nightclub search.

Promoters may place general or highly targeted advertisements with the Hoozware system to be forwarded to members of the Hoozware system, either asynchronously, or at strategic times, such as when the Hoozware system member is requesting information on other Hoozware system members or a venue or product, or the Hoozware system otherwise determines that the member is a "venue or product candidate." Members typically view such ads visually and/or aurally on their mobile phone, but members may also receive such ads via email to their home computer, postal mail to their physical address, or any other way people receive advertisements. For instance, the Hoozware system may inform one or more nightclubs that the Hoozware system has classified a member as a "nightclub candidate." A nightclub that the Hoozware system informs of the candidate may request that the Hoozware system forward an advertisement to the Hoozware system member, with an "offer number," such that if the member arrives at their nightclub by a particular time and presents the offer number they will receive a reward, such as a discounted cover charge or drink special, etc. Thus, a nightclub can place real-time, highly targeted and focused ads with the Hoozware system, which ads may, for example, be based on whether or not the nightclub is behind its attendance or drink revenue quota at a particular time. The Hoozware system may also allow a nightclub to post and advertise the nightclub's website, phone number or other marketing information provided by the nightclub.

The Hoozware system may also provide statistics on the Hoozware system members to taxicab companies and to other organizations interested in knowing the temporal movement patterns of the Hoozware system members. In this way, taxis might adjust where to sit at particular times on particular nights according to the crowds on hand. Hoozware system members detected as leaving a nightclub may be queried, through the Hoozware system, whether they need a taxi. If so, the Hoozware system may find a taxi for them and receive a financial benefit from either the taxi service or the member as a service fee.

Hoozware system members may elect to be notified when their desired crowd demographics or nightclub characteristics, including atmosphere, band, etc., for one or more nightclubs change. For instance, if the percentage of single women at a first nightclub that a male Hoozware system member is attending drops below 40%, while the percentage at a second nightclub in the area moves above 60%, the Hoozware system may send the male member a text message (or any other effective notification) alerting him to that fact. The Hoozware system may also inform the second nightclub of the male member's desired characteristics and suggest that the second nightclub send the male member a special offer through the Hoozware system to entice him to switch nightclubs. For example, the second nightclub may then send him a targeted message asking him if he'd like a taxi, a reduced cover charge and drink special to switch from the first nightclub to the second nightclub. The Hoozware system may also inform the first nightclub of the male member's desired characteristics and suggest that the first nightclub send the male member a special offer though the Hoozware system to entice him to stay. Accordingly, the Hoozware system may include features for nightclubs to, in effect, set up bidding wars for clientele. For example, a nightclub that a Hoozware system member is not attending may be encouraged to send a special offer to the Hoozware system member to lure him or her away. Similarly, the nightclub that the Hoozware system member is presently at may be encouraged to offer the Hoozware system member specials, such as drink discounts, to encourage him or her to stay at their nightclub.

Dictionary.com defines "demographic" as "of or relating to demography; 'demographic surveys' n: a statistic characterizing human populations (or segments of human populations broken down by age or sex or income etc.)."

Thus, the Hoozware system presents useful summary numbers in useful categories to its members. Rather than merely listing people present at a venue along with all their traits and requiring a receiving member to digest the data, the Hoozware system processes the traits of those people present at a venue and presents a summary of the information which may include desired category statistics, i.e., demographics. For example, rather than just providing the following data for members present at a venue: Bill, male, 25; Amy, female, 31; Jill, female, 29; the Hoozware system may provide the following data: 3 members present; 66% female/33% male; 66% of members in age range 25-29; 50% of females in age range 25-29.

The Hoozware system may allow a particular member to register with the Hoozware system or with a particular nightclub as a "preferred customer." For instance, a heavy drinker, or beautiful woman, may be registered as a preferred customer by a nightclub. Such registration allows the nightclub to be alerted when the preferred customer is nearby and so the nightclub may send them a special targeted incentive, via the Hoozware system, to encourage the preferred customer to come to their nightclub.

Much has been described thus far regarding the services that the Hoozware system can provide to a venue, such as a nightclub. However, the Hoozware system can provide more value to a nightclub as the member base and amount and quality of data provided by the members of the Hoozware system increase. Thus, the Hoozware system may provide reward incentives to encourage people with GPS mobile phones to: opt into the Hoozware system, make their location known to the Hoozware system server for as long as possible, provide their personal data, post useful information regarding nightclubs they are attending or recently attended, etc. Exemplary reward incentives which may be provided to Hoozware system members are described below.

Hoozware system members may be rewarded, financially or otherwise, for contributing information. For instance, Hoozware system members may be rewarded more if they permit their GPS mobile phone to update their position more time throughout the week. Other rewardable contributions may include: confirming that they've entered a particular nightclub; posting their personal data; frequency of use of the Hoozware system; posting of comments, photos, movie/video clips, audio clips, voicemails, emails, and the like from the nightclub, etc. Hoozware system members may receive more rewards based on the quality of their postings, according to amount of use or ratings as determined by inquiring Hoozware system members, or as determined by other means. Rewards may include sharing of Hoozware system financial profits. In this way, the Hoozware system is a co-op, where the most loyal, contributing members receive the most rewards. Other rewards may include incentives offered by the nightclubs, discounted phone bills, airline miles, store credits, drink specials, cover charge specials, Hoozware system honors, and the like.

As mentioned previously, the Hoozware system tracks the position of its members and compiles statistics and demographic information about the members that are attending nightclubs. The Hoozware system makes certain information and statistics about the members available, either directly or indirectly, to the nightclubs, in addition to other Hoozware system members. For example, using the GPS location of its members, the Hoozware system computer program running on the Hoozware system server determines whether or not to classify a member as attending one of the nightclubs at a point in time. Other Hoozware system members may then receive information informing them of the number of members in attendance at each nightclub (i.e., the minimum number of people there) and even an estimate of the total number of people in attendance, which additionally accounts for non-Hoozware system members.

Hoozware system members can use the Hoozware system to determine before going out for the evening, or even while in attendance at one nightclub, which other nightclub has a "desirable crowd." At minimum, an "inquiring member" can receive from the Hoozware system the number of people known to be in attendance at each nightclub. Typically, if the inquiring member has provided their own demographic information they can also receive a compilation of similar demographic information of the crowd at each nightclub. Under certain circumstances, a member may also be allowed to "drill down" and review more detailed information related to the personal profile of a particular Hoozware system member, where the personal profile includes personal data.

Members using the Hoozware system to help them determine which nightclub to attend may receive characteristics about the nightclubs, as well as, information about the crowds in attendance at the nightclubs, including crowd sizes, other demographics, attendee photos, attendee videos, and the like. Hoozware system members may also use their mobile phone, PDA, home computer, etc., to post their own comments about a club they're attending or attended recently. Hoozware system members may also post geotagged data for a nightclub (that is, data associated with the geographical location of a particular nightclub), including photos, movie/video clips from the nightclub, sound clips (e.g., of the DJ, band, sound system, etc.), and the like, which helps other members to get a better sense of the nightclub atmosphere, the type of music being played, the type of clientele in attendance, the lighting, and the like.

Members may inquire and receive information about the nightclubs in textual form, graphical form, auditory form, or a combination. In one embodiment, a Hoozware system member launches the Hoozware system application on their GPS mobile phone. They may narrow the nightclub search space by selecting a desired city, with an optional search radius. Alternately, they could narrow a nightclub search space by defining a geographical search space using landmarks, such as streets, bridges, rivers, buildings, county lines, state lines, other geotagged objects and the like, or distances from such landmarks. Hoozware system members may direct their nightclub search by listing in decreasing order of preference, or listing with weighting factors, what they feel most important to them when searching for a desired nightclub at that time. For instance, as the most preferred search criterion, a member might request a nightclub with the most people; as a second preferred search criterion a member might request the highest ratio of single heterosexual women to men; as a third preferred search criterion a member might request the average age to be 25-29; as a fourth preferred search criterion a member might request a live band; and as a fifth preferred search criterion a member might want the club to be within a five mile radius of where he or she is having dinner.

The computer program with computer algorithm running on the Hoozware system server digests data about each nightclub, including data provided by other Hoozware system members, data provided by the nightclub itself (such as whether they have a live band), and data available from other sources, and ranks the nightclubs in the member's selected search space based on the preferential criteria defined by the member (such as provided by the example in the previous paragraph). In one embodiment, if a Hoozware system inquiring member specified a particular city as the desired search space, a graphical map appears on the inquiring member's GPS mobile phone display with icons located on the map representing nightclubs. The nightclub scoring the highest rank by the Hoozware system server may be displayed with a red color (i.e., "hot!"); the next highest rank may be displayed in a color closer to orange; etc.; with the lowest ranking nightclub being displayed with a blue color (i.e., "cold."). The map may be zoomed and scrolled to provide more detailed information about a particular nightclub. As an alternative to, or in combination with the map-based display, a text-based list of nightclubs with score ranking may be displayed. A particular nightclub may also be specifically selected by the inquiring member in order to receive more details about that nightclub. An example of specific details that an inquiring Hoozware system member might receive is: (1) 347 Hoozware system members; 412 total estimated attendees; (2) 63% single heterosexual women; (3) 28 years average age; (4) 80's cover band started at 10:00 p.m. and (5) 3.7 miles away; approximately 10 minutes by taxi.

The total number of attendees may be determined by a variety of estimation methods. By estimation, it is intended that from a known measurement, a calculated value is obtained based on an algorithm. For instance, if previously the total number of attendees at a nightclub was counted by the nightclub, or by another organization, and compared with the number of Hoozware system members at that nightclub to establish a ratio (total attendees/number of members), then that same ratio could be applied to (multiplied by) the number of Hoozware system members on another night to estimate the total number of nightclub attendees. This same technique could similarly be applied to estimate other totals for a nightclub, such as the total number of single women, the ratio of women to men, etc.

Hoozware system members may define different desirable "mood" profiles, where depending on the member's mood, they may specify different nightclub rankings For instance, a male Hoozware system member might define his default mood as "Meeting women," which specifies the most preferred search criterion as "The largest percentage of single females," and a second preferred search criterion as "Hip hop Di." The member might define a second mood profile as "Hanging with the boys," with the most preferred search criterion as "Drink specials," and the second preferred search criterion as "Pool table."

The computer algorithm that ranks the nightclubs for each member may employ search and ranking algorithms, such as provided by companies like Google, Yahoo!, Microsoft, Ask Jeeves, and the like. The computer algorithm may also employ classification algorithms, including but not limited to statistical classification techniques (including Bayesian Decision Theory, etc.), vector quantizers, neural network algorithms, other Computer Science search and ranking algorithms, and the like.

Typical inputs to the computer algorithm include data such as: member traits, nightclub demographics and nightclub characteristics. Member traits are personal features, beliefs, lifestyles, etc. of a member that are typically either inherited or chosen by the member. Member traits typically comprise: age, sex, sexual orientation and preference, education, race, religion, smoker/non-smoker, marital status (e.g., single/married/committed/divorced), parental status, financial status, occupation, home zip code, political affiliation, pictures, both direct and anonymous contact information, friend status, group status, as well as other online dating categories including physical attributes (e.g., height, weight, eye color, hair color, balding, body type, etc.), etc.

Nightclub demographics comprise statistics of the member population at a nightclub. The nightclub demographics typically comprise: the number of members in attendance at a nightclub, the number of members plus estimated non-members in attendance, as well as, statistics of the trait categories of the members, where the statistics may include the number and percentage of members possessing a particular trait.

Nightclub characteristics are features, rules, etc. that an attendee may find important, attractive or objectionable about a nightclub, other than aspects directly attributable to the other clientele in attendance. Nightclub characteristics typically comprise: location, type of music (e.g., radio, CD, DJ, band, etc.), genre of music (e.g., rock, classical, country, jazz, easy listening, 70's, 80's, 90's, etc.), atmosphere (subjective coolness, romantic/not romantic, lighted/dark, clear/smoky/hazy, loud/quiet, cold/hot, cramped/open, etc.), cover charge/no cover charge, attire (e.g., casual, business casual, formal, etc.), expensive/cheap, drinks/food available, drink specials, pool table, dancing/no dancing, coat check, closing time, website, member-supplied postings (e.g., text ratings and comments/photos/audio clips/video clips, estimated number of attendees, estimated age range, estimated ratio of women to men), etc.

The data input to the computer algorithm may include weighting factors. The weighting factors may be set by the member to indicate the relative importance of a portion of the data. The weighting factors may also be set automatically, for example, based on how old the member postings are.

To assist nightclubs to efficiently target members to whom to send their promotions, the Hoozware system server (a.k.a., data processor, computer) tracks member behaviors. Member behaviors typically comprise: prior types of accepted promotions, spending habits, drinking habits, venue attendance habits (e.g., the venue the member is at now, venues the member frequents), temporal habits, parking habits (e.g., where the member parks before going to a venue), walking habits (e.g., the path the member takes in going to a venue), where the member eats before going to a venue, types of products the member buys, number of rewards points, particular venue or Hoozware premier status, Hoozware member usage frequency, etc.

To help a member classify their various inclinations, the Hoozware system allows members to define "moods" or select previously defined moods. Typical mood categories comprise: prowl, ladies/guys night, rowdy, quiet, dance, drink, pool, chat, live music, comedy, happy hour, sports, drag, etc. Members typically define their moods by logging into the Hoozware system server from their home computer; although, some mood functionality may be accessed using their mobile phone. When defining a mood, a member typically selects nightclub attendee demographics and traits and nightclub characteristics, typically using a set of drop-down boxes, radio buttons, and the like. Additionally, the member may use drop-down boxes or fill-in boxes to enter weighting factors for each of the selected demographics, traits and characteristics. If no weighting factors are entered, the Hoozware system server typically uses default weightings, such as equal weighting, for each demographic, trait and characteristic. For instance, a male member may define his "prowl" mood to include and highly weight the demographic categories covering the number of non-committed women between the ages of 25 and 35. His prowl mood may also assign a lower weighting to dancing as a nightclub characteristic. A woman member might define her "chat" mood to include and equally weight a demographic preference for few men and characteristics of quiet country music, no cover and cheap drinks.

When a nightclub (or in general, a "promoter," which is used here to include "venues" and "sponsors") wants to send a promotion to a member, the nightclub may access the Hoozware system server (typically by logging into the Hoozware website from an office computer) and specify which promotion they would like to be sent to a subset of members which is associated with one or more desired demographics or which exhibits a desired behavior.

When a member is trying to decide which nightclub (or in general, which venue) to attend, they may access the Hoozware system server, typically using their mobile phone. A member may communicate with the Hoozware system server using a WAP or other mobile browser, SMS (short message service) or MMS (multimedia messaging service), emailing, running a custom Hoozware application on their mobile phone (which may include JAVA, or be written for or using BREW, Symbian, RIM, Microsoft, Windows CE, Palm, EPOC, FLEXOS, OS/9, JavaOS, etc.), and the like. When the Hoozware system server receives a member request for a list of nightclubs that best match the member's selected "mood," the server performs the search calculation and returns the nightclub list, along with detailed nightclub demographics and characteristic information for the member to view. Typically, along with the ordered nightclub list, the Hoozware system server will also return relevant nightclub or sponsor promotions to the member.

Present GPS technology used in mobile phones requires line-of-sight communication with multiple satellites. Accordingly, when a Hoozware system member enters a nightclub typically their GPS signal will be lost. When a Hoozware system member's GPS signal disappears, the computer algorithm of the Hoozware system server decides what happened to the Hoozware system member. For example, if the Hoozware system server can no longer communicate with the member's GPS mobile phone, the computer algorithm running on the server might determine that the mobile phone was turned off. If the Hoozware system server can still communicate with the member's GPS mobile phone but the GPS mobile phone can't provide position information, the computer algorithm running on the server might hypothesize that the member has walked inside a building. At that point, the computer algorithm running on the Hoozware system server might extrapolate, or otherwise estimate, using previous position data points in time, as well as any other relevant data available (such as previous history or patterns of behavior), whether the Hoozware system member was walking toward the entrance of a nightclub when the member's GPS position information disappeared such that the member should be classified as being in that nightclub. When the computer algorithm running on the Hoozware system server estimates that a member has entered a particular nightclub, it may send a query to the member asking them if indeed they are in the classified nightclub. The Hoozware system member may respond with Yes or No, may provide an alternate location, or may provide another response. If the computer algorithm running on the Hoozware system server receives an affirmative response from the Hoozware system member, that member is classified as a confirmed attendee at the nightclub. Typically, if no response is received, the computer algorithm running on the Hoozware system server classifies that member as an unconfirmed attendee at the estimated nightclub.

When a Hoozware system member is classified by the computer algorithm running on the Hoozware system server as being at a particular nightclub, if the member takes a picture, records a movie/video clip, records an audio clip, types a text message, types an email, records a voicemail, and the like with their GPS mobile phone, the Hoozware system application on their mobile phone may insert a prompt requesting that they post that geotagged information to the Hoozware system server; thus making it very easy and convenient for Hoozware system members in attendance at a nightclub to provide real-time geotagged information about the nightclub for other Hoozware system members to receive.

The Hoozware system may also offer social networking and dating services to its members. For instance, Hoozware system software may allow members to enter personal data about themselves into their own personal profile, including but not limited to attributes commonly included in dating service surveys, such as the member's sex, age, physical attributes, interests, etc., and also similar types of personal data about what they would like to see in people they would like to meet at a nightclub. Typically, the Hoozware system requires a member to enter their own personal data first in order to be allowed to receive similar types of data about other Hoozware system members. For example, if a member entered that he was a male, between 25 and 29 years of age, and included a picture, then when that member was determined by the Hoozware system using the member's GPS position to be at a particular nightclub, the member's data would be compiled into the statistics of all members classified as attending that nightclub. Such compiled statistical data would be receivable by other members who also provided their sex, age and picture. If a member only provided a subset of personal data (such as their age) they typically would only be allowed to receive a similar subset of compiled statistical data of the members (such as the ages) in attendance at the nightclub.

If a member specified in their personal profile that they would like to be contacted by other Hoozware system members, they can specify under what circumstances and how they would prefer to be contacted, including by voice on their mobile phone, text message on their mobile phone, voicemail, email, physical mail, etc., either directly or anonymously via the Hoozware system server. If they request anonymous contact, then an inquiring member would use the preferred method of contact; however, the content of the contact attempt would first go to the Hoozware system server. The member to be contacted is then sent the content of the contact attempt from the inquiring member without revealing the direct contact information of either member to the other. Typically included in the content anonymously sent from one member to the other is a capability for allowing each member to mutually share one or more elements of their direct contact information with the other. For example, if a first member elects to mutually share their mobile phone number, the second member is informed of that election in content anonymously provided to the second member. Until the second member also elects to mutually share their mobile phone number, neither party will be allowed to view the mobile phone number of the other. Of course, the first member may include their mobile phone number, or other direct contact information, directly in the content anonymously sent to the second member, or vice versa. A member may specify that only Hoozware system members at the nightclub they're at be allowed to contact them; or alternatively, a member may specify that prospective attendees may be allowed to contact them. The Hoozware system may charge a service fee for Hoozware system members to gain access to another Hoozware system member's personal profile or information related thereto, assuming that the profile or information was specified by the member to be accessible. The Hoozware system may also work with, provide information to, or receive information from, other online or mobile dating services, and receive financial benefits or other benefits therefor.

The following description details one embodiment of the subject invention.

1. Introduction

The Hoozware system consists of server and mobile device components that work together to implement mobile-centric venue information and marketing services. The system leverages member-driven content, including location-based commentary and demographics, to promote community amongst members and to provide marketing opportunities for venues and sponsors. Targeted venues include night clubs, sports bars and music scenes where people aggregate for entertainment and socializing.

2. Feature Summary

The system is used by tracked members, registered venues, registered sponsors, and system administrators. Members carry mobile devices which enable location tracking by the system, provide access to demographic and other information relevant to their decisions on which venues to visit, and facilitate interaction with other members. Venues and sponsors access the system via the desktop (rather than mobile device) in order to query demographics, setup marketing campaigns, and monitor campaign results. Venues may also publish entertainment schedules and other information that members access from their mobile devices. Venues and sponsors are both promoters, such that referring to a promoter can mean either a venue or a sponsor that is interested in providing a promotion to a member.

3. Members

Members use the system to access venue information and to participate in an incentive rewards program.

3.1. Venue Information

Information includes venue descriptions, member commentary, and population data. Venue descriptions are supplied by venues (or acquired from a third party database), and may include music schedules and other events. Member commentary may include ratings, reviews, and current blogs, possibly with multimedia content. Population data may include current demographics and lists of members present.

3.2. Rewards Program

The incentive rewards program allows members to accumulate points for various actions and to exchange these points for discounted products and services from sponsors. Reward items may include drinks and cover charges at clubs, meals at restaurants, limousine services, hotel stays, sports merchandise, music downloads, electronics, event tickets, airline tickets, cash, shopping discounts at department stores or other retailers, etc.

A member may receive reward points for purchases at a venue or from a sponsor, whether or not the purchases are in response to a venue or sponsor promotion. While the six purchase scenarios below refer to purchases at venues, the same scenarios apply to purchases from sponsors.

To receive points in a first scenario that doesn't require any cooperation from venues a member may keep purchase receipts, enter them on the Hoozware website to generate a receipt-submission form (typically which includes an associated receipt-submission ID), printout the receipt-submission form and mail it, along with the receipts, to a Hoozware mailbox.

In a second scenario that does require cooperation from the venues, immediately after a purchase a member enters the amount of the purchase into the Hoozware application running on their mobile phone and then hands their mobile phone to the cashier who then reviews the purchase amount, and if correct, enters their unique cashier password into the member's mobile phone and presses the SEND button. The amount of the purchase and the cashier's identity is sent to the Hoozware system and optionally also sent to the venue for the venue's records.

In a third scenario that also requires cooperation of the venue, at the time of purchase the member gives the cashier the member's unique rewards ID number. The venue then associates the member's rewards ID with the purchase amount and provides the information to the Hoozware system. The member may provide their rewards ID number by any convenient method, including entering the number into a data terminal, providing a rewards card or transmitting the rewards number via a phone.

In a fourth scenario, the member's rewards ID number and payment information, such as credit card number or debit card number, may both be transmitted by the member's mobile phone, such as by wireless transmission.

In a fifth scenario, the member uses their mobile phone to call a venue-rewards-credit telephone number. The Hoozware application communicates the members name and minimum amount of the credit card number or debit card number information in order for the venue to associate charges made at the venue with the member and report the information about the products purchased by the member to the Hoozware system.

In a sixth scenario, when a purchase is made using the member's credit card or debit card, the associated credit card company or bank sends confirmation to the member's mobile phone. The Hoozware mobile application captures the confirmation and submits item(s) purchased, venue, time, purchase amount(s) and other important information to the Hoozware system server which records the information and updates member behaviors, rewards points and statuses (such as elite status) with the venues and sponsors that the purchases relate to. Alternately, the credit card company or bank may send confirmation to a separate website, the member's home computer, the Hoozware system server, and the like, from where the member then requests rewards credit for the purchases.

3.3. Accounts

To establish accounts, new members supply the following information:

username, password, first name, last name, email, mobile number

Usernames must be unique to individuals in the system. These data are used for account access, maintenance, and communication. They are not disclosed to third parties.

Reward points are given for successful registration. Additional reward points are given when other members are referred.

3.4. Profiles

Members describe themselves by submitting personal profiles consisting of demographic and personal fields. The system also records member behavior statistics in behavior fields.

Demographic fields list member traits that can be statistically combined to provide demographics information for anonymous population tracking and targeted marketing. These fields are:

general: birthday, gender, education, occupation, marital status, parental status, home zip code, political affiliation, salary range sports: leagues, teams/players music: genres, performers tags: other member input, such as interests Any presentation of demographic information to venues, sponsors, or other members are not identifiable with specific individuals.

Personal fields are used for social networking and commentary attribution, and do identify specific individuals. These fields are:

nickname, personal statement, photo

Nicknames must be unique to individuals in the system and should be different from usernames. Personal statements are textual introductions by the members. Default photos may be system-supplied defaults if not replaced by the members.

Behavior field records prior types of accepted promotions, spending habits, drinking habits, attendance habits, temporal habits, parking and walking habits, etc.

3.5. Groups

Members may organize themselves into groups to facilitate common personal visibility and messaging. A group consists of:

groupname, leader (nickname), member list (nicknames)

Groupnames must be unique to groups in the system. Each group has a leader who is responsible for creating and maintaining the list of its members. Additions to the list require consent of both the member and the leader. Deletions from the list may be issued by either.

If group filtering is enabled, personal fields of a member's profile are visible to other members only if they belong to a common group. Members may belong to more than one group simultaneously.

A member may request that they be invisible to a specific member while being visible to other members.

3.6. Tracking

During certain periods, member locations may be tracked so that their presence at or near venues is known to the system. The system may consolidate and present real-time, anonymous, venue demographic data to other members. The system may also, subject to personal visibility control, display a list of which members are present at each venue using their personal fields.

Members must select a default tracking window from the following:

TABLE 1

| | |
|---|---|
| Happy Hour Hoozware | Wednesday-Friday 3pm-8pm. |
| Night Flight Hoozware | Thursday-Saturday 8pm-3 am. |
| Super Party Hoozware | Combination of Happy Hour and Night Flight windows. |
| Ultimate Party Hoozware | Continuous window. |

There may also be special sports windows, for instance, to allow members to search venues to watch playoff games at times that don't fall into one of the other tracking windows.

Tracking is automatically turned on at the beginning of a member's window and turned off at the end of a member's window. If a member accesses the system for real-time demographics outside of their default window, then the shortest enclosing window is automatically applied to their tracking schedule for that day. For example, if a member whose default window is Night Flight checks current demographics on Friday at 4 pm, then they are automatically subscribed to Happy Hour tracking until 8 pm (for that day only), at which time their Night Flight default continues to track until 3 am.

Reward points are given based on the number of hours a member is tracked.

3.7. Commentary

Members are encouraged to contribute comments on venues. These take the form of ratings, reviews, and blogs. Ratings and reviews are overall impressions of the venue. Blogs are typically shorter posts with more immediate value, e.g., tonight's scene rocks. Multimedia content may be included as well.

Reward points are given based on the number and quality of a member's comments. Quality is measured by usefulness as deemed by other members.

3.8. Privacy

These policies shall be observed to respect member privacy while offering relevant information to users of the system.

3.8.1. Tracking Control

Powering off a mobile device prevents tracking, but only until the device is powered on again. However, an interface shall be provided to allow a member to disable tracking in software and have this be effective until 3 am the next day (remainder of the daily cycle) or for a specified multi-day period (vacation stop). The interface also allows the member to reverse this selection.

3.8.2. Personal Visibility Control

Members may choose the exposure level for their personal fields. Personal visibility may be set to: seen by all (no group filtering), seen only by groups (apply group filtering), or seen by none (hide). If someone is being tracked but does not appear on a list of members present at a venue, they are either not present or just personally invisible to the viewer; these possibilities are indistinguishable to the viewer.

3.8.3. Status

Indicators are provided to members so they may easily determine their tracking status (on/off) and personal visibility status (all, groups, none) at any time.

3.8.4. Protection

Member behavior is not observable beyond intended members of the system.

To protect against sniffer attacks, member tracking packets are encrypted.

Demographic data are not easily identifiable with specific individuals. To protect against geographic/demographic inference methods, demographic data may be obscured for venue population counts below a threshold.

Member lists are not provided for locations other than venues.

3.8.5. History

Exact trajectory histories of tracked members are not retained by the system, but some statistics may be accumulated.

3.9. User Interface

Members access the system from both the desktop and their mobile device.

Functionality is organized into the following sections which correspond roughly to screens or pages:

Setup/Maintenance:
Open/close account (desktop-only)
Update profile information (desktop-only)
Update tracking window
Update/manage groups
Privacy Control:
Update tracking
Update personal visibility
Venue Search:
Edit "moods" and search types (i.e., ranking criteria)
   closest location to current location
   most offers available
   most members present
   most M members present
   most F members present
   highest rating from other members
   best match to custom demographic
One-time search (mobile-only)
Continuous search; optionally alert when rank changes (mobile-only)
List/map of search results (mobile-only)
Select a venue to view
Venue View:
Venue description
Commentary—read, grade, add new
Current demographics (mobile-only)
Current members present (mobile-only)
Current offers Member Search:
Contact list—groups, other people
One-time search of member locations (mobile-only)
Continuous search; optionally alert when location changes (mobile-only)
List/map of search results (mobile-only)
Select a member to view
Member View:
Personal fields
Current location (mobile-only)
Contributed commentary
Offer Search:
Reward points available
Current offers (rewards/promotions) with different sorting options
Select an offer to view
Offer View:
Description
Use offer; creates barcode and/or number code; deducts points if a reward
Delete offer 4. Guests Non-members may access the system via their desktop computer as guests; however, they can access only limited features. Guests do not have access to the mobile device interface. Typically, a guest sees the same top-level interfaces as members; however, when attempting to access information limited to members only, the guest is informed that the information they requested is for members only and the system then prompts the guest to register. Typically, guests can see a list of venues and access venue descriptions supplied by the venues. Typically, guests cannot view venue demographics, venue characteristics provided by members or personal profile information. Guests may be permitted to view venue or sponsor promotions, but are unable to redeem such promotions and do not receive rewards.

5. Venues

Venues access the system to update their business description and manage their marketing campaigns.

5.1. Description

Initially, venue descriptions will be generated from available databases, but venues may choose to update/correct their own entries. Descriptions may include basic contact information, hours, charges, event schedules, and statements from the venues.

5.2. Marketing

There are two ways that venues can market to members. First, they may place standard advertisements on the desktop web interface seen by members (and guests). This is implemented using a third-party pay-per-click advertising system such as Google AdSense. Venues setup these campaigns through the third party.

The other, more powerful way, is to market directly to members using system offers (rewards or promotions). Marketing campaigns may be customized according to numerous factors such as demographics, location, time, and VIP status. In a pay-for-performance model, venues would be charged a placement fee only when the offer is used by a member.

5.3. User Interface

Venues access the system from the desktop. Functionality is organized into the following sections:
Setup/Maintenance:
Open/close account
Update description
Marketing:
Campaign summary
Create/delete a campaign
Select a campaign to view
Campaign View:
Offer description
Offer type—reward or promotion
Point level, if reward
Limitations—expiration, count
Target location
Target profile
Target patronage—VIP or all
Target time
Usage statistics
Billing:
Credit card
Monthly statements Venues may provide venue descriptions that are accessible by both members and guests (non-members). Venues may post advertisements on a Hoozware website. Venues may provide promotions via the Hoozware system to a member of a demographic or behavioral pattern. Venues may receive and review member demographics and behaviors and select a desired demographic or behavioral pattern to which to send a promotion. Alternatively, the venues may, without receiving and reviewing any information from the Hoozware system, provide instructions to the system regarding to what types of demographics and behavioral patterns they wish to target, and when they would like promotions to be distributed, and let the Hoozware system make the detailed promotional distribution decisions.

Typically, a venue has Hoozware Promoter Application software running on an office computer or mobile phone, or uses a web browser to access Hoozware Promoter Application software running on the Hoozware system server. The venue enters their promotion, selects one or more desired demographics and enters the number of members in that demographic to which the venue wants the promotion sent. The promotion, desired demographic and number-of-members instructions are submitted to the Hoozware system which then directs the venue's promotion to the desired number of members belonging to the demographic.

The promotions may be time critical and thus have a short expiration day and time associated with them. For instance, if a venue desires more attendees now, they may place a promotion through the Hoozware system that expires in 30 minutes or is valid only for the next 50 entrants. Allowing venues to efficiently promote to potential attendees who are known by the position of their mobile phone to already be in the area and based on their demographics and prior behavior to be likely attendee candidates is a major advantage of the Hoozware system.

Members typically receive venue promotions in a Hoozware "promotion mailbox" on their mobile phone. The member may set up the promotion mailbox to provide an indication that there are promotions available, and optionally, how many promotions are available. The indication may be a media signal, such as an audible tone, a visual signal a tactile signal, a combination of signals, etc. Different indications may be configured to indicate promotions of different types, from different venues, and the like. The member may alternately set up the promotion mailbox to do nothing until the member calls a promotion-mailbox phone number to request that all promotions be sent at that time. The promotions may also be accessed from a home or office computer, etc.

Members may use their communication device (e.g., mobile phone or home computer, etc.) to view which promotions are currently being offered to them. Members falling within different demographic groups or exhibiting different behaviors will typically see different promotions offered.

Typically, venues can have promotions (1) sent directly to the mobile phone of one or a group of members and (2) posted on the Hoozware system server where only promotions relevant to a particular member (for instance, based on their demographics and behaviors) will be viewable by that member when they access the Hoozware system server for their promotions.

A venue may offer promotional coupons to a larger number of members than the venue desires to accept. For instance, a venue may send a coupon (via the Hoozware system server) for "no cover charge" to 100 members of a desired demographic group or behavior, but the venue may specify that only the first 10 coupons presented will be accepted. In one embodiment, members may access in real time from their mobile phone or home computer how many coupons will still be accepted at that time. In the case where the promotion requires members to use points for a coupon, a member may be allowed to "reserve" a coupon in advance. Such a reservation immediately debits the member's rewards points, but assures the member that their coupon will be valid to redeem the promotion when they arrive.

In one embodiment for redeeming a venue's promotion at the venue, the member shows the coupon (which was sent to them on behalf of the venue) displayed on their mobile phone's screen to a venue representative. The coupon has a coupon identifier (ID) associated with it. The display on their mobile phone says to press "OK" to "Validate" the coupon. The venue representative presses OK which causes the Mobile Application to communicate the coupon ID to the Hoozware system server (data processor). The Hoozware system server then sends a "Confirmation Code" to one or more communication devices of the venue's choice. For example, a Confirmation Code may be text messaged to the venue representative's mobile phone informing the venue representative to accept the coupon. Simultaneously, a Confirmation Code may be emailed to the Promoter Application to log the transaction for future reference.

When a member uses their communication device to check in real time how many coupons the venue is still going to accept at that moment, in addition to being presented with the number of coupons remaining, they may be prompted to (1) press "OK" to validate the coupon now or (2) press "1" to reserve the coupon in advance.

Members typically receive reward points for accepting a promotion, attending a venue, spending money at a venue, and the like. Refer to the Rewards Program in Section 3.2 for more information on how member may receive rewards points for purchases at venues.

Venues may track promotion acceptance or spending habits of members at their venue. One way a venue may track member acceptance of the venues' promotion is for the venue to require that the member show the promotion on their mobile phone that was sent to them. The venue may record a promotion identifier (ID) that was sent along with the promotion. The member may also be required to show their personal-field photo on their mobile phone to confirm that they are the intended member.

6. Sponsors

Sponsors may provide promotions via the Hoozware system similarly to a venue. Sponsors access the Hoozware system to manage their marketing campaigns. Their features and interface are similar to that of the venues, except for the areas of venue description and VIP status. See the description above in Section 4 for Venues, and also refer to the Rewards Program in Section 3.2 for more information on how member may receive rewards points for purchases from sponsors.

7. Administrators

Administrators have access to all stored information, including member personal fields. Administrators may send promotions to members based on vendor or sponsor instructions. Such instructions may request that the system send promotions to members based on the members' demographic or behavior, the day and time, etc. Administrators also control the billing, promotion rates, etc.

8. Carrier/Device Support

Most major carriers and mobile devices are supported.

9. Venue Support

The system allows any venue to be listed. Venues may be added in bulk based on business listings/categories acquired from third party databases. For example, the system may add venues appearing in Google Local, CitySearch, SFGate, PubClub, Viator, and the like, as businesses categorized under one or more of the following:

Cocktail Bars & Lounges
Lounges & Bars
Night Clubs
Sports Bars, Lounges, & Restaurants The following description details a second embodiment of the subject invention.

1. Introduction

The subject Hoozware system consists of server and mobile device components that work together to implement mobile-centric club information and marketing services. The system leverages member-driven content, including location-based commentary and demographics, to promote community amongst members and to provide marketing opportunities for clubs and sponsors. Targeted clubs include night clubs, bars, and music scenes where people aggregate for entertainment and socializing.

The system is used by registered members, clubs, and sponsors, and supervisory access is supported for system administrators. Members carry mobile devices which provide access to demographic and other information on clubs, facilitate interaction with other members, and support other activities such as recording their location. Clubs and sponsors access the system via the desktop (rather than a mobile device) in order to query demographics, setup marketing campaigns, and monitor campaign results. Clubs may also publish entertainment schedules and other information that members can access.

2. Member Features

Members use the system to access club information, meet other members, and to receive offers from clubs and sponsors.

2.1 Club Information

Information includes club descriptions, member reviews, and population data. Club descriptions are typically supplied by clubs, and may include music schedules and other events. Member reviews may include ratings and comments, possibly with multimedia content. Population data may include current demographics and lists of members present.

2.2 Meeting Members

Members may search for other members in the system, and attempt to contact them to arrange meetings at the clubs. Members may be interested in establishing these connections for socializing or "crushing." The system provides communications facilities for requesting meetings, responding to requests, and selectively providing additional information.

2.3 Offers

Members may receive promotional offers from clubs and sponsors (collectively known as marketers) for discounts on products and services. Offers may be targeted according to member profile and behavior.

Example offer items are drinks, food, cover, limousine services, hotel stays, sports merchandise, music downloads, electronics, event tickets, and shopping at department stores or other retailers.

2.4 Privacy

Member location and profile information may be made available to clubs, sponsors, and other members in order to support targeted marketing and member-to-member interaction. Privacy from clubs and sponsors is addressed by making marketing campaigns anonymous (but possibly targeted), except for certain opt-in programs such as VIP designation. Privacy from other members is addressed by allowing visibility control of certain information.

2.4.1 Location Data

Member attendance at clubs is recorded by the system whenever a member performs a check-in. However, the member may dynamically control which other members can access their location information. It is possible for a member to check-in to a club and, at the same time, keep their location invisible to other members. In this scenario, the member's demographics are still added to that of other attending members for purposes of club crowd characterization, but their identities are blocked from appearing on people searches on that club. Note that any presentation of aggregate demographics for a club should be robust to trivial inference methods that may reveal such a member's presence unintentionally.

2.4.2 Crush Profile

Member profiles contain various information which describes themselves to the system. The information is categorized into demographic, social and crush fields. Demographic fields are used anonymously to characterize the crowd of attendees at a venue. Social fields describe members to other members in order to facilitate member interaction. Crush fields are information that may be particularly relevant for members interested in dating or relationships. Since some members may consider the crush fields to be more sensitive, explicit privacy controls are provided for this portion of the profile.

2.4.3 History

Exact check-in histories of members will not be retained by the system, but some statistics may be accumulated.

3. Member Interface

Members access the system from both the desktop and the mobile device.

Functionality is available on both platforms unless indicated otherwise.

3.1 Account

To establish accounts, new members supply the following information:

Username
Password
First Name, Last Name
Email
Cellphone (number, carrier, model)

Usernames must be unique to individuals in the system. These data are used for account access, maintenance, and communication. They are not disclosed to third parties. Cellphone numbers should be validated as part of account setup (e.g. by sending confirmation code in SMS).

Opening, closing, and changing accounts are only available from the desktop.

3.2 Profile

Members describe themselves by submitting profiles consisting of demographic, social and crush fields.

Demographic fields consist of the following:
*Required*
Gender
Date of Birth (present as age)
ZIPcode (present as distance from other members)
Optional: Other fields presentable in aggregate.
Social fields consist of the following:
Nickname
*Optional*
Statement
Media (Photo, Video, Audio)
City of residence
Hometown
Interests—general
Interests—music
Interests—movies
Interests—television
Interests—books
Interests—sports
Interests—dance
Interests—politics
Favorite drink
Ask me about
Tell me about
Crush ("C") fields consist of the following:
C Statement
C Media (Photo, Video, Audio)
About my date
Relationship status
Orientation
Body type
Height
Smoking
Drinking
Ethnicity
Religion
Have children
Want children
Income
Homeowner
Occupation
Education
Zodiac Members also configure their crush profile with filtering, privacy, and participation. Filtering indicates the criteria to apply in order to identify potential crushes (crush matches). Privacy indicates which other members may see their crush fields. Participation indicates whether the member opts-in to the crushing portion of the service. By opting-in, the member enables their crush fields to be visible according to their privacy setup, and allows the system to find crush matches according to their filtering setup.

Entering or updating profile information is generally only available only from the desktop.

Optional: Support upload of profile photo, video, audio from mobile device.

Optional: Add business card fields to profile.

3.3 My Preferences

Members may customize their interaction with the system in various ways.

The customizable settings are as follows.

3.3.1 My Clubs

These are member-selected favorite clubs for convenient reference.

3.3.2 My Friends

Friends are individual members that are listed for easy access similar to a phonebook, but requiring consent from both parties. Friend lists are publicly available to other members in order to facilitate networking.

Optional: Add option to hide some or all friends.

3.3.3 My Groups

Groups consist of one or more friends that may be treated together for visibility, messaging, or other purposes.

3.3.4 My Bookmarks

Bookmarks are similar to friends, but do not require consent from both parties and are not publicly available. They are useful for easily referencing individual members prior to acceptance as a friend.

3.3.5 My Blocked

Blocked members are those designated for avoidance. A member's location and crush profile are not visible to a blocked member, and any messages received from blocked members are discarded.

Cellphone numbers may also be blocked. This is useful for preemptively blocking people that may not have accounts yet.

3.3.6 My Filters

Filters are member-defined criteria for selecting other members. Criteria may include numerous factors involving social or crush fields. For convenience, the system may pre-define one or more common criteria that are useful to many members.

3.3.7 My Moods

Moods are member-defined criteria for ranking clubs. Criteria may include numerous factors such as club characteristics, attendee demographics, distance from starting location, and available offers. For convenience, the system may pre-define one or more common criteria that are useful to many members. Some example moods are:

Closest
Most members, both men and women
Most members, men
Most members, women
Most members that belong to My Friends
Most members that belong to one of My Groups
Most members that pass one of My Filters
Most offers
Highest recommendation by member review
Closest AND Live music AND Most dancing by member review
Darts AND Pool AND Most offers Each mood which relies on data that may not be available (e.g., member reviews) uses the lowest scores for any missing data.

Optional: Allow weights to be associated with ranking criteria.

3.3.8 My Alerts

Alerts are member-defined notifications based on various triggers. Supported triggers include:

TABLE 2

| | |
|---|---|
| Top Club | Active search has identified a new top club |
| Review | Club has gotten a member review |
| Offer | Offer has been received |
| Check-in | Member has checked-in |
| Check-out | Member has checked-out |
| Message | Message has been received |
| Candidate | System has identified a new member passing a screen |

All alerts may be independently configured for:

TABLE 3

| | |
|---|---|
| Status | Enabled or disabled |
| Timing | Immediate, digest (e.g., every hour) |
| Channel | Application, text message, email |

Some alerts may restrict the set of members considered by further selection of individual, group, bookmarks, blocked, or screen (e.g., filter, crush matches). The candidate alert must select a screen.

Some alerts may restrict the set of clubs considered by further selection of club name, current club, or not the current club.

An alert notification will indicate what was triggered, with a brief description.

A master alert switch suppresses all alerts when off, and defers to the individual alert statuses when on. When master alert is off, the alert configuration page should indicate this override (e.g., by graying out).

3.3.9 My Location Privacy

Location privacy determines which other members see check-in activity.

Visibility may be granted by category to the following:
Friends
Crush matches
Current club
Individuals (custom list)

If a member is in My Blocked, any individual visibility rule for that member will be overridden and indicated as such (e.g., by graying out).

A master location switch suppresses location data to everyone when off, and defers to the collection of rules when on. When master location is off, the privacy configuration page should indicate this override (e.g., by graying out).

3.4 Club Activities

Members may perform various activities related to clubs. Features may be limited for unregistered clubs, which have no offers and have minimal descriptive information.

3.4.1 Club Search

Each search is configured as follows:

TABLE 4

| | |
|---|---|
| Consider only | All, registered, My Clubs, by neighborhood |
| Ranking | none, one of My Moods, customized mood |

"Consider only" indicates which clubs are to be considered. "Ranking mood" indicates the criteria used to sort the search results. If Ranking mood is None, results will be sorted alphabetically. If Ranking mood is Customized mood, it is possible to use one of My Moods as a basis for the customization. Any customized mood may be saved as a new entry to My Moods or discarded.

Search results are presented as an indexed list or, optionally, as a map with the indices plotted. Each club result is given a score based on the ranking criteria. For atomic criteria, the score may be expressed in the relevant units such as distance, rating, or counts of people/offers. For compound criteria, the score may be expressed as a percentage of highest possible score.

Optional: Select 'checked', i.e., manual selection of a subset of search results as input into subsequent search.

There is also a club lookup feature which allows finding a club based on name or street.

Clicking on a particular club brings up its details in the club view.

3.4.2 Club View

Club details are organized according to the following categories. Some values, indicated in parentheses, are displayed on the initial view page:

TABLE 5

| | |
|---|---|
| Crowd | Attending members (M, W, age, crush matches) |
| Reviews | Member reviews (recommendation, number of reviews) |
| Offers | Offers available (number of offers |
| Description | Club description |

If the club view was brought up by clicking on a ranked search result, the club view may also include a line indicating the club's score on the ranking criteria.

On the mobile device, clicking on a category will bring up a separate page that elaborates on that category. On the desktop, some or all of these categories may be simultaneously displayed.

3.4.2.1 Club Detail: Crowd

Visible members in attendance at the club are listed. Each member is summarized with a photo, nickname, gender, and age. Icons may be shown to convey member location and crush profile visibility (forward and reverse), as well as crush matching designation.

Optionally, the listing of visible members may be restricted by selection of individual, group, bookmarks, blocked, crush matching designation, one of My Filters, or by a customized filter. If using a customized filter, it is possible to use one of My Filters as a basis for the customization. Any customized filter may be saved as a new entry to My Filters or discarded. The listing of visible members may also be restricted to those having photos.

Clicking on a listed member brings up the "member view" as a separate page.

The current demographics of the attending members are also available, possibly via an extra button selection. The demographics data are given as follows:

Gender: Men(#,%), Women(#,%)

Age: Typical=#, Spread=+/−#, Min=#, Max=#

Distance: Typical=#, Spread=+/−#, Min=#, Max=#

Note that distance refers to how many miles away attending members live from the viewing member's residence. Locations are typically assigned as the centroids of profile ZIPcodes.

Optional: Other fields presentable in aggregate.

Optional: Check-in versus survey-based data.

Optional: Show map of residence clusters.

Demographic trends over time may also be displayed in a chart. Each chart is specified by a time period and a demographic:

TABLE 6

| | |
|---|---|
| Time period | Today, or last 7, 30 or 90 days (pick day of week or all) |
| Demographic | By gender, age, or distance |

Member counts segmented by the demographic are then displayed versus time of day for an average day in the time period.

3.4.2.2 Club Detail: Reviews

Reviews of clubs are submitted by members. Each review may have the following sections:

TABLE 7

| | | | | |
|---|---|---|---|---|
| Ratings | Rate the club on these factors | | | |
| | Crowded | 1 = empty | 2 = so-so | 3 = packed |
| | Age | 1 = 20s | 2 = 30s | 3 = 40s&up |
| | Gender Mix | 1 = mostly M | 2 = even | 3 = mostly W |
| | Dancing | 1 = nobody | 2 = some | 3 = everyone |
| Comments | Text comments | | | |
| Photo | Snapshot, possibly with text | | | |
| Video | Video snippet, possibly with text | | | |
| Audio | Audio snippet, possibly with text | | | |

Optional: Rating for music.

Reviews are displayed based on which review sections are of interest.

If ratings are selected, then the average for each rating (one hour weighting ramp peaking at the most recent rating) is provided, with indication of how many ratings are included. Ratings are displayed anonymously (i.e., without attribution to member). A graphing option may also be provided.

If comments or other media are selected, the relevant reviews are listed and sorted reverse chronologically. For each review, the time stamp is given and the contributing member is identified, possibly characterized by their historical contribution level.

3.4.2.3 Club Detail: Offers

Offers from the club are displayed similarly to the general offers interface described later, but only include those that come from this club.

3.4.2.4 Club Detail: Description

The club description may include the following components:

TABLE 8

| | |
|---|---|
| Contact | Address, phone, fax, website |
| Summary | Text description |
| Features | Availability of pool table, darts, tv, etc. |
| Media | Photo, video, audio |
| Events | Calendar of events |

Directions to the club are also provided. Optionally, a map may be supplied.

3.4.3 Club Actions

For a particular club, members may perform certain actions. These actions are accessible from various interfaces as appropriate:

TABLE 9

| | Mobile Home Page | Mobile Club View | Desktop Home Page | Desktop Club View |
|---|---|---|---|---|
| Add to My Clubs | — | X | — | X |
| Check-in | X | X | — | — |
| Check-out | X | X | — | — |
| Post Review | X | X | — | X |

3.4.3.1 Add to My Clubs

This adds the club to the member's list of favorites.

3.4.3.2 Check-in

This checks-in the member at a club. As part of the check-in, the member is prompted to submit a review, with the ratings section being mandatory. At registered clubs, check-ins qualify the member for automatic spins for 2-for-1 or free drink specials. A member may check-in again at the same club in order to refresh their presence (typically after two hours).

3.4.3.3 Check-Out

This checks-out the member from the current club. If no explicit check-out is performed, the member is automatically checked-out two hours after their last check-in.

3.4.3.4 Post Review

This enables a member to post a review on a club.

3.5 Member Activities

Member-related activities include searching for members, viewing member pages, and actions related to members such as sending messages.

3.5.1 Member Search

Each search is configured as follows:

Select: all, My Friends, one of My Groups,

My Bookmarks, My Blocked, crush matching designation, one of My Filters, customized filter 'Select' indicates which set of members to search for. If select is customized filter, it is possible to use one of My Filters as a basis for the customization. Any customized filter may be saved as a new entry to My Filters or discarded. Optionally, selected members may be further restricted to those having photos.

Search results are sorted by proximity to the member's starting location (closest first, and members with unknown locations alphabetically at the end). Results are presented as an indexed list or, optionally, as a map with the indices plotted. Each member result is shown with their proximity in miles.

Optional: Select 'checked', i.e., manual selection of a subset of search results as input into subsequent search.

There is also a member lookup feature which allows finding a member based on name, email, or cellphone number.

Clicking on a particular member brings up their details in the member view.

3.5.2 Member View

Member gender, age, and social profile are displayed, as well as current location, crush profile, and primary photo as available. Accessing other media may require navigation to linked pages. Icons may be shown to convey member location and crush profile visibility (forward and reverse), as well as crush matching designation. The reviews submitted by this member are also available.

Optional: Also show testimonials if supported.

3.5.3 Member Actions

When viewing a member's page, the following actions are supported:

TABLE 10

| | |
|---|---|
| Add as Friend | Add to My Friends |
| Add to Group | Add to group in My Groups |
| Bookmark | Add to My Bookmarks |
| Block | Add to My Blocked |
| Create Alert | Create alert for My Alerts |
| Change Privacy | Modify privacy of location or crush profile |
| Send Message | Send a message |
| Report Abuse | Flag inappropriate material |

Optional: Support testimonials.

3.6 Message Center

Members may exchange messages with other members. Messages consist of a subject, a body (including prefix/postfix), and optional flags and attachments.

3.6.1 Composing Messages

Messages are constructed primarily by selecting quick text phrases. Selecting custom for any component allows the user to enter arbitrary text:

TABLE 11

| Subject: | |
|---|---|
| Rockin'! <club> | |
| Here! <club> | |
| Gone! <club> | |
| Chat! <topic: null or part of recipient social fields> | |
| [I1 You1We] match! | |
| Wink! | Special message with no other components |
| *CUSTOM* | |
| Body Prefix (Salutation): | |
| *PRESET* | Member pre-defined (e.g. Hi <recipient first name>) |
| *CUSTOM* | |
| Body: | |
| Check it out. | |
| Let's talk. | |
| You're cute. | |
| You're hot. | |
| Meet at the [bar\|door\|spotN\|*CUSTOM*] (optional) in [5\|15\|30mins]? | |
| Call me at <sender cellphone number> (optional) in [5\|15\|30mins]? | |
| Buy you a drink? | |
| No thanks | |
| Maybe later. | |
| OK (optional) but in [5\|15\|30mins]. | |
| *PRESET 1 | * Member pre-defined (e.g. Wuzzup?) |
| *PRESET2* | " |
| *PRESET3* | " |
| *CUSTOM* | |
| Body Postfix (Signature): | |
| *PRESET* | Member pre-defined (e.g. <sender first name>) |
| *CUSTOM* | |
| Flags: | |
| Request crush profile | |
| Attachments: | |
| Media | |

Messages may be sent to individuals or groups. Some quick text choices may be restricted based on context (e.g., allow "we match!" only when mutual crush).

Optional: Identify supported media sources from amongst server repository, desktop file system, cellphone file system, capture at composition.

3.6.2 Reading Messages

Members view the subject and body of a message as plain text Links are provided to select a member view of the sender, or a club view of the sender's current location (if known). Icons may be shown to convey member location and crush profile visibility (forward and reverse), as well as crush matching designation. Any sender request to show crush profile should also be conveyed.

3.7 Offer Center

Offers from marketers are promotional discounts on products or services.

Each offer is described as follows:

TABLE 12

| | |
|---|---|
| Marketer | Club or sponsor making the offer |
| Discount | Free, 2for1, % value, $value |
| Item | All drinks, beer/wine, well drinks, admission, food, merchandise |
| Start | Date/time offer starts |
| End | Date/time offer ends |

Optional: Additional field for number of available redemptions.

An example offer is:

From Ruby Skye: 2for1 beer/wine, valid 2/11-2/19

Depending on display limitations, some reformatting of the offer information may be necessary. Offers may be sorted by any of the offer fields. Clicking on a particular offer brings up the individual offer view, which may show more details and enables redemption.

BRIEF DESCRIPTION OF THE DRAWINGS

FIG. 9 illustrates information about a member in a member profile. FIG. 10 illustrates information about the member in the member profile. FIG. 11 illustrates further information about the member in the member profile, including an opportunity to find a partner, referred to as "Crush Information." In this example, the member fills out the information using a web browser on a desktop computer.

FIG. 16 illustrates user preferences for a particular filter.

FIG. 17 illustrates Crush Information requirements.

FIG. 35 illustrates further aspects and characteristics of the club as displayed via the mobile communication device. FIG. 36A illustrates further aspects and characteristics of the club as displayed via the mobile communication device. FIG. 36B illustrates further aspects and characteristics of the club as displayed via the mobile communication device.

FIG. 37 shows a menu for selecting Check-in on a mobile communications device.

FIG. 56 illustrates an example venue console. FIG. 57 illustrates an example venue console.

FIG. 70 illustrates example fields for promotional activities. FIG. 71 illustrates example fields for promotional activities. FIG. 74 illustrates example fields for promotional activities. FIG. 75 illustrates example fields for promotional activities.

FIG. 77A is an exemplary social network website Home screen on a desktop computer for a signed-in member of the website. FIG. 77B is exemplary of a lower portion of the screen of FIG. 77A further showing place and Member Updates in various tabs. FIG. 78A exemplifies a social network member's social network friends being organized into labeled "circles of friends". FIG. 78B exemplifies how to add to and create a circle of friends.

FIG. 79 exemplifies how to specify a desired geographical region using Hooz City.

FIG. 82A provides an exemplary Offer Center, and FIG. 82B provides an exemplary offer.

FIG. 86C provides exemplary venue search criteria.

FIG. 87A provides two exemplary "find" features for finding a desire member or list of members. FIG. 87B provides exemplary member search criteria. FIG. 87C provides exemplary member search criteria.

FIG. 89 provides exemplary saved venue searches.

FIG. 90 provides exemplary saved member searches.

FIG. 91A illustrates exemplary editable mobile-alert settings for occurrence of certain trigger events related to a social network of members. FIG. 91B illustrates exemplary editable mobile-alert settings for occurrence of certain trigger events related to a social network of members.

FIG. 92 provides exemplary checkin viewability settings.

FIG. 93 provides exemplary Crush Matching information.

FIG. 95 provides exemplary contact information for a member.

FIG. 107A illustrates an example portion of Packet Data, such as The Scene data, being displayed in various local business listings for a particular venue. FIG. 107B illustrates an example portion of Packet Data.

FIG. 108B further illustrates the example Home page.

FIG. 109A illustrates an example tool for specifying a new offer campaign. FIGS. 109B-109F further illustrate the example tool.

DETAILED DESCRIPTION OF THE INVENTION

Figure 1:
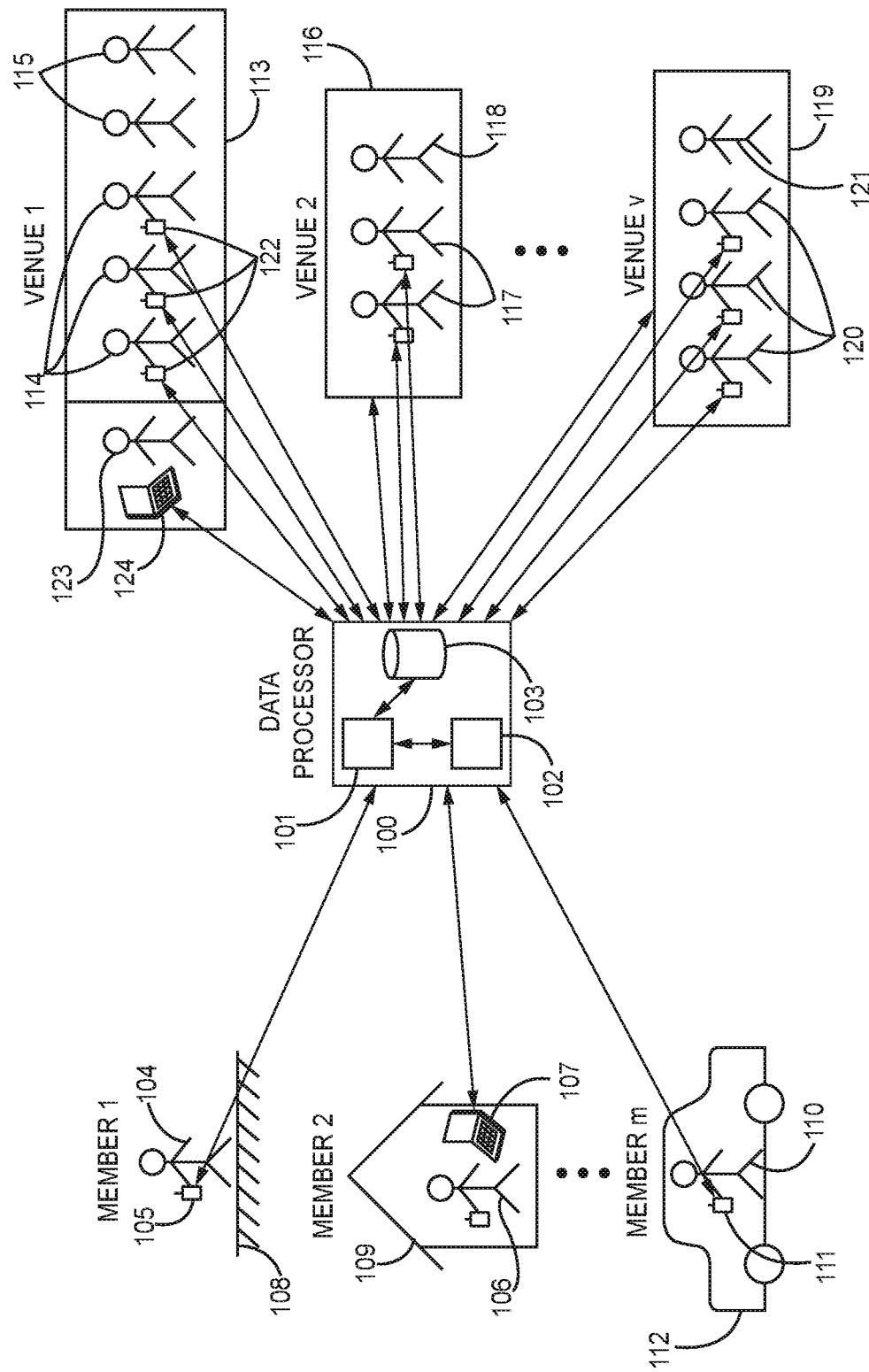
FIG. 1 is a diagrammatic view of the Hoozware system, including members, venues and a data processor.

A system and method is provided for a service to venues where people aggregate.

The subject invention is further described in detail hereunder referring to the embodiments provided in the drawings.

FIG. 1 is a diagrammatical view of the Hoozware system showing various entities communicating with a data processor 100. The data processor 100 comprises a processor 101, such as a central processing unit (CPU), computer memory 102 and a database 103 typically stored on a hard drive accessible by the processor 101. The data processor 100 may comprise a computer server, desktop computer, laptop computer, portable computer or any other convenient computing device or combination of distributed or networked computing and/or data communication devices. The database 103 may be a single database or may be multiple databases that may reside on a single hard drive or multiple hard drives accessible over a network, where the network may be wired or wireless. The database 103 may comprise a dating service database. Such a dating service database may exist at a remote site and be licensed from a Hoozware vendor partner.

The data processor 100 communicates, both wired and wirelessly, with various entities, including members, venues and sponsors. The data processor 100 can communicate wirelessly with a Hoozware Member1 104 who is using a data communication device 105. The data communication device may be a mobile phone (a.k.a. mobile telephone, cellular telephone, cell phone) or handheld computer. By "handheld computer" is meant a relatively small wired, wireless or mobile computer, terminal or PDA ("personal digital assistant"), such as a Palm Pilot®, Pocket PC®, Blackberry®, and the like. The Member 1 104 may be standing on the ground 108, sitting, walking, running, etc., or be most anywhere where they can send and receive signals. A Member 2 106 may communicate with the Hoozware system data processor 100 from a building 109, such as their home or office, using a wired or wireless computer 107. The computer 107 may be a laptop computer, desktop computer, mobile phone, handheld computer and the like. A MemberM 110 may communicate with the Hoozware system data processor 100 from a vehicle 112, such as a car, bus, train, subway, people mover, aircraft, watercraft, and the like. Typically, the MemberM 110 communicates with the Hoozware system using a mobile phone 111; however, depending on whether the vehicle has wired communication capability, the MemberM 110 may use other wireless or wired communication devices, including handheld computers, wireless computers, wired computers, wired telephones, cordless telephones and the like.

The data processor 100 is also capable of communicating with venues and members and non-members at venues. The data processor 100 communicates with Venue1 113 by both wired and wireless communication devices. For example, a venue manager 123 may communicate with the data processor 100 from his office using a wired desktop computer 124. The manager 123 may also communicate with the data processor 100 using a mobile phone. The data processor communicates with members 114 at Venue1 113 typically by their data communication devices 122. In FIG. 1, members are shown having data communication devices that are depicted similarly to the data communication device 105. Non-members 115 at Venue1 113 are not depicted in FIG. 1 to have data communication devices; however, they may have them. The non-members 115 typically have limited access to information that the data processor 100 provides to the members 114.

Typically, the data communication devices 122 comprise position-sensing devices, such as global positioning system (GPS) sensors. Any other convenient position-sensing device may be used. Assuming a member is in possession of such a data communication device, the location information provided by the GPS sensor is assumed to indicate the location information for the member. The data processor 100 typically receives location information from the data communication devices 122 of members 114. Accordingly, at Venue1 113, three of the five people present are tracked and known to be at Venue1 113. For the tracked members 114 the data processor also knows their traits and can calculate demographics of members 114 at Venue1 113 and also estimate the demographics of the entire crowd based on a previously estimated relationship between member demographics and entire crowd demographics.

The venue manager 123 at Venue1 113 typically can view information provided by the data processor 100 concerning the members 114 at Venue1 113, as well as, view information about the members 117 and 120 at other venues 116 and 119, respectively. A non-member 118 is at Venue 2 106 and a non-member 121 is at VenueV 119. The data processor 100 typically provides such information concerning members to a Hoozware website, where the manager 123 views it using a browser or custom software application running on his office computer 124. The venue manager 123 at Venue1 113 may use such viewed information to decide to send a promotion to a desired number of members making up a demographic of interest or exhibiting a behavior of interest to the manager 123. For example, the manager 123 at Venue1 113 may decide at 10:00 p.m. that business is a little slow and so he wants to entice members to come to Venue1 113. The manager 123 can use either a browser or custom software application running on his office computer 124 to submit a request to send a promotion. In one illustrative embodiment, the manager 123 may use a series of drop-down boxes, number-entry boxes, radio buttons, and the like, to submit his request to the data processor 100. For example, the manager 123 may use drop-down boxes to select a first demographic group comprising women between the ages of 25 and 29. The manager 123 may then use a number-entry box to enter the desired number of members to which a promotion is sent. For example, the manager 123 may enter the number "25." In the illustrative embodiment, the manager 123 then selects from a set of radio buttons which promotion is to be sent the his selected demographic. For example, the manager 123 selects his promotion to comprise an offer for "No Cover Charge." In the illustrative embodiment, the manager 123 then selects from the drop-down boxes a second demographic group comprising men between the ages of 25 and 34; clicks a radio button that the promotion is to be sent to "All In The Selected Demographic Not At Venue1;" and selects from a set of radio buttons that the promotion comprise a "2 for 1" drink offer if redeemed within 30 minutes. The manager 123 then clicks a "Preview" button which summarizes the promotion, to whom it is to be sent, the associated cost of the promotion to be paid to Hoozware, and is then presented with "Send," "Cancel" and "Back" buttons. If Send is pressed, the data processor 100 follows the manager's instructions and sends the promotion to the mobile phones (e.g., using SMS text messages) and/or email addresses of members fitting the desired demographics. The promotion may also be stored for members on the Hoozware data processor 100 in a location accessible by the members using any of a variety of wireless and wired communication devices.

In the illustrative embodiment above, selecting "All In The Selected Demographic Group Not At Venue1" means that the promotion will go to all members fitting the selected demographics, including the mobile phones of members at other venues. In fact, the Hoozware system typically allows a venue manager to specifically request that a promotion be sent to members exhibiting a particular behavior. Some example behaviors include (a) the venue you're at now, (b) venues you frequent, (c) where you park before going to a venue, (d) where you eat before going to a venue, (e) the path you take in going to a venue, (f) how much you drink at a venue, (g) how much you spend at a venue, (h) which types of promotions you accept, (i) what types of products you buy, and the like. Accordingly, in the illustrative example above, the manager 123 at Venue1 113 might intentionally try to encourage members at other venues to come to his venue by selecting from a drop-down box that his promotion be sent to members 117 exhibiting the behavior that they are presently at Venue2 116. The manager 123 may select that the promotion sent to this selected group of members further include "No Cover Charge" since it is likely that such members already paid a cover charge at the competing Venue2 116. Venue2 116 may also send a promotion to its members in attendance to encourage them to stay. In a sense, the Hoozware system can be used like an "eBay® for people," where venues, in effect, bid for members in real time.

Figure 2A:
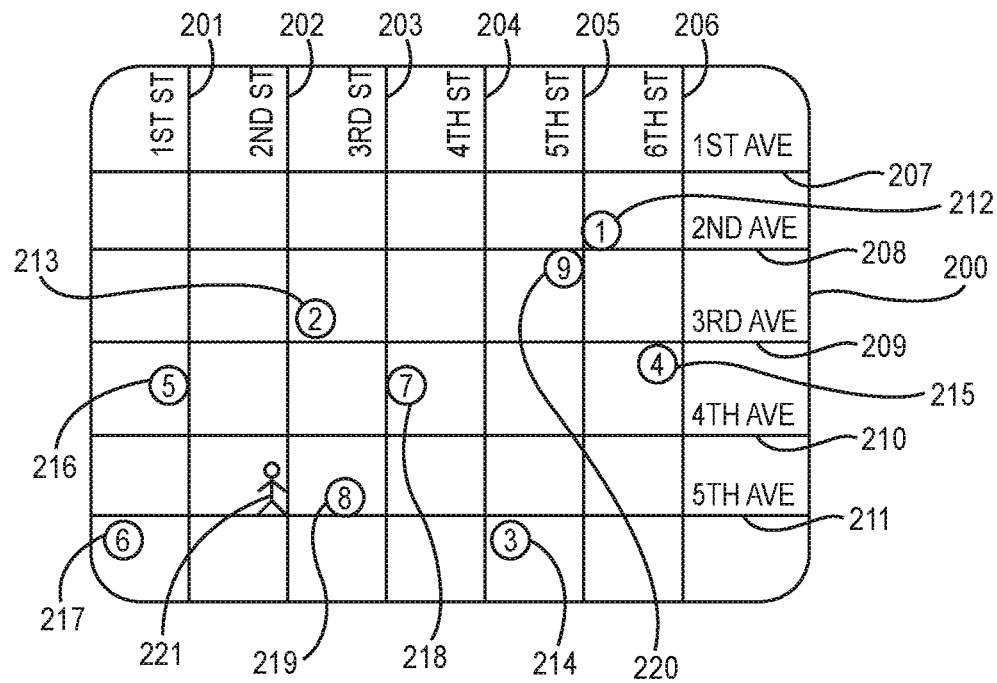
FIG. 2A is a map view of venue search results.

FIG. 2A is a graphical map display 200 that may be used in an exemplary embodiment to display venue search results on the screen of a mobile phone which is in "map mode." The map shows streets and venues. Example streets include 1st Street 201, 2' Street 202, 3rd Street 203, 4th Street 204, 5th Street 205, 6th Street 206, 1st Avenue 207, 2" Avenue 208, 3rd Avenue 209, 4th Avenue 210 and 5th Avenue 211. VenueA 212 is shown on the northeast corner of 5th Street 205 and 2" Avenue 208; VenueB 213 is shown on the northeast corner of 2" Street 202 and 3rd Avenue 209; VenueC 214 is shown on the southeast corner of 4th Street 204 and 5th Avenue 211; VenueD 215 is shown on the southwest corner of 6th Street 206 and 3rd Avenue 209; VenueE 216 is shown on the west side of 1' Street 201 midblock between 3rd Avenue 209 and 4th Avenue 210; VenueF 217 is shown on the south side of 5th Avenue 211 west of 1st Street 201; VenueG 218 is shown on the east side of 3rd Street 203 midblock between 3rd Avenue 209 and 4th Avenue 210; VenueH 219 is shown on the north side of 5th Avenue 211 midblock between 2" Street 202 and 3rd Street 203; and Venue1 220 is shown on the southwest corner of 5th Street 205 and 2" Avenue 208. In this example, the venues are designated on the map by a circle with an associated number, where the number specifies the venue's ranking score based on the member's predefined rankings of individual venue characteristics and attendee demographics. The member's location is depicted by the person icon 221 at the northwest corner of 2nd Street 202 and 5th Avenue 211. The location is determined by position sensing, such as GPS, in the member's mobile communication device.

Typically, various mobile phone controls are used to control the translation and zoom of the map. Mobile phone controls are also typically used to select a venue and request more information about the venue. For example to further illustrate, after selecting the map mode by toggling between "map mode" and "text mode" using the * key, the VenueA 212 is highlighted by default since it received the highest ranking score. To highlight a subsequent venue, the mobile phone "down arrow" is used; then to highlight a venue above, the mobile phone "up arrow" is used. Once a venue is highlighted for which the member desires more information, such as detailed information on the highlighted venue's characteristics and attendee demographics, the "OK" button on the mobile phone is pressed. If the mobile phone has a touch screen, the member may simply tap the circle designating the venue to bring up detailed information on the corresponding venue.

Figure 2B:
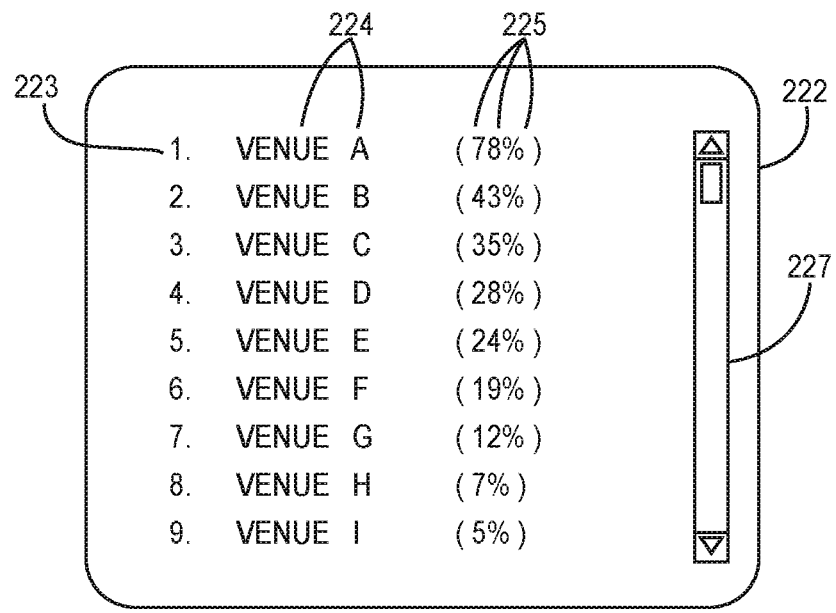
FIG. 2B is a text view of venue search results.

FIG. 2B is a text display 222 that may be used in an exemplary embodiment to display venue search results on the screen of a mobile phone when in "text mode." In this embodiment, the text display 222 lists the venues returned by a Hoozware venue search. The text display 222 lists the venue, VenueA 224, with the highest ranking score at the top next to ranking index 1 223 and with a ranking score of 78% 225 listed next to it on the other side. In the example, the other venues are listed below VenueA 224 next to their associated ranking index and ranking score. Typically, the text display 222 has a graphical scroll bar 227 when there are too many venue results to fit on a single screen.

Continuing with this exemplary embodiment, to toggle from the map display 200 to the text display 222 the member may again use the * key. Similar to the map mode, the VenueA 212 is highlighted by default since it received the highest ranking score. To highlight a subsequent venue in the text list, the mobile phone "down arrow" is used; then to highlight a venue above, the mobile phone "up arrow" is used. Once a venue is highlighted for which the member desires more information, such as detailed information on the highlighted venue's characteristics and attendee demographics, the "OK" button on the mobile phone is pressed. If the mobile phone has a touch screen, the member may simply tap the name of the venue to bring up detailed information on it.

Figure 3:
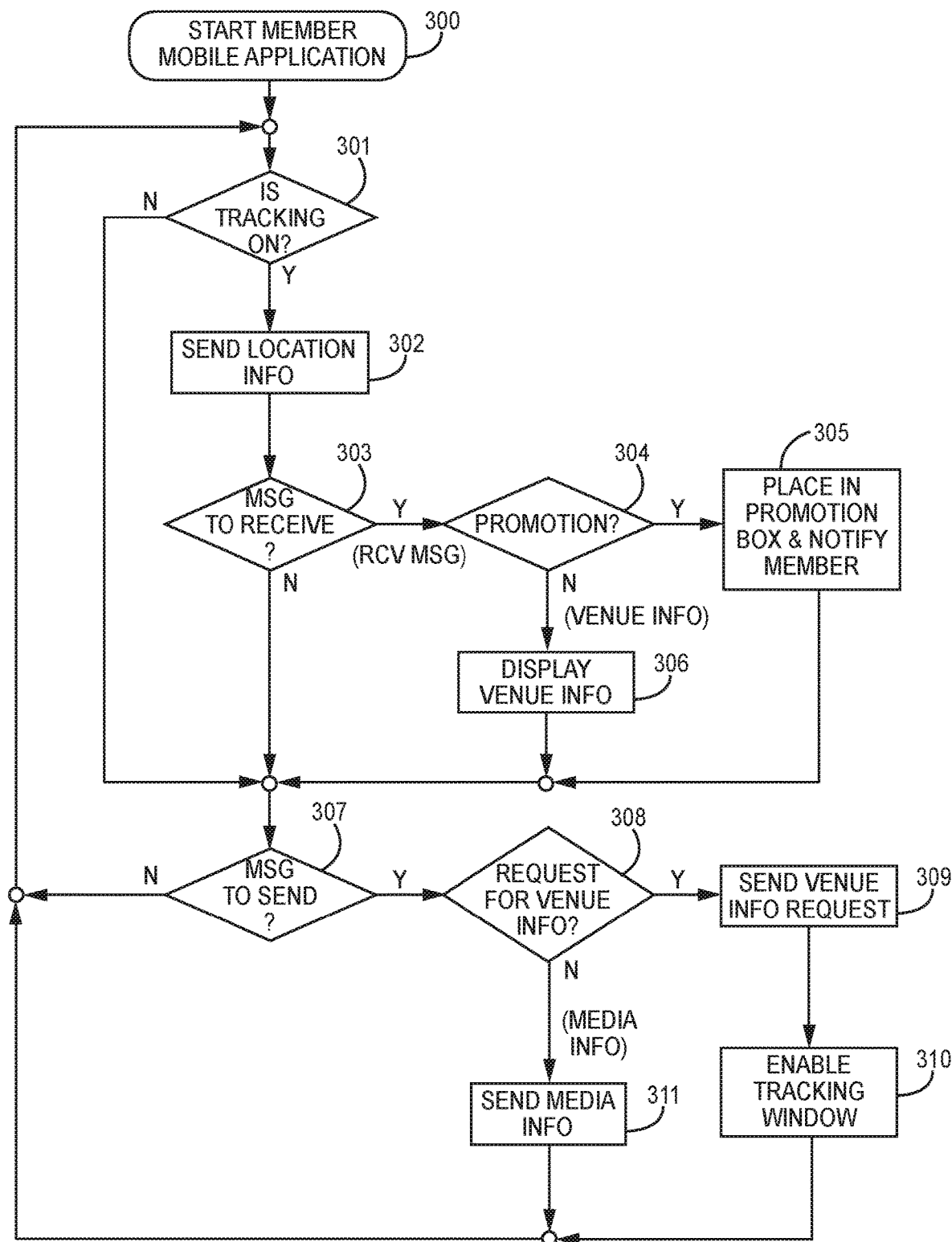
FIG. 3 is a simplified logic flow diagram for a software application accessed using a member's mobile communication device.

FIG. 3 is a simplified logic flow diagram for a software Hoozware mobile application which may be accessed by, or run on, a member's mobile phone. A commercial Hoozware mobile application is typically much more complex; however, FIG. 3 exemplifies some of the basic elements that typically exist in such more complex application. Such an application is typically downloaded to the member's mobile phone from the Hoozware website, the member's carrier's website, a third-party mobile phone software website or by downloading the application from a CD to the member's computer and then transferring the application to the member's mobile phone. The Hoozware mobile application may also run on the Hoozware system server 100 and be accessed, such as by a web browser, using a mobile phone (typically using a WAP browser), other data terminal, an office computer, communication device and the like.

In an illustrative embodiment, the Hoozware mobile application is loaded onto the member's mobile phone and launched, i.e., started 300. Once the application is launched it runs as a background process until terminated by the member. Typically, even if the mobile phone is turned off, if the application had not been explicitly terminated by the member prior to turning off the mobile phone, the application will automatically launch when the mobile phone is turned on.

During the process of loading and launching the Hoozware mobile application, the member is asked to setup the application. During setup, the member is typically asked to configure, define or edit the following application features: (1) tracking window(s), (2) moods, (3) personal profile, including traits, nickname, personal statement, self photo, self video, etc., (4) register with Hoozware, (5) friends and groups, etc.

The Hoozware mobile application performs a number of important functions. Such functions include: (1) checking and handling tracking, (2) processing received messages and (3) processing messages to send. Each function may be a separate process and processed in parallel or sequentially.

Each process may be a separate thread. In the Hoozware mobile application embodiment of FIG. 3, the functions are processed sequentially.

While it is running, the Hoozware mobile application checks 301 whether "tracking" is enabled for the member's mobile phone. Most mobile phones have position tracking capability, such as GPS, which can be used to determine the geographical location of the phone, and hence, the member. If tracking is enabled the mobile phone automatically transmits 302 the location information of the mobile phone to the Hoozware system server 100. Transmission of the location information may use any convenient method, including an SMS message, email, telephone call and the like. If tracking is not enabled, in the embodiment as shown, the member is prohibited from receiving promotions and viewing certain venue information.

Next, the Hoozware mobile application checks 303 whether there is a message to receive and process. If so, the application receives the message and checks 304 to see if it is a promoter (i.e., venue or sponsor) promotion. If so, the promotion is provided to, or made accessible by, the member. In the embodiment of FIG. 3, the promotion is placed 305 in a special promotion message box on the member's mobile phone. If there are no other un-read promotion in the member's promotion message box the member is notified that there is a new promotion available. In the embodiment of FIG. 3, the member can configure how they wish to be notified of such new promotion. Typical notification methods include visual, auditory and tactile signals.

If the message is not a promotion, in the embodiment of FIG. 3 the message is assumed to be venue information which was previously requested by the member. In an embodiment not shown here, the Hoozware mobile application checks the message to confirm that the received information is venue information. The venue information is displayed 306 on the member's mobile phone, such as provided by the examples of FIGS. 2A and 2B.

Next, the Hoozware mobile application checks 307 whether the member has requested to send a message. This check 307 is also done next if it was determined 301 that tracking was not enabled. If the member has requested to send a message a check 308 is done to see if the request is for venue information. If so, the member's current "mood" is submitted 309 to the Hoozware system server 100 along with a request for a list of venues best matching the demographics and characteristics defined by the member's mood. If the member was not being tracked at the time of this venue information request, tracking will be enabled 310 on their mobile phone for a period of time. A typical period of time is until the end of the current predefined tracking window.

If it was determined 308 that the member's request was not for venue information, in the embodiment of FIG. 3 the request is assumed to be to send media information, so media is sent 311. In an embodiment not shown here, the Hoozware mobile application checks the request to confirm that it is to send media information. Media information sent by the member typically includes text, audio (including audio recordings of the crowd, music/band and voice annotated member comments), images and/or video, and may be sent in any convenient format, including SMS, MMS, email, a phone call, and the like. In one embodiment, if the member enters text into their mobile phone, uses their mobile phone to record sound, take a picture or record video, the Hoozware mobile application will infer that the member wishes to post characteristic information about a venue and so the Hoozware mobile application will prompt the member to submit such media to the Hoozware system server 100.

At this point, as well as if it had been determined 307 that the member was not requesting to send a message, control is returned to the beginning where the Hoozware mobile application checks 301 whether tracking is enabled.

Figure 4:
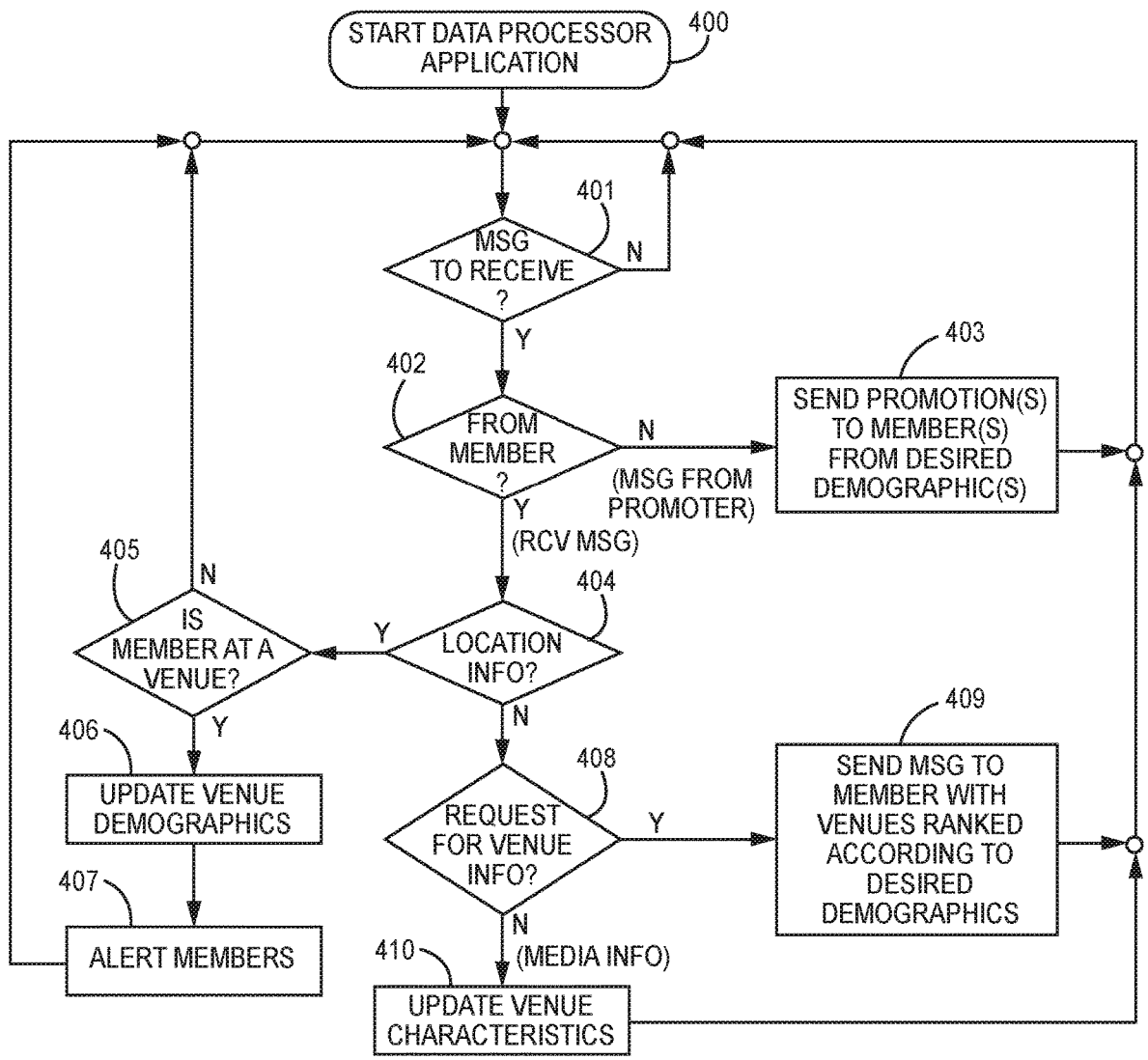
FIG. 4 is a simplified logic flow diagram for a software application to run on the Hoozware data processor.

FIG. 4 is a simplified logic flow diagram for a software application which may run on the Hoozware system server, a.k.a. data processor 100. A commercial Hoozware system server application is typically much more complex; however, FIG. 4 exemplifies some of the basic elements that typically exist in such more complex application. The Hoozware system server application performs a number of important functions. Such functions include: (1) receiving and processing messages from members, (2) receiving and processing messages from promoters and (3) storing member traits, venue demographics and venue characteristics. Each function may be a separate process and processed in parallel or sequentially. Each process may be a separate thread. In the Hoozware system server application embodiment of FIG. 4, the functions are processed sequentially.

Once the Hoozware system server application is loaded onto the Hoozware system server and started 400 it checks 401 whether there is a message to receive. If not, the application continues to check 401 until there is a message to receive. Once there is a message to receive, the Hoozware system server application checks 402 whether the message is from a member. If not, in the simple embodiment of FIG. 4 the Hoozware system server application assumes the message is from a promoter. In an embodiment not shown here, the Hoozware system server application checks the message to confirm that it is from a promoter.

A promoter message typically includes a promotion and instructions regarding to which members the promotion is to be sent. Such instructions typically include demographics and behaviors that members must possess to receive the promotion. Optionally, such instructions further include the maximum number of members to which the promotion is to be sent. Optionally, such instructions further include specific members, typically referred to anonymously by a member identifier, to which the promotion is to be sent. A promotion typically comprises drink specials, cover charge discounts, access to VIP lounges, transportation offers, parking specials, food specials, merchandise offers, lodging specials, music downloads, passes to other events, retail gift cards, and the like. The message is sent 403 to, or made accessible by, one or more members by the Hoozware system server 100 following the promoter's instructions. At this point, control is returned to checking 401 whether there is a message to receive.

A promotion may be redeemed by the receiving member in a variety of ways, including showing the promoter's agent the promotional material displayed the member's mobile phone, where such promotional material typically includes an offer identifier. The promoter's agent is anyone permitted by the promoter to provide to the redeeming member the goods and/or services promoted by the promotional material. The redeeming member may be required to show the promoter's agent the member's personal-field photo on their mobile phone, or other identification, to confirm that they are the intended member for the promotional material. The member may receive rewards points for accepting the promotional material. For more discussion on rewards, refer to the previous details of one embodiment of the subject invention in Section 3.2 covering an example Rewards Program.

If the check 402 regarding whether the message to be received is from a member is true, the message is received and queried 404 to see if it contains location information of the member's mobile phone (a.k.a. mobile communication device). If so, in the embodiment of FIG. 4 the Hoozware system server 100 predicts 405 whether the member is at a particular venue. If so, the member's traits are combined with the traits of other members estimated to be at the venue to provide 406 demographics for the venue. In the embodiment of FIG. 4, other members may be alerted 407 to the change in venue demographics. Typically, a member will receive such an alert 407 only if they have requested to be alerted if a demographic of interest to them has moved above or below a predefined level, or if a member of interest, such as a friend or group member, has arrived at or left the venue. At this point, control is returned to checking 401 whether there is a message to receive.

If the message that is received and queried 404 does not contain location information the message is queried 408 to see if it contains a request for venue information. If so, the message contains the sending member's "mood" and/or associated desired demographics and venue characteristics with weighting factors. The Hoozware system server 100 processes the desired demographics and venue characteristics with weighting factors to determine the ranked list of venues that best matches the member's desires. Typically, such a ranked list of venues includes a measure of how close each listed venue matches the member's defined mood. The ranked list of venues and measures of match are sent 409 typically to the member's mobile phone and/or home computer. At this point, control is returned to checking 401 whether there is a message to receive.

If the message is queried 408 and does not contain a request for venue information, in the embodiment of FIG. 4 the message is assumed to contain media information. In an embodiment not shown here, the Hoozware system server application checks the message to confirm that it contains media information. The media information in the message is added 410 to the database 103 that the Hoozware system server 100 accesses. The media information is added 410 to the section of the database 103 for the venue the media pertains to. At this point, control is returned to checking 401 whether there is a message to receive.

Figure 5:
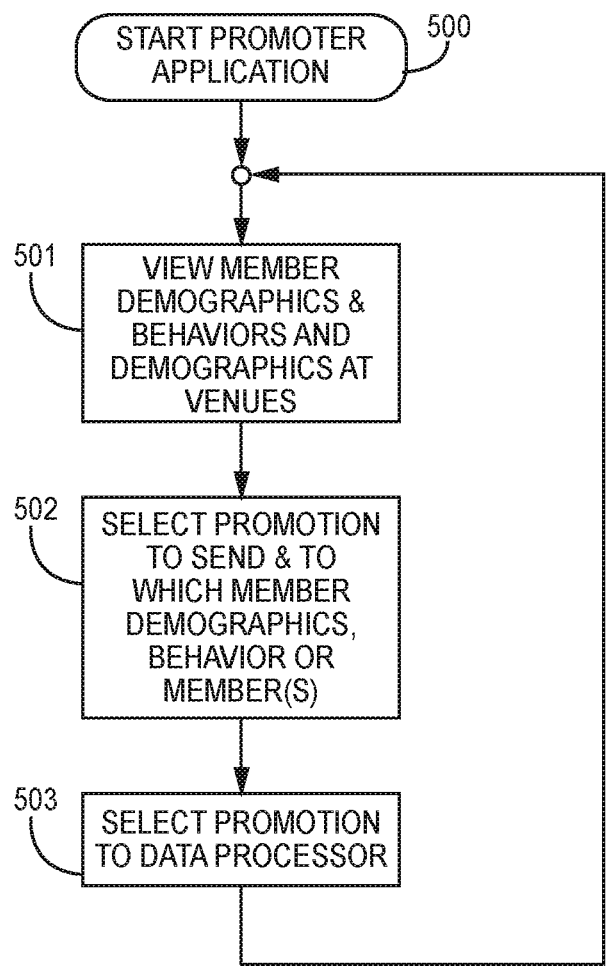
FIG. 5 is a simplified logic flow diagram for a software application accessed using a promoter's office computer.

FIG. 5 is a simplified logic flow diagram for a software application which may be accessed by, or run on, a promoter's office computer. A commercial Hoozware promoter application is typically much more complex; however, FIG. 5 exemplifies some of the basic elements that typically exist in such more complex application. Such an application is typically downloaded to the promoter's office computer (or alternately, to a mobile phone, other data terminal, etc.) from the Hoozware website or by loading the application from a CD to the promoter's computer. The Hoozware promoter application may also run on the Hoozware system server 100 and be accessed, such as by a web browser, using an office computer, mobile phone, other data terminal, communication device and the like. The Hoozware promoter application performs a number of important functions. Such functions include: (1) receiving member demographics and behaviors, (2) receiving member demographics at venues, (3) selecting promotions and specifying instructions regarding to which member the promotions should go, and (4) sending the promotion and instructions to the Hoozware system server 100. Each function may be a separate process and processed in parallel or sequentially. Each process may be a separate thread. In the Hoozware promoter application embodiment of FIG. 5, the functions are processed sequentially.

Once the Hoozware promoter application is loaded onto the promoter's computer, or accessed by a web browser, and started 500 it allows the promoter to continually view 501 the demographics and behaviors of members in the Hoozware system. In the embodiment of FIG. 5, the Hoozware promoter application allows the promoter to also view the demographics at one or more venues.

The Hoozware promoter application allows the promoter to select 502 promotional materials to send or post, and to specify instructions regarding which members to send to, or make accessible, the promotional materials. The Hoozware promoter application also allows the promoter to send 503 the promotional materials and instructions to the Hoozware system server 100, which then sends to, or makes accessible, the promotional materials to members according to the instructions.

Figure 6:
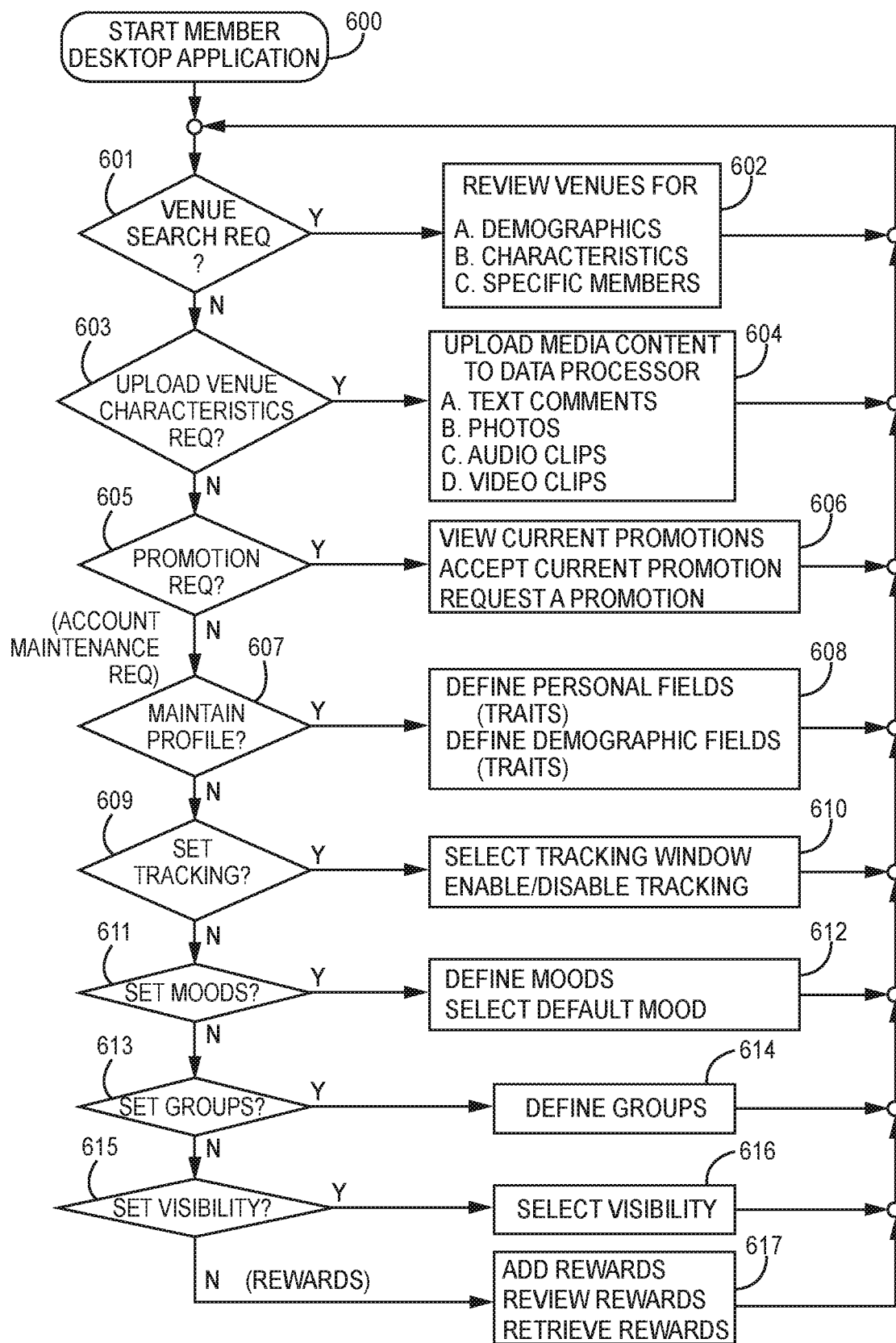
FIG. 6 is a simplified logic flow diagram for a software application accessed using a member's home computer.

FIG. 6 is a simplified logic flow diagram for a software application which may be accessed by, or run on, a member's home computer. A commercial Hoozware member's home application is typically much more complex; however, FIG. 6 exemplifies some of the basic elements that typically exist in such more complex application. Typically, the member's mobile application (FIG. 3) and the member's home application (FIG. 6) are similar. In fact, typically, the member's mobile application provides a subset of functionality of the member's home application. The member's home application is typically downloaded to the member's home computer from the Hoozware website or by loading the application from a CD to the member's computer. The Hoozware member's home application may also run on the Hoozware system server 100 and be accessed, such as by a web browser, using a home computer, mobile phone, other data terminal, communication device and the like. The Hoozware member's home application performs a number of important functions. Such functions include: (1) viewing venue demographics and characteristics, and determine which friends and groups are at which venues, (2) uploading media content concerning venue characteristics to the Hoozware system server 100, (3) viewing, redeeming or requesting a promotion, (4) defining and editing personal traits and related information, (5) selecting a tracking window and enabling/disabling tracking, (6) defining and editing moods, (7) defining friends and groups, (8) specifying visibility to others and (9) reviewing, adding and/or redeeming rewards. Each function may be a separate process and processed in parallel or sequentially. Each process may be a separate thread. In the Hoozware member's home application embodiment of FIG. 6, the functions are processed sequentially.

Once the Hoozware member's home application is loaded onto the member's home computer, or accessed by a web browser, and started 600 it checks 601 to see if the member has requested a venue search. If so, the member's "mood" and/or associated desired demographics and venue characteristics with weighting factors are sent to the Hoozware system server 100. The Hoozware system server 100 processes the desired demographics and venue characteristics with weighting factors to determine the ranked list of venues that best matches the member's desires. Typically, such a ranked list of venues includes a measure of how close each listed venue matches the member's defined mood. In the embodiment of FIG. 6, the ranked list of venues and measures of match are sent to the member's home computer for viewing 602. At this point, in the embodiment of FIG. 6, control is returned to checking 601 to see if the member has requested a venue search.

If the member has not requested a venue search, in the embodiment of FIG. 6 the Hoozware member's home application checks 603 to see if the member has requested to upload media content. If so, the member is provided with functionality to conveniently upload 604 to the Hoozware system server 100 text comments, voice annotations, photos, recorded audio and video clips from a venue, and the like. The media is stored in the portion of the database 103 for the corresponding venue. At this point, in the embodiment of FIG. 6, control is returned to checking 601 to see if the member has requested a venue search.

If the member has not requested to upload media content, in the embodiment of FIG. 6 the Hoozware member's home application checks 605 to see if the member has requested to access promotions. If so, the member is provided with functionality to conveniently access promotions relevant to the member. Such promotions may be stored and accessed from the Hoozware system server 100 or stored locally on the member's home computer. The member may view promotions 606 currently relevant to the member, redeem such promotions or request that a promotion be offered to the member. At this point, in the embodiment of FIG. 6, control is returned to checking 601 to see if the member has requested a venue search.

If the member has not requested to access promotions, in the embodiment of FIG. 6 the Hoozware member's home application checks 607 to see if the member has requested to maintain their member profile. If so, the member is provided with functionality to conveniently maintain their member profile. Such member profile information is typically stored on the Hoozware system server 100 or stored locally on the member's home computer. The member may define 608, edit or view their member profile. The member profile typically includes personal traits that are combined with traits of other members to produce member demographics. Such traits typically comprise: age, sex, sexual orientation and preference, education, race, religion, smoker/non-smoker, marital status (e.g., single/married/committed/divorced), parental status, financial status, occupation, home zip code, political affiliation, pictures, both direct and anonymous contact information, friend status, group status, as well as other online dating categories including physical attributes (e.g., height, weight, eye color, hair color, balding, body type, etc.), etc. At this point, in the embodiment of FIG. 6, control is returned to checking 601 to see if the member has requested a venue search.

If the member has not requested to maintain their member profile, in the embodiment of FIG. 6 the Hoozware member's home application checks 609 to see if the member has requested to set tracking parameters. If so, the member is provided with functionality to conveniently set tracking parameters 610. Such functionality typically allows the member to select a tracking window. Tracking windows are predefined periods of time in which a member's location is automatically transmitted from their mobile phone to the Hoozware system server 100. Setting tracking parameters 610 also include the ability to enable or disable tracking, regardless of the tracking window selected. At this point, in the embodiment of FIG. 6, control is returned to checking 601 to see if the member has requested a venue search.

If the member has not requested to set tracking parameters, in the embodiment of FIG. 6 the Hoozware member's home application checks 611 to see if the member has requested to define moods. If so, the member is provided with functionality to conveniently define, edit, view and select moods 612. Mood definitions may be stored in the database 103 on the Hoozware system server 100 and/or on the member's home computer and/or the member's mobile communication device. Mood definitions include the name of the mood and the associated desired demographics and venue characteristics with weighting factors. At any time there is a default mood in effect that is used by the Hoozware system server 100 when a request is received by the member for a venue search; however, a new default mood may be selected at any time using either the Hoozware member's home application or mobile application. At this point, in the embodiment of FIG. 6, control is returned to checking 601 to see if the member has requested a venue search.

If the member has not requested to define moods, in the embodiment of FIG. 6 the Hoozware member's home application checks 613 to see if the member has requested to define friends and/or groups. If so, the member is provided with functionality to conveniently define, edit, view and select friends and groups 614. Friend and group definitions may be stored in the database 103 on the Hoozware system server 100 and/or on the member's home computer and/or the member's mobile communication device. Friend definitions include the name of the friend. Group definitions include the name of the group, the group leader and the associated group members. Friend status and group status may be included by a member as parameters of interest in a venue search request. At this point, in the embodiment of FIG. 6, control is returned to checking 601 to see if the member has requested a venue search.

If the member has not requested to define friends and/or groups, in the embodiment of FIG. 6 the Hoozware member's home application checks 615 to see if the member has requested to set their visibility to others. If so, the member is provided with functionality to conveniently define, edit, view and select visibility 616. Visibility settings may be stored in the database 103 on the Hoozware system server 100 and/or on the member's home computer and/or the member's mobile communication device. A member may allow various entities to view certain personal information. Typical entities comprise: all members, a subset of members (such as friends and/or groups), venues and sponsors. Personal information that a member can typically restrict visibility to comprises any of their personal traits, such as: age, sex, sexual orientation and preference, education, race, religion, smoker/non-smoker, marital status (e.g., single/married/committed/divorced), parental status, financial status, occupation, home zip code, political affiliation, pictures, both direct and anonymous contact information, friend status, group status, as well as other online dating categories including physical attributes (e.g., height, weight, eye color, hair color, balding, body type, etc.), etc. A typical visibility setting for a first member is that a second member cannot view any trait of the first member if the second member doesn't allow the first member to view the same trait of the second member. At this point, in the embodiment of FIG. 6, control is returned to checking 601 to see if the member has requested a venue search.

If the member has not requested to set their visibility to others, in the embodiment of FIG. 6 the Hoozware member's home application assumes that the member wishes to access rewards. If so, the member is provided with functionality to conveniently enter items that provide reward points 617, review the member's current number of reward points and/or redeem goods and/or services using the member's points. Reward information may be stored in the database 103 on the Hoozware system server 100 and/or on the member's home computer and/or the member's mobile communication device. For discussion on how a member may receive rewards points for accepting the promotional material, refer to the previous details of one embodiment of the subject invention in Section 3.2 covering an example Rewards Program. The member typically may use their rewards point to receive goods and/or services. Such goods and/or services typically comprise: drink specials, cover charge discounts, access to VIP lounges, transportation offers, parking specials, food specials, merchandise offers, lodging specials, music downloads, passes to other events, retail gift cards, and the like. At this point, in the embodiment of FIG. 6, control is returned to checking 601 to see if the member has requested a venue search.

Figure 7:
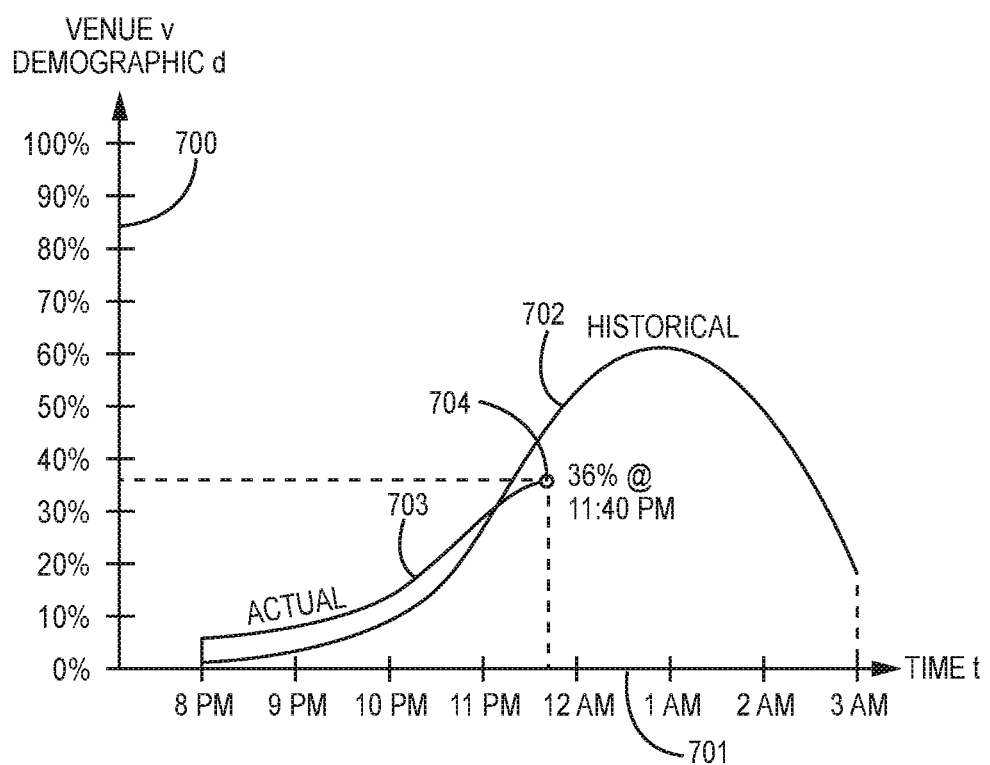
FIG. 7 is an example plot of one demographic versus time on a particular evening at one venue, where the historical average for the selected demographic is plotted along with the actual real-time demographic FIG. 8 provides exemplary information requested to open a user account using a web browser on a desktop computer.

FIG. 7 is a graph exemplifying how demographics information at a venue may be presented to a member, venue or sponsor, for viewing on a mobile phone, data terminal, home or office computer screen, and the like. In this example, the ordinate ("Y axis") 700 represents the demographics d at venue v, such as, the percentage of members at venue v that possess trait d. The abscissa ("X axis") 701 represents the time t. FIG. 7 shows an historical curve 702 that represents a function of previous nights where the demographic d for venue v were recorded over time. Also in FIG. 7 is a curve showing the actual 703 recorded demographics d for venue v up to the point 704 corresponding to the present time of 11:40 p.m., where the demographics d denote that 36% of the crowd possess trait d.

Figures 74, 75:
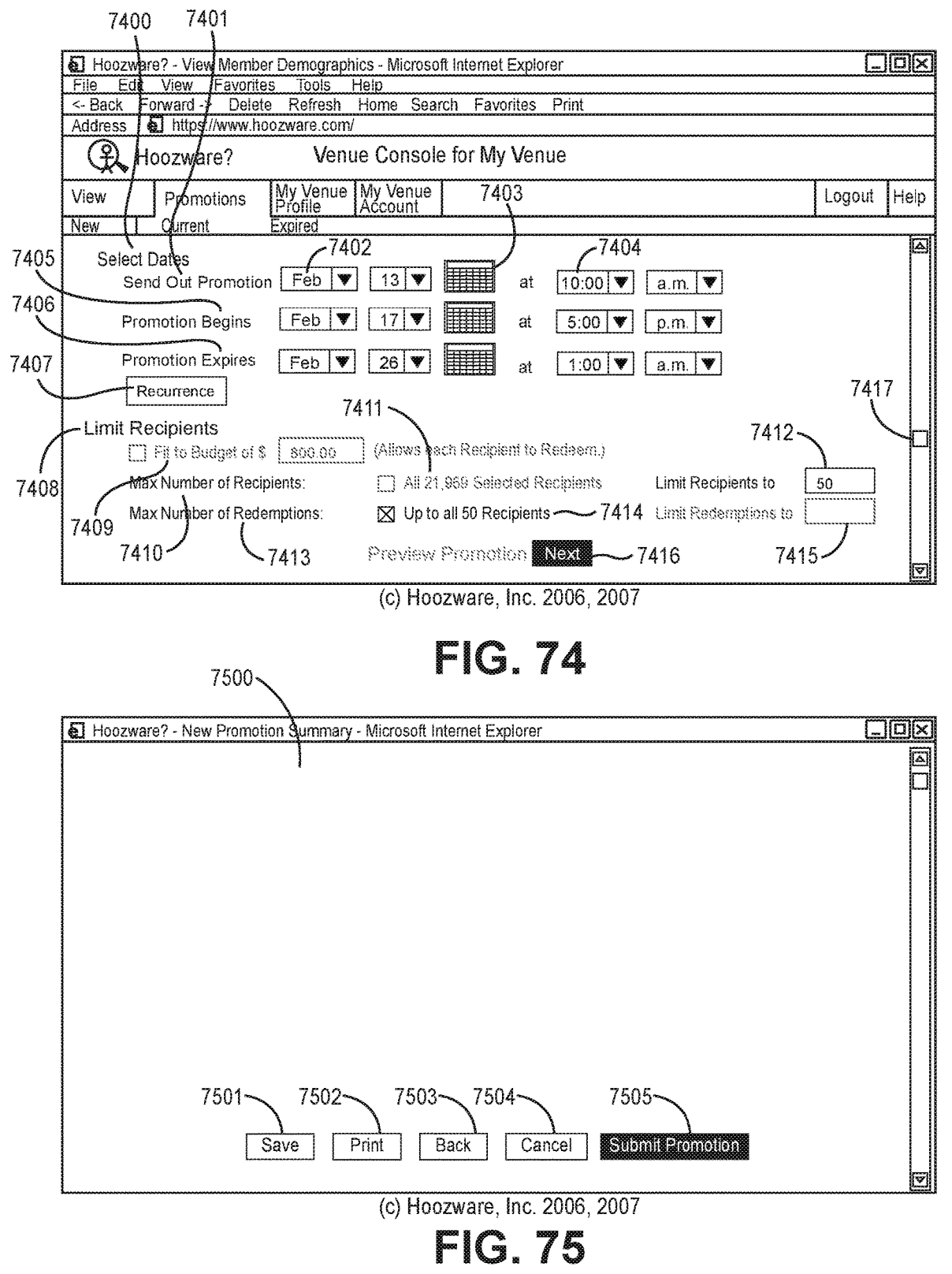

FIGS. 8-75 illustrate use and operation of the second embodiment of the subject system. In typical operation, the Hoozware System is a mobile phone service that informs members "Who Is Where" (i.e., Hoozware), and what's happening at venues, such as clubs (nightclubs, bars, lounges and the like). The Hoozware System brings together mobile communication device users and venues. In one commercial embodiment, the Hoozware System is free to members, and venues pay to send offers to members. In another commercial embodiment, members pay on a time and/or feature usage basis. In yet another commercial embodiment, venues pay on a time usage basis.

Using their mobile communication device, such as a mobile telephone, PDA, pocket computer, and the like, a member can:

(1) view timely club information, such as: (a) crowd demographics (size, gender mix, age, etc.); (b) peer reviews (e.g., "This place rocks!"); (c) club descriptions (e.g., no cover charge, full menu, etc.); (d) events schedules (e.g., live band tonight); (e) directions; etc.;

(2) meet up with existing friends and meet new friends; and (3) receive valuable club coupons (e.g., free drinks, 2-for-1 drinks, free cover charge, etc.).

The Hoozware System enables venues to target offers to members of the system who like to go to venues such as theirs. A recipient member can immediately receive notification and view venue offers on their mobile communication device. A venue can send out an offer at a specific time, or send an offer having a specific time window for redemption. Venues can target a specific demographic or group of members to draw in business during specific, or "slow," times. Venues can track the demographics of members who patronize their place of business. Venues can announce "what's happening" by posting their events calendar, business description and directions.

For venues to use the Hoozware System, first they sign up. They then login via the web and update their account information, business profile and events calendar. At any time, a venue can login to their account and view the demographics of members Checked-in to their venue. The venue may use the web interface to enter an offer type (e.g., 2-for-1 drink, discounted cover charge, food discount, etc.), the timing of the offer and to which members (either presently at the venue or not) the offer should be sent.

The following is an illustrative scenario: It's Saturday evening and Rachael wants to go out . . . but where? She pulls out her mobile phone and clicks her web browser to connect to the Hoozware website. Her "Party Mood" is still the default so she presses "Find Clubs". Her phone displays "Dragon Bar" first in a list of San Francisco clubs since it has a score of 89%, the highest percentage match to her mood criteria. She checks out a short video clip of the crowd posted by another Hoozware member to the Hoozware website. Looks pretty happening. Rachael previously defined her Party Mood to include DJ Hip Hop, no cover, drink discounts, lots of friends, guys who pass her "Cool Guy" filter and a club where people currently there say it "rocks." She goes to Dragon Bar and "Checks-In" to the club using the Hoozware System on her phone and quickly rates a few simple features of the club for other Hoozware members to see. Since she checked-in she gets to "spin" the virtual roulette wheel that the Hoozware System displays on her phone to see if she can win a prize. Tick, tick, tick, clunk. Cool! She won a free drink. She shows the prize coupon displayed on her phone to the bartender who promptly gives her the free vodka-cranberry she ordered. She's stoked. Hmm. Now, who's here? She uses the Hoozware System to do a quick search using her phone and sees that she has eight friends and three guys here who pass her very specific "Cool Guy" filter. Could this be the night she meets Mr. Right? Rachael does a quick review of Chris' profile. Wow! He's cute, and they have so much in common. He's even from her hometown of Cleveland. They exchange anonymous text messages using the Hoozware System before deciding to meet at the bar. The rest is Hoozware history . . . .

To use Hoozware, a user signs up over the web to become a member. Typically the member will sign up using a desktop computer or mobile communication device such as a smart mobile phone, personal digital assistant (PDA), pocket computer and the like. Typically, non-members can access limited features of the Hoozware System. To sign up, an individual completes a Member Profile, including (a) Demographic Information, (b) optional Social Information and (c) optional Crush Information. The Demographic Information is used when the Hoozware System compiles the venue crowd statistics; the Social Information is used to share a member's interests with other members; and Crush Information is used when the member participates in the "crush matching" dating element of the Hoozware System.

During the sign-up process, an individual also provides various Preferences. A member uses their Preference settings to manage their (a) favorite venues, (b) friends list, (c) "Filters" for screening members, (d) "Moods" for ranking venues, (e) alert notifications, (f) location privacy settings, and the like.

Once signed up, members can use their mobile communication device or desktop computer to search for venues, which search may be based on desired criteria called a "Mood." A Mood may include such criteria as (a) geographical distance away; (b) number of friends, crush matches or crowd size in attendance; (c) Reviews (including Surveys and Postings (including Overall Recommendation, Comments and Media)) submitted by members in attendance at the venue; (d) venue characteristics; (e) combinations of the above criteria as well as other criteria.

After identifying a venue, a member may inspect details about the venue, including viewing (a) current crowd demographics; (b) list of members present; (c) real-time member Surveys and Postings; (d) discount offers from the venue; (e) venue description; (f) venue events; (g) directions to the venue; and the like.

Members can also search for other members, which search may be based on desired criteria called a "Filter." A Filter may include criteria to identify (a) Friends; (b) Crush Matches; (c) individuals based on selected Demographic Information; and the like. Once an individual identifies another member, the individual may view the Profile (e.g., background and interests) of such member, and send messages to and receive messages from the member, facilitating meeting existing and new friends at a venue.

Members can also receive, view and redeem offers sent to them by venues or other parties. Members may also receive advertisements sent to them by advertisers.

At a venue a member "Checks-In" using their mobile communication device. The Check-in procedure typically includes submitting a "Review" which typically includes a required "Survey" and an optional "Posting." The Review typically requires answering at least one Survey question where typically the member must estimate something about the venue scene that is of interest to another member. Typically a member will be asked to estimate and answer from three to six Survey questions. The member Review may also include an optional Posting, including such elements as an Overall Recommendation, written Comments and Media (such as photos, videos and audio clips) of the venue scene. Media uploads and downloads on a mobile communication device are typically supported using MMS.

After a member Checks-in to a venue and submits the Survey, they typically get a chance to receive a Prize, where typically the Hoozware System presents them with a game of chance. One exemplary game of chance is where the member gets to select one of four drink shakers presented on the member's mobile communication device. When the member selects a shaker, the screen on their mobile communication device is refreshed where the selected shaker is replaced with either an empty or full drink glass. A full drink glass represents that the member won a drink Prize. Another illustrative game of chance is where the member gets to press a key on their mobile communication device to initiate the spinning of a roulette wheel. The wheel spins and stops at a position indicating whether the member has won a Prize or not.

In either illustrative example, if the member wins a Prize, the Prize is listed in an Offer Center with other offers they might already have received from a venue or advertiser, and the member is typically given a limited time in which to redeem the Prize. By limiting the time to typically between two and five minutes, members are not incentivized to try to fake a Check-in and submit a Survey when they're not at a venue in order to win a Prize, since if they're not already at the venue, they won't have time to use the Prize they're trying to win. Members typically are limited such that they cannot Check-in to a venue more than every 15-30 minutes. In this way, if there are multiple venues in close proximity to one another, a member cannot quickly attempt a fake Check-in and submit a Survey at multiple venues in an attempt to see if they can win a Prize at one of the venues before deciding which venue to go into.

To incentivize members present at a venue to help update the venue scene for other members not present to view, typically after Checking-in a member can submit a new Survey every two hours and receive another opportunity to win a Prize, such as by playing a game of chance. Any member Checked-in to a venue may submit an updated Survey as often as they'd like; however, they only get a chance to win a Prize after a minimum amount of time has passed since they have taken their most recent chance to win a Prize. Typically, venues are required to cover the cost of honoring redemption of a Prize.

FIGS. 8-53 below illustrate how the Hoozware System operates for members in a second embodiment. Various modifications may be introduced for different situations, the check-in procedure changed, the game altered, information expanded, incentives varied, and the like.

FIG. 8 provides exemplary information requested to open a member account using a web browser 800 on a desktop computer. An account may similarly be opened using a mobile communication device. This web view is entitled New Registration 801. Fields that are requested in this example include: Username 802, Password, Re-type password, Display name, First name, Last name, Email, Mobile number, Mobile carrier and Cellphone model. In this example, "rwinters" 803 is entered as the username. The username is typically the name the member uses to login to their account. The Display name (in this case "racewinner") is the name other members may see associated with the member's information. Other members may also see the First name, and may do a Member Search using any of the First name, Last name and Display name.

To ensure that a computer recognizable Mobile carrier is entered, a "down-arrow" 804 may be used such that when it is selected (e.g., by clicking with a computer mouse or tabbing to it and pressing "OK") a selectable list of mobile carriers is displayed. Similarly, to ensure that a computer recognizable Cellphone model is selected, a down-arrow 805 may be used, such that when it is selected a selectable list of cellphone models is displayed. When this New Registration 801 page is completed, the prospective member selects Submit 806. Alternately, if the prospective member elects not to open a member account at this time, they may select Cancel 807.

FIGS. 9-12 refer to information about a member and the opportunity to find a partner, referred to as "Crush Information." In this example, the member fills out the information using a web browser on a desktop computer.

FIG. 9 exemplifies Demographic Information 901 a member is required to provide as part of completing their profile 900. In this example, the member completing their profile is Rachael. Required fields that must be filled out include: Gender 902, Date of birth 907 and Zipcode 910. Typically, a member's Gender 902 is viewable by all other members; however, a member's Date of birth 907 is not viewable directly, but a member's age, calculated using the Date of birth 907, is viewable. Also, a member's Zipcode 910 is not viewable by other members, but the living distance between members, as calculated using the distance between Zipcodes 910, is viewable. The slider 911 indicates that this screen may be continued.

For Gender 902, the member may select and check the box 904 next to Man 903 or the box 906 next to Woman 905 (which is check in this example). This example, each of the month, day and year corresponding to Date of birth 907 have a down-arrow to ensure a computer-readable entry. For instance, the down-arrow 909 is used to select the year of birth 908. Typically, if the member attempts to enter information directly into one of the boxes, such as the year 908, the box will display the closes match to an acceptable entry.

FIG. 10 exemplifies Social Information 1000 that a member may optionally provide. Typically, any such Social Information 1000 that is entered is viewable by all members. In this example, the Social Information 1000 includes the ability to enter: a Statement 1001 (including a text box 1002), Media Files 1003, Residence 1004 city and state, Hometown 1005 city and state, Interests 1006 including Music 1007, Dancing, Movies and Television. The Media Files 1003 may include photo images, video clips, audio tracks, documents, Power Point presentations, other media types and the like. The list of Interest 1006 may be extensive to cover a very broad range of possibilities. The slider 1010 indicates that this screen may be continued. Other information that Social Information 1000 may include is one or more Drink Faves (shore for "Drink Favorites"), one or more Club Faves, one or more Band/Artist Faves, one or more Book Faves, spoken Languages, Education, Occupation, Political View, and the like. In the example of FIG. 10, Music 1007 allows the member to specify whether they are interested in music by checking the Yes box 1008 or the No box. If the Yes box 1008 is checked, they may be allowed to check any of a variety of additional boxes related to Music 1007, such as Pop, Rock, Hip-hop, Jazz 1009 (which is checked), Classical, and the like. Similarly, checking Yes to Dancing may expose a list of dances to specify. Similarly, checking Yes to Movies may expose a list of movie types to specify, such as Drama, Action, Romance, Sci-fi, Comedy, and the like. Similarly, checking Yes to Television may expose a list of TV types to specify, such as Sitcom, Game, Reality, Talk, Documentary, and the like.

FIG. 11 exemplifies Crush Information 1100 that a member may optionally provide. Typically, a member entering any such Crush Information 1100 may indicate who may view it. The member may indicate if they are participating in the Crush Matching program by checking the box 1101. Participation includes various privileges. As with Social Information 1000, Crush Information may include a statement, entitled here About me 1102, with associated text box 1103. The member may also include Media Files 1104 which may be more aimed to attract someone in a dating sense than the Media Files 1003 provided in the Social Information 1000. Other exemplary fields for the Crush Information include Status 1105, (sexual) Orientation, Body type, Height, Smoking (frequency), Drinking (frequency), Ethnicity, Religion, Income, Have children, Want children, and the like. The slider 1106 indicates that this screen may continue.

Figure 12:
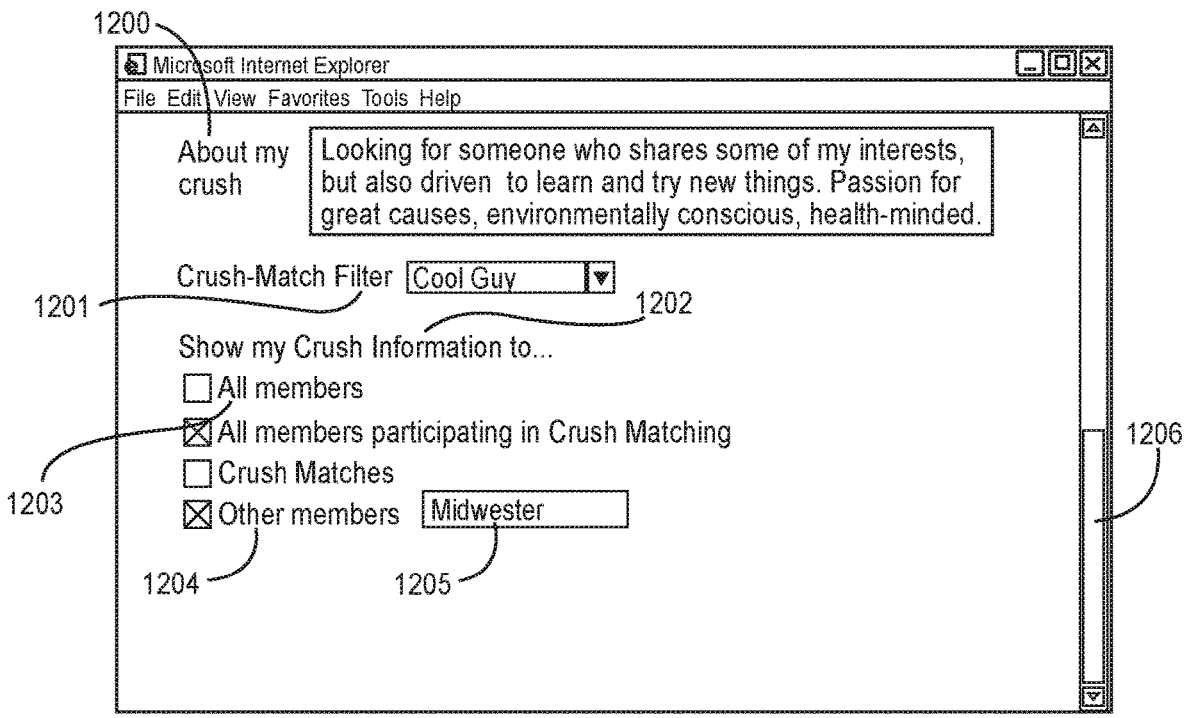
FIG. 12 illustrates additional Crush Information.

FIG. 12 represents a continuation of FIG. 11. FIG. 12 provides a statement 1200 about what a member is looking for in their "crush," i.e., ideal date. The member is able to specify which pre-defined filter 1201 they'd like to use to help search for their crushes. The member may select who may review their Crush Information 1100, including All members 1203, All members participating in Crush Matching, Crush Matches and Other members 1204. When Other members 1204 is selected, typically by checking the associated box, the member may be allowed to type into a box 1205, or select from a list, the names (Display names, First names, Last names, etc.) of members they want to allow to see their Crush Information 1100.

FIGS. 13-23 provide user preferences and various aspects of information included in the database of the Hoozware System. In this example, the member fills out the information using a web browser on a desktop computer.

Figure 13:
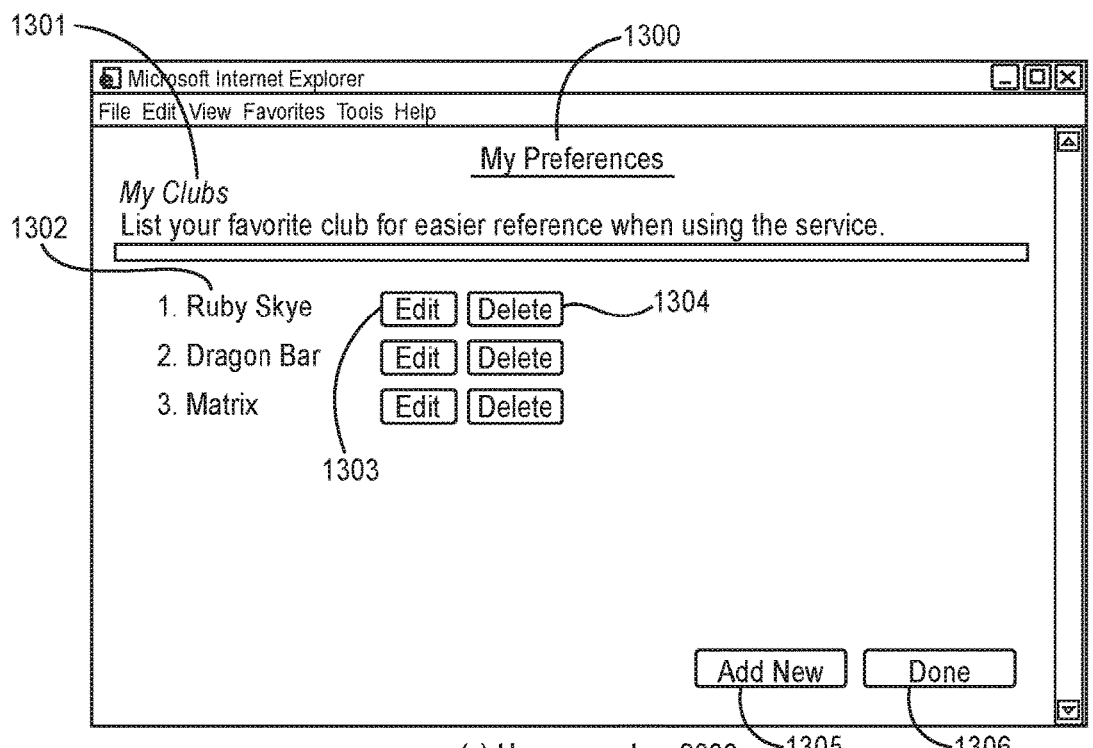
FIG. 13 illustrates user Preferences and various aspects of information included in the database of the Hoozware System, including preferences for favorite clubs. In this example, the member fills out the information using a web browser on a desktop computer.

FIG. 13 is one screen a member completes when filling out My Preferences 1300, where the preferences are various parameters used to control operation of the Hoozware System. One such preference is My Clubs 1301. This preference is sometimes also called My Fave Clubs. My Clubs 1301 is a list of venues a member wishes to particularly keep track of The list may be user generated and maintained. The list may be populated with some automation based on inference by the Hoozware System. As shown, there are three entries in the My Clubs 1301 list, including Ruby Skye 1302, Dragon Bar and Matrix. As shown, a member may modify an entry, such as Ruby Skye 1302, by selecting Edit 1303 or Delete 1304 in the same row. Alternately, a member may click on the name of the venue or in a box next to it to modify the entry. As shown, to add a new entry, the member selects Add New 1305. When finished, the member selects Done 1306.

Figure 14:
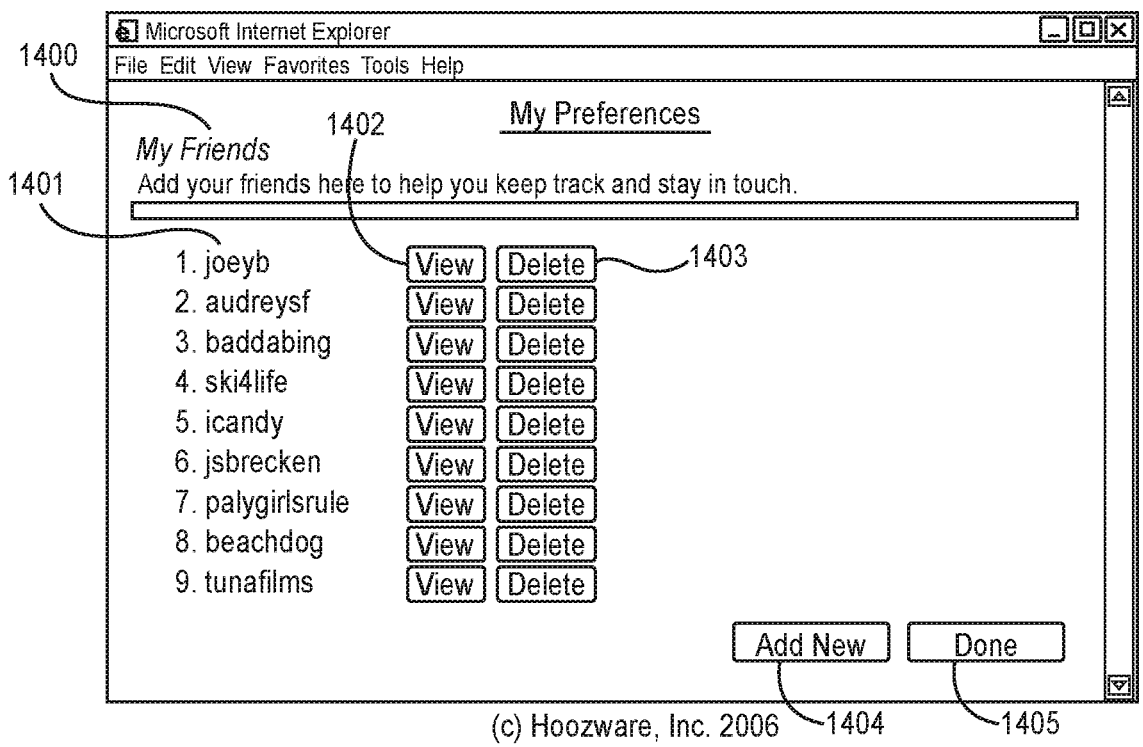
FIG. 14 illustrates user preferences for friends.

FIG. 14 provides another preference called My Friends 1400. My Friends 1400 is a list of members that a member wishes to particularly keep track of and provide viewing privileges to. Adding a member as a friend may require acceptance by the member being added, or adding a member as a friend may simply require a member to enter the added member's Display name. FIG. 14 shows a list of nine friends: joeyb 1401, audreysf, baddabing, ski4life, icandy, jsbrecken, palygirlsrule, beachdog and tunafilms. As shown with My Clubs 1301, there are various selections to add and modify the list, including View 1402, Delete 1403, Add New 1404 and Done 1405.

Figure 15:
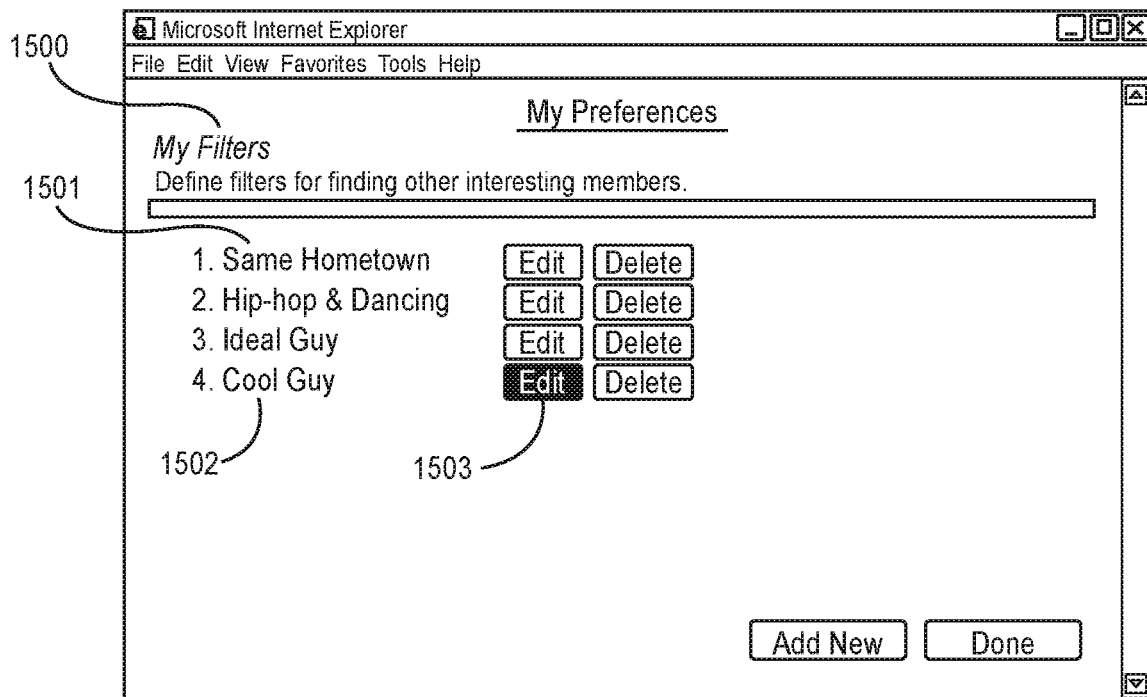
FIG. 15 illustrates user preferences for filters.

FIG. 15 provides another preference called My Filters 1500. This preference is sometimes also called My Member Filters. My Filters 1500 is a list of labeled filters (i.e., formulae) for specifying how to produce a "filtered" list of members from all members or another list of members. FIG. 15 shows a list of four filters: Same Hometown 1501, Hip-hop & Dancing, Ideal Guy and Cool Guy 1502. Filters may be member defined, as well as, initially populated with Hoozware System defaults. As with My Clubs 1301, there are various selections to add and modify the list. If it is desired to modify the Cool Guy 1502 filter, Edit 1503 is selected. In another example, the each element of the list may be clicked on directly to select for editing.

FIG. 16 exemplifies the information a member may select when defining or editing a filter, e.g., when selecting Edit 1503 to edit the Cool Guy 1502, 1600 filter. Typically, a member can require as part of their filter any Demographic Information 1601, Social Information 1605 and Crush Information 1700. Regarding Demographic Information 1601, a member can typically specify their requirements for a variety of fields including Gender 1602, Age 1603 and Distance 1604. Regarding Social Information 1605, a member can typically specify their requirements for a variety of fields including Residence 1606, Hometown 1607, Interests 1608 including Music 1609, Dancing, Movies, Television, and the like. The slider 1610 indicates that this screen continues.

Regarding Crush Information 1700, a member can typically specify their requirements for a variety of fields including Status 1701, Orientation, Body type, Height, Smoking, Drinking, Ethnicity, Religion, Income, Have children, Want children, and the like. The filter can then be saved as the same name when editing by selecting Save 1702. The filter can be saved with another filter name by selecting Save As 1703. Alternately, editing or creating the filter may be canceled by selecting Cancel 1704. The slider 1705 indicates that this screen is a continuation of another screen.

Figure 18:
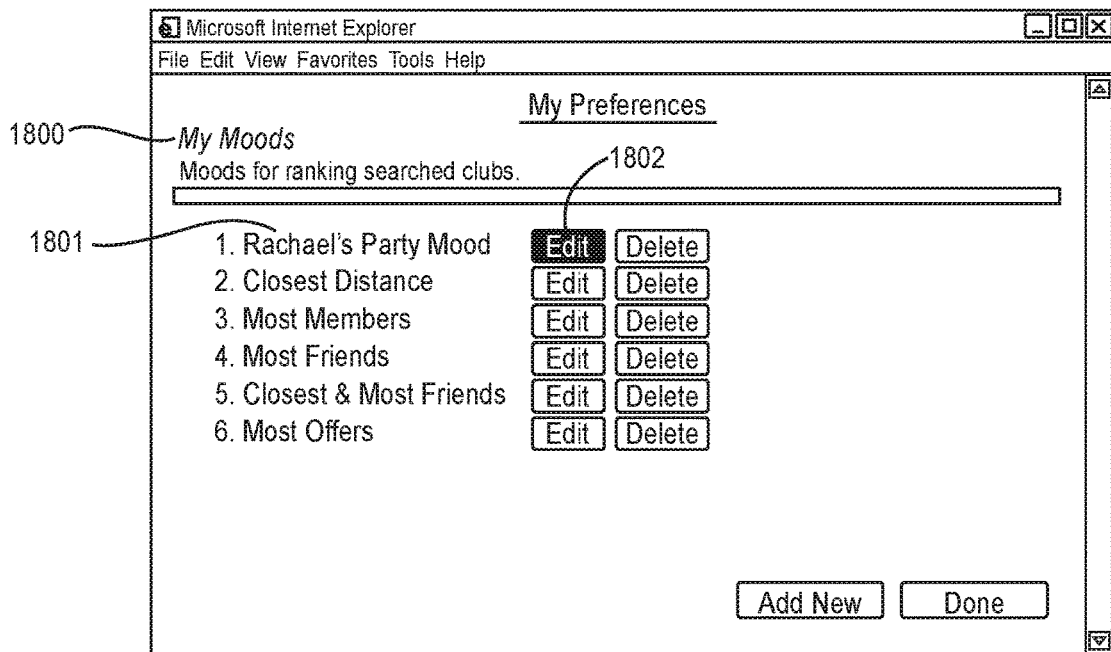
FIG. 18 illustrates user preferences for moods.

FIG. 18 provides another preference called My Moods 1800. This preference is sometimes also called My Club Moods or My Venue Moods. My Moods 1800 is a list of labeled criteria for specifying how to sort, i.e., rank, a list of venues. FIG. 18 shows a list of six moods: Rachael's Party Mood 1801, Closest Distance, Most Members, Most Friends, Closest & Most Friends and Most Offers. Moods may be member defined, as well as, initially populated with Hoozware System defaults. As with My Clubs 1301, there are various selections to add and modify the list. If it is desired to modify Rachael's Party Mood 1801, Edit 1802 is selected. In another example, the each element of the list may be clicked on directly to select for editing.

Figure 19:
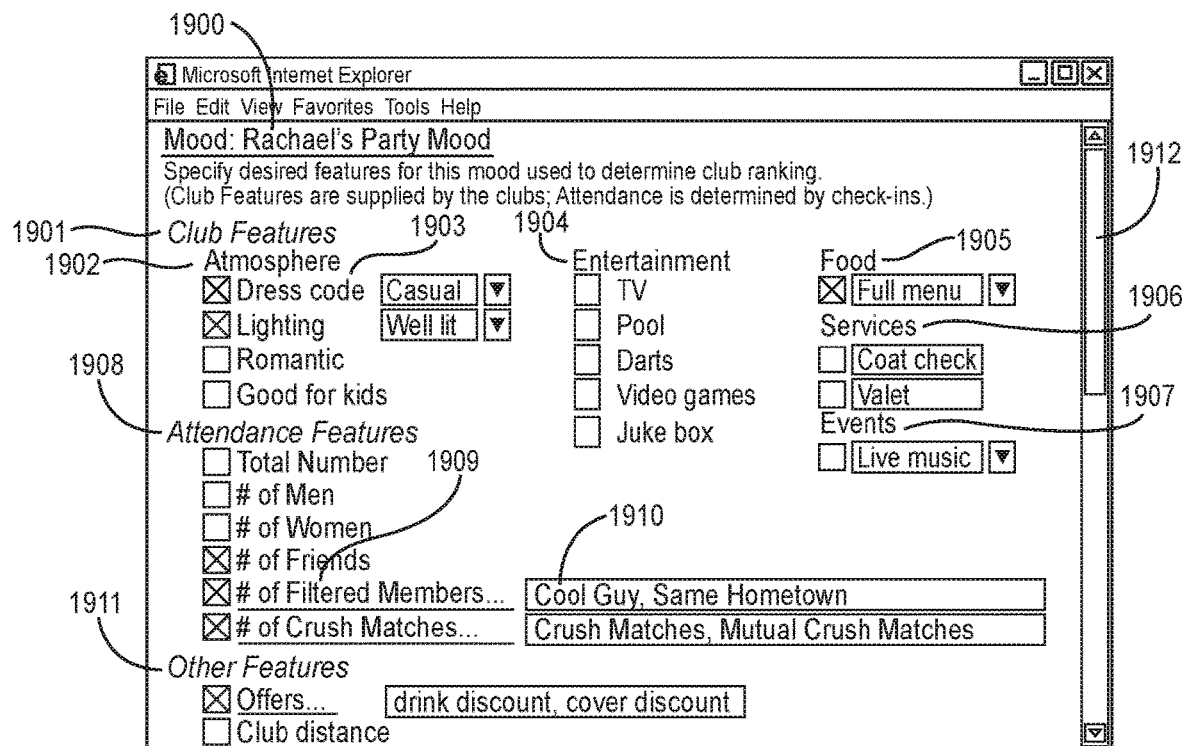
FIG. 19 illustrates user preferences for a particular mood.

FIG. 19 exemplifies the information a member may select when defining or editing a mood, e.g., when selecting Edit 1802 to edit Rachael's Party Mood 1801, 1900. Typically, a member can require as part of their mood information provided by a venue, as well as, information estimated or otherwise provided by another member regarding a venue. Three exemplary categories of features a member may use to define a mood include Club Features 1901, Attendance Features 1908 and Other Features 1911. For instance, Club Features 1901 are provided by a venue when they sign up to participate in the Hoozware System. Club Features 1901 may include such features as Atmosphere 1902, Entertainment 1904, Food 1905, Services 1906, Events 1907, and the like. Atmosphere 1902 may include such fields as Dress code 1903, Lighting, Romantic, Good for kids, and the like. Entertainment 1904 may include such fields as TV, Pool, Darts, Video games, Juke box, and the like. Food 1905 may include different kinds of food offerings, such as Full menu, Bar food, and the like. Services 1906 may include fields such as Coat check, Valet, and the like. Events 1907 typically lists the types of events the venue has on tap, such as Live music, Comedy, DJ music, Happy Hour, and the like.

Attendance Features 1908 are features based on the members in attendance. The Attendance Features 1908 may include Demographic Information, Social Information and Crush Information on members who are checked-in or otherwise known to be at a venue. A member can use a mood definition to rank venues based on their member filters, including filters for their Crush Matches. In FIG. 19, if a member selects (typically by clicking on it with a computer mouse) one of the underlined fields that end with an ellipsis, that opens up a "browse" window where the member may search for and select desired entries from a list of possible entries. Alternately, the member may type in the desired entry name in the box, such as the box 1910, separating each entry with a delimiter such as a comma or semicolon.

Other Features 1911 typically include Offers, such as drink, food and cover-charge discounts. Other Features 1911 may also allow a member to rank venues based on their proximity, i.e., Club distance. The slider 1912 indicates this screen is continued.

Figure 20:
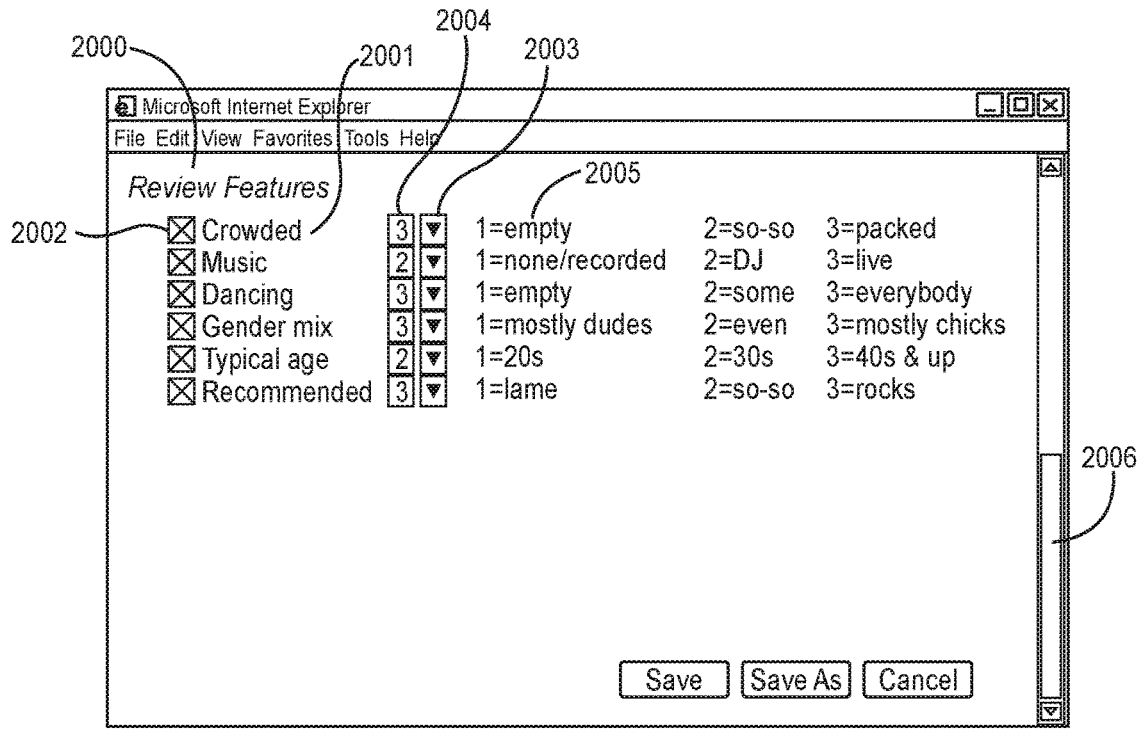
FIG. 20 illustrates review features.

FIG. 20 provides Review Features 2000 as another exemplary category of feature a member may use to define a mood. The Review Features 2000 may include estimates provided by members regarding the venue "scene," e.g., estimates of the crowd size, typical attendee age, gender mix, music, whether people are dancing, quality of the drinks, bar service, cover charge and the like. (How these estimates are entered will be discussed with subsequent figures.) Crowded 2001 designates the estimate for the crowd size. To require this review feature in a mood, a member selects the box 2002. In one embodiment of the invention, the member may also set the target crowd size they are desiring. For example, if the member desires a "packed" crowd, the use the down-arrow 2003 to select the value "3" 2004. Alternately, the member could also type a "3" directly into the associated box. The legend showing selections and their meanings is provided to the right 2005. The slider 2006 indicates this page is continued from a previous page.

Figure 21:
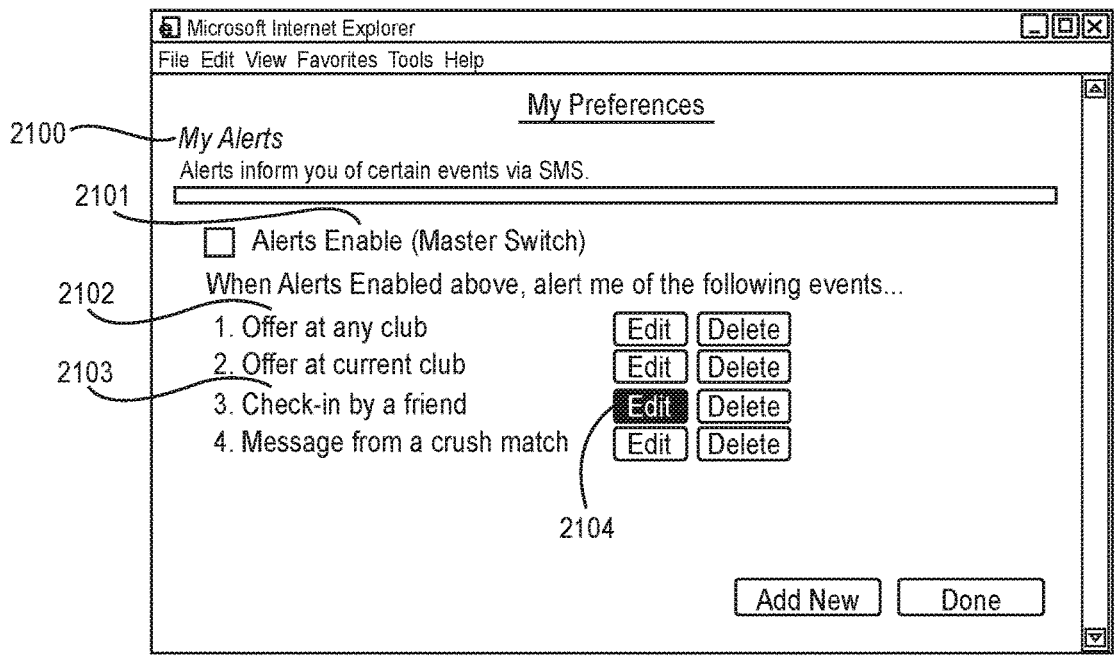
FIG. 21 illustrates user preferences for alerts.

FIG. 21 provides another preference called My Alerts 2100. My Alerts 2100 is a list of labeled criteria for specifying when, and optionally how, to notify a member of the occurrence of an event of their interest. FIG. 21 shows a list of 4 alerts: Offer at any club 2102, Offer at current club, Check-in by a friend 2103, Message from a crush match. Alerts may be member defined, as well as, initially populated with Hoozware System defaults. As with My Clubs 1301, there are various selections to add and modify the list. If it is desired to modify the Check-in by a friend 2103 alert, Edit 2104 is selected. In another example, the each element of the list may be clicked on directly to select for editing.

Figure 22:
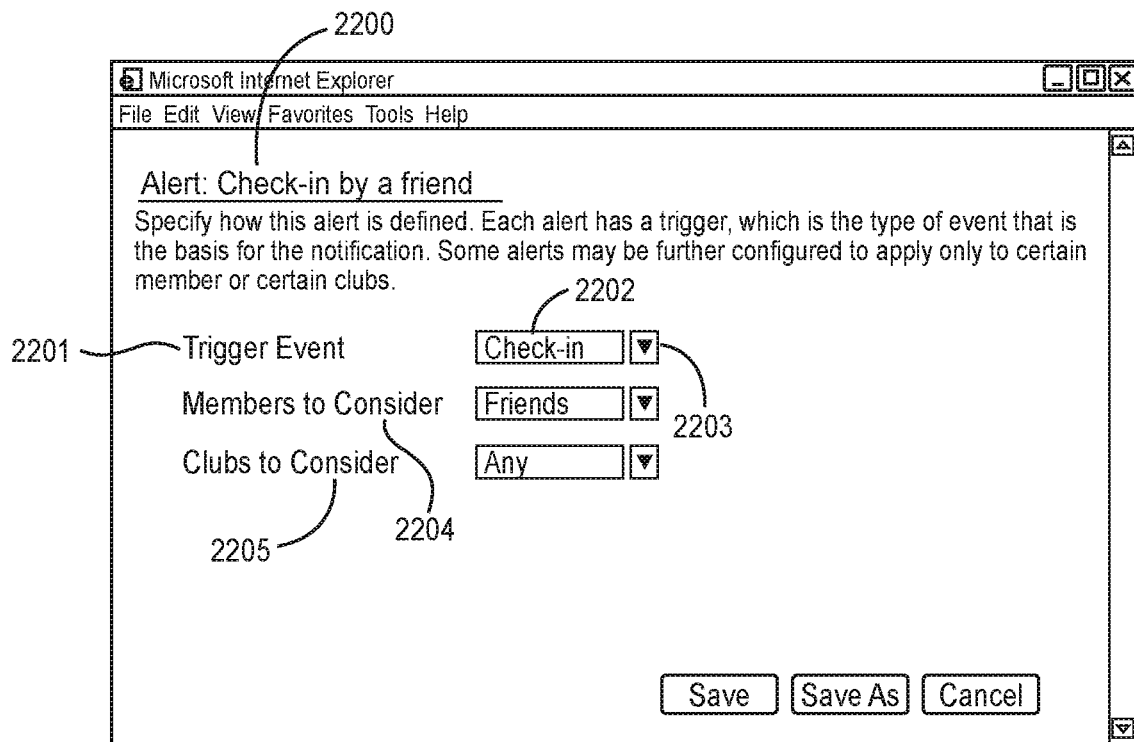
FIG. 22 illustrates a particular alert.

FIG. 22 exemplifies the information a member may select when defining or editing an alert, e.g., when selecting Edit 2104 to edit Check-in by a friend 2200, 2103. Typically, an alert allows the member to select a Trigger Event 2201. In this example, selecting the down-arrow 2203 causes the selectable trigger events to be listed in the box 2202. Such selectable trigger events typically include Check-in, Offer, Message, and the like. If Check-in or Offer is selected as the trigger event, the member typically must also specify Clubs to Consider 2205. If Check-in or Message is selected as the trigger event, the member typically must also specify the Members to Consider 2204.

Figure 23:
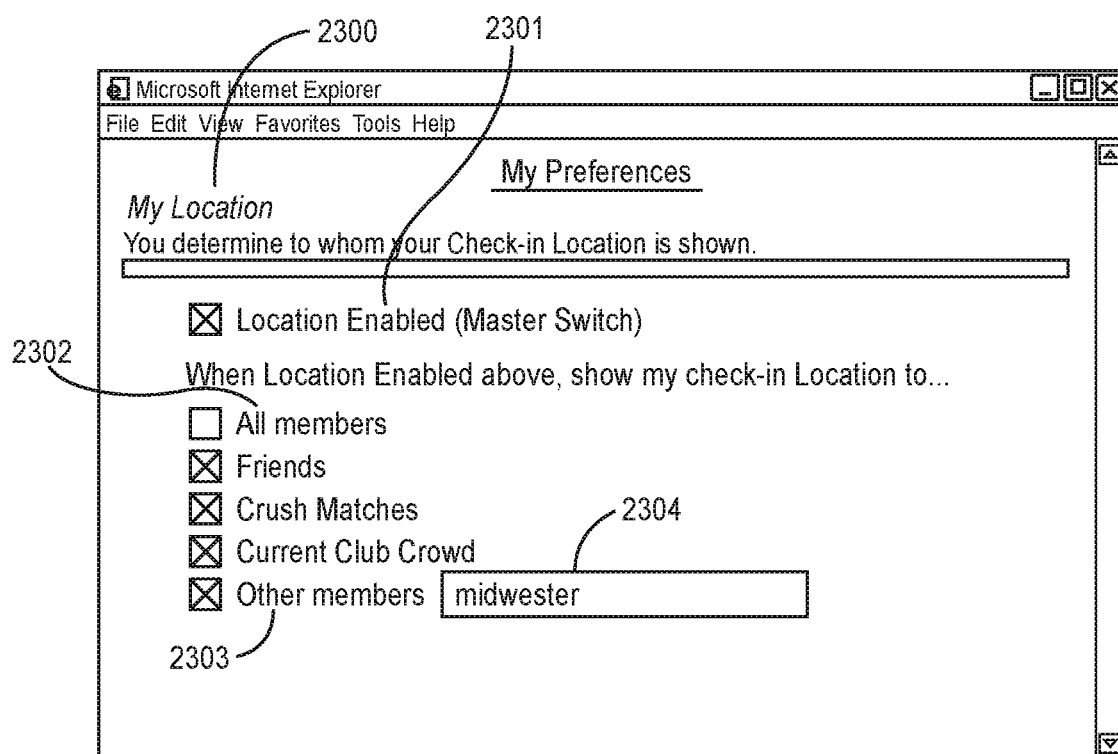
FIG. 23 illustrates user preferences for a location.

FIG. 23 provides another preference called My Location 2300. My Location 2300 is a list of criteria for specifying to which members the Hoozware System can provide your check-in status and location. In addition to a Master Switch 2301, FIG. 23 shows a list of five examples of groups of members that can know your location: All members 2302, Friends, Crush Matches, Current Club Crowd and Other members 2303. Typically, to select one of these, a member selects the associated check box. If "Other members" 2303 is selected, the defining member enters one or more members into the box 2304 (separating each member by a delimiter) who should be given permission to know their check-in status and location. Alternately, by clicking on "Other members" 2303, a "browse" window will open and provide a list of members to choose from.

Figure 24:
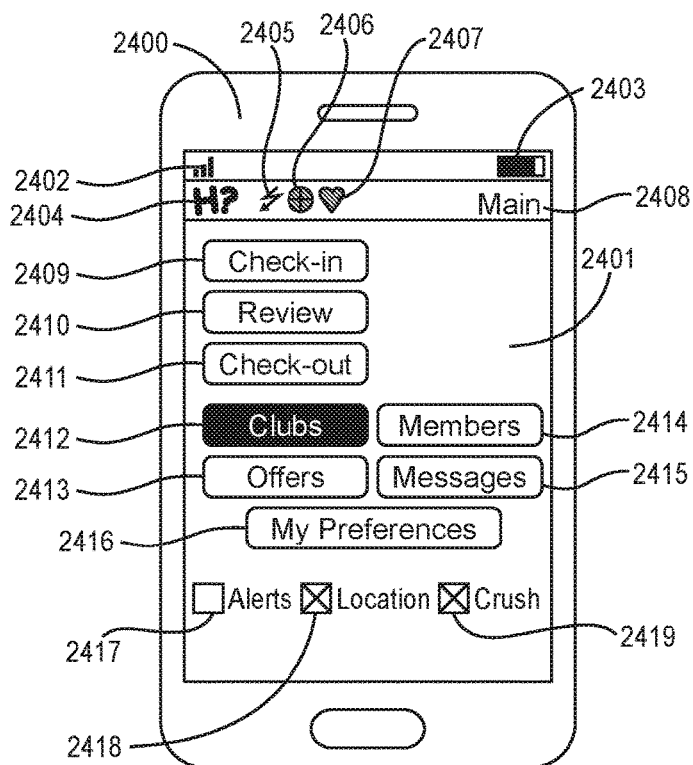
FIG. 24 shows an exemplary menu of selections displayed on the screen of a mobile communication device, such as a mobile telephone.

FIG. 24 shows an exemplary menu of selections displayed on the screen 2401 of a mobile communication device 2400, such as a mobile telephone. Typical elements on the screen include a communication signal indicator 2402 and a battery level indicator 2403. Also in this example is a Hoozware logo 2404, as well as, indicators for master enables for alerts 2405, location 2406 and crush matching 2407, and indication 2408 that the screen 2401 is displaying the Main menu.

On the Main menu 2408 of FIG. 24 are selections for Check-in 2409, (submit or view a) Review 2410, Check-out 2411, (find) Clubs 2412, (view) Offers 2413, (find) Members 2414, (send or read) Messages 2415, (set or view) My Preferences 2416, as well as set the master switches for Alerts 2417, Location 2418 and Crush (matching) 2419. To perform a club search, Clubs 2412 is selected. In general, to select an option, if the screen 2401 of the mobile communication device 2400 is a touch-sensitive screen, the desired option is typically tapped with a stylus. If the screen 2401 is not touch sensitive, then typically a button on the mobile communication device 2400 is used to navigate between options, and another button, typically labeled "OK", is used to select the desired option after navigating to it and highlighting it. If Clubs 2412 is selected, program control is passed to the Clubs menu.

In general, throughout much of the following figures the word "club" is used; although, it may represent the more general category of venue.

Figure 25:
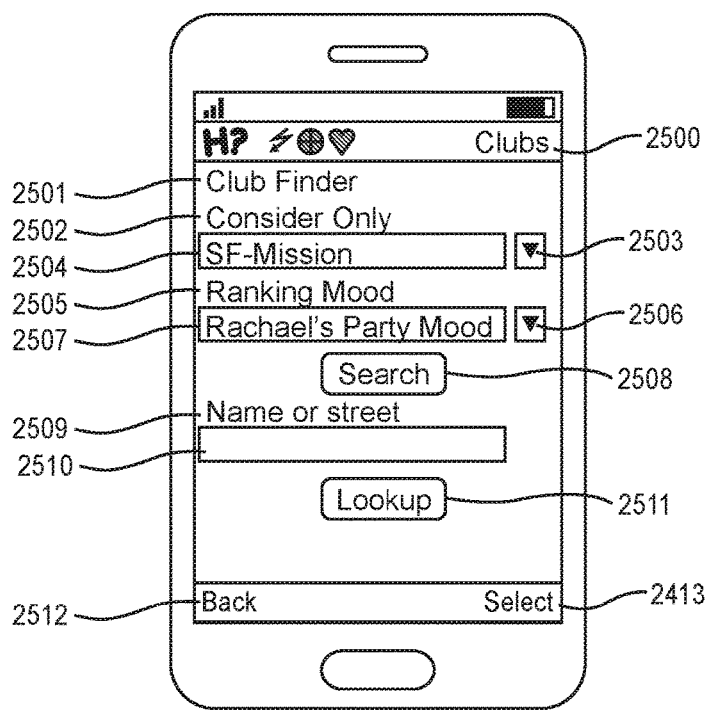
FIG. 25 demonstrates how to search for and select a particular club using a mobile communication device.

FIGS. 25-26 demonstrate how to search for and select a particular club using a mobile communication device; where, in this example, the selected club is referred to as "Dragon Bar."

FIG. 25 is the Clubs 2500 menu. An exemplary label for the screen is Club Finder 2501. To do a search the member must select the desired field under Consider only 2502. Typically, Consider only 2502 refers to geographical regions used to narrow the search space. In the example of FIG. 25, box 2504 is a drop-down box of choices. To drop down the box 2502, typically a down-arrow 2503, or equivalent icon, is used. Typically when the box 2504 is dropped down, a button on the mobile communication device 2400 is used to navigate between the selections, and the "OK" button is used again to select the desired option after navigating to it and highlighting it. Alternately, if the list of selections is short, a separate check-box can be displayed for each selection. Typical choices for the box 2504 include neighborhoods, cities and other geographically identifiable regions. Although not shown in this example, there can be a "state" box or other box to first narrow down the geographical region to a more manageable area. In this example, the neighborhood called SF-Mission is selected. Other example options include All Clubs, My Fave Clubs, etc.

Next, the box 2507 corresponding to Ranking Mood 2505 is selected, typically using the down-arrow 2506. In this example, Rachael's Party Mood is selected, although, any previously defined mood from My Moods may be selected, such as Closest Distance, Most Members, Most Friends, etc. The box 2507 may also include a selection called "Define/ edit mood," or equivalent, which allows the member to define a new mood or edit an existing mood. Once the geographical region and mood are selected, the member selects Search 2508. Alternately, if the name of the desired club is known, it may be entered in the box 2510 under the Name or street 2509 title, and then selecting Lookup 2511. Alternately, if the name of the desired street one or more clubs are on is known, the street name (optionally with the street number) may be entered in the box 2510 followed by selecting Lookup 2511. If just a street name is entered, typically a list of all clubs located on that street will be displayed.

Back 2512 may be used to go back to the previous screen. If the screen is being displayed in a web browser, the browser typically will have such a "back" capability built in. Select 2513 may be used to select a highlighted element of the interface.

Figure 26A:
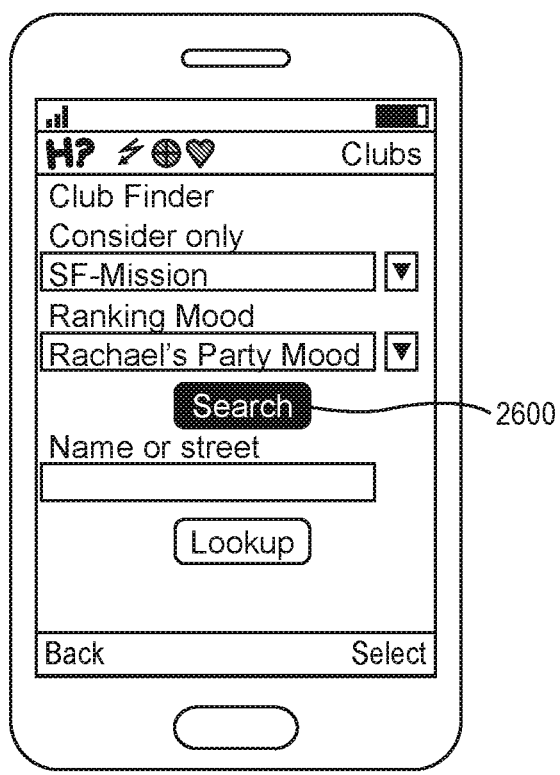
FIG. 26A depicts a further example of searching for a particular club.
Figure 26B:
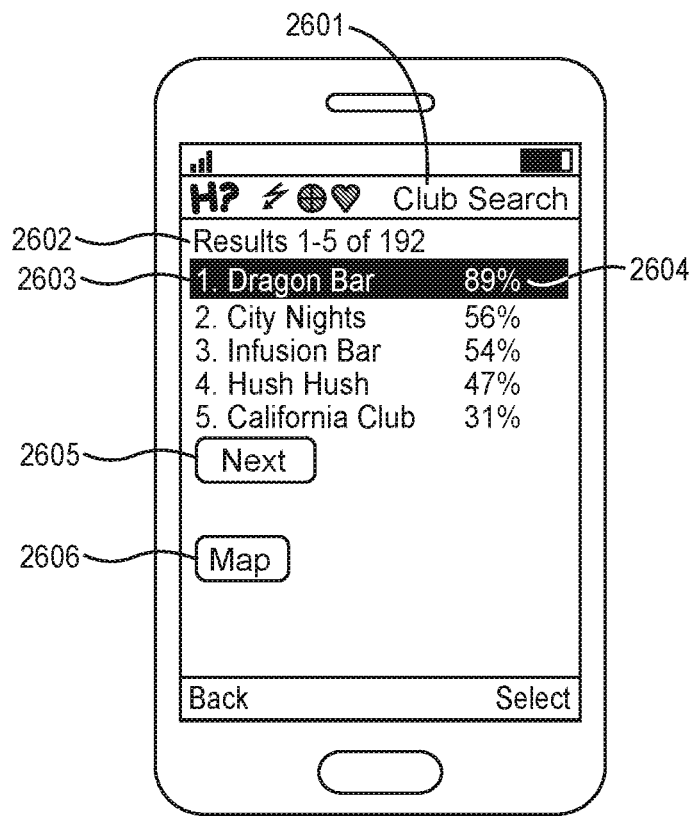
FIG. 26B depicts an example of selecting from search results a particular club referred to as "Dragon Bar."

FIG. 26A is a repeat of FIG. 25 with Search 2600, 2508 highlighted. When selected, the Club Search 2601 menu of FIG. 26B is displayed. In this example, as indicated by the heading 2602, there are 192 clubs that are sorted, where only the first five are displayed (e.g., due to screen space constraints). The club with the highest rank in this example is Dragon Bar 2603, with a ranking (i.e., "closeness match") score of 89% 2604. In this example, to display the next five lower ranked clubs Next 2605 is selected. To display a map showing the geographical location of a club, and optionally other information of interest about the club, a club is highlighted (as Dragon Bar 2603 is highlighted) and Map 2606 is selected.

Figure 28:
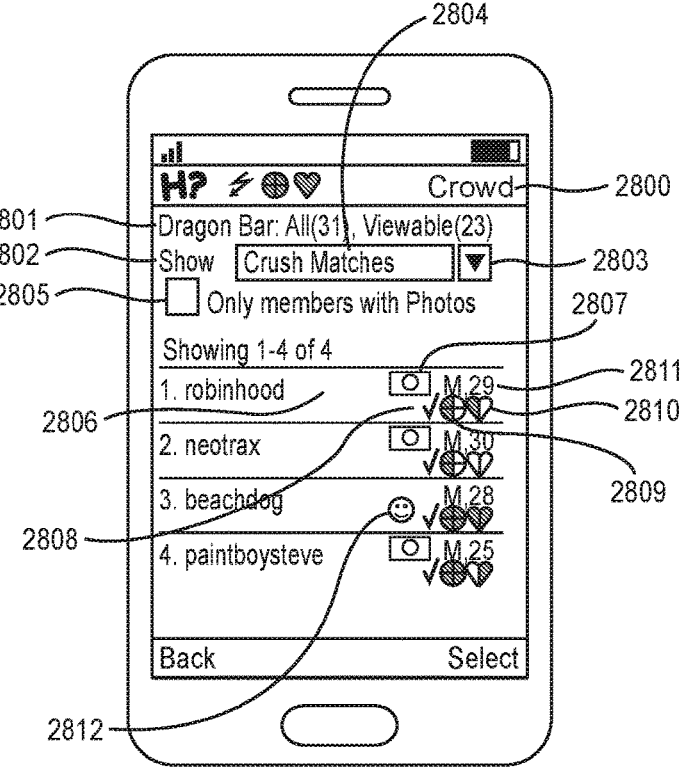
FIG. 28 illustrates further aspects and characteristics of the club as displayed via the mobile communication device.
Figure 29:
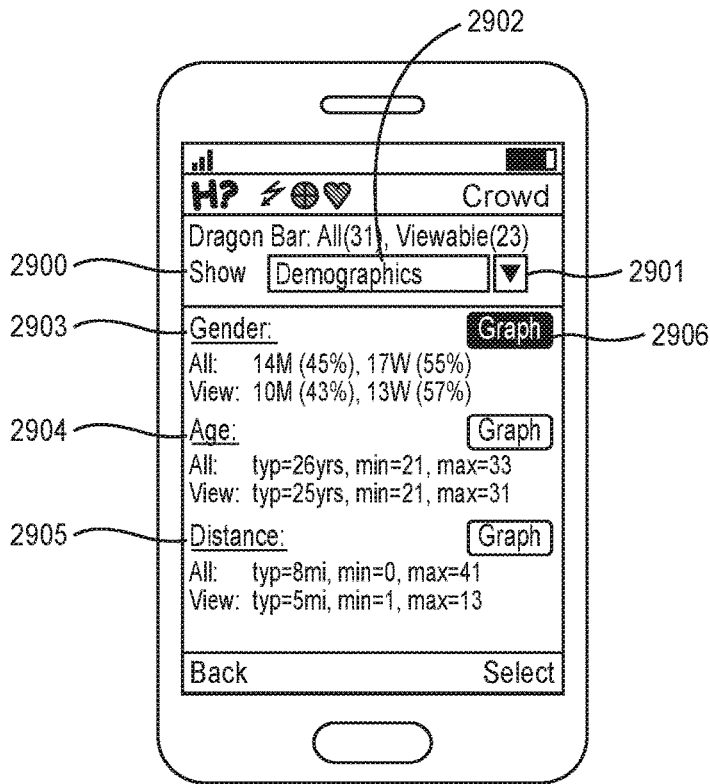
FIG. 29 illustrates further aspects and characteristics of the club as displayed via the mobile communication device.
Figure 30:
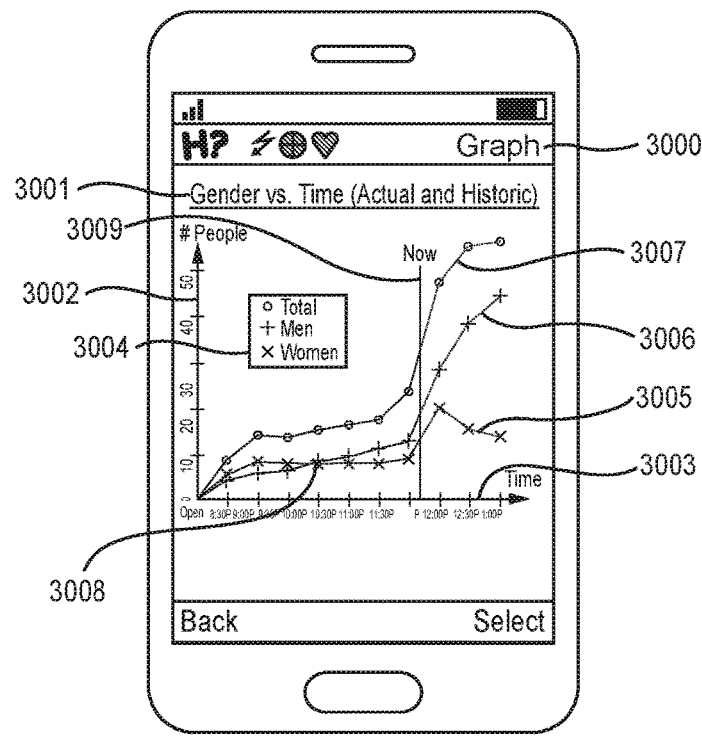
FIG. 30 illustrates three curves versus time: the total number of men at the club, the total number of women at the club and the overall total number of members at the club.

FIGS. 27-36 illustrate various aspects and characteristics of the club referred to as "Dragon Bar" all displayed on a mobile communication device. In particular, FIG. 30 shows three curves versus time: the total number of men at the club, the total number of women at the club and the overall total number of members at the club.

If the highlighted club Dragon Bar 2603 in FIG. 26B is selected, the menu for Dragon Bar 2700 is displayed. At the bottom, the Search Score 2712 value of 89% is displayed. At a club menu such as this menu for Dragon Bar 2700, there are four selections to choose from: Crowd 2701, Reviews 2703, Offers 2703 and Description 2704. Next to Crowd 2701 is a brief summary of demographics and related crowd information for members who are checked-in at the club. In this example: 14M 2705 indicates that the crowd checked-in at Dragon Bar includes 14 men; 17W 2706 indicates that the crowd includes 17 women; 26 yrs 2707 indicates that the typical age of the crowd is 26 year old; and the number 6 followed by the heart icon indicates that the member has six people in the crowd who match their currently designated filter for crush matching. Note that the general term "typical age" is used, and the algorithm for determining it is not specified. Typical age may be determined using the average, median or some other determination, including where a portion of the higher and/or lower ages may be thrown out to avoid skewing of the number.

Next to Reviews 2702 is a brief summary of related review information, some of which is provided in real time at the club. For instance, the two solid stars and one hollow star followed by a parenthetical number 5 and the time of 10:22 P indicate that based on 5 reviews over some designated time period (e.g., the past 30-60 minutes), with the most recent review coming at 10:22 p.m. on the current day, that the average Overall Recommendation for the club is two out of a possible three stars.

Next to Offers 2703 is a number 3, indicating that the member has three offers pending for use at Dragon Bar.

If Description 2704 is selected, more general information as provided by club (e.g., Dragon Bar) is presented.

Figure 27:
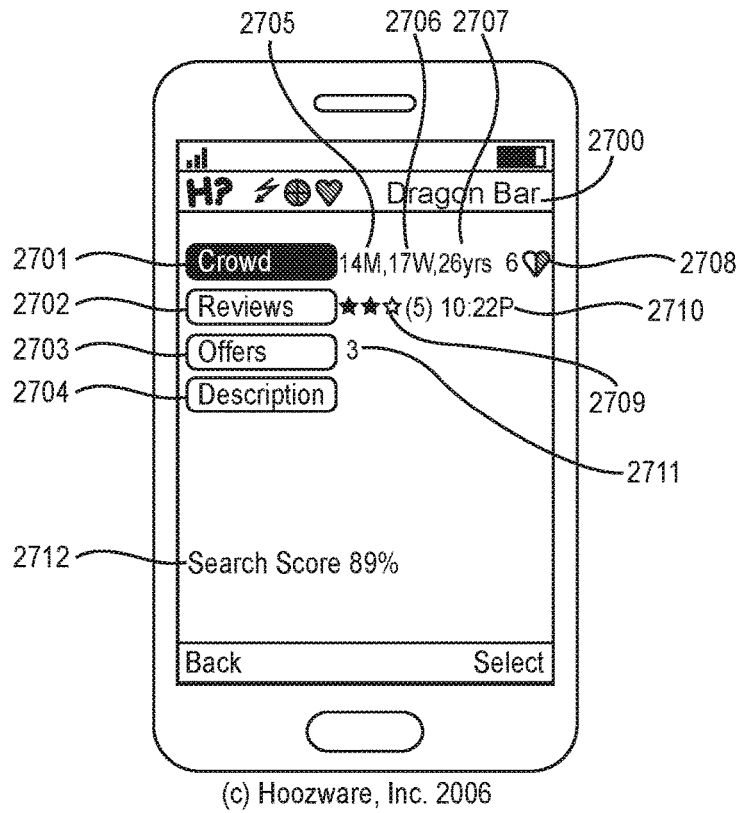
FIG. 27 illustrates various aspects and characteristics of the club referred to as "Dragon Bar" as displayed on a mobile communication device.

If Crowd 2701 is selected as shown in FIG. 27, the Crowd 2800 menu is shown as exemplified in FIG. 28. The top summary heading 2801 indicates that there are currently 31 members checked-in at Dragon Bar, and 23 of the members have information that is viewable to the member using the phone. To sort the viewable members, the viewing member fills in the Show 2802 box 2804 using the drop-down arrow 2803 to select Crush Matches. The resulting members may be further limited by selecting the box 2805 to show Only members with Photos.

Based on these elections in this example, summary information for all four resulting members is displayed. The first entry 2806 in the list for robinhood has a number of identifying icons displayed. The camera icon 2807 indicates that this member has at least one photograph. Alternately, depending on data and screen refresh rates, a thumbnail of the photo may be displayed.

The check-mark icon 2808 indicates that the member is checked-in (which is actually redundant information here, since this list is already known to be a list of members checked-in at Dragon Bar).

The circle 2809 with the cross in it indicates check-in Location visibility: shaded means check-in Location is visible, where if the left side is shaded it means the other member's check-in Location is visible to you, and where if the right side is shaded, it means your check-in Location is visible to them. In a simpler embodiment, a fully shaded circle 2809 means your check-in Location is visible to the indicated member.

The heart 2810 indicates Crush Information visibility and Crush Matches: shaded means that Crush Information is visible, and blinking means "is a Crush Match." If the left side of the heart is visible/blinking it means the other member's Crush Information is visible to you/you are one of their Crush Matches; if the right side of the heart is visible/ blinking it means your Crush Information is visible to them/they are one of your Crush Matches. In a simpler embodiment, a fully shaded heart 2810 means the indicated member passes your selected Crush Match filter.

The M,29 indicates that robinhood is a 29-year-old male.

Besides Crush Matches, examples of other selectable options for box 2804 include: All Viewable, Friends, Same Hometown, Cool Guys, Women, Demographics or any other defined filter or system keyword, etc.

FIG. 29 is the Crowd menu similar to FIG. 28 but where next to Show 2900 the option Demographics 2902 is selected using the down-arrow 2901. Gender 2903, Age 2904 and Distance 2905 information are then summarized, with the option to graph the information. Distance 2905 indicates how far the crowd individuals who are checked-in live from you as calculated using Zipcodes. Associated with Gender 2903 is the Graph 2906 selection.

FIG. 30 exemplifies the Gender vs. Time 3001 plot that is displayed in a Graph 3000 screen when Graph 2906 of FIG. 29 is selected. The solid curves to the left of the "Now" 3009 vertical line are actual data for the current evening; the dotted curves to the right of the "Now" 3009 vertical line show historic data for the same night of the week. The abscissa 3003 is a time axis and the ordinate 3002 is the # People axis. The legend for the three curves is provided by the box 3004. The curve 3005 designated by X represents Women; the curve 3006 designated by + represents Men; and the curve 3007 designated by 0 represents the total of Men and Women. This plot shows that at approximated 10:00 p.m. the number of men begins to exceed the number of women present. This plot also shows that historically, between 11:30 p.m. and midnight that the number of women stops increasing and starts to decrease. Attendees may find this information useful in helping to determine when they want to arrive or leave, and club managers may use such information to determine when they want to send out offers to men and to women to achieve more desirable curves.

Figure 31:
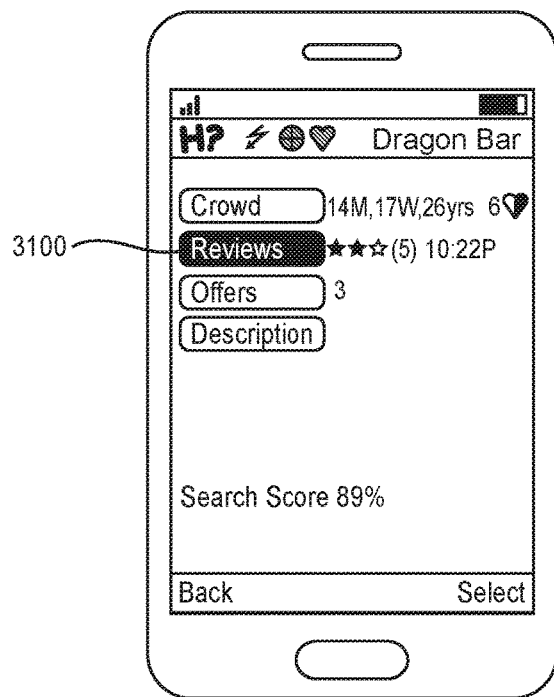
FIG. 31 illustrates further aspects and characteristics of the club as displayed via the mobile communication device.
Figure 32:
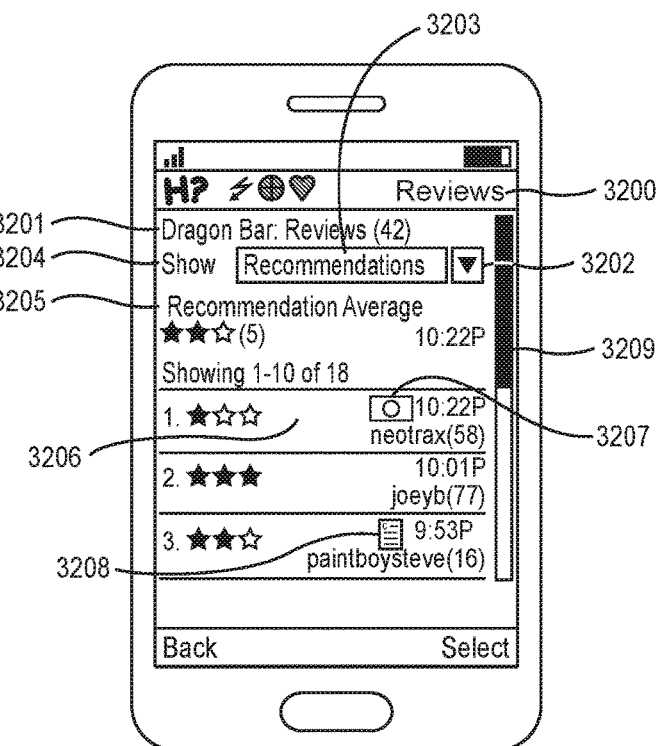
FIG. 32 illustrates further aspects and characteristics of the club as displayed via the mobile communication device.

FIG. 31 is similar to FIG. 27, except that now Reviews 3100 is selected which brings up the Reviews menu 3200 of FIG. 32. In FIG. 32, the heading 3201 indicates that there are 42 reviews. Reviews include real-time, member-submitted Surveys, which are estimates of the club scene. Reviews also include Postings, which include (overall) Recommendations, Comments, Media, and the like. Using drop-down arrow 3202 Recommendations is selected in the box 3203 in the Show heading 3204. The (overall) Recommendation Average heading 3205 indicates that the recommendation average for the club (i.e., Dragon Bar) is two out of a possible three stars based on five reviews going back in time (e.g., 30-60 minutes) from 10:22 p.m. There are 18 recommendations where the first 10 are displayed. The slider 3209 indicates that if you scroll the screen down you will see the remainder of the first 10 recommendations.

Each individual review may be summarized with the Display name of the submitting member, a submission timestamp and how many reviews the member has submitted. A particular review may be selected to see its details. As shown previously in FIG. 28, icons indicate the existence of certain components or items of interest. In this case, the camera icon 3207 indicates that there is at least one photo associated with the first recommendation 3206 submitted at 10:22 p.m. by neotrax. Neotrax gives a one of three stars overall recommendation for the club (i.e., Dragon Bar), and s/he has submitted a total of 58 recommendations regarding various clubs so far. The text icon 3208 indicates that there is a free-form Comment associated with the third recommendation submitted at 9:53 p.m. by paintboysteve. Paintboysteve gives the club a two of three stars overall recommendation, and he has submitted 16 recommendations regarding various clubs so far.

Besides Recommendations, other Show 3294 options include: All Reviews, Crowded, Music, Dancing, Gender Mix, Age, Comments, Photos, Video Clips, Audio Clips, and the like.

Figure 33:
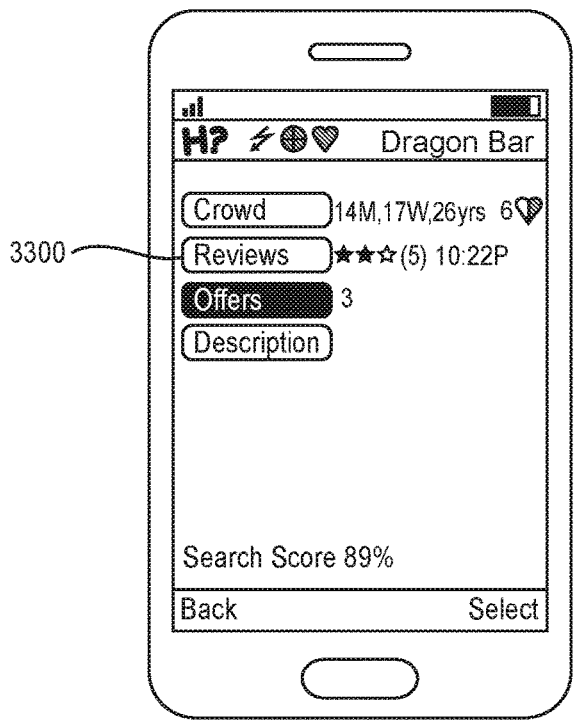
FIG. 33 illustrates further aspects and characteristics of the club as displayed via the mobile communication device.
Figure 34:
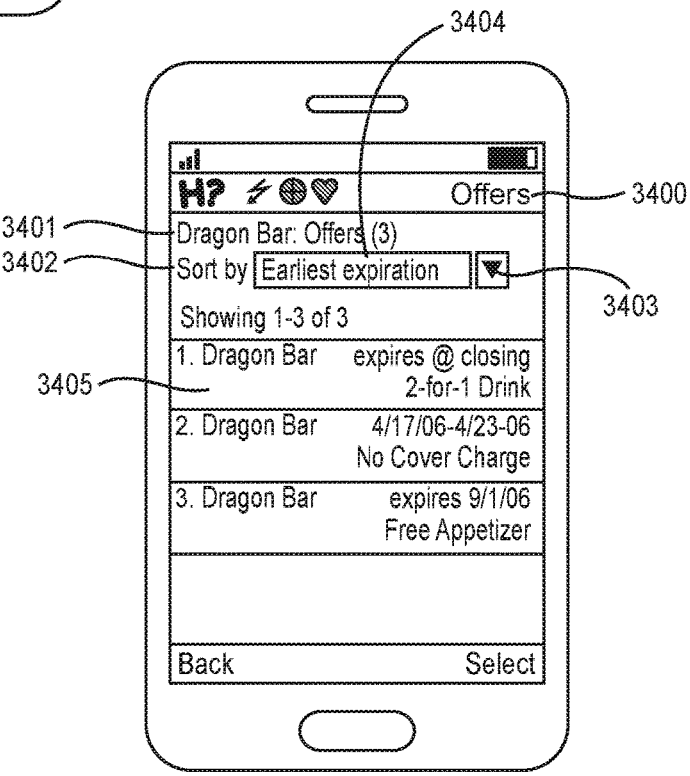
FIG. 34 illustrates further aspects and characteristics of the club as displayed via the mobile communication device.

FIG. 33 is similar to FIG. 27, except that now Offers 3300 is selected which brings up the Offers menu 3400 of FIG. 34. In FIG. 34, the heading 3401 indicates that the member has 3 offers at Dragon Bar. Using drop-down arrow 3403 "Earliest expiration" is selected in the box 3404 in the "Sort by" heading 3202. The first offer 3405 indicates that the member has an offer that expires at closing time the current evening for a 2-for-1 drink. As sorted, this is the offer that expires the soonest of all offers at the club. Other "Sort by" options include: Discount level, Item type, and the like. An offer can be selected to view or redeem.

FIG. 35 is similar to FIG. 27, except that now Description 3500 is selected which brings up the Description menu 3600 of FIGS. 36A and 36B. In FIG. 36A, a text description 3601 of the club is provided. The slider 3602 indicates that the screen is continued. The screen of FIG. 36A continues in FIG. 36B and provides options to view the following about the club (i.e., Dragon Bar): Features 3604, Events 3605, Media 3606, Map 3607, Directions 3608, and the like. The slider 3603 indicates that the screen is a continuation of another screen.

FIGS. 38-43 illustrate the various stages of the check-in involving selection of a club, estimation of the demographics of patrons at the club, evaluation of the club, the opportunity to play a game of chance to win a prize, redeeming the prize, and changing the evaluation of the club later.

Figure 37:
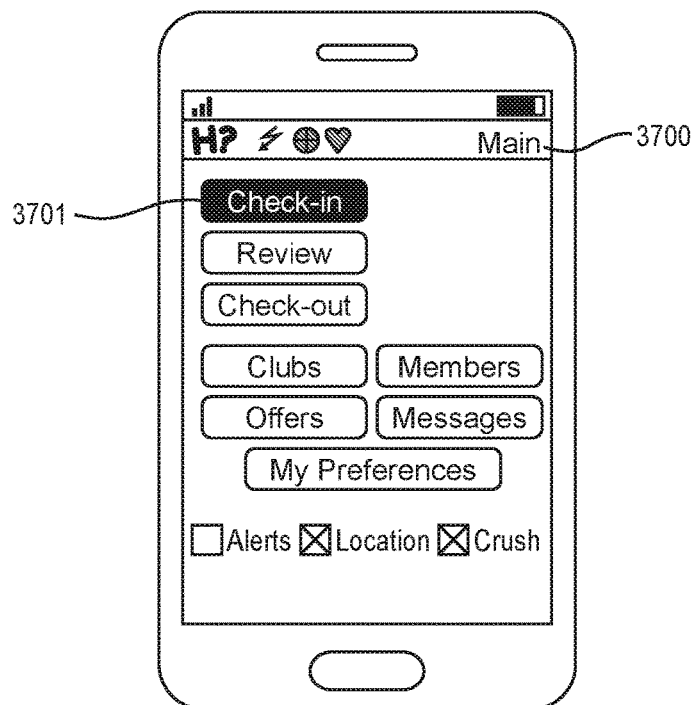
FIG. 37 illustrates further aspects and characteristics of the club as displayed via the mobile communication device.
Figure 38:
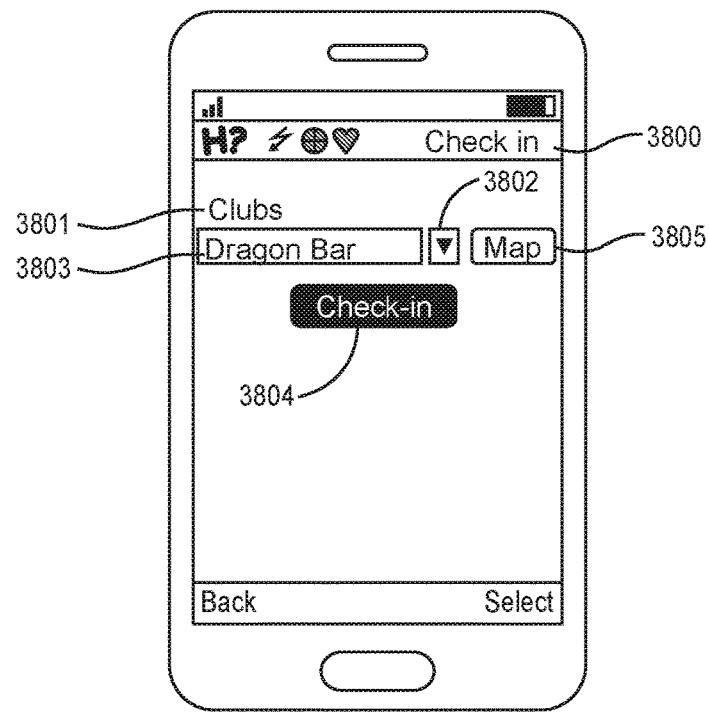
FIG. 38 illustrates one of various stages of the check-in involving selection of a club.

Similar to FIG. 24, FIG. 37 shows the Main menu 3700 on a mobile communications device except that now Check-in 3701 is selected which brings up the Check-in menu 3800 of FIG. 38. In FIG. 38, the drop-down arrow 3802 is used to select a club entry in the box 3803 under the heading for Clubs 3801. Once a club is designated, Map 3805 may be selected to see a geographical map and optionally other information, including directions, about the designated club. Also, once inside a club and after a club is designated, Check-in 3804 may be selected to check-in to the club. Checking-in to a club is typically required to redeem offers, get a chance to "play" for a door prize, inform others where you are, and the like.

Figure 39:
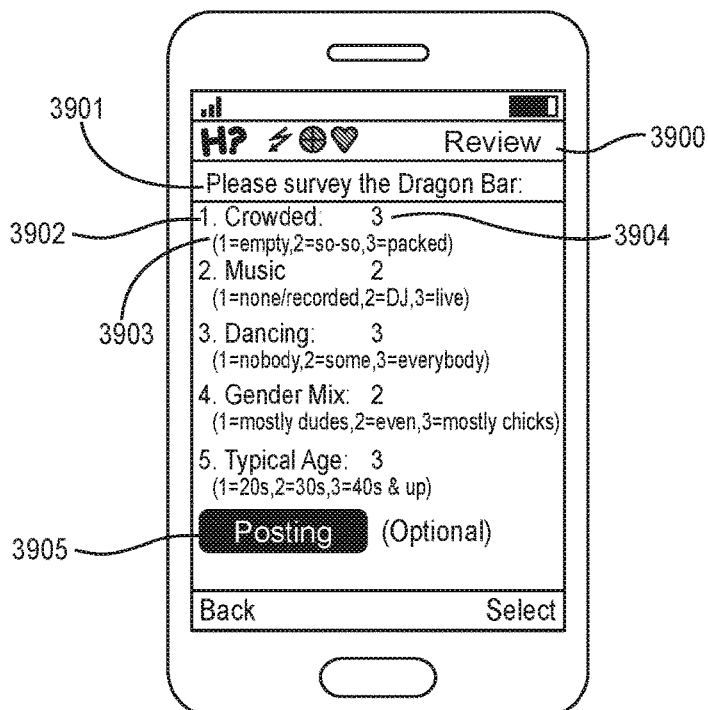
FIG. 39 illustrates a stage of check-in that involves an estimation of demographics of patrons at the club.

FIG. 39 is the Review menu 3900, which is part of the standard check-in procedure. A Review typically includes: (a) a mandatory real-time Survey 3901 and (b) an optional Posting 3905. The Survey is a set of questions the member checking-in is required to estimate. The Posting typically includes: (a) an Overall Recommendation, (b) free-form text Comments, and (c) Media. Media typically includes: (a) Photos, (b) Video Clips, (c) Audio Clips and (d) other documents.

The heading 3901 asks the member checking-in to submit a Survey of the club (i.e., the Dragon Bar). The Survey provides a number of questions to estimate, typically between one and six, but typically the number of questions is five. In this embodiment, the survey questions asked pertain to: Crowded 3902 (with example answers 3903 being: empty, so-so, packed, and the like), Music (with example answers being: none, recorded, Di, live, and the like), Dancing (with example answers being: nobody, some, everyone, and the like), Gender Mix (with example answers being: mostly men (dudes), even, mostly women (chicks), and the like) and Typical Age (with example answers being: 20's, 30's, 40's & up, and the like). In this example, if the estimate of Crowded 3902 is "packed," the member would select "3" 3904 on their mobile communication device. Other survey questions may include: drink quality, drink price, cover charge, ethnic mixture, efficiency of bar service, wait to get in, and the like.

In FIG. 39, to answer a question the member presses the corresponding number on their phone. In general, there could be more or fewer questions, different members might be asked different questions and the member may respond using any convenient method or technology. In other words, in order to provide more complete demographics of all patrons at the club for others to search on, rather than relying on automatic tracking of only members (using tracking technologies such as GPS, WiFi, Bluetooth, etc.) to compile only the demographics of members checked into a club, members present at the club provide the Hoozware System with real-time estimates of various demographics categories for all patrons at the club.

Members can also provide real-time Postings of the atmosphere and other club characteristics. For instance, if there were just one member at a club with 100 patrons in attendance, when the member checked in they might provide a Survey estimating that the club was crowded; there was a rocking DJ that packed the dance floor; the club had an even mix of men and women; and the typical patron age was 20-something. Thus, a different member doing a club search would be able to assess the fact that the club atmosphere was exactly what they were looking for, even though there was only one member checked in. Of course, in the future, when most club patrons use the Hoozware System, and when GPS, WiFi, Bluetooth or any other applicable tracking technology is widely supported, the demographics that the Hoozware System associates with the club will be more accurate since such demographics will be based on a larger amount of actual member location data than mere estimation.

As a reward to the member for providing the Survey they typically get a chance to win a door prize, such as a discounted drink. After checking-in, the member must typically reconfirm their check-in periodically, e.g., every two hours, or they will be automatically checked-out. After reconfirming their check-in, they are typically granted another opportunity to win a door prize by submitting another Survey. A checked-in member may submit a Survey as often as they like, but the member's most recent Survey (or, in general, their Review) places the previous one for any compiled club averages, and the member doesn't get a chance to win a door prize more often that at a maximum frequency, which is typically every two hours.

Surveys must be submitted while at the club and using the member's mobile communication device. The optional Postings may be submitted while at the club or anytime after leaving, and may be submitted by the member's mobile communication device or from the member's account using a desktop computer.

Figure 40:
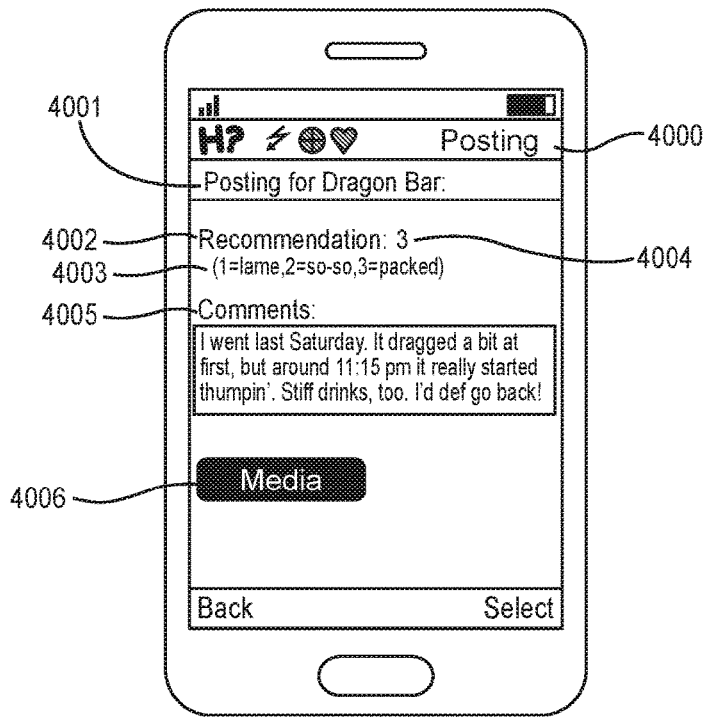
FIG. 40 illustrates a stage of check-in that involves an evaluation of the club.

When Posting 3905 is selected in FIG. 39, the Posting menu 4000 of FIG. 40 is brought up. The heading 4001 indicates that the following information is the Posting for Dragon Bar. Postings are optional and are attributed to the posting member. The first element of the posting is (overall) Recommendation 4002. The heading 4003 is a list of exemplary possible responses, including: lame, so-so and rocks. Of course, there can be other responses. In this example, "rocks" corresponds to entering the number "3" 4004. Free-form personalized Comments 4005 may be entered in the corresponding text box. Media 4006 may also be attached, where media includes any of a variety of elements, including but not limited to still images, moving images, sound images, presentations, combinations of the preceding, and the like.

Figure 41:
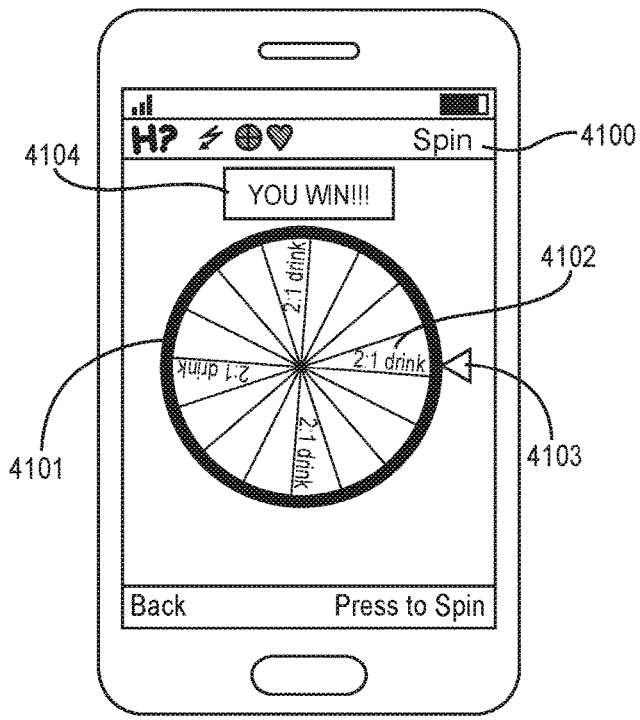
FIG. 41 illustrates a stage of check-in that involves an opportunity to play a game of chance to win a prize.

FIG. 41 shows a game of chance given to a member after checking-in and successfully completing a Survey as part of a Review. This particular game includes a roulette wheel 4101. Typically the member will press a key on their mobile communication device to initiate spinning of the wheel roulette 4101. In this embodiment, the member has a 1-in-4 (i.e., 25%) chance of winning a 2:1 (i.e., 2-for-1) drink. If a winning sector 4102 of the roulette wheel 4101 stops at the indicator 4103, the member is informed 4104 that they have won a prize. If a member wins a prize, they receive a Prize Offer to that effect in their Offer Center that they may redeem. Typically, the member has a short limited time in which to redeem such Prize Offer in order to ensure that a member inappropriately checking-in while not at the club cannot redeem such Prize Offer before it expires.

Other games include a modified "shell game," where the member selects one of a group of items. For instance, there may be four drink shakers presented, and the member has a one-in-four (25%) chance of picking the drink shaker hiding a full drink. Typically, a club participating in the Hoozware System will cover the cost of redeeming the Prize Offer.

In more general terms, after checking-in and successfully submitting a Survey, a member present at a venue uses their mobile communication device to communicate with a computer server, where a result of the communication is associated with the member. The members' mobile communication device transmits a first signal concerning the venue to the computer server when the member is present at the venue with their mobile communication device. In response to the first signal, a second signal is transmitted from the computer server to the mobile communication device, wherein the second signal solicits an action from the member. The member then performs the action, and their mobile communication device transmits a third signal to the computer server indicating their action. Then, a fourth signal is transmitted from the computer server to the member's mobile communication device indicating the result of the member's action.

Figure 42:
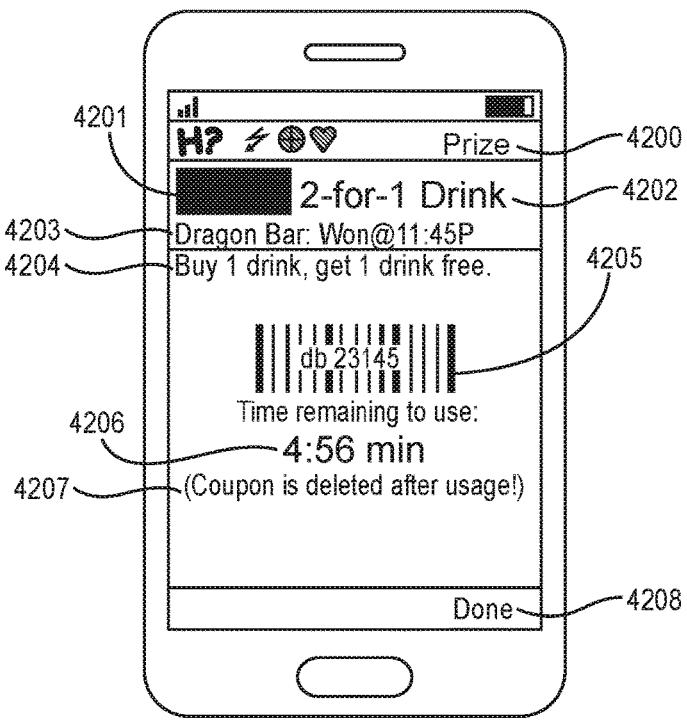
FIG. 42 illustrates a stage of check-in that involves redeeming a prize.

FIG. 42 shows how to redeem a Prize Offer. Using their mobile communication device, the winning member selects the Prize Offer in their Offer Center if it is not already being displayed. The Prize heading 4200 indicates the contents being displayed are a Prize Offer. Typically the club's logo 4201 is displayed. The type of prize won 4202 is also displayed. The heading 4203 indicates that the Prize Offer was won at 11:45 p.m. that evening at Dragon Bar. The heading 4204 indicates the details of the Prize Offer as being "Buy 1 drink, get 1 drink free." Each offer is typically tagged with a code, such as the code 4205. Prize Offers typically have a limited time by which they must be used. Here the remaining time to redeem the Prize Offer is 4:56 minutes 4206. Typical times range from one to 10 minutes, with the typical time being five minutes. The message 4207 indicates that the Coupon is deleted after usage! The Prize Offer is valid until the timer counts down to zero. During the time the Prize Offer is valid, the coupon displayed on the member's mobile communication device must be shown to a member of the club's wait staff. The wait staff should verify that the counter is not yet zero. After viewing the coupon, the member or wait staff should press the button corresponding to Done 4208 to designate the coupon as having been "used." Typically, the winning member can request a physical coupon from the waitstaff if they wish to redeem their Prize Offer at a later time.

Note that to prevent an unauthorized user from using someone else's offers, a member's Offer Center typically can only be accessed by the mobile communication device of the member associated with the offers. Further toward this goal of authenticating the redeemer of an offer, when redeeming an offer, the photo of the member associated with the offer may be displayed on the coupon.

Figure 43:
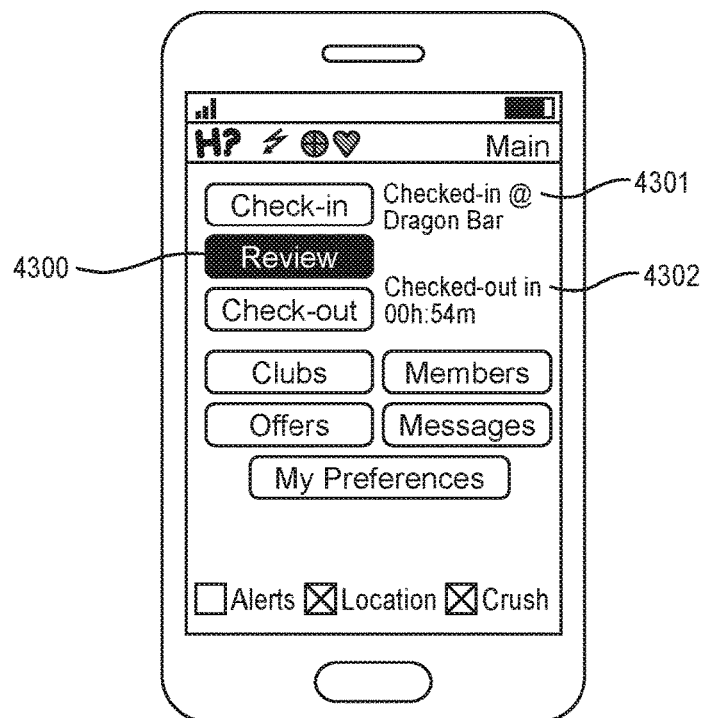
FIG. 43 illustrates a stage of check-in that involves changing an evaluation of the club later.

Similar to FIG. 37, FIG. 43 shows the Main menu on a mobile communications device, except that now Review 4300 is selected which brings up the Review menu 3900 of FIG. 39, which has already been discussed in detail. Another difference in the Main menu display of FIG. 43 compared to the Main menu display of FIG. 37 is that since the member is checked-in, the heading 4301 designates that the member is Checked-in at Dragon Bar. The Main menu display of FIG. 43 also has a heading 4302 that designates that the member will be automatically checked-out in 45 minutes.

FIGS. 44-47 illustrate the use of a mobile communication device with the Hoozware System for locating and viewing other members, including "Crush" members, employing filters for the selection.

Figure 44:
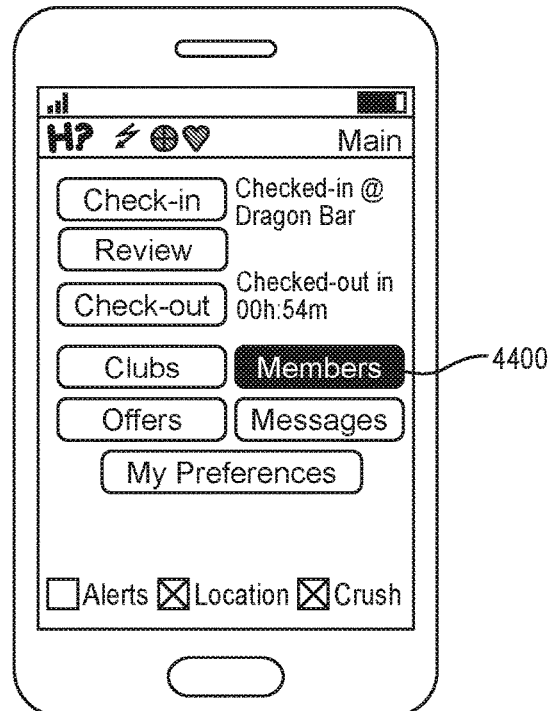
FIG. 44 illustrates a use of a mobile communication device with the Hoozware System for locating and viewing other members.
Figure 45:
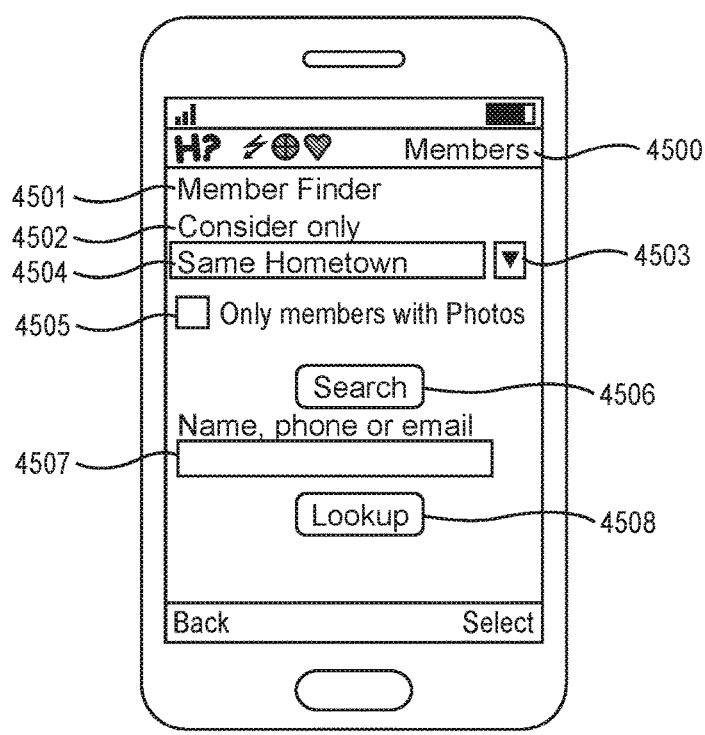
FIG. 45 illustrates some options for locating and viewing members including employing filters.

Similar to FIG. 43, FIG. 44 shows the Main menu on a mobile communications device, except that now Members 4400 is selected which brings up the Members menu 4500 of FIG. 45. An exemplary label for the screen is Member Finder 4501. To do a search the member must select the desired field under "Consider only" 4502. Typically, "Consider only" 4502 refers to groups of members or filters used to narrow the search space. In the example of FIG. 45, box 4504 is a drop-down box of choices. To drop down the box 4502, typically a down-arrow 4503, or equivalent icon, is used. Typically when the box 4504 is dropped down, a button on the mobile communication device 2400 is used to navigate between the selections, and the "OK" button is used again to select the desired option after navigating to it and highlighting it. Alternately, if the list of selections is short, a separate check-box can be displayed for each selection. Typical choices for the box 4504 include groups like Friends, Crush Matches, Blocked List, and the like, as well as filters like Same Hometown, Cool Guy and the like. In this example, "Same Hometown" is selected. The member may also check the box 4505 to designate that the member search result should include "Only members with Photos."

Once the narrowing restriction in box 4504 is selected, the member may select Search 4506. Alternately, if the name (e.g., Display name, first or last name), phone or email of the desired member is known, it may be entered in the box 4507 under the "Name, phone or email" title, and then selecting Lookup 4508. If the name entered is not unique, the result will typically include a list of members passing the desired filter. The list may be sorted in a variety of way, including in alphabetical order.

Figure 46A:
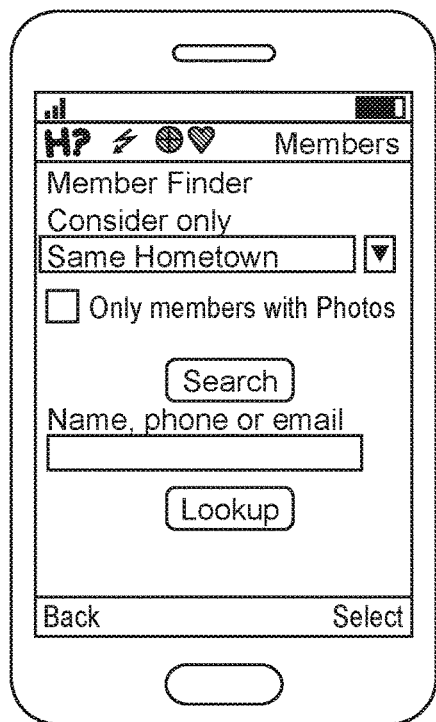
FIG. 46A illustrates some options for locating and viewing members including employing filters.
Figure 46B:
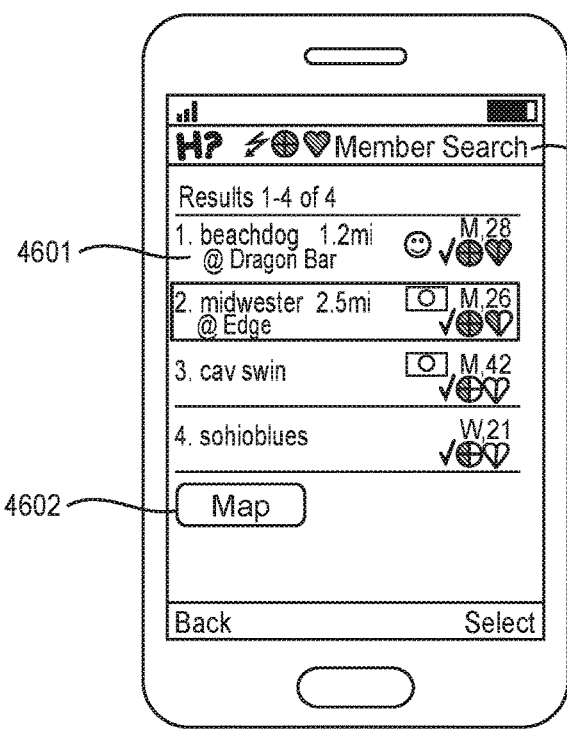
FIG. 46B illustrates search results for members.

FIG. 46A is a repeat of FIG. 45 with Search 4506 highlighted. When selected, the Member Search 4600 menu of FIG. 46B is displayed. In this example, as indicated by the heading, all four of the results are displayed. The member with the closest distance in this example is beachdog 4601 checked-in at Dragon Bar, at a distance of 1.2 miles away. To display information of interest about a member, the member is highlighted (as midwester is highlighted) and selected. To display a map showing the geographical location of a member, the member is highlighted (as midwester is highlighted), and Map 4602 is selected. As shown previously in FIGS. 28 and 32, icons associated with the listed members indicate the existence of certain components or items of interest.

Figure 47A:
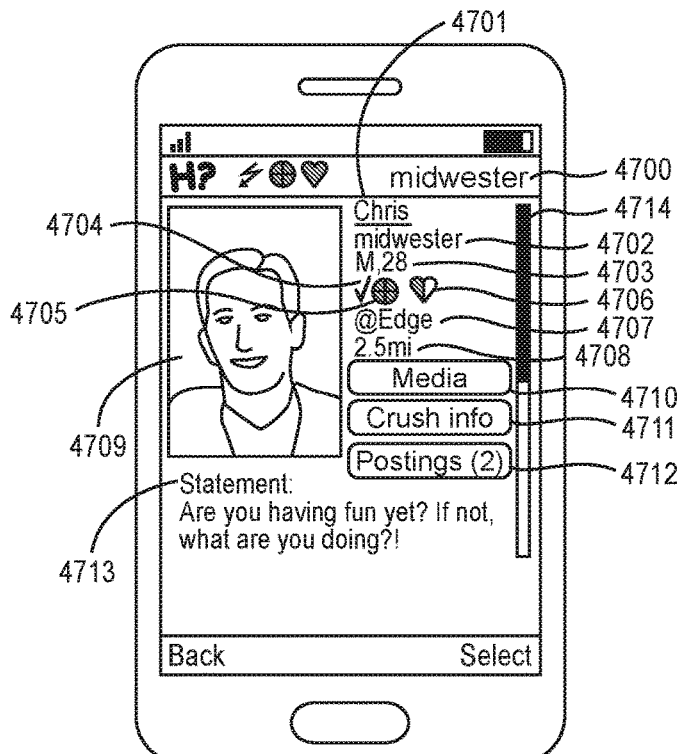
FIG. 47A illustrates locating and viewing members, including "Crush" members.
Figure 47B:
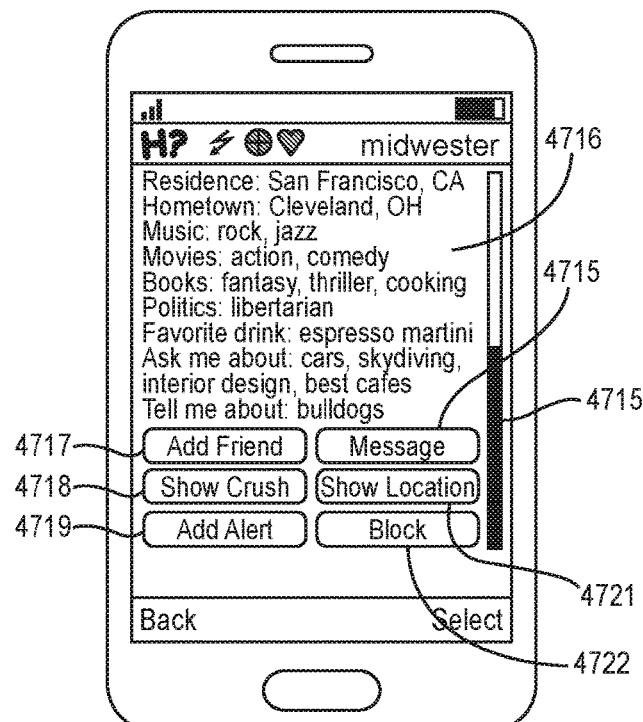
FIG. 47B illustrates information about members.

When a member is highlighted, as is midwester in FIG. 46B, and then selected, the member's information accessible by the searching member is displayed, as shown in FIGS. 47A and 47B. Note that the slider 4714 in FIG. 47A indicates that the information displayed is continued to a subsequent screen. Likewise, the slider 4715 in FIG. 47B indicates that the information displayed is continued from a previous screen. The Display name associated with the information, in this example, midwester 4700, is displayed. The member's first name, Chris 4701, is displayed, followed by other associated information, where the display may include icons such as have already been discussed, including: Display name 4702, gender and age 4703, check-in status 4704, Location visibility 4705, Crush Match status 4706, where checked-in 4707, distance away 4708, primary photo 4709, Social Information Media 4710, Crush Information 4711 (if visible to the searching member), Postings 4712, the Social Information Statement 4713 and other information 4716 such as information the member listed in their Social Information. FIG. 47B provides selections to view or perform the following with respect to the member (i.e., midwester): add as a Friend 4717; expose your Crush Information 4718 to the member; add an Alert 4719 regarding the member; send a message 4720; expose your Location 4721 to the member; Block 4722 the member from communicating with you, and potentially from receiving any information about you; and the like.

Figure 48:
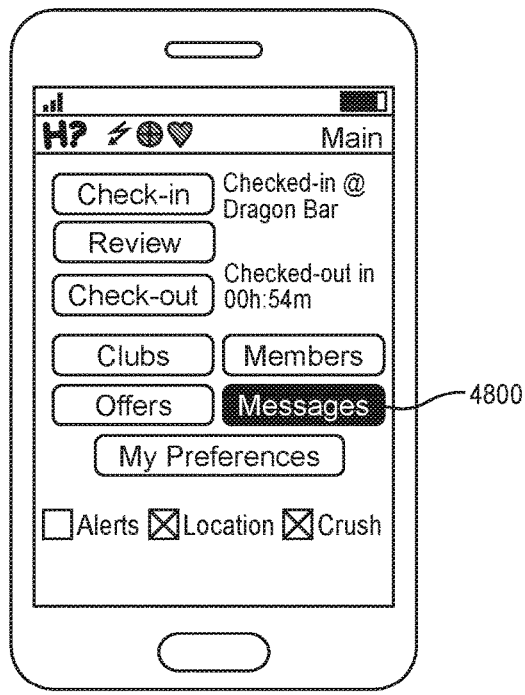
FIG. 48 illustrates use of a mobile communication device for sending messages to other members of the Hoozware System.
Figures 49A, 49B:
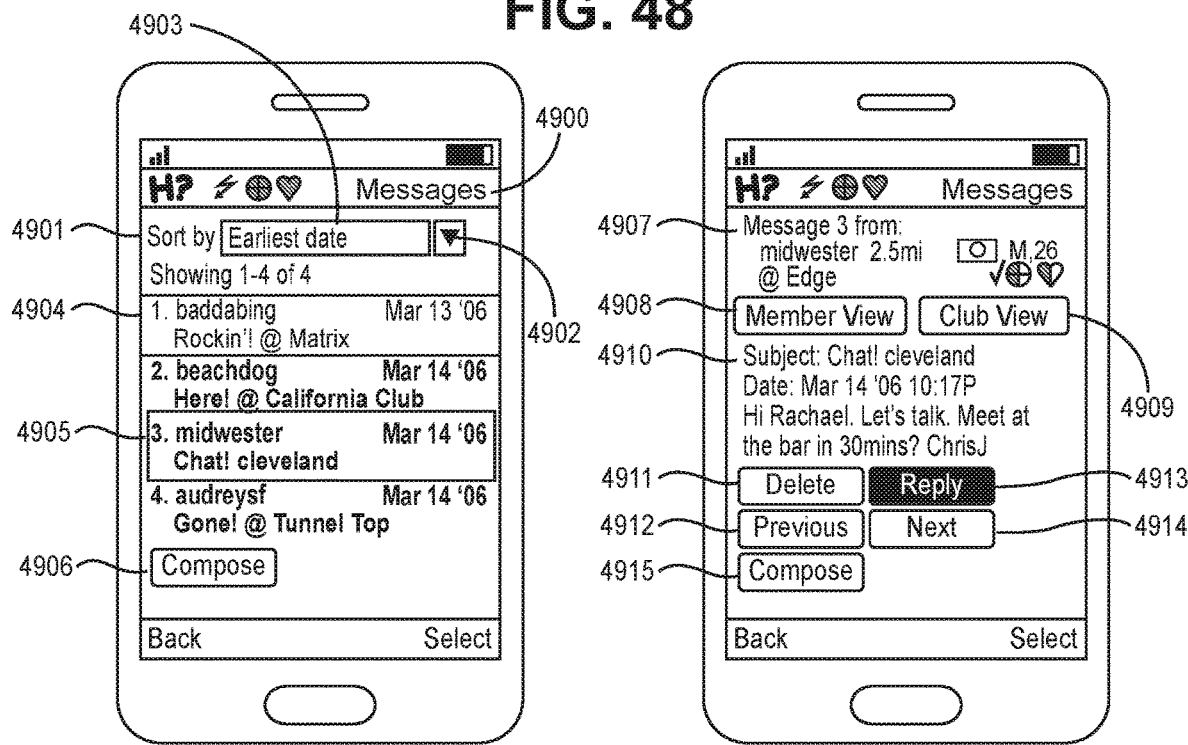
FIG. 49A illustrates use of a mobile communication device for sending messages to other members of the Hoozware System.
FIG. 49B illustrates use of a mobile communication device for sending messages to other members of the Hoozware System.
Figure 50:
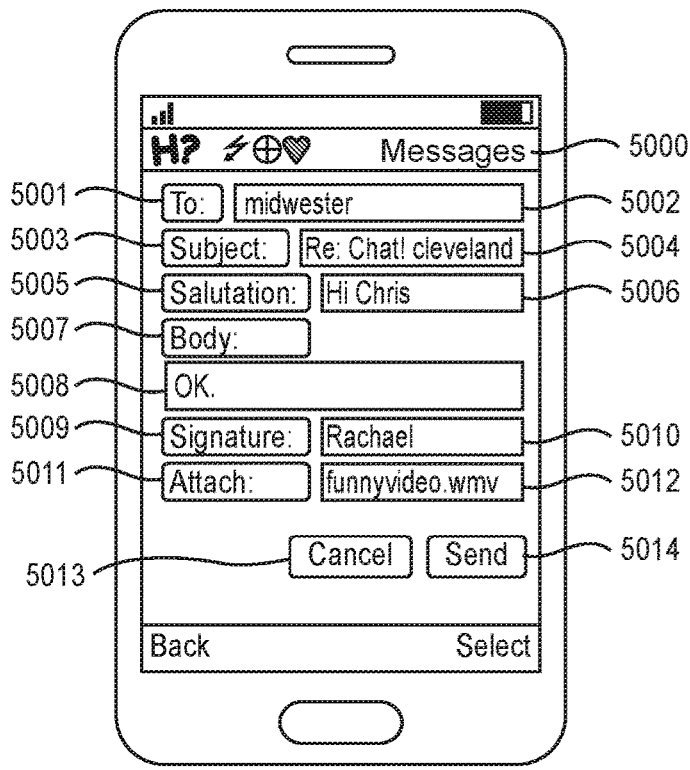
FIG. 50 illustrates use of a mobile communication device for sending messages to other members of the Hoozware System.

FIGS. 48-50 illustrate the use of a mobile communication device for sending messages to other members of the Hoozware System.

Similar to FIG. 44, FIG. 48 shows the Main menu on a mobile communications device, except that now Messages 4800 is selected which brings up the Messages menu 4900 of FIG. 49. In FIG. 49, the heading 4901 indicates that the member has 4 messages. Using drop-down arrow 4902 "Earliest date" is selected in the box 4903 in the "Sort by" heading 4901. The first message 4904 indicates that the member has received a message from baddabing on Mar. 13, 2006. The message subject was to the effect that the Matrix was rocking. As sorted, this message at the top is the oldest, i.e., received the earliest. Other "Sort by" options include: Oldest date, subject, alphabetical, and the like. To choose a message to view or respond to, navigation keys on the member's mobile communication device are used to highlight and select a desired message, such as the message from midwester 4905. Alternately, to compose a new message, Compose 4906 is selected.

If the message from midwester 4905 is selected, it brings up a screen exemplified by FIG. 49B. This screen indicates that it is Message 3 4907 and contains some summary information and icons pertaining to midwester. To view midwester, Member View 4908 is selected. To view information on the club midwester is at, Club View 4909 is selected. The message 4910, including message subject, salutation, body and signature are displayed. The following options pertain to the currently selected message: Delete 4911 deletes the message; Previous 4912 displays the previous message in the list in FIG. 49A; Reply 4913 opens a reply message to midwester; Next 4914 displays the next message in the list in FIG. 49A; and Compose 4915 opens a new message.

In FIG. 49B, Reply 4913 is highlighted. If selected, a reply message is opened as shown in FIG. 50. Messages 5000 is the menu label. In the reply message, the recipient midwester 5002 is automatically filled in, as is the subject 5004, salutation 5006 and signature 5010. To choose from a variety of prompted member recipients, the To: box 5001 is selected; to choose from a variety of prompted subjects, the Subject: box 5003 is selected; choose from a variety of prompted salutations, the Salutation: box 5005 is selected; choose from a variety of prompted bodies, the Body: box 5007 is selected; choose from a variety of prompted signatures, the Signature: box 5009 is selected; and to browse for attachments, the Attach: 5011 box is selected. Alternately, any of the corresponding boxes 5002, 5004, 5006, 5008, 5010 may be filled manually by typing. To cancel the message Cancel 5013 is selected, and to send the message to the intended recipient Send 5014 is selected.

Example prompted recipients include defined groups (e.g., Friends) and other members. Example prompted subjects include: Call Me!; Check It Out!; Good Tunes!; I'm Here!; I'm Outta Here!; It's Rockin'!; Let Me Buy You A Drink!; Let's Chat!; Let's Meet!; Meet @ the Bar in 5 mins!; Nice Pics!; Nice Profile!; We Match!; Where Are You!; Wink!; You're Cute!; You're Hot!; and the like. Example prompted salutations include: Hello.; Hey.; Hi.; Hiya.; and the like. Example prompted bodies include: Cool.; I'll be there.; Maybe later.; No thanks; Thanks; Yes.; and the like. Example prompted signatures include the sending member's Display name, their first name, their last name, and the like.

An alternate embodiment for a message is where for each heading (To, Subject, Salutation, Body and Signature) there is (a) a drop-down box listing each of the prompted responses along with an entry that says, "Use Custom Box," and a (b) box where custom text can be entered. Typically associated with the Subject heading is a drop-down box with the list of clubs. When used, the Subject is augmented with the selected club name. Typically associated with the Signature is a box to select to "Include my mobile number." Thus, the member can easily inform the recipient of their mobile number, which otherwise is not provided to the recipient.

Figure 51:
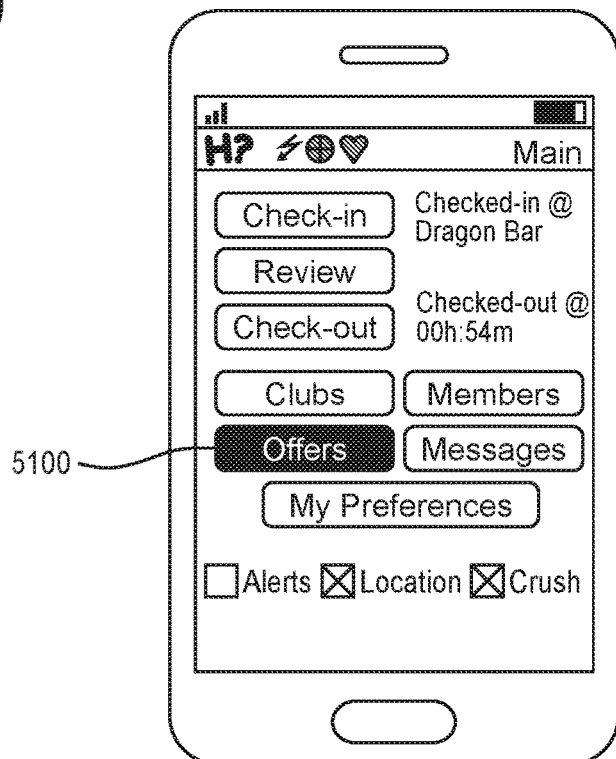
FIG. 51 illustrates displaying promotional offers from the club to the members on the screen of a mobile communication device.

FIGS. 51-53 display promotional offers from the club to the members on the screen of a mobile communication device.

Figure 52A:
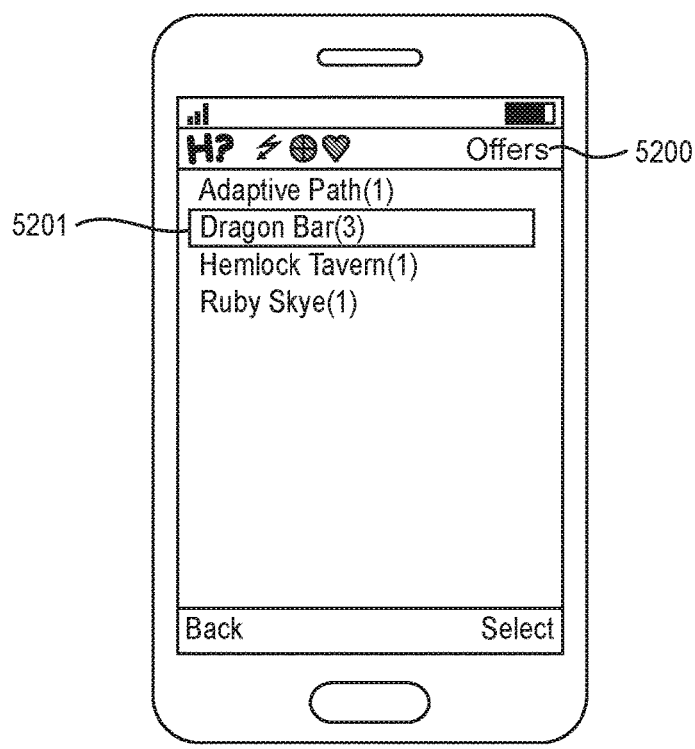
FIG. 52A illustrates displaying promotional offers from the club to the members on the screen of a mobile communication device.

Similar to FIG. 48, FIG. 51 shows the Main menu on a mobile communications device, except that now Offers 5100 is selected which brings up the Offers menu 5200 of FIG. 52A. FIG. 52A displays four clubs with offers awaiting the member: Adaptive Path has one offer; Dragon Bar 5201 has three offers; Hemlock Tavern has one offer and Ruby Skye has one offer.

Figure 52B:
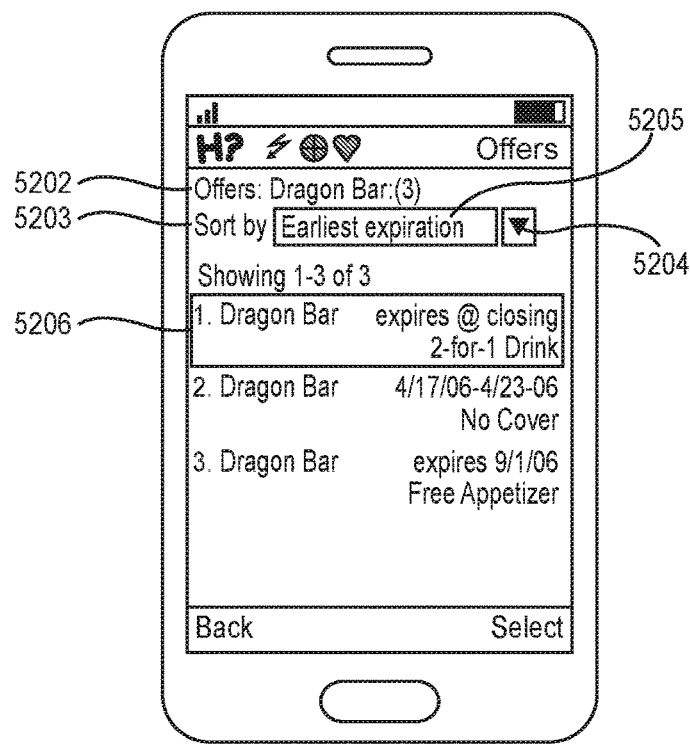
FIG. 52B illustrates displaying promotional offers from the club to the members on the screen of a mobile communication device.

Similar to FIG. 34, in FIG. 52B, the heading 5202 indicates that the member has 3 offers at Dragon Bar. Using drop-down arrow 5204 "Earliest expiration" is selected in the box 5205 in the "Sort by" heading 5203. The first offer 5206 indicates that the member has an offer that expires at closing time the current evening for a 2-for-1 drink. As sorted, this is the offer that expires the soonest of all offers at the club. Other "Sort by" options include: Discount level, Item type, and the like. An offer can be selected to view or redeem.

Figure 53A:
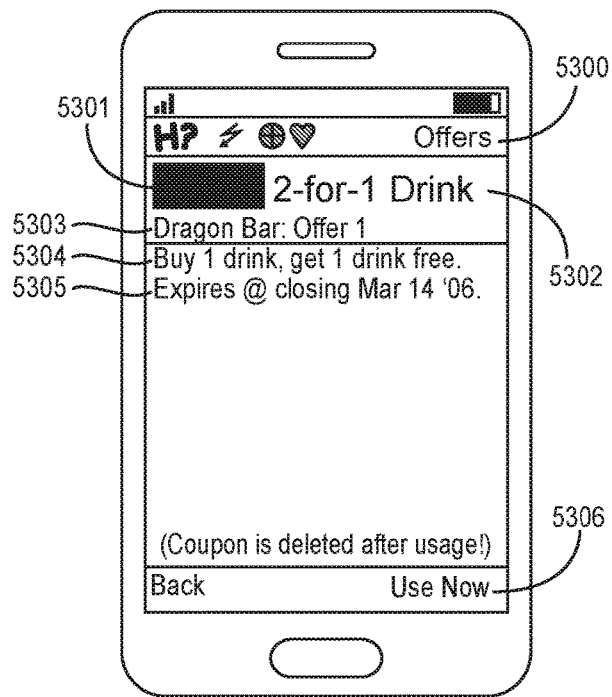
FIG. 53A illustrates displaying promotional offers from the club to the members on the screen of a mobile communication device.
Figure 53B:
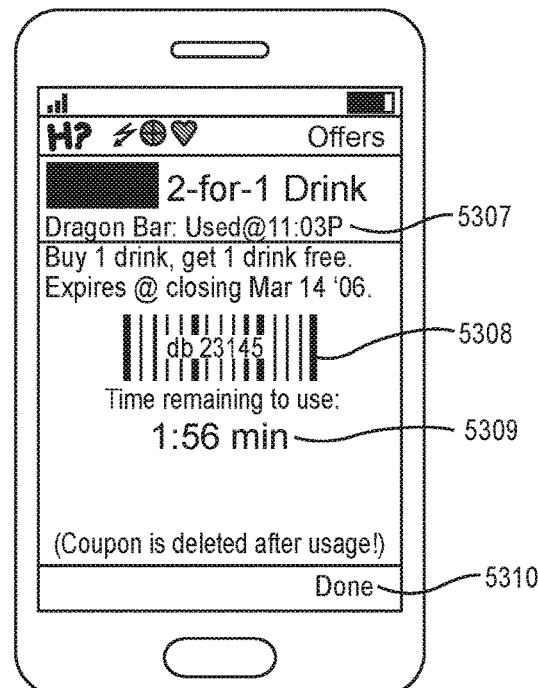
FIG. 53B illustrates displaying promotional offers from the club to the members on the screen of a mobile communication device.

When an offer in FIG. 52 is highlighted and selected, as is the first offer 5206, the offer is displayed as exemplified in FIGS. 53A and 53B. FIGS. 53A and 53B exemplify how to redeem an offer. Using their mobile communication device, a member selects the desired offer in their Offer Center (e.g., one of the offers listed in FIGS. 52A and 52B) if it is not already being displayed. The label of the screen in FIG. 53A is Offers 5300. Typically the club's logo 5301 is displayed. The type of offer 5302 is also displayed. The heading 5303 indicates that the offer is "Offer 1" at Dragon Bar. The heading 5304 indicates the details of the offer as being "Buy 1 drink, get 1 drink free." The heading 5305 indicates that the offer expires at closing on the evening of Mar. 14, 2006. To use the offer, the member selects "Use Now" 5306.

When "Use Now" 5306 is selected, the offer heading 5303 typically changes to say the time that the offer was used 5307, e.g., at 11:03 p.m. Each offer is typically tagged with a code, such as the code 5308. Offers typically have a limited time by which they must be used, to prevent the member from going to multiple wait staff attempting to use the same coupon multiple times. Here the remaining time to redeem the offer is 1:56 minutes 5309. Typical times range from one to 10 minutes, with the typical time being two minutes. The offer is valid until the timer counts down to zero. During the time the offer is valid, the coupon displayed on the member's mobile communication device must be shown to a member of the club's wait staff. The wait staff should verify that the counter is not yet zero. After viewing the coupon, the member or wait staff should press the button corresponding to Done 5310 to designate the coupon as having been "used."

FIGS. 54-75 below illustrate a how the Hoozware System operates for the venues in the second embodiment. Various modifications may be introduced for different situations, information expanded, incentives varied, and the like.

FIGS. 54-63 illustrate the fields for a venue representative to login and provide their venue account and profile information.

Figure 54:
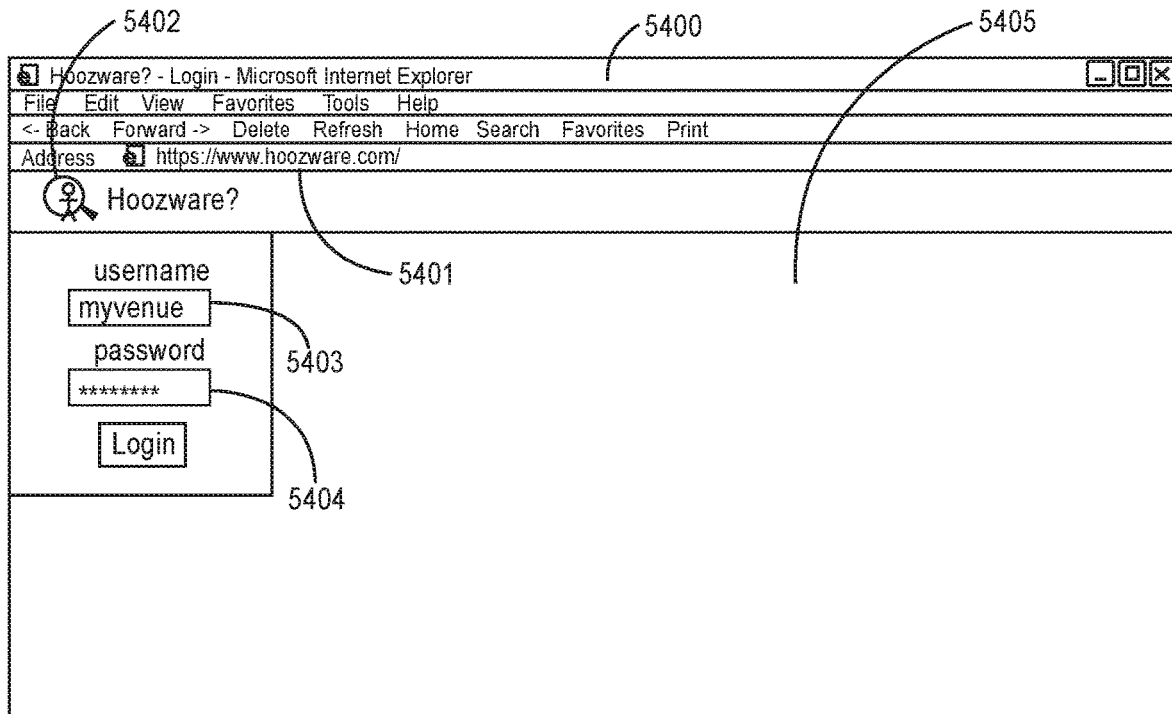
FIG. 54 illustrates fields for a venue representative to login and provide their venue account and profile information.

FIG. 54 is the login screen to access the Hoozware System. The Hoozware System in this embodiment is accessed via a web browser 5400 at the URL 5401. Instead of the H? logo in previous figures, FIG. 54 displays a person near a magnifying glass 5402. As is customary for login screens, the member is prompted to enter their username in the box 5403 and their password in the box 5404. The remainder of the screen may be used for general information, advertisements, video promotions, details about the Hoozware System, and the like.

Figure 55:
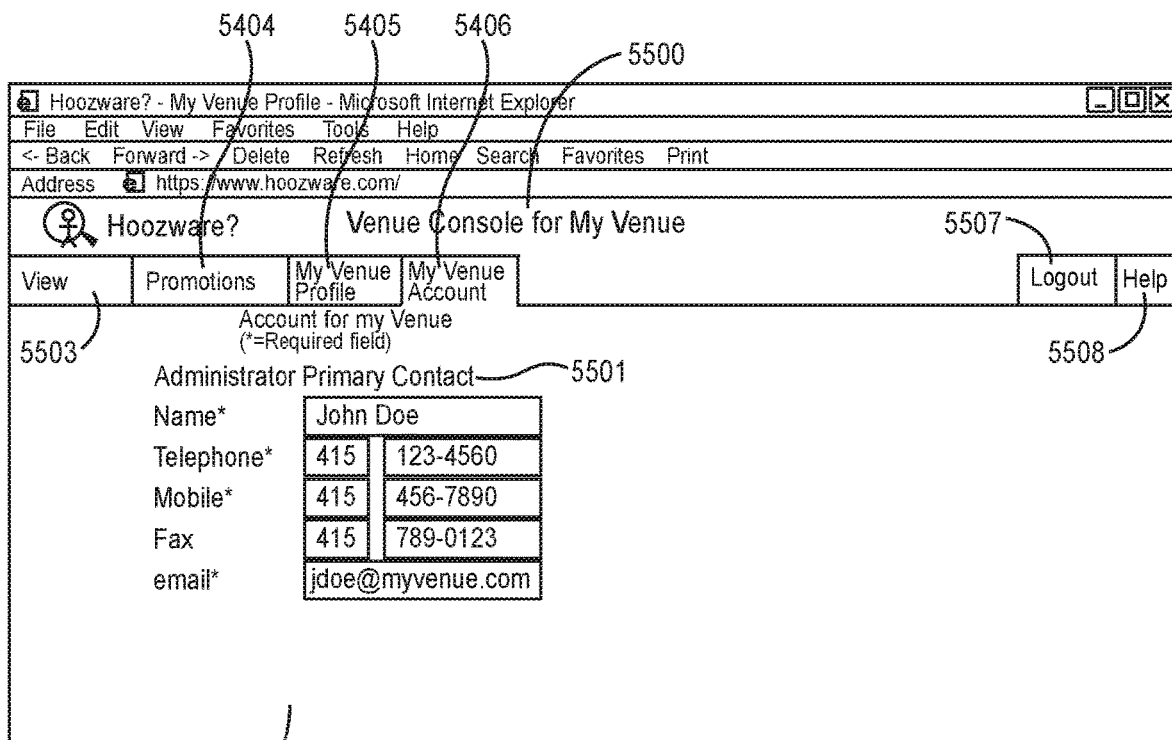
FIG. 55 illustrates an example venue console.

FIG. 55 is a screen labeled "Venue Console for My Venue" 5500. Using this console, various groups of venue information may be accessed, including View information 5503, Promotions information 5404, My Venue Profile information 5405, My Venue Account information 5406, the ability to Logout 5507, and Help 5508. "My Venue Account" information 5406 presents a screen of information the venue (e.g., club, bar, lounge, etc.) completes. The Administrator Primary Contact information 5501 is entered in the boxes. Such contact information typically includes a name, office telephone number, mobile number, fax number and email address. Although not shown, there may be additional fields 5502 for an Administrator Secondary Contact; Marketing Primary Contact; Marketing Secondary Contact, and the like.

Figures 56, 57:
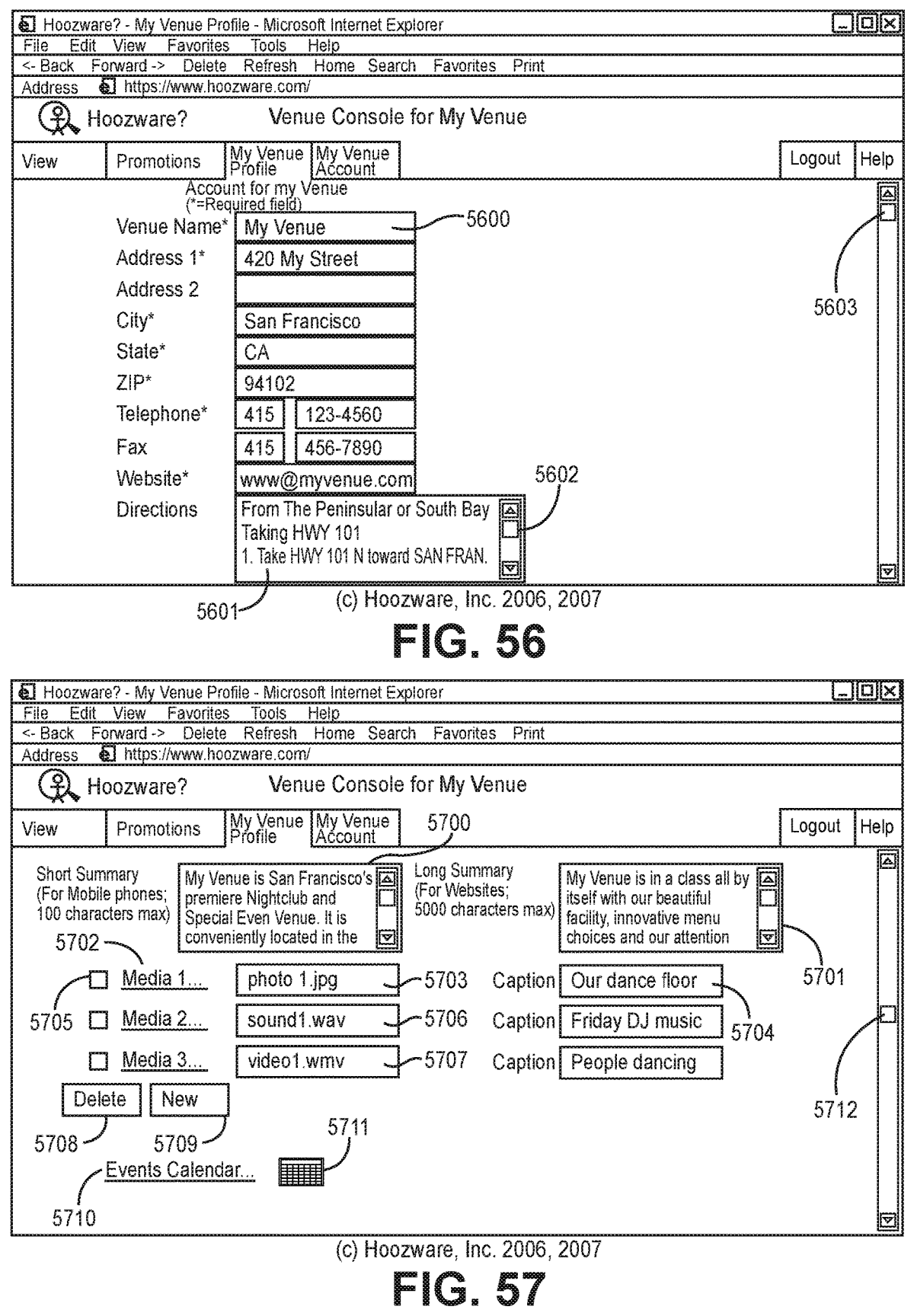

FIG. 56 presents "My Venue Profile" information. Such information typically includes a box 5600 to enter the venue name, as well as address, phone, fax, website and directions box 5601. The directions box 5601 have an associated slider bar 5602 with up/down arrows for causing the text in the directions box 5601 to scroll so the amount of text in the directions box 5601 is not limited to the box dimensions. The slider 5603 indicates that the information on this screen is to be continued.

FIG. 57 is a continuation of FIG. 56. In FIG. 57 the venue may enter a Short Summary 5700 and a Long Summary 5701 about themselves. Typically, the Short Summary 5700 is used when displaying on small screens, such as screens of a mobile communication device; typically the Long Summary 5701 is used when displaying on large screens, such as desktop computer monitors.

FIG. 57 also allows a venue to provide media for the Hoozware System to direct to users when they request more information about a club they're considering. As shown in this embodiment, there are spots for three different media entries; however, by selecting New 5709, new media entries may be added. In this example, the first media entry is a picture named photo1.jpg 5703. The name of the file may be typed into the associated box. Alternately, by selecting Media1 . . . 5702 a browse window is typically opened to help locate the desired file. In this example, to delete an entire media entry the associated box 5705 is checked and then Delete 5708 is selected. The second media file in this exemplary embodiment is a sound file named sound1.wav 5706, and the third media file in this example is a movie file named video1.wmv 5707. Typically associated (e.g., next to) the media file is a caption. In the example of FIG. 57 the caption entered for photo1.jpg is "Our dance floor" 5704.

Other elements typically part of the "My Venue Profile" information include an events calendar. Typically, to view or edit venue event, the venue representative selects the calendar icon 5711 or the descriptive words "Events Calendar . . . " 5710. As before, the slider 5712 indicates this screen is continued on another.

Figure 58:
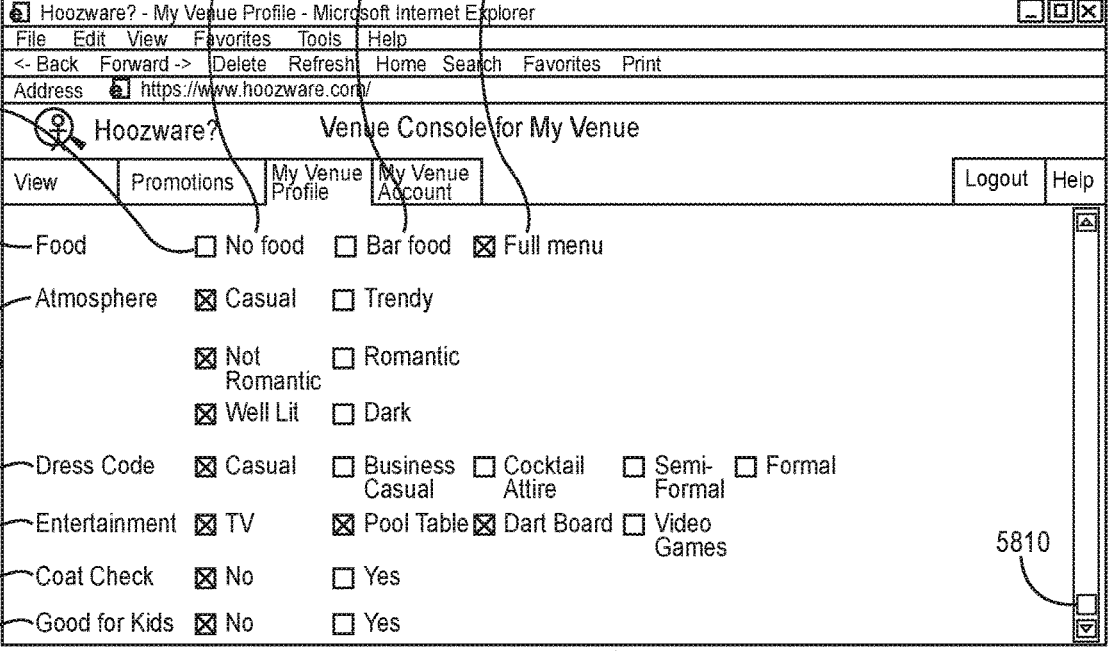
FIG. 58 illustrates an example venue console.

FIG. 58 provides still more information a venue can complete for the Hoozware System to make available to users, i.e., members, and optionally to guests, of the system. Such information includes the availability and type of Food 5800; the Atmosphere 5805; the Dress Code 5806; available Entertainment 5807; the existence of a Coat Check 5808; whether the venue is "Good for Kids" 5809; and the like. FIG. 58 provides various example elections for each category just listed; for example, elections for the Food 5800 category may include: No food 5801, Bar food 5803, Full menu 5804, and the like. To select an election such a "No food" 5801, typically one checks the associated box 5802. The slider 5810 at the bottom indicates that this is the last screen for My Venue Profile.

Figure 59:
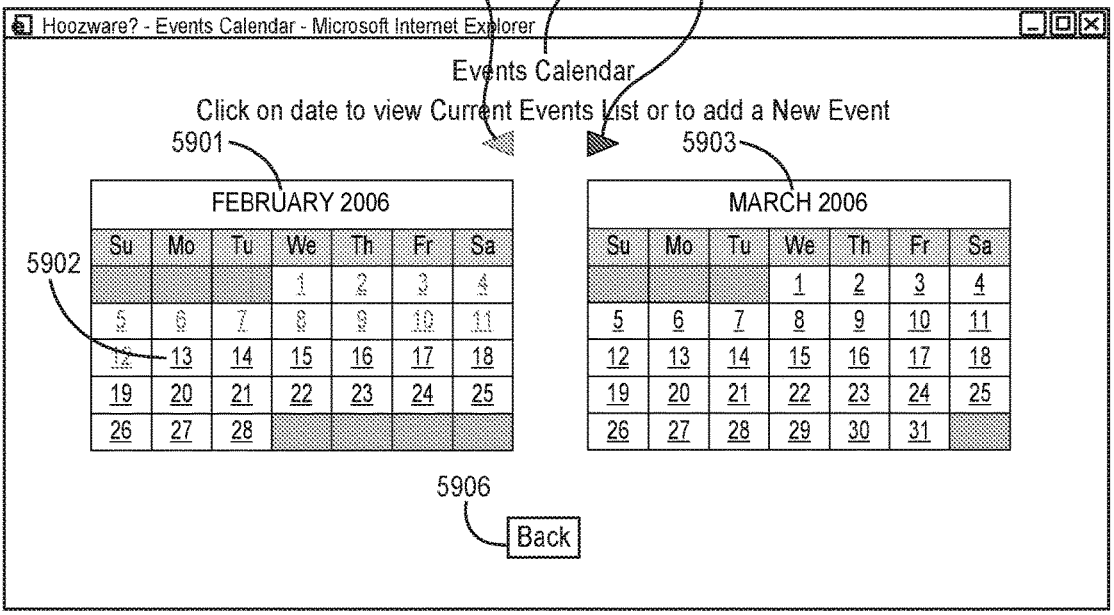
FIG. 59 illustrates an example venue console.

FIG. 59 provides an example embodiment of an Events Calendar 5900 which is opened when either the calendar icon 5711 or text Events Calendar . . . 5710 are selected in FIG. 57. As displayed, two months at a time, February 5901 and March 5903, are presented. By selecting the right arrow 5905 the two months are each incremented by one month; similarly, by selecting the left arrow 5904 the two months are each decremented by one month. The lighter colored days of February (1-12) represent days already passed, which can only be viewed but no longer edited; whereas, the darker colored days (13-28) represent today into the future, which can be both viewed and edited. An underlined number, such as number 13 5902, signifies that the number may be selected to bring up the detailed calendar for that day. Selecting (e.g., clicking on) number 13 5902 in the February 2006 calendar brings up the Current Events List 6000 of FIG. 60. Selecting Back 5906 reverts to the previous screen.

Figure 60:
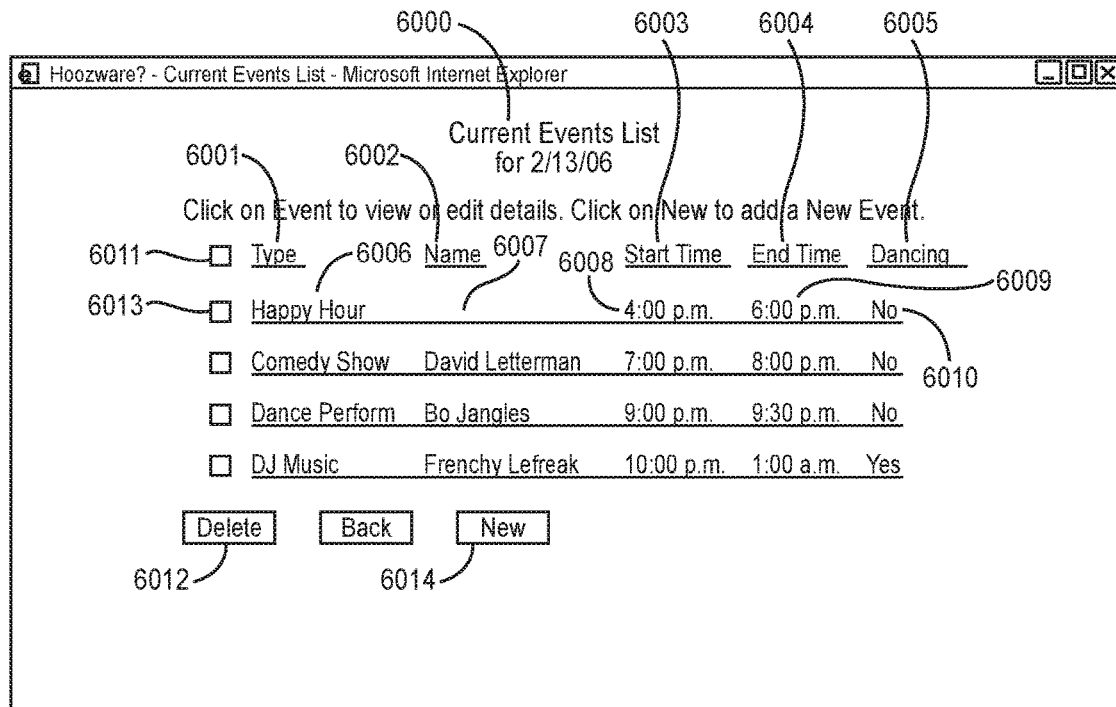
FIG. 60 illustrates an example current events list.

FIG. 60 is a detailed display of an exemplary Current Events List 6000 for the date Feb. 13, 2006. Each of the four underlined events shown is summarize by five event fields, including: Type 6001, an event Name 6002, an event Start Time 6003, an event End Time 6004, and a binary indication of whether Dancing 6005 is appropriate. To delete a listed event, one selects the associated box, such as box 6013 next to Happy Your 6006, and then selects Delete 6012. To delete all events, one can either individually select each associated box, or select the single box 6011, which automatically selects each box below it. To add a new event, one selects New 6014 and then completes the various event fields which appear in a new event window. The first example event listed is for Happy Hour 6006 starting at 4:00 p.m. 6008 and ending at 6:00 p.m. 6009, where dancing is specified as not really appropriate with an entry of No 6010. Note that the spot for a Name is left blank 6007 for this particular event.

Figure 61:
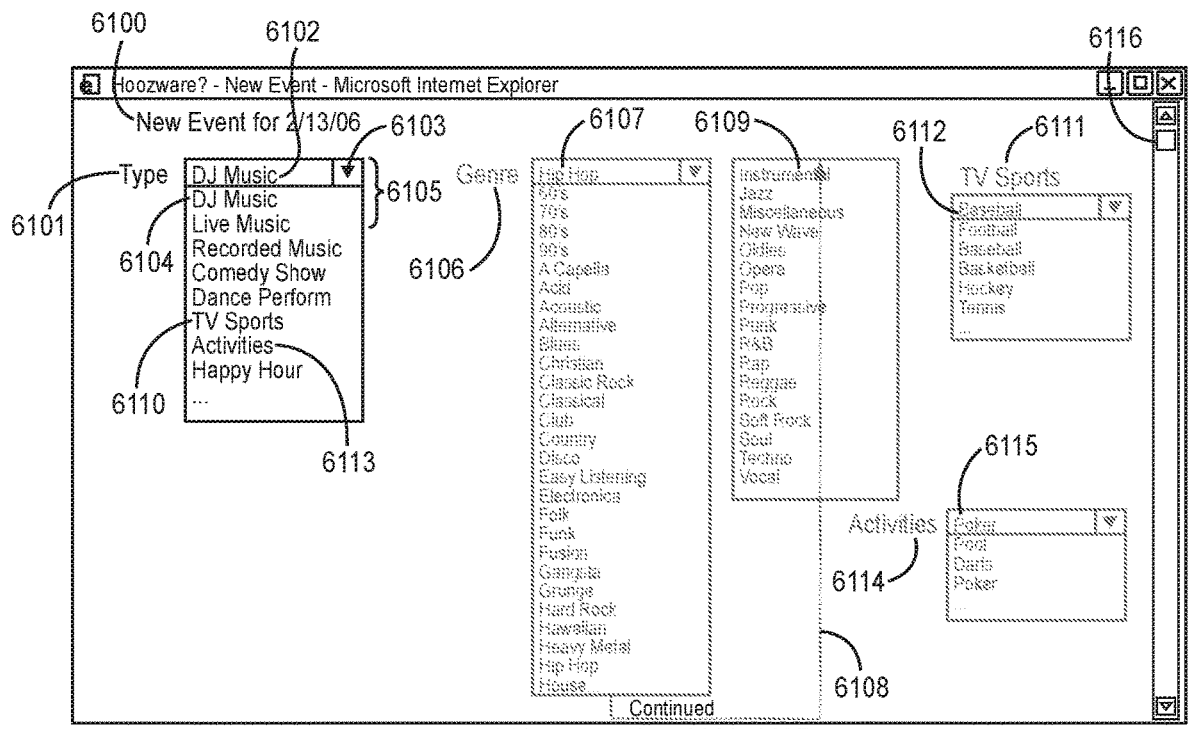
FIG. 61 illustrates an example event creation.

FIG. 61 is the first of three screens (i.e., together with FIGS. 62 and 63) that exemplify the information a venue typically enters when adding a new event, such as when New 6014 is selected in FIG. 60. The screen in FIG. 61 is referred to as a New Event screen 6100. First the Type 6101 of event is selected. In this example, DJ Music 6102 is specified. The down-arrow 6103 is used to expand the box of selections (as shown), which in this example include: DJ Music, Live Music, Recorded Music, Comedy Show, Dance Performance, TV Sports, Activities, Happy Hour, and the like. When any of the music choices 6105 (e.g., DJ Music 6104, Live Music or Recorded Music) is selected, the lightly colored Genre box 6106 is displayed to provide a context-sensitive set of subsequent choices. (When displayed in context, the Genre box 6106 is not typically lightly colored, but is only lightly colored here to indicate that it remains grayed out until it is in context.) In this example, the list of music genre is so long that it has been figuratively wrapped 6108 to continue with the remainder of the selections 6109. The genre selected in this example is Hip Hop 6107. Other music genre choices include: 60's, 70's, 80's, 90's, A Capella, Acid, Acoustic, Alternative, Blues, Christian, Classic Rock, . . . , Soul, Techno, Vocal, and the like.

Similar to the context-sensitive music genre, if TV Sports 6110 were selected as the Type 6101, a TV Sports list 6111 of options may be boldly displayed. Possible TV Sports choices include: Football, Baseball, Basketball, Hockey, Tennis, and the like. In this example Baseball 6112 has been selected.

Also similar to the context-sensitive music genre, if Activities 6113 were selected as the Type 6101, an Activities list 6114 of options may be boldly displayed. Possible Activities choices include: Pool, Darts, Poker, and the like. In this example Poker 6115 has been selected. The slider 6116 indicates this screen is continued.

Figure 62:
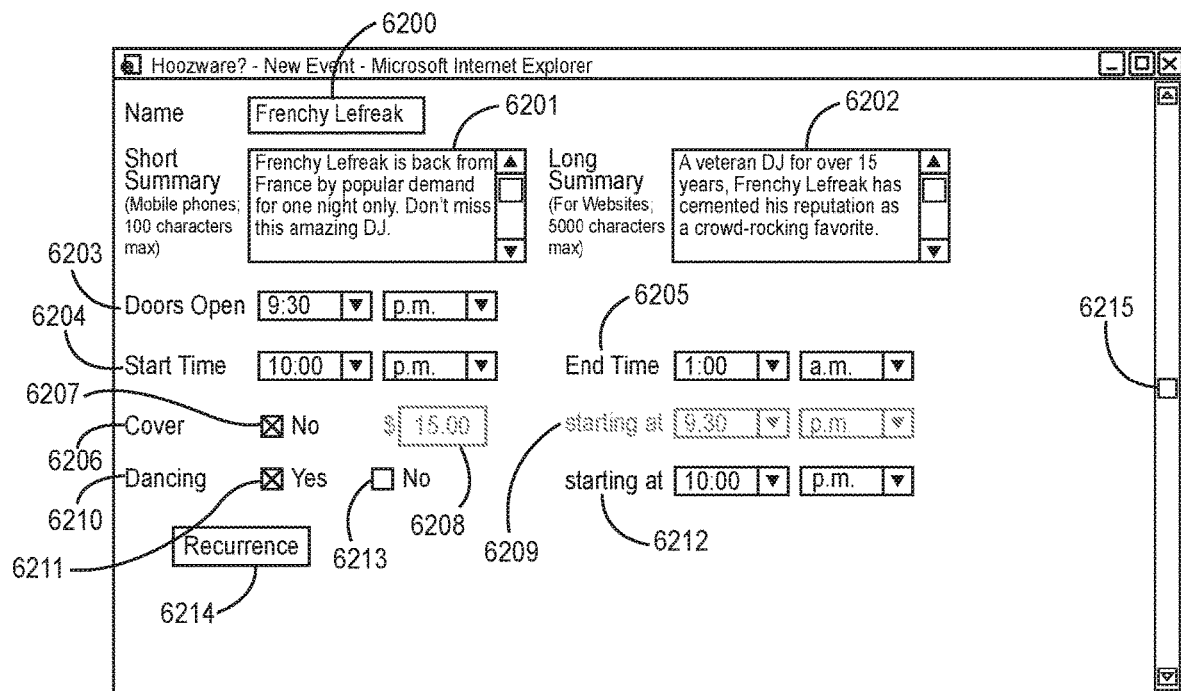
FIG. 62 illustrates an example event creation.

FIG. 62 is a continuation of the New Event screen of FIG. 61. Here the name of the DJ event is specified as "Frenchy Lefreak" 6200. As with venue information, event information may also have a Short Summary 6201 and a Long Summary 6202 for mobile and desktop screens, respectively. The time the Doors Open 6203 is specified, as is the Start Time 6204 and End Time 6205 for the event. Cover charge 6206 is specified as not existing based on a check in the No box 6207. If there were a cover charge, the No box 6207 would not be checked, and the lightly colored cost box 6208 and starting time 6209 for the cover charge would become boldly colored, indicating they are relevant. Dancing 6210 is specified by checking either the Yes box 6211 or No box 6213. Since the Yes box 6211 is checked, the starting time 6212 for dancing is relevant.

If the event repeats, the Recurrence box 6214 is selected. The Recurrence box 6214 may operate like the other popular calendaring systems, such as the Recurrence option in the calendar feature of Microsoft Outlook®, where various recurrence parameters may be selected. The slider 6215 indicates that this slide is a continuation and there is still another slide to come.

Figure 63:
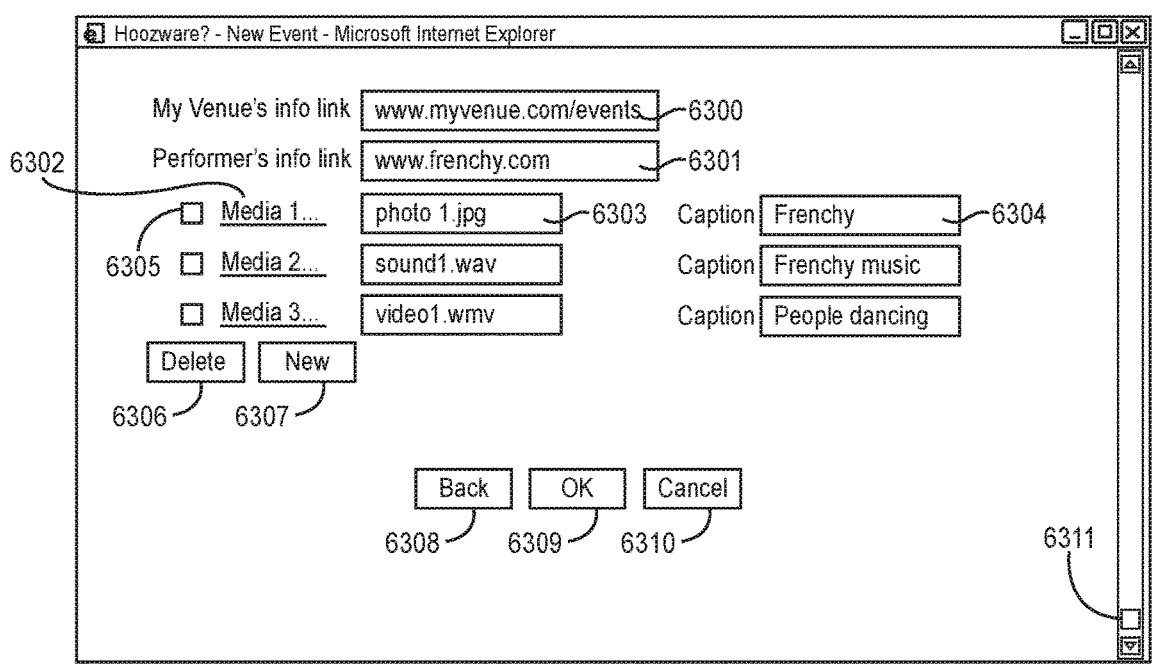
FIG. 63 illustrates an example event creation.

FIG. 63 is the final screen example here for adding a new event, as indicated by the slider 6311 at the bottom. In this figure, various website links are provided, including a link

6300 to information the venue provides regarding the event; as well as, a link 6301 the performer (i.e., the "talent") provides to their own website. In a similar manner that a venue added media to embellish information about them in FIG. 57, so can a performer, or a venue, add media about an event. In FIG. 63, the filename photo1.jpg 6303 may be typed in to the box, or the underlined word Media . . . 6302 may be selected to bring up a browser window to allow one to search for the desired media file in a file system. To delete a media listing, the associated box 6305 is checked and Delete 6306 is selected. Each media entry has an optional Caption, such as "Frenchy" 6304 in the photo1.jpg example. Selecting New 6307 allows a new media entry to be stored. Back 6308 caused the screen to go back to the previous display. Selecting OK 6309 causes the entered information to be stored and closes the NewEvent window; and Cancel 6310 closes the NewEvent window without storing any modifications made.

Figure 64:
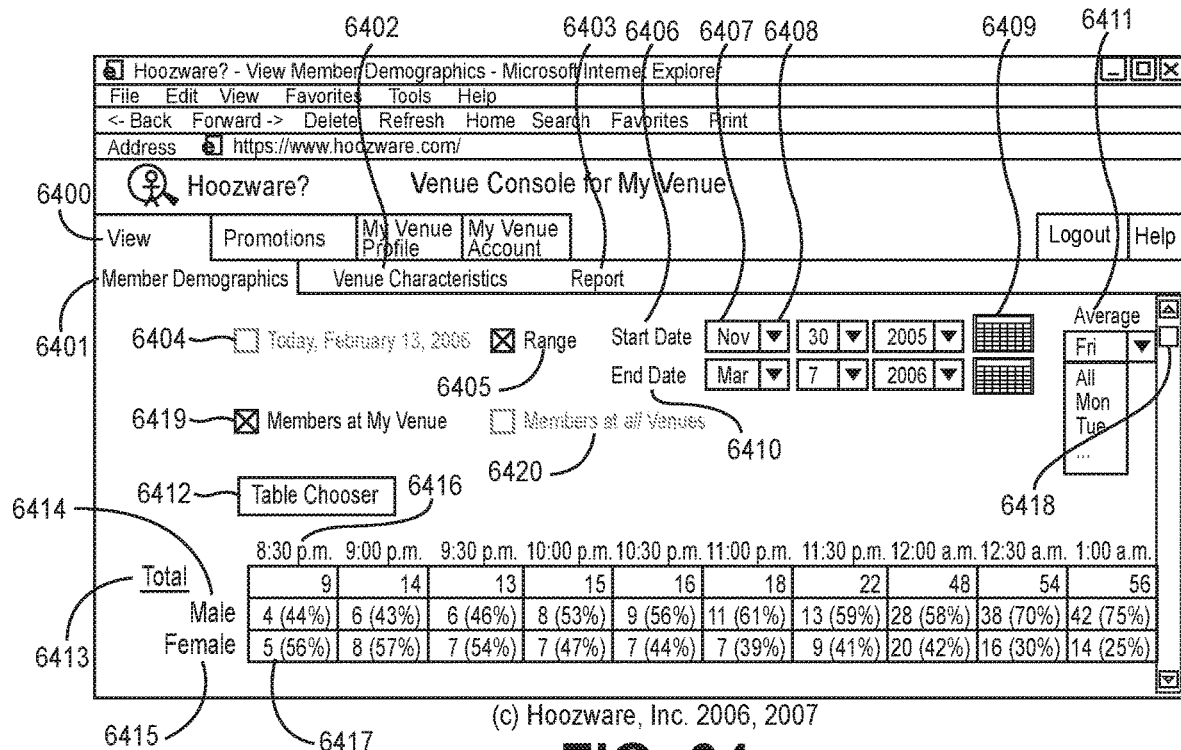
FIG. 64 illustrates fields used for presenting the demographics of members at a venue.
Figure 65:
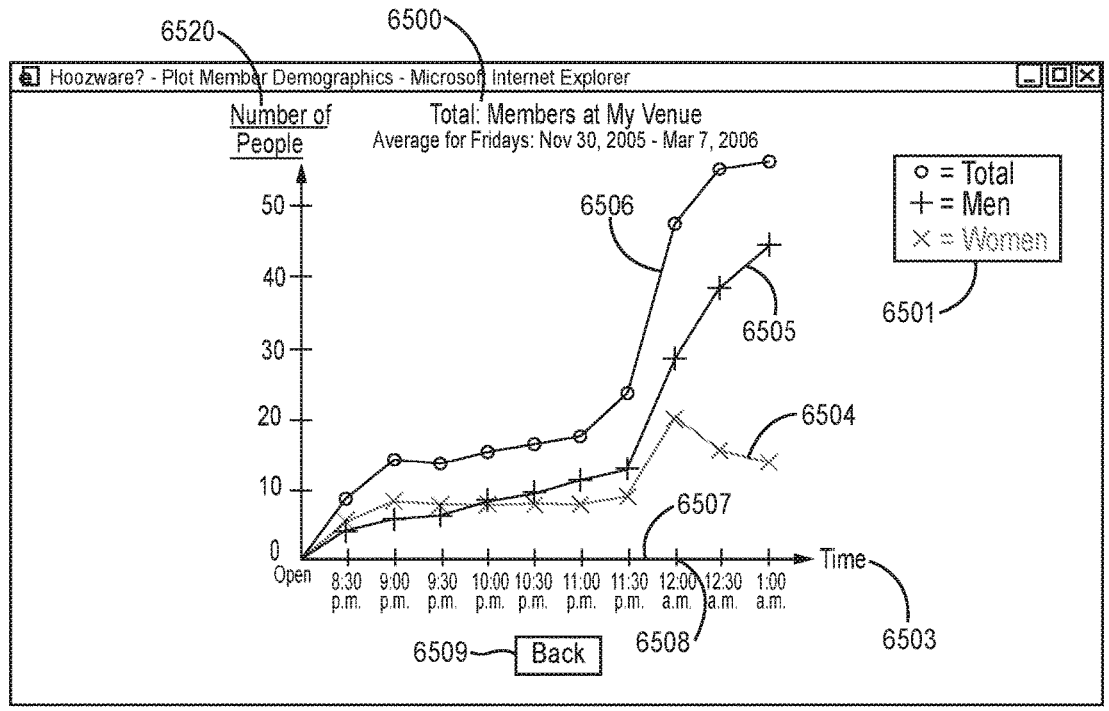
FIG. 65 is an illustrative graph of the data tabulated in FIG. 64.

FIGS. 64-69 illustrate the fields used for presenting the demographics of members at a venue, where FIG. 65 is an illustrative graph of the data tabulated in FIG. 64.

FIG. 64 again displays the Venue Console, with focus this time on View 6400. In one exemplary embodiment there are three categories of View 6400: Member Demographics 6401, Venue Characteristics 6402 and Report 6403. FIG. 64 shows how a member's demographics may be specified. One can specify they are interested in member demographic data from only today (in this example, Feb. 13, 2006) 6404. Since the associated box is not checked, the text "Today" is lightly colored. To specify a range of dates over which member demographic data should be assembled, Range 6405 is selected, as well as Start Date 6406 and End Date 6410. One convenient way that the dates may be entered is to use the drop-down arrow 6408 to select from a list of allowable dates, including "November" 6407. The month, day and year may be individually selected for both the Start Date 6406 and End Date 6410, or, alternately, it may be convenient to select a calendar 6409 that opens a new window and allows the user to select the desire date from an image of a monthly calendar, similar to what was depicted in FIG. 59 for specifying event dates. If a range of dates is selected, different slices of the data may be selected 6411 and averaged, or otherwise mathematically operated upon. A slice of data may be selected by specifying one or more days of the week over which to perform the average. Other selections include specifying whether to use members only at the venue's venue 6419, or members that attended all venues 6420 over the selected day or range of days.

The Table Chooser 6412 button provides a user interface for specifying which demographic field or other parameter is of interest in the selected member data. For instance, one demographic field is total population 6413, which may be subdivided into Male population 6414 and Female population 6415. In the associated table, each of these populations is tabulated versus time of day, where both the raw number and percent of total is presented. For instance, in cell 6417, the total number of Females at the venue at 8:30 p.m. 6416 is 5, which corresponds to 56% of the total population of 9. Slider 6418 indicates there are subsequent slides.

If the underline word Total in FIG. 64 is selected, the tabulated data is graphed, typically in a new window. This graph is similar to the graph previously described in FIG. 30. The title is "Total: Members at My Venue" 6500. The number of people 6502 is plotted on the ordinate; whereas, the time 6503 is plotted on the abscissa. The curve 6504 designated by X is for Women; the curve 6505 designated by + is for Men; and the top curve 6506 designated by 0 is the total number of people. The legend 6501 is provided. At roughly 10:00 p.m. 6507 the number of men surpasses the number of women at the venue, and the number of women takes a steep drop off around midnight 6508. Selecting the underlined text for Number of People, causes the ordinate to switch from "number of people" to "percent of people". Selecting Back 6509 causes the screen to present the previous display.

Figure 66:
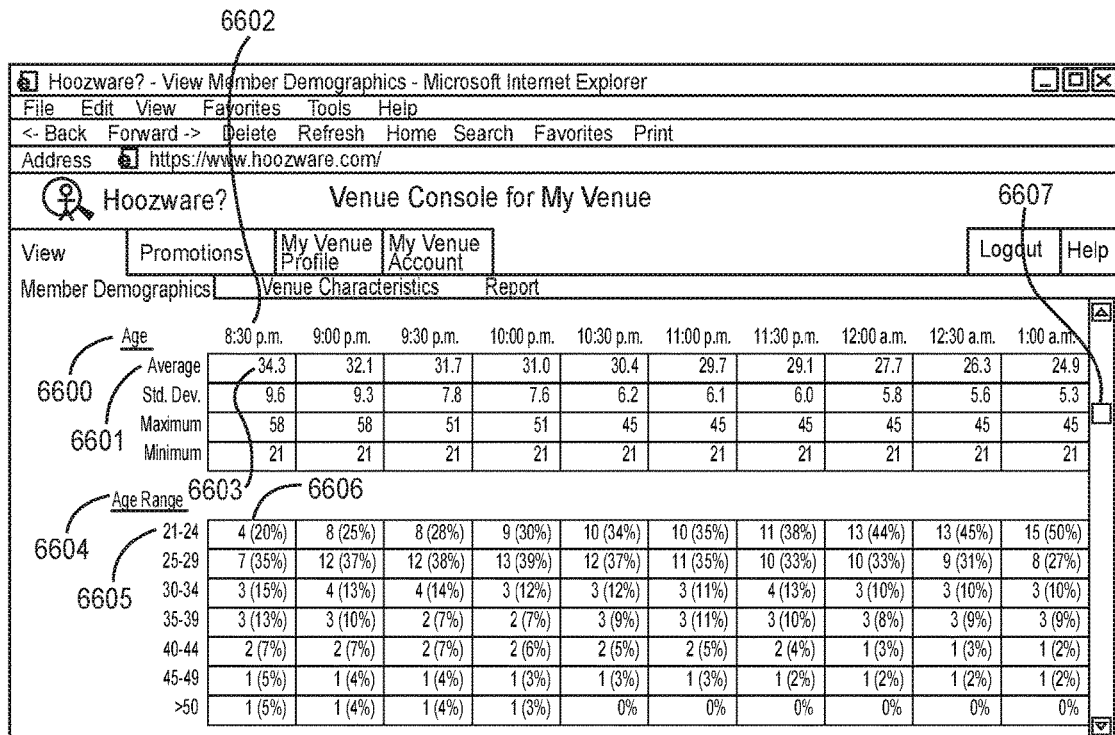
FIG. 66 illustrates a view of member demographics at a venue.

FIG. 66 is a continuation of FIG. 65 where instead of total number of people, Age 6600 and Age Range 6604 are the selected demographics to tabulate (and potentially plot). Range 6605 is 21-24 years old; cell 6606 says there are 4 people accounting for 20% of the population in the 21-24 year-old range; cell 6603 says 34.3 is the average 6601 age at 8:30 p.m. 6602. The slider is 6607.

Figure 68:
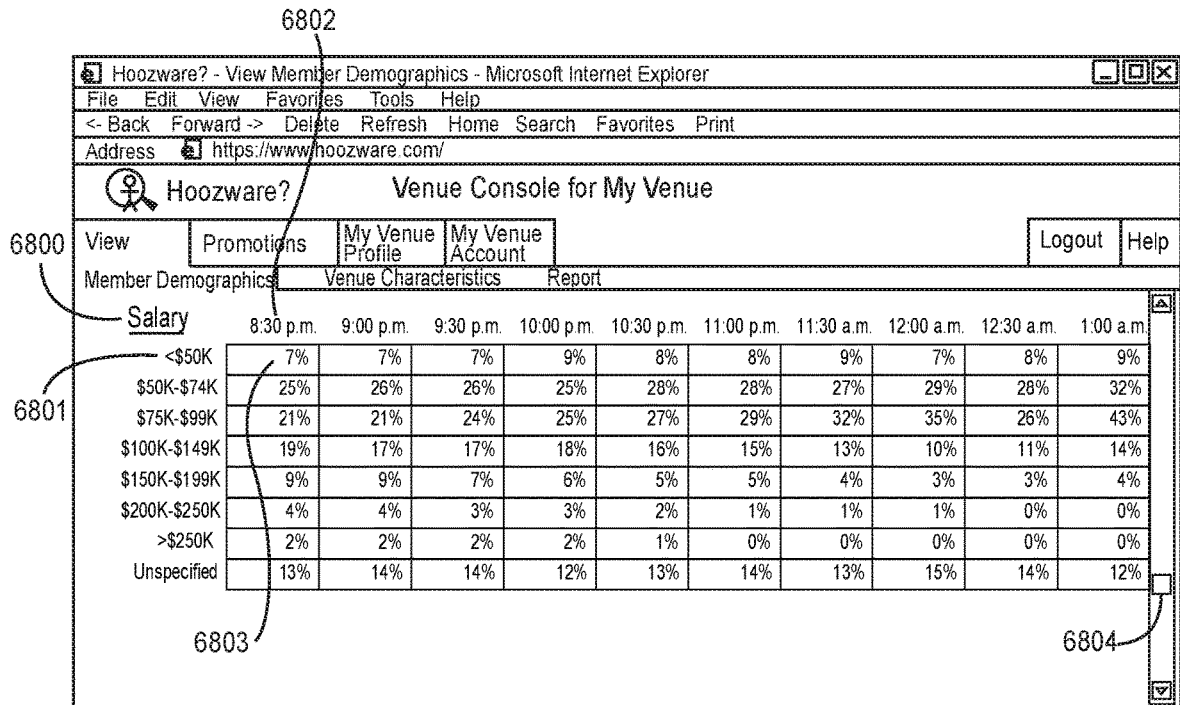
FIG. 68 illustrates a view of member demographics at a venue.

FIG. 68 is a continuation where Salary 6800 is the selected demographic. Cell 6803 indicates that 7% of the member population at the venue at 8:30 p.m. 6802 makes less than $50,000 per year 6801. The slider is 6804.

Figure 67:
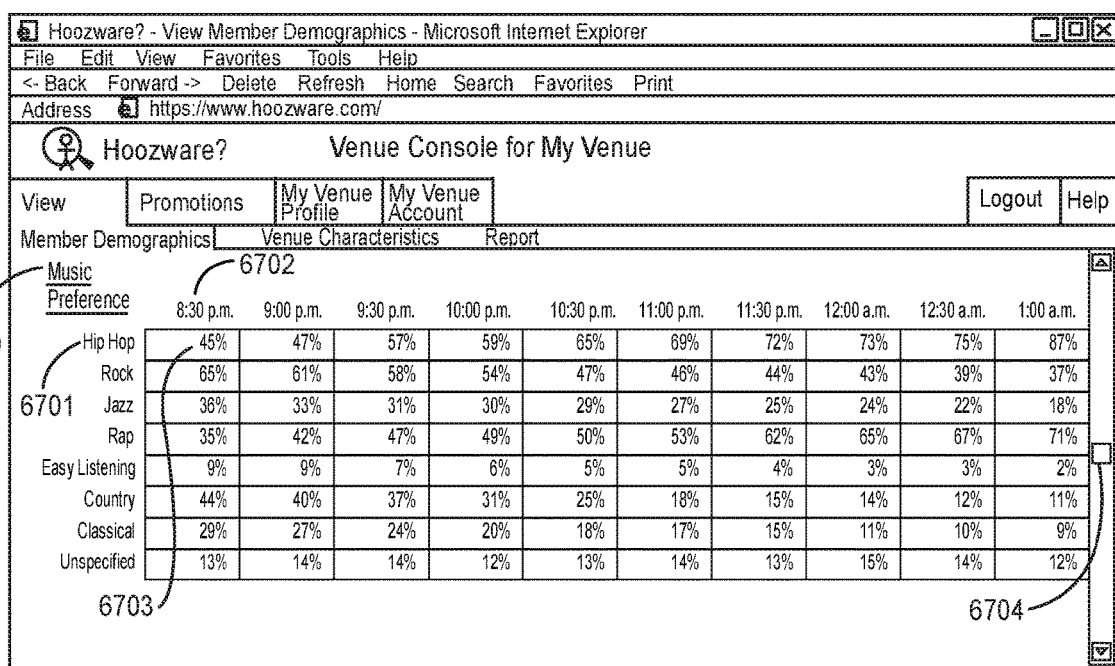
FIG. 67 illustrates a view of member demographics at a venue.

FIG. 67 is a continuation where Music Preference 6700 is the selected demographic. Cell 6703 indicates that 45% of the member population at the venue at 8:30 p.m. 6702 likes Hip Hop 6701. The slider is 6704.

Figure 69:
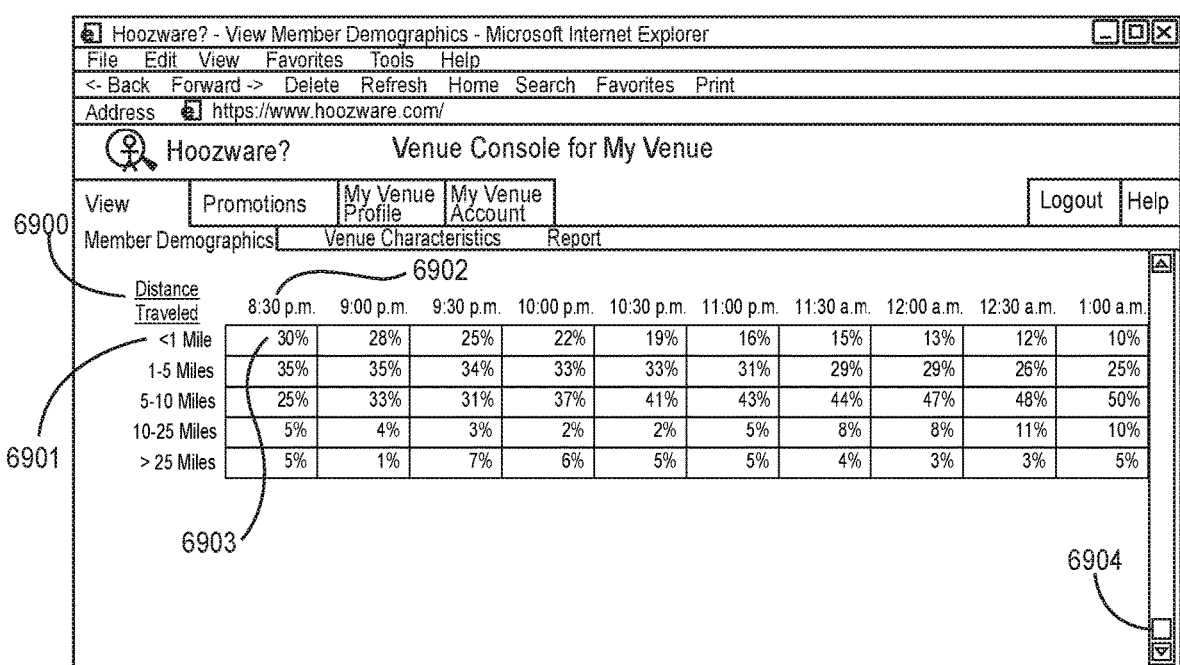
FIG. 69 illustrates a view of member demographics at a venue.

FIG. 69 is a continuation where Distance Traveled 6900 is the selected demographic. Cell 6903 indicates that 30% of the member population at the venue at 8:30 p.m. 6902 traveled less than one mile 6901. The slider is 6904. Other member demographics which a venue may wish to select to tabulate or plot include: Education, Occupation, City, Interests, Sports Preferences, and the like.

FIGS. 70-75 provide illustrative fields for promotional activities. FIG. 70 again displays the Venue Console, with focus this time on Promotions 7000. In one exemplary embodiment there are three categories of Promotions 7000: New 7001, Current 7002 and Expired 7003. The New 7001 category assists a venue operator in defining a new promotion, including selecting to whom it will be sent. The screen asks the venue to "Select Recipients" 7004. At any time, the total selected recipients is tallied. In this example, the total is 21,969 7005. To limit the number of recipients, the venue may elect to send the promotion to everyone who's redeemed an offer at their venue within some selected time frame 7006. The venue may also similarly limit the promotion to redemptions at any venue 7007, which is what is being done in this example. The slider is 7008.

Figures 70, 71:
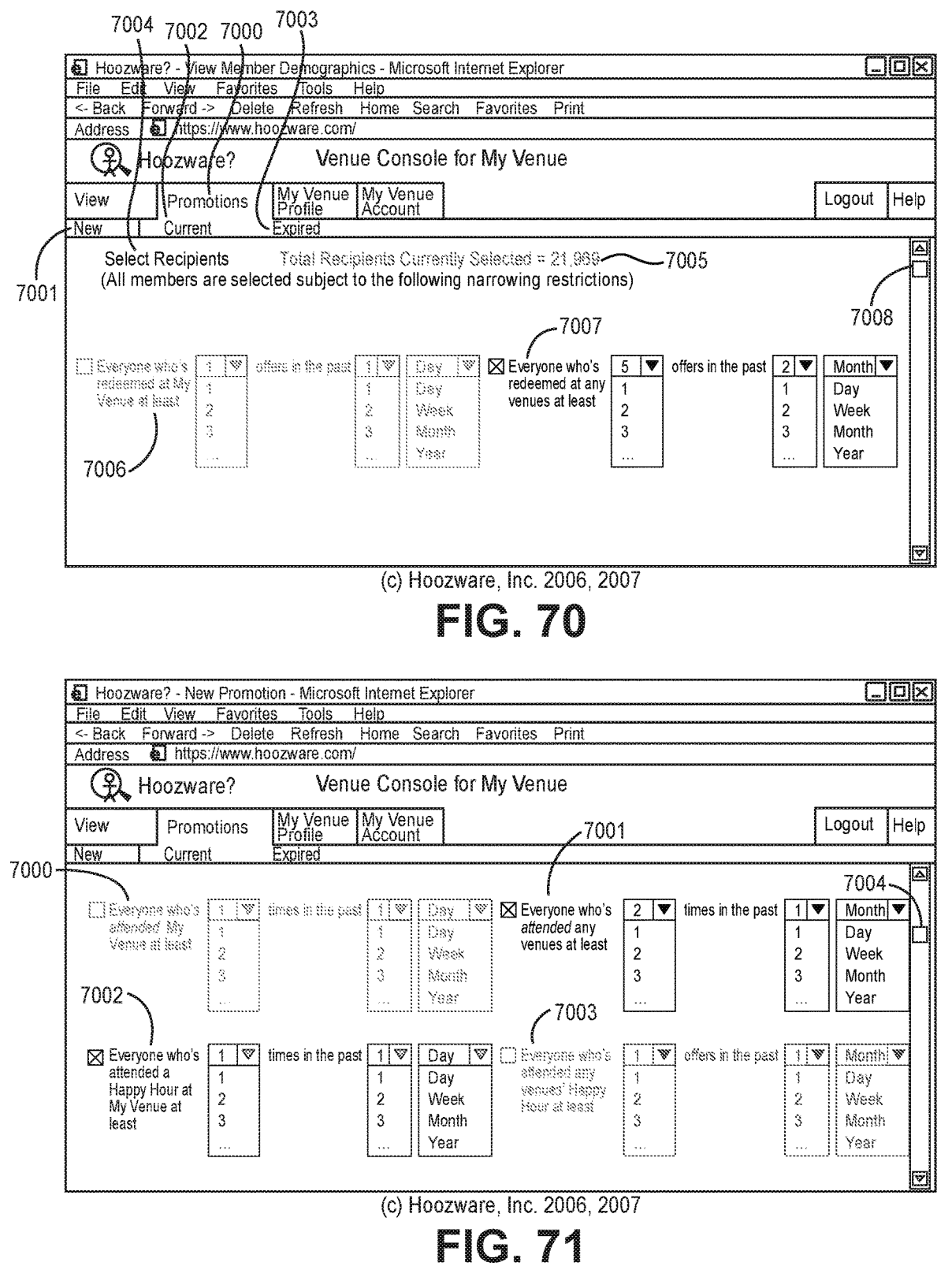

Similarly, the venue may limit the promotion to people who've attended their venue 7000, or any venue 7001 in some previous time frame, as shown in FIG. 71. Similarly, the venue may limit the promotion to people who've attended Happy Hour at their venue 7002, or any venue 7003. The slider is 7004.

Figure 72:
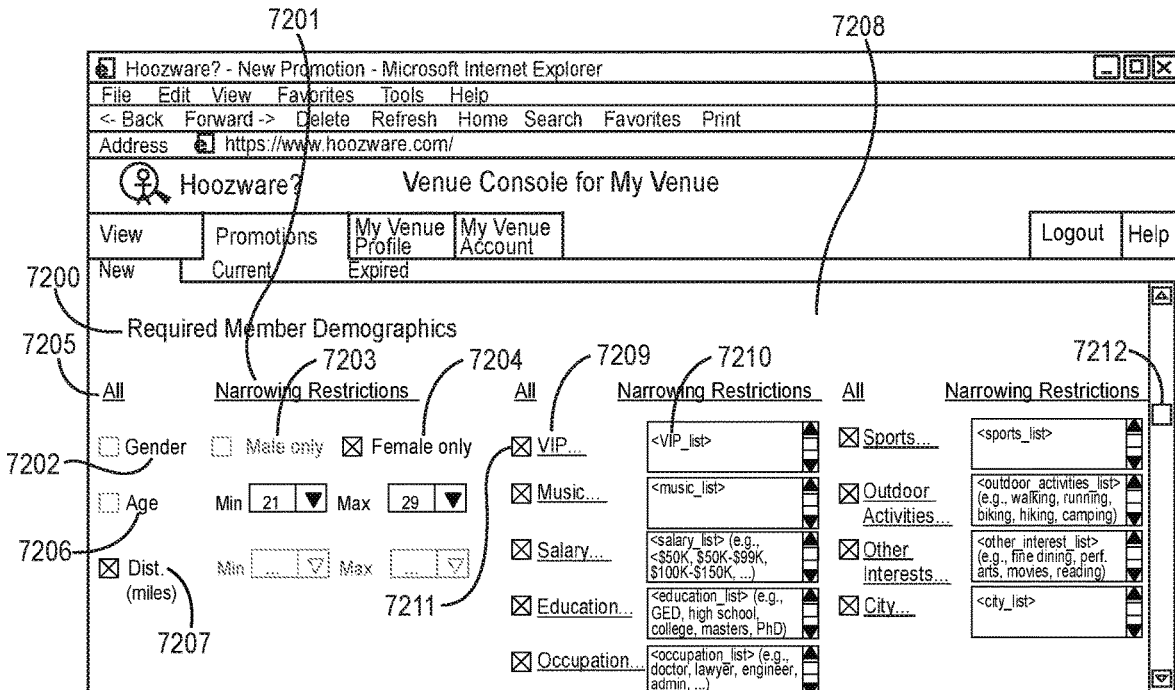
FIG. 72 illustrates example fields for promotional activities.

FIG. 72 allows the venue to further limit the number of promotion recipients by member demographics 7200, such as Gender 7202, Age 7206, Distance 7207, whether the member's on the venue's VIP list 7209, the type of Music they like, their Salary, Education, Occupation, Sports interests, Outdoor Activities, Other Interests, City, and the like.

Note: When one clicks on an underlined label followed by " . . . ", and further followed by a box with up/down arrows, they get a selection box similar to what they get when one clicks on "To . . . " while addressing an email in Outlook. Also, a check box is automatically unchecked if a list is specified.

Figure 73:
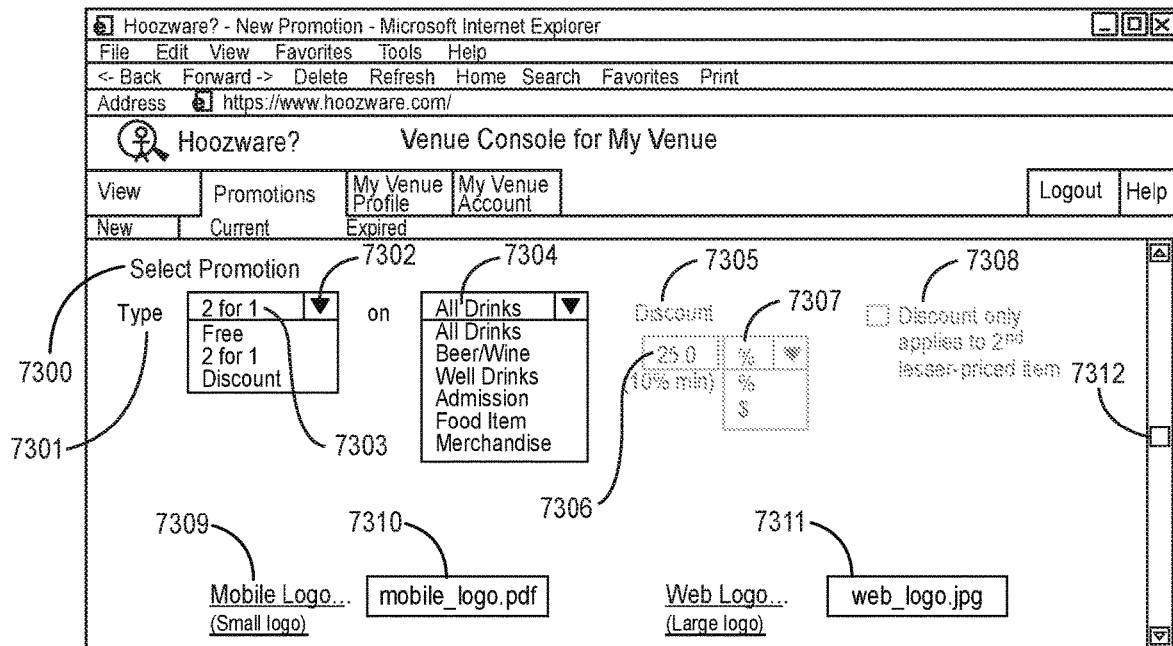
FIG. 73 illustrates example fields for promotional activities.

FIG. 73 demonstrates how to Select a Promotion 7300. First the Type 7301 is selected, such as: 2 for 1, Free, Discount, and the like. Next the item 7304 the Type applies to is designated, such as All Drinks, Beer/Wine, Well Drinks, Admission, Food Item, Merchandise, and the like. Next, if appropriate, a Discount 7305 is selected, where the Discount 7305 is specified in dollar amounts or percentage 7307. Typically a minimum is set for each to make sure a member gets a good offer and not just a useless advertisement. The venue may also select that a discount only applies to a second or lesser-priced item 7308. Short 7310 and long 7311 logos may also be specified to be associated with the promotion.

In FIG. 74 allows the venue to select dates 7400 that the promotion is sent out 7401, the promotion begins 7405, expires 7406, and whether there is a Recurrence 7407. Any of the type of date entry techniques already described or otherwise convenient may be employed. If the number of recipients is greater than desired based on the other types of limitations previously discussed, the venue may limit the recipients 7408 by requiring that the promotion fit a budget 7409, that the number of recipients not exceed a limit 7412, that the number of redemptions of the offer not exceed a limit 7415, and the like. Any number entered in box 7412 is reflected in the line 7414. When all the promotion parameters are specified, the venue reviews the promotion 7416.

FIG. 75 displays a user friendly summary of the promotion in the area 7500. The promotion can be saved 7501 for later, printed 7502, canceled 7504, or submitted 7505, and the like.

Figure 76:
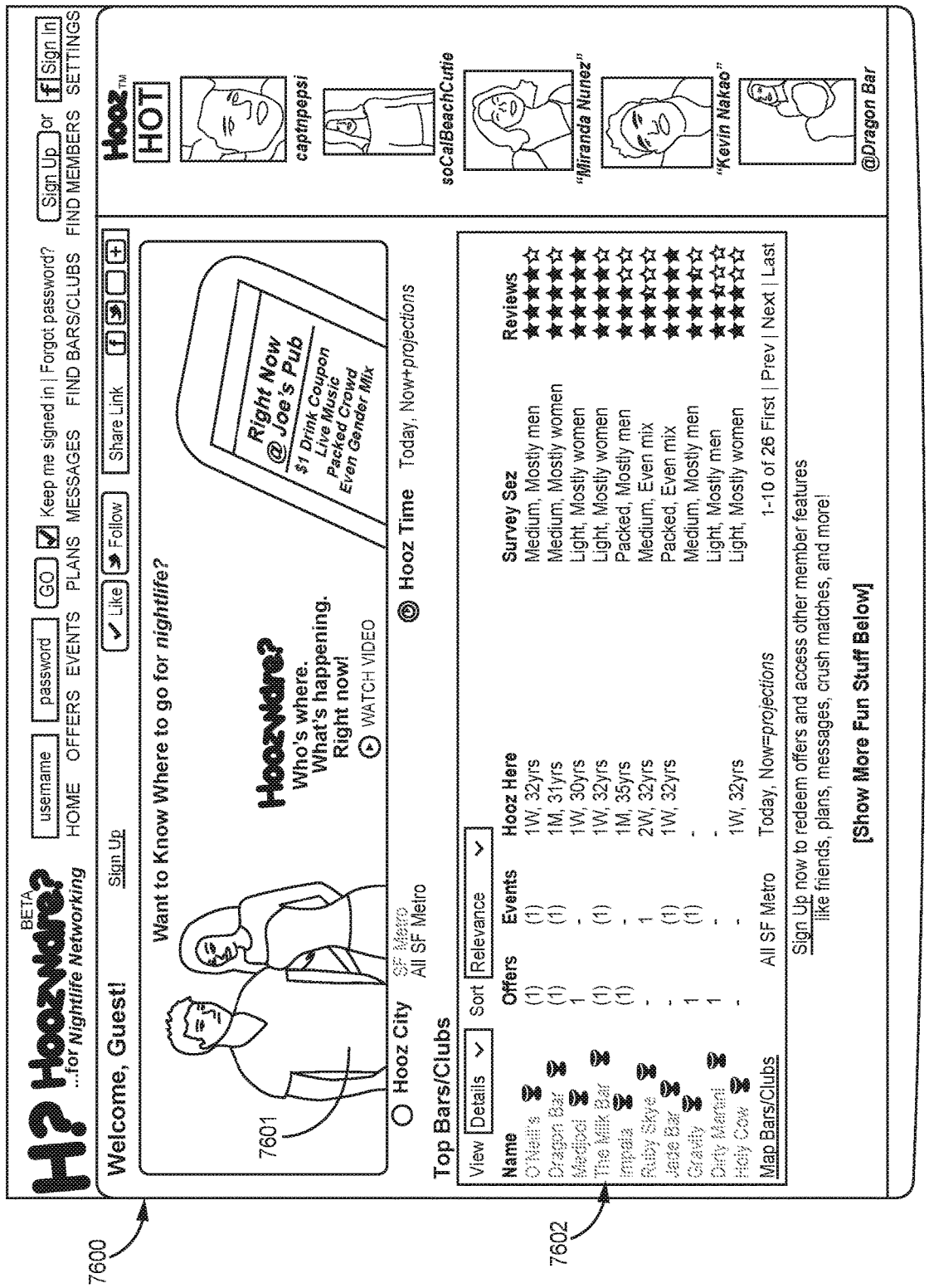
FIG. 76 is an exemplary social network website Home screen on a desktop computer for a guest visitor to the website.

FIG. 76 shows an exemplary social network website (e.g., Hoozware) Home screen 7600 as displayed on a desktop computer for a guest visitor to the website. In the example, the website Home screen presented to a guest provides limited capability compared to a signed-in member. It shows the first still image 7601 of an introductory video animation, and it provides a real-time ranked list 7602 of Top Bars/Clubs using a search with default preference criteria.

Figure 77A:
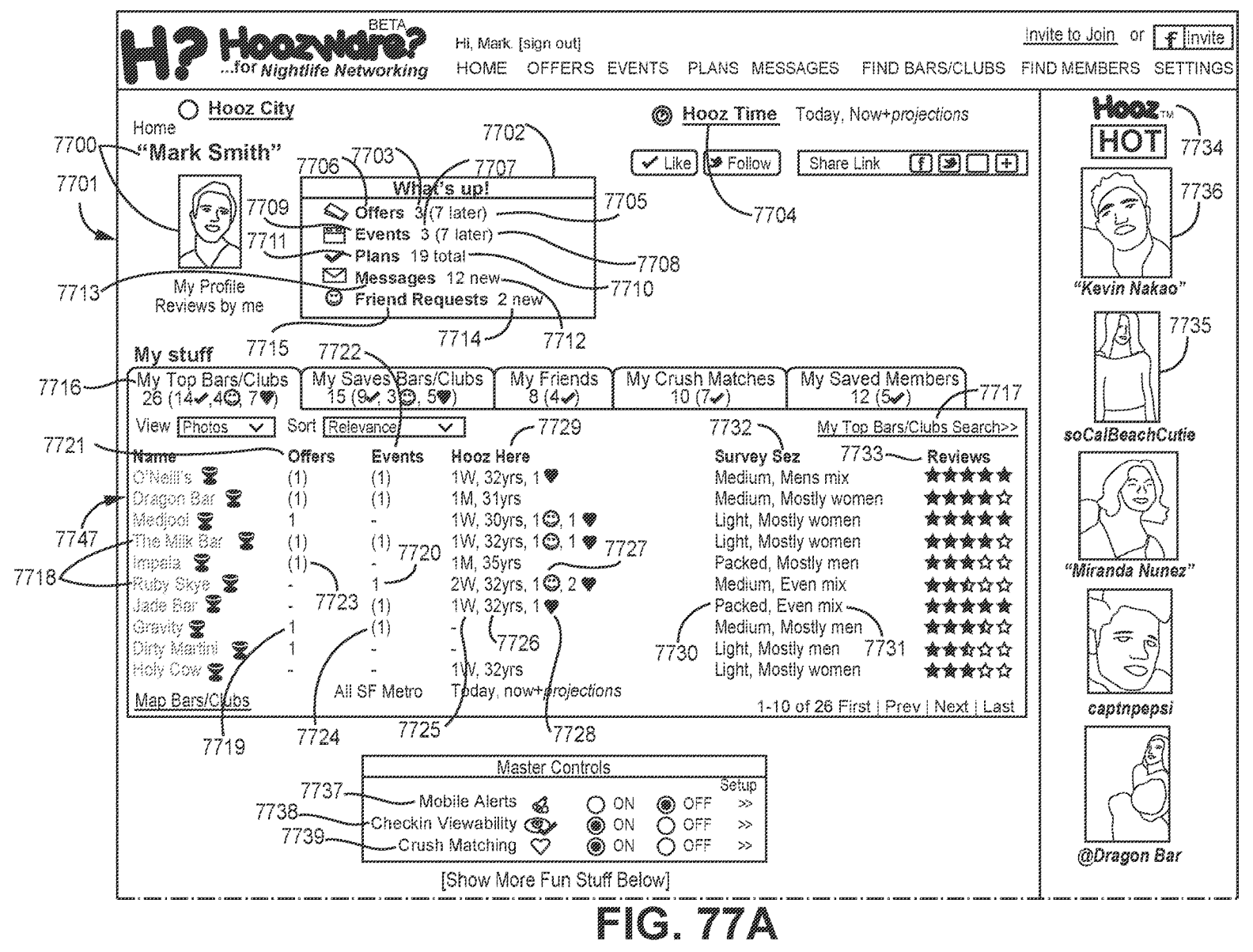

FIG. 77A shows an exemplary desktop Home screen for a signed-in member named Mark Smith 7700 (with Display Name "yurlyricsmymusic"). On a signed-in member's Home page 7701, in a box 7702 entitled "What Up" the member sees a summary of their offers 7703 at the current Hooz Time 7704 (which is currently set to Now+projections), as well as their other offers later 7705 up to 4 am the following morning. These later offers 7705 are listed in parentheses. The word, "Offers" 7706 may be a link to the Offer Center which may list offers today, after today and before today. The number of events 7707 occurring at the specified Hooz Time 7704 are listed, as well as events starting later 7708 until 4 am the following morning, which are listed in parentheses. The word, "Events" 7709 may be a link to the Events Center, which may list events today, after today and before today.

In the example, the number of Plans 7710 for the member 7700 and their friends are listed. The word, "Plans" 7711 may be a link to the Plans Center, which may list all plans for today, after today and before today for the member and their friends. The number of new messages 7712 for the member is listed. The word, "Messages" 7713 may be a link to the Messages Center which lists all messages sent and received. The number of new Friend Requests 7714 for the member is listed. The word, "Friend Requests" 7715 may be a link to the Friends Center which may display all or a portion of current social network friends, friend requests the member sent, and friend requests the member received.

The tab entitled "My Top Bars/Clubs" 7716 provides an exemplary real-time ranked list 7747 of venues that meet the member's specified interests. "Venues" refers to places, typically where people aggregate, including but not limited to pubs, bars, restaurants, nightclubs, coffee shops, cafes, and the like. In the example, the interests are specified by a filter called, "My Top Bars/Clubs Search" 7717, but the filter may be named "My Top Places" or the like. For each venue 7718 in the list, the number of offers 7719 and events 7720 associated with a selected timeframe are shown under column headings of Offers 7721 and Events 7722, respectively. The number of offers 7723 and events 7724 later that day up to 4 am the following morning are shown in parentheses. Also, the number 7725 of each gender checked in, the average age 7726, and their possible classification as a friend (smiley face icon 7727) or Crush Match (heart icon 7728) is indicated under the Hooz Here column heading 7729. The consensus survey of crowd size 7730 and gender mix 7731, as submitted by checked-in members, is listed under the column heading of Survey Sez 7732. The average review rating of each venue is listed under the Review column heading 7733.

There is an exemplary column displayed along the right side of the web page entitled, "Hooz Hot" 7734. This is an exemplary list of preferred photos 7735, videos or other media concerning people, typically members, as voted on by the social networking membership. The photo, video, or other media listed at the top 7736 is the highest vote getter. Voting may take place by someone clicking a "Vote Hooz Hot" button, clicking a "Like" button, or other convenient way to indicate approval, typically while viewing, or shortly after viewing the photo, video, or other media.

Another exemplary column entitled, "Ware's Hot", may be listed instead of, or in addition to, "Hooz Hot" 7734. The Ware's Hot column lists preferred places as voted on by the membership. The "Ware's Hot" column may include list of preferred photos, videos, or other media concerning places, typically pubs, bars, restaurants, nightclubs, coffee shops, cafes, or other places where people aggregate, as voted on by the social networking membership. The photo, video, or other media listed at the top is the highest vote getter. Voting may take place by someone clicking a "Vote Ware's Hot" button, clicking a "Like" button, or other convenient way to indicate approval, typically while viewing, or shortly after viewing the photo, video, or other media. Photos, videos, or other media shown in the Ware's Hot column may be provided by the venue, or they may be taken and posted by a member, such as during the checkin process at that venue, or after redeeming a mobile coupon, or when prompted, such as by a mobile communication device application. The submission of photos, videos, or other media may be incentivized by the promise of a reward. A reward may be a mobile coupon, the playing of a game which may also include a prize, social network honors, or any other convenient incentive.

A member redeeming a mobile coupon for a product, such as a drink or food item, may be requested or required to take a photo, video, or provide other media concerning the product. The photo, video, or other media may be required to be shared with Facebook, Twitter, or other media-sharing services. The photo, video, or other media may be requested or required to include the product and the member. If a photo, video, or other media is not taken or shared, the member may be prevented from accessing other features of the social network service (e.g., redeeming another mobile coupon) for a period of time or until the photo, video, or other media is taken or shared.

Master Controls can make it quick and easy to enable/disable important features with one selection. In the example, the member can enable/disable (1) mobile alerts 7737, (2) their checkin viewability by others 7738, and (3) their participation in Crush Matching 7739, which is a romantic dating service.

Figure 77B:
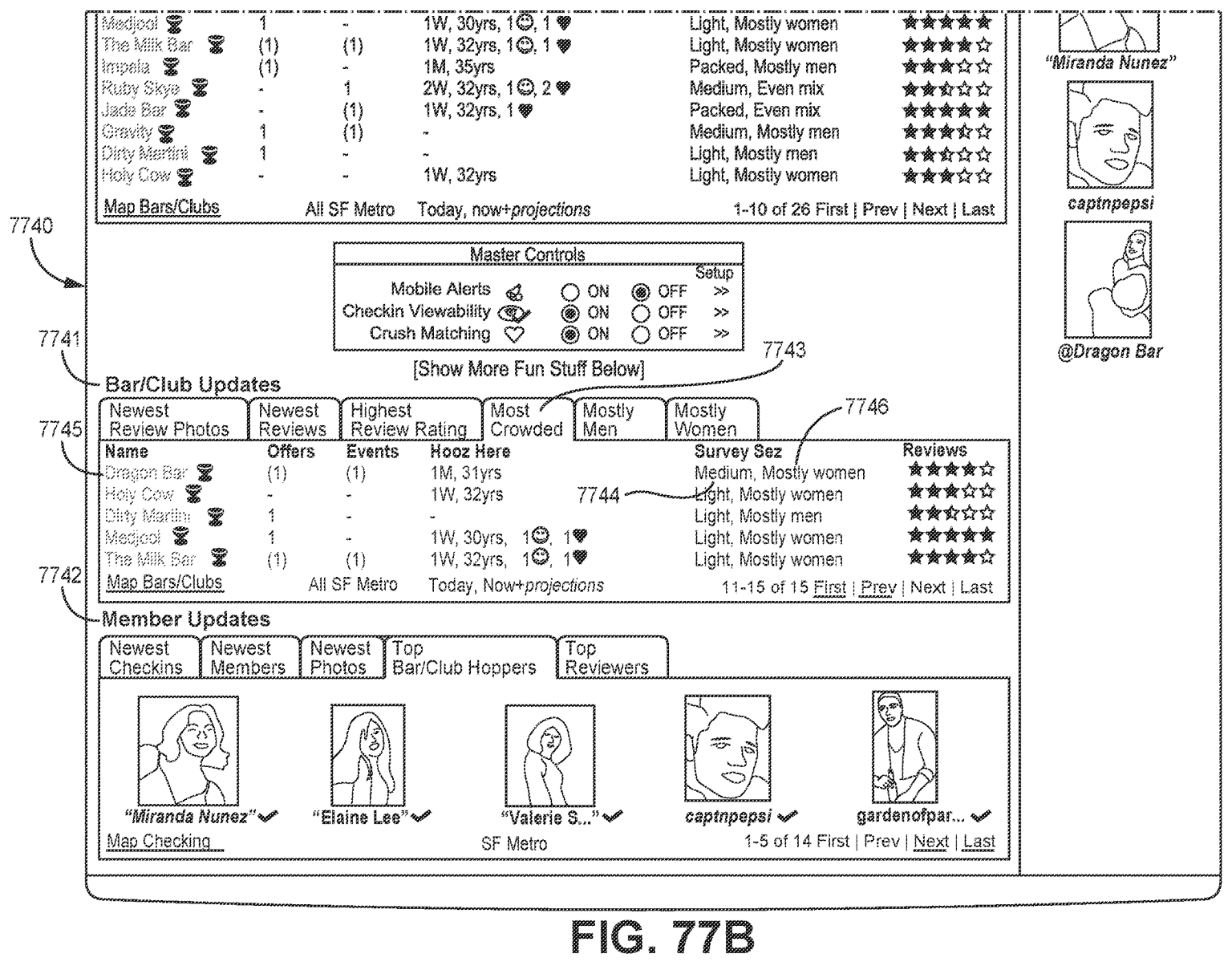

FIG. 77B shows the lower portion 7740 of an exemplary desktop Home screen showing Bar/Club Updates 7741 and Member Updates 7742 in various tabs. For instance, the Most Crowded tab 7743 lists from top to bottom the venues with consensus surveys 7744 indicating the most crowed. Although a venue can be listed as having a "Packed crowd", there are no venues with packed crowds in this example. There is one venue 7745 with a medium crowd 7746, so it is listed at the top.

Figure 78A:
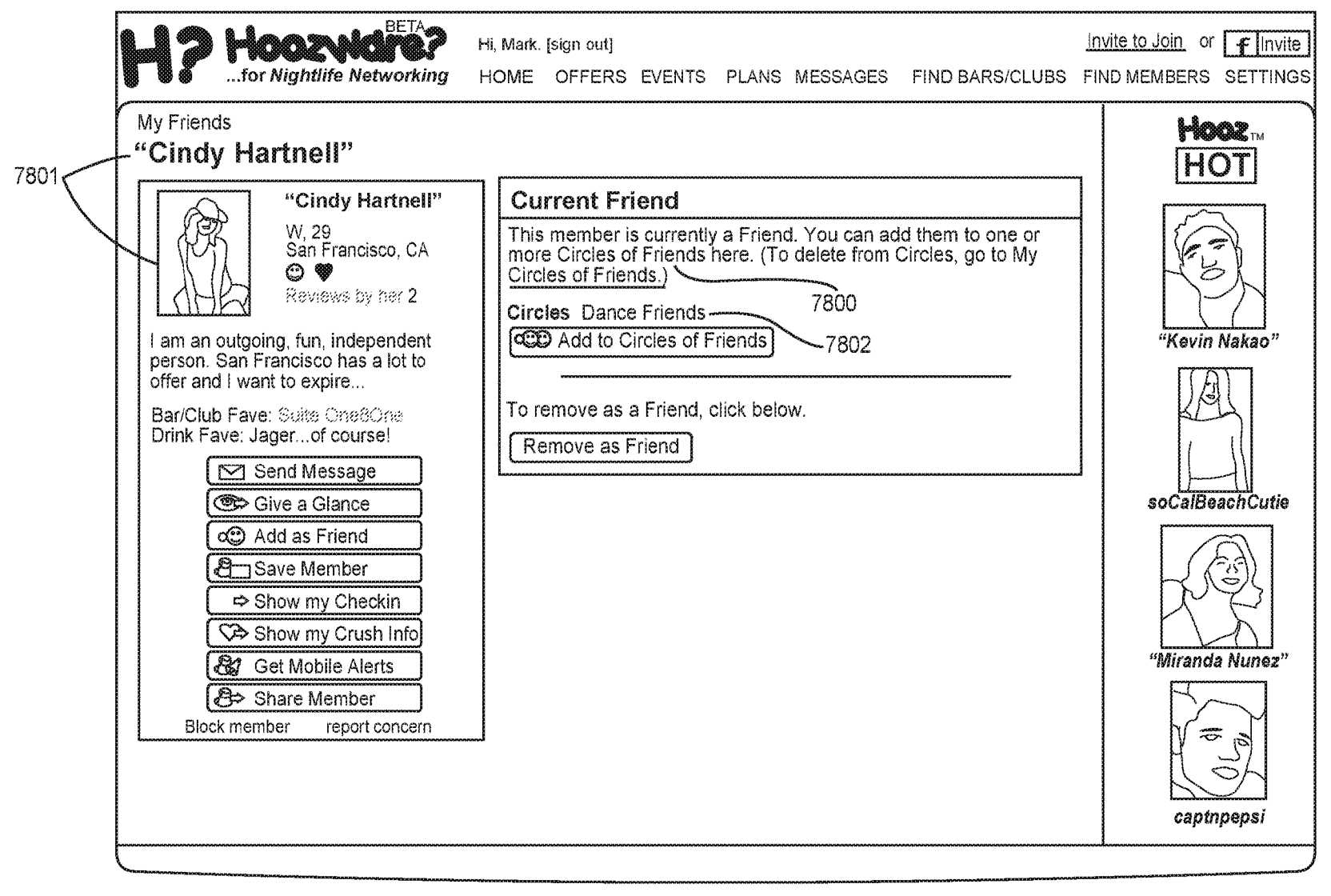

FIG. 78A shows an example of a social network member's social network friends being organized into labeled "circles of friends" 7800. In this case, Mark's friend, Cindy Hartnell 7801, is already in his "Dance Friends" 7802 circle of friends. "Circles of friends" 7800 are a convenient way to organize social network friends into meaningful groups that can be identified with a single label. Each circle of friends for the social network can have different privileges and benefits. Friends may belong to multiple circles of friends. For instance, some circles of friends may be allowed to see when and where Mark is checked in, while other circles might not. A first circle of friends may be allowed to see that Mark checked into a first venue; whereas, a second circle of friends might not be allowed to see that Mark checked into the first venue. Similarly, the second circle of friends may be allowed to see that Mark checked into a second venue; whereas, the first circle of friends might not be allowed to see that Mark checked into the second venue. A particular circle of friends may be selected by the circle label 7802 to receive an email message 7813 so each member in the circle doesn't need to be individually addressed to receive the email message 7813, such as is shown in FIG. 78E. A selected circle of friends may be allowed to see a member's Crush Matching information.

Figure 78B:
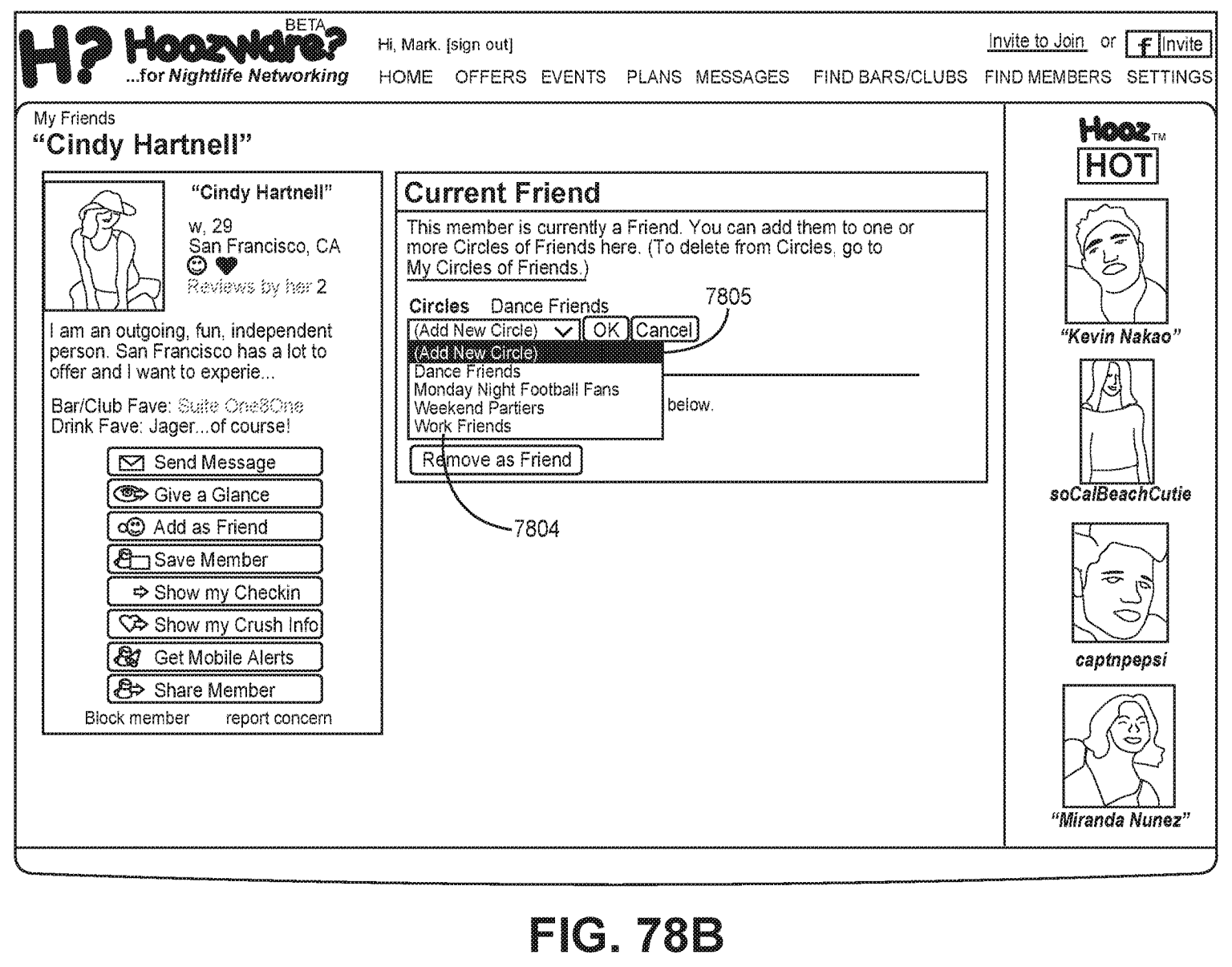

FIG. 78B shows an example of how to add a social network friend to an existing circle of friends 7804 and to create a new circle of friends 7805.

Figure 78C:
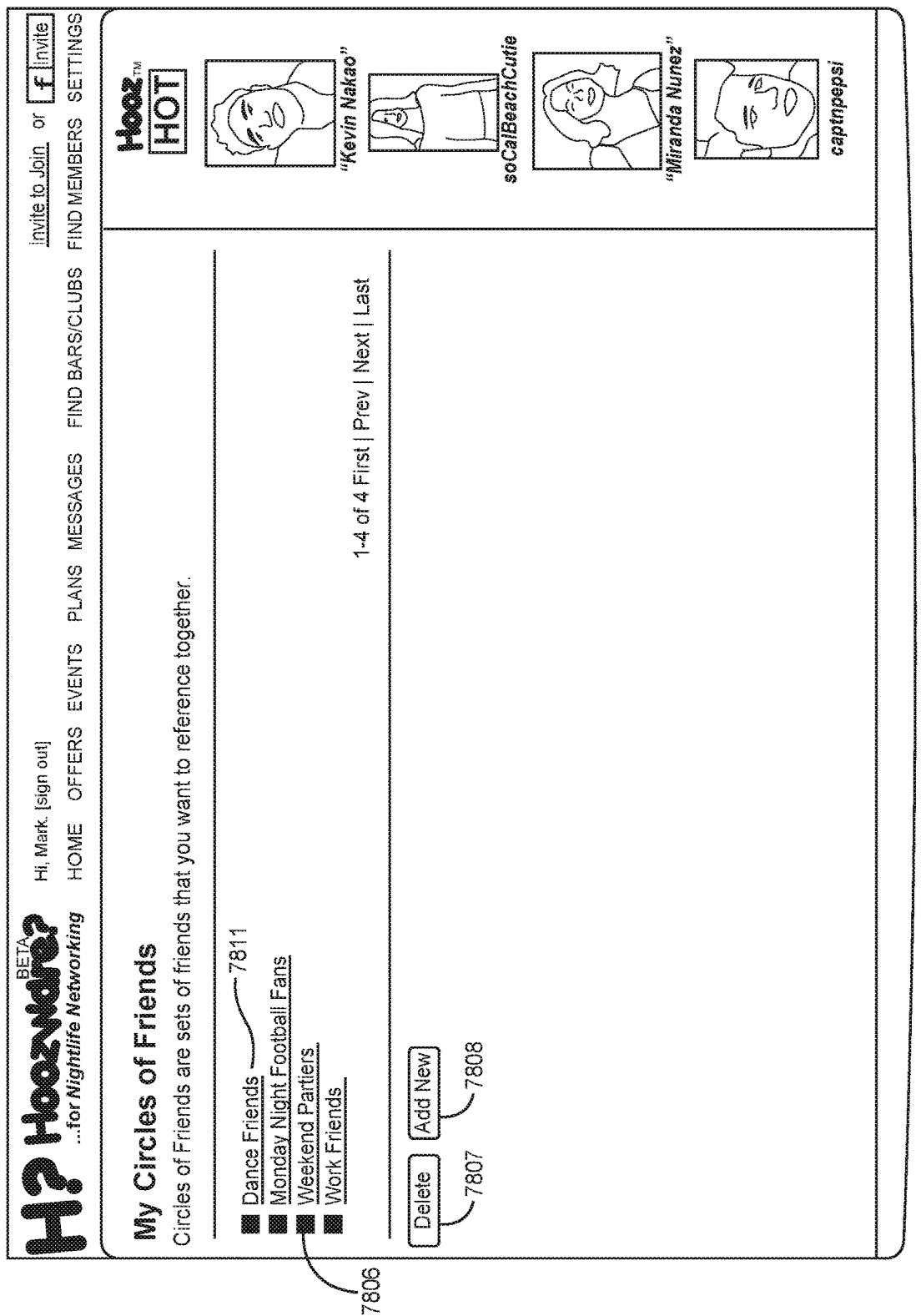
FIG. 78C provides an exemplary list of circles of friends for a particular social network member.

FIG. 78C shows an example list 7806 of all or a portion of circles of friends for a particular social network member. Typically, a circle can be deleted 7807 without deleting the individual members. A new circle can be added 7808 and members assigned to the circle. Members of a circle can be added or deleted, in this example, after selecting the name of the circle, which is a link to a list of members in the circle.

Figure 78D:
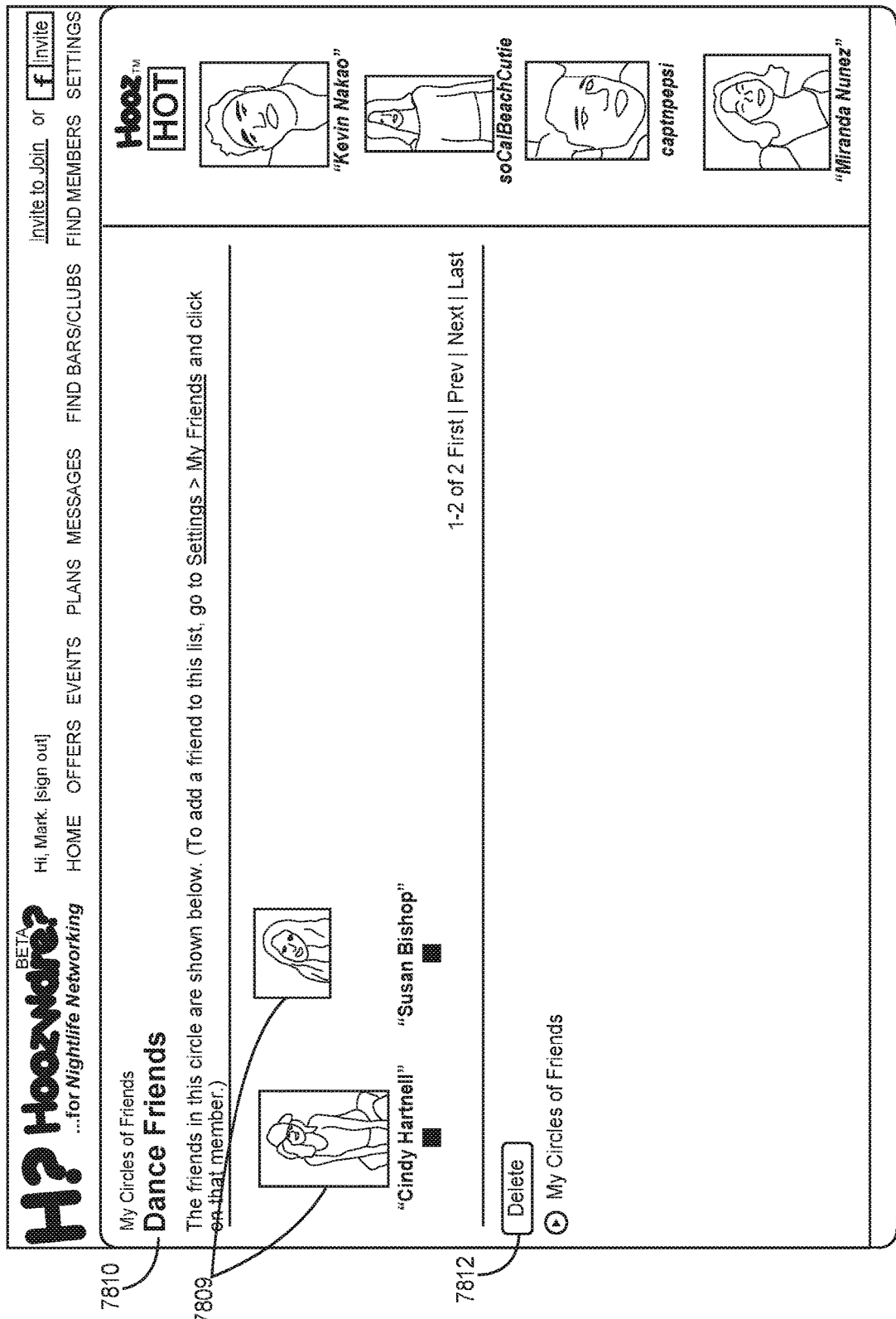
FIG. 78D provides an example with two members in the "Dance Friends" circle of friends.
Figure 78E:
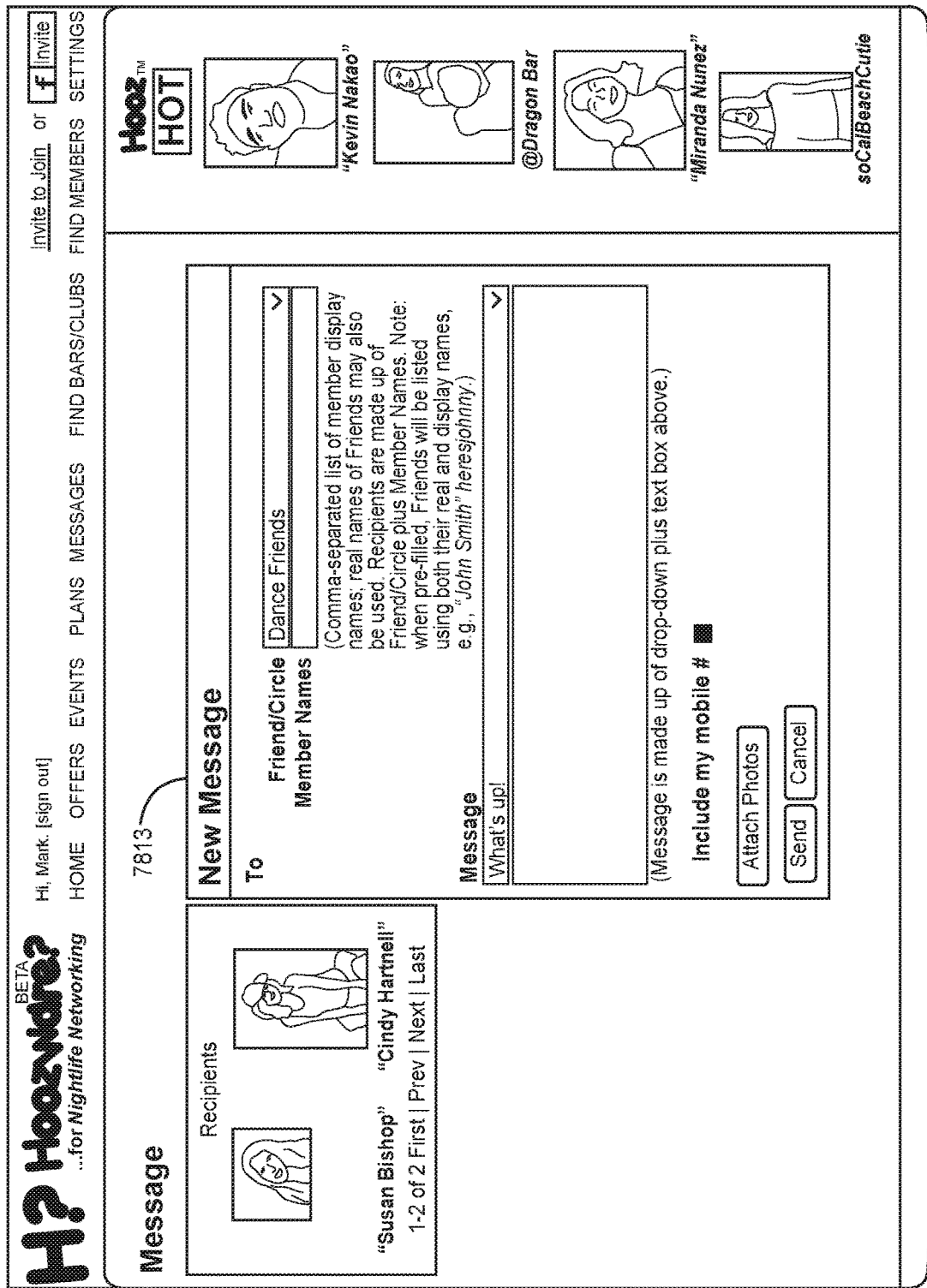
FIG. 78E exemplifies selecting a circle of friends to receive an email.

FIG. 78D shows an example with two members 7809 in the "Dance Friends" circle 7810 of friends. For instance, this list of members is shown by selecting the "Dance Friends" link 7811 shown in FIG. 78C. Members can be selected and deleted 7812 from this circle of friends.

FIG. 78E shows an exemplary benefit of using circles of friends where a particular circle of friends may be selected by the circle label 7802 to receive an email message 7813 so each member in the circle of friends doesn't need to be individually addressed to receive the email message 7813.

Figure 79:
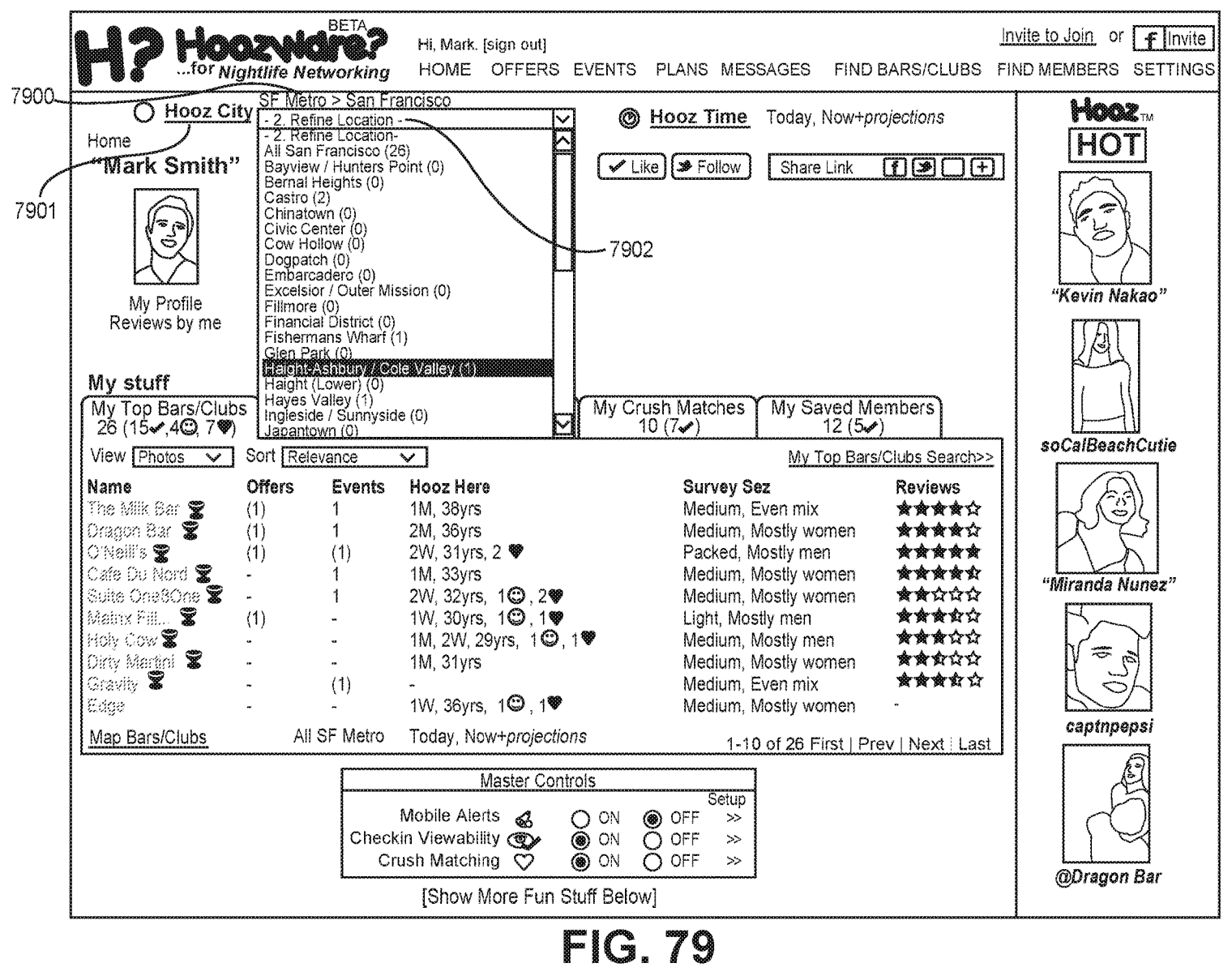

FIG. 79 shows an example of how to specify a desired geographical region 7900 of interest denoted by the Hooz City label 7901. Some regions have sub-regions which can be further selected with "Refine Location" 7902. Typically, data on the social network website or application that concern venues and other places is restricted to show only venues or other places relevant to the selected Hooz City 7901.

Figure 80A:
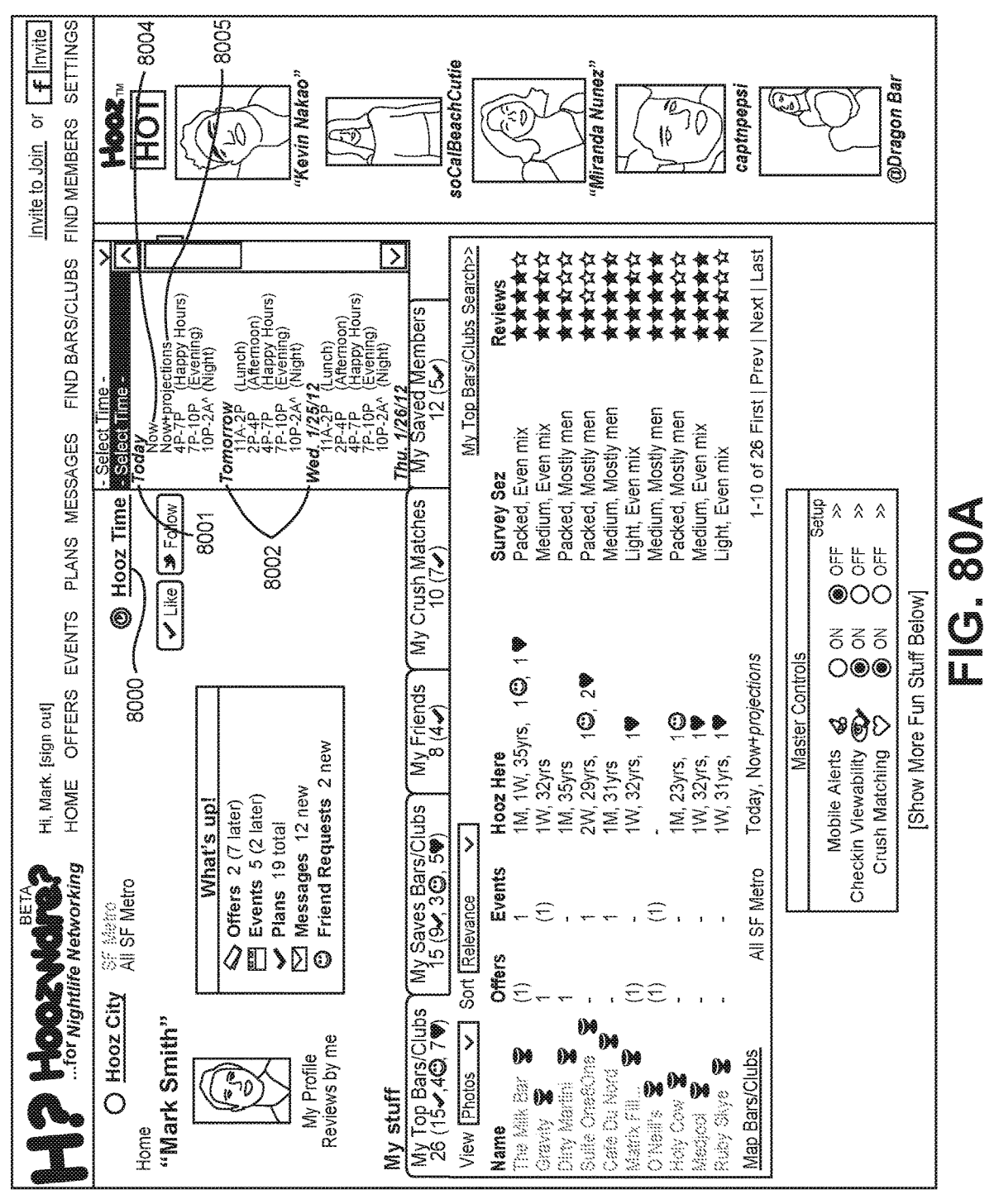

FIG. 80A shows an example of how to specify a desired timeframe of interest denoted by the Hooz Time label 8000. Desired timeframes for Hooz Time may be for the present time 8001, or for the future 8002 or past. Timeframes may be at a discrete moment in time, such as 4 pm, or may cover a time range, such as 4-7 pm 8003. Typically when a Hooz Time is selected other than "Now" 8004 or "Now+projections" 8005, all data associated with that timeframe is displayed in italics to draw attention to the fact that the data isn't for "now".

Figure 80B:
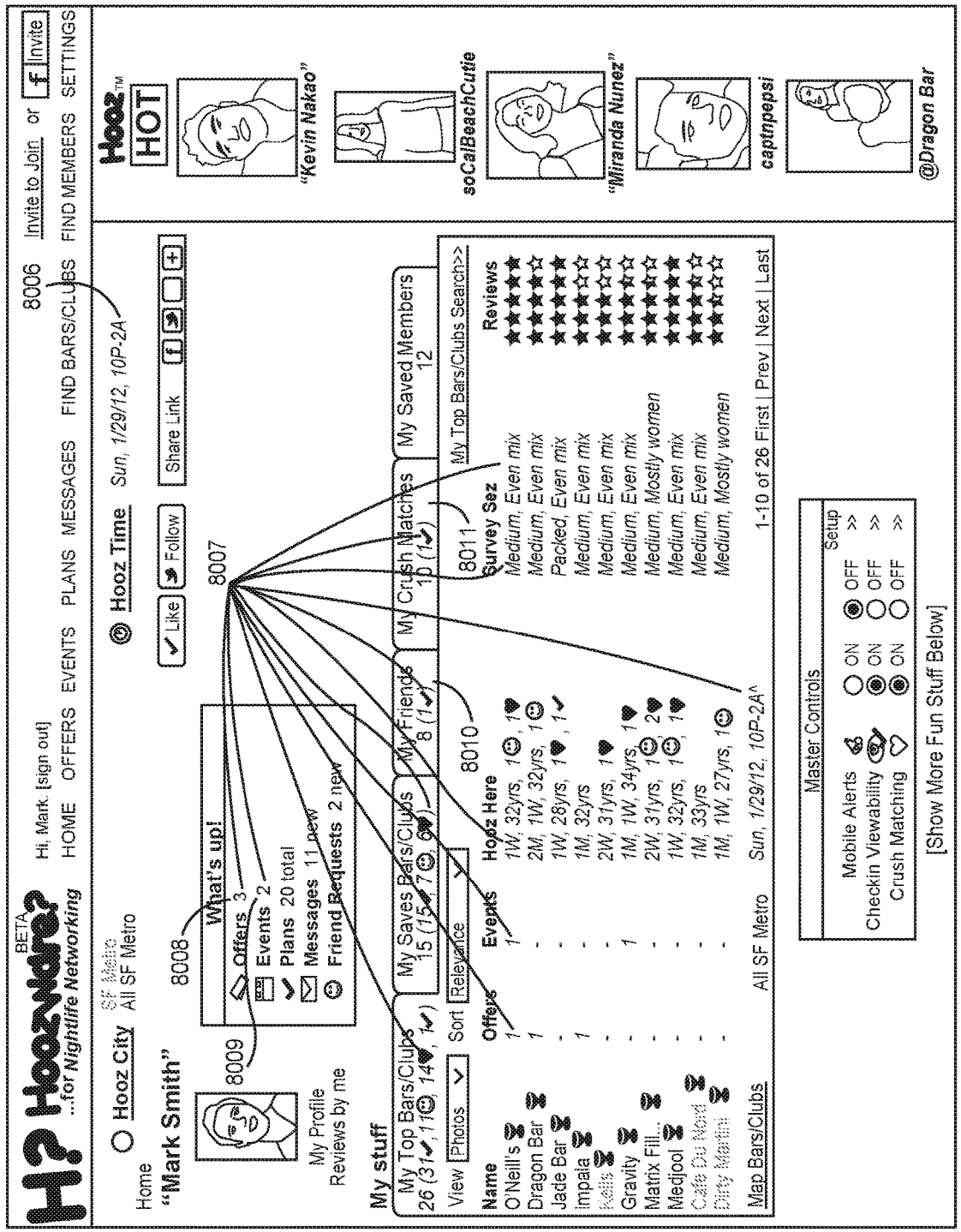
FIG. 80A exemplifies how to specify a desired timeframe using Hooz Time, and FIG. 80B exemplifies Hooz Time set to a future day.

FIG. 80B shows an example of Hooz Time set to a future day, in this case it is set to Sun, Jan. 29, 2012, 10 pm-2 am 8006 (i.e., 2 am the following morning), which when selecting was also given a name of "Night". Timeframes set to the future may cause associated data to be displayed in italics 8007. Actual offers 8008 and events 8009 scheduled for the future timeframe are typically listed. Checkins, including checked-in friends 8010 and romantic interests (which are referred to as "Crush Matches" 8011), as well as the consensus survey for that timeframe are projected based on prior data. For instance, data from the prior four weeks for that day and time may be used to project the data for the same day and time of the subsequent week.

When Hooz Time is set to "Now", typically all displayed data is real time (or relatively recent), current and actual data. When Hooz Time is set to "Now+projections", if a venue has no actual real-time data corresponding to the present time, i.e., "Now", but there is "projected" data based on prior weeks at a similar time for that venue, it will be displayed in italics 8007. This helps people viewing the website to get an idea about the "typical" crowd demographics and makeup at a venue for a particular time, even if there is no social network member checked in there currently to provide the actual "Now" crowd survey.

Figure 81:
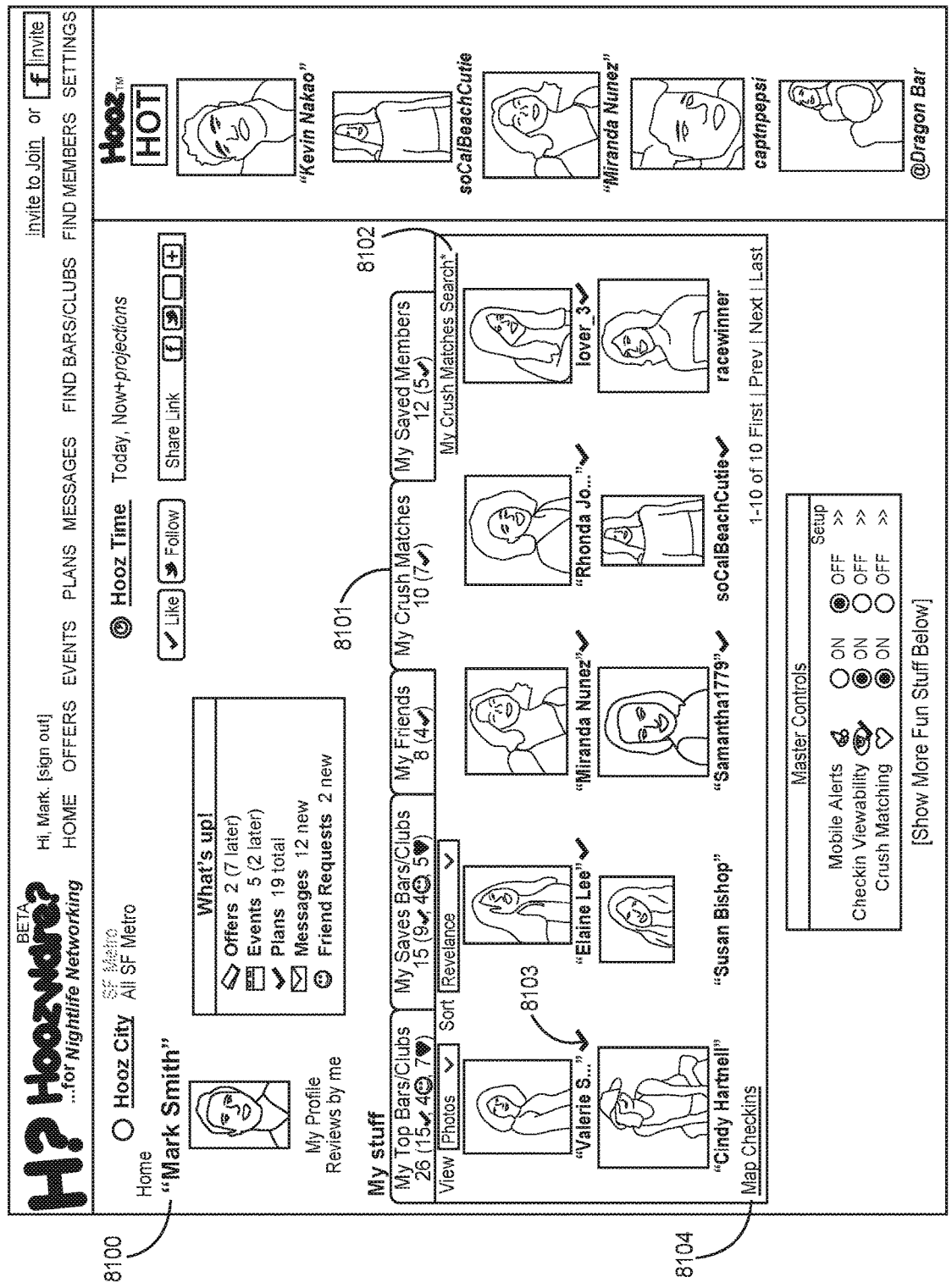
FIG. 81 provides an exemplary list of "Crush Matches".

FIG. 81 shows an exemplary member's list 8100 of other members who are romantic interests, which are referred to here as "Crush Matches" on the "My Crush Matches" tab 8101. Crush Matches are determined in real time by a filter named, "My Crush Matches Search" 8102. Crush Matches who are checked in currently at a venue have a check mark 8103 displayed after their Display Names. The places where members are checked in can be mapped by selecting "Map Checkins" 8104.

The subject invention includes the use of a mobile communication device of a member of a social network to gather any of real-time demographic data, real-time survey data, real-time characteristic data of a venue, real-time photos, real-time videos, or other real-time media of a venue or its customers, collectively referred to here as "Gathered Real-time Data". The Gathered Real-time Data may be stored on a data server of the social network organization comprising the members.

The Gathered Real-time Data may be analyzed to provide "Analyzed Real-time Data". Such analysis may include determining the number of members of each gender at the venue, the average age of members at the venue, and whether a member has friends or romantic interests (e.g., Crush Matches) at the venue. The Analyzed Real-time Data may be stored on the data server of the social network organization.

Data about which mobile coupons are available at the venue now and later in the day, and which events are currently occurring or are scheduled to occur later in the day (e.g., up to 4 am the following morning), is referred to as "Offer/event Data". The Offer/event Data may be stored on the data server of the social network organization.

"Packet Data" includes at least a portion of Gathered Real-time Data, Analyzed Real-time Data, and Offer/event Data, and in particular includes but is not limited to one or more of (1) the date and time associated with the data, (2)

who is currently at the venue, which may include the member posting the data as well as others there, where the others there may be checked in or not, (3) the number of each gender checked in, (4) the average age, (5) the number of friends (which may be denoted by a smiley face icon), (6) the number of romantic interests (which may be denoted by a heart icon), (7) the crowd demographics, which may include the crowd size and gender mix based on surveys, (8) which mobile coupons are redeemable now and later in the day, (9) what events are occurring now and later in the day (or up to a time the following morning, such as 4 am), (10) answers to other member survey questions, where exemplary answers to survey questions include "there is great live music", "there is no cover charge", "the appetizers are delicious", "the ballgame is on TV", and the like, (11) photos, videos, and/or other media submitted by members, which may be submitted as part of the checkin process, and (12) results of games, such as a survey-incentive bonus game, for instance "10 people just won the Checkin Bonus Game!"

The Packet Data may be stored on the data server of the social network organization.

Packet Data may be provided for display on a website, which may be the website of a 3rd party which is not the organization providing the social network service to which the members belong. That is, members of the organization providing the social network service may generate Packet Data that is of interest to others, and where the Packet Data the members generate may be provided or otherwise shared with other media- or information-sharing services to expand the number of other people able to benefit from the Packet Data.

Figure 82A:
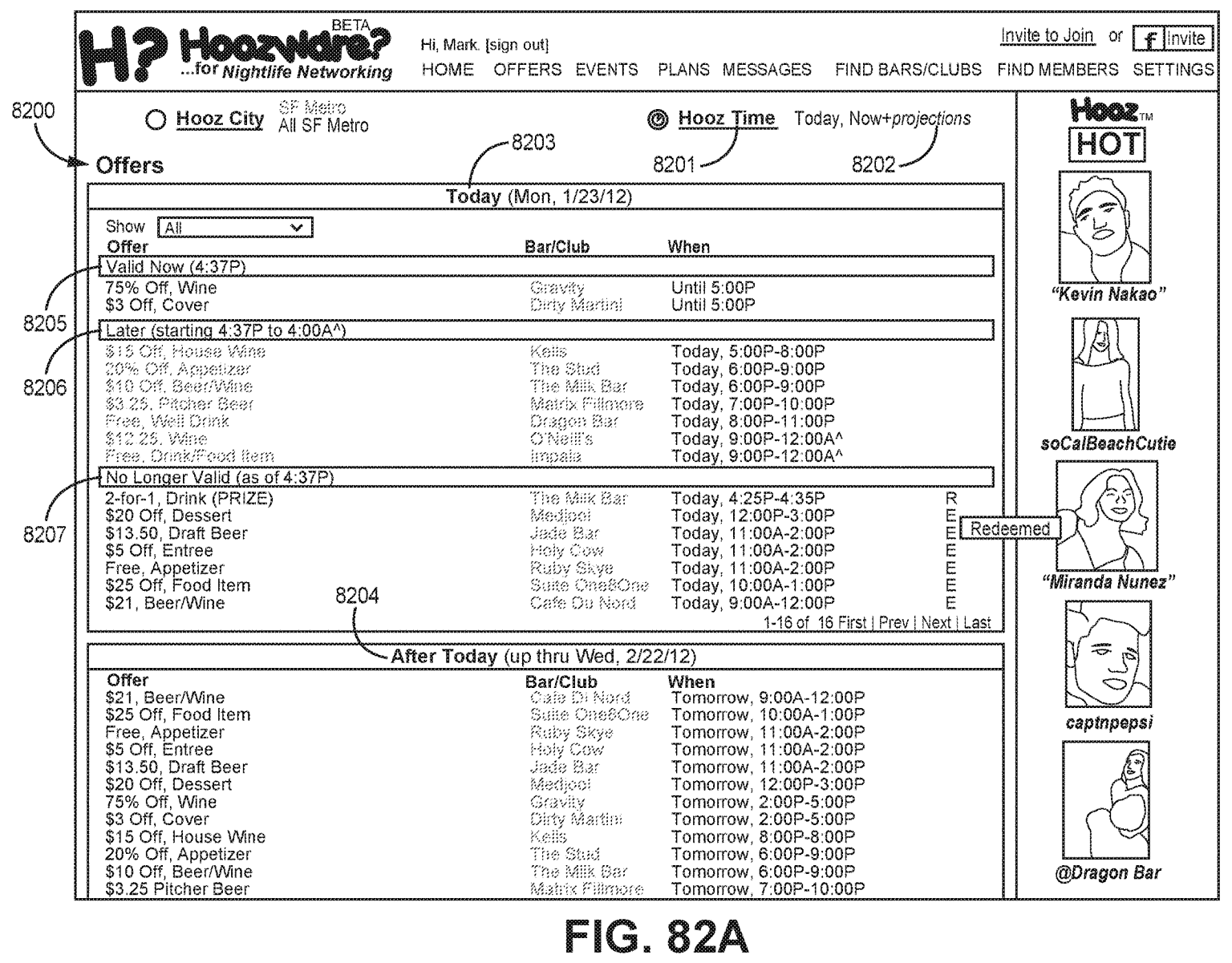

FIG. 82A shows an exemplary Offer Center 8200. In the exemplary Offer Center 8200, when Hooz Time 8201 is set to "Now" or "Now+projections" 8202, offers are classified as (1) Today 8203, (2) After Today 8204, and (3) Before Today. Offers for "Today" 8203 are sub-classified as (A) Valid Now 8205, (B) Later 8206, and (C) No Longer Valid 8207. When the Hooz Time is set for a future timeframe, the naming convention is shifted accordingly.

Figure 82B:
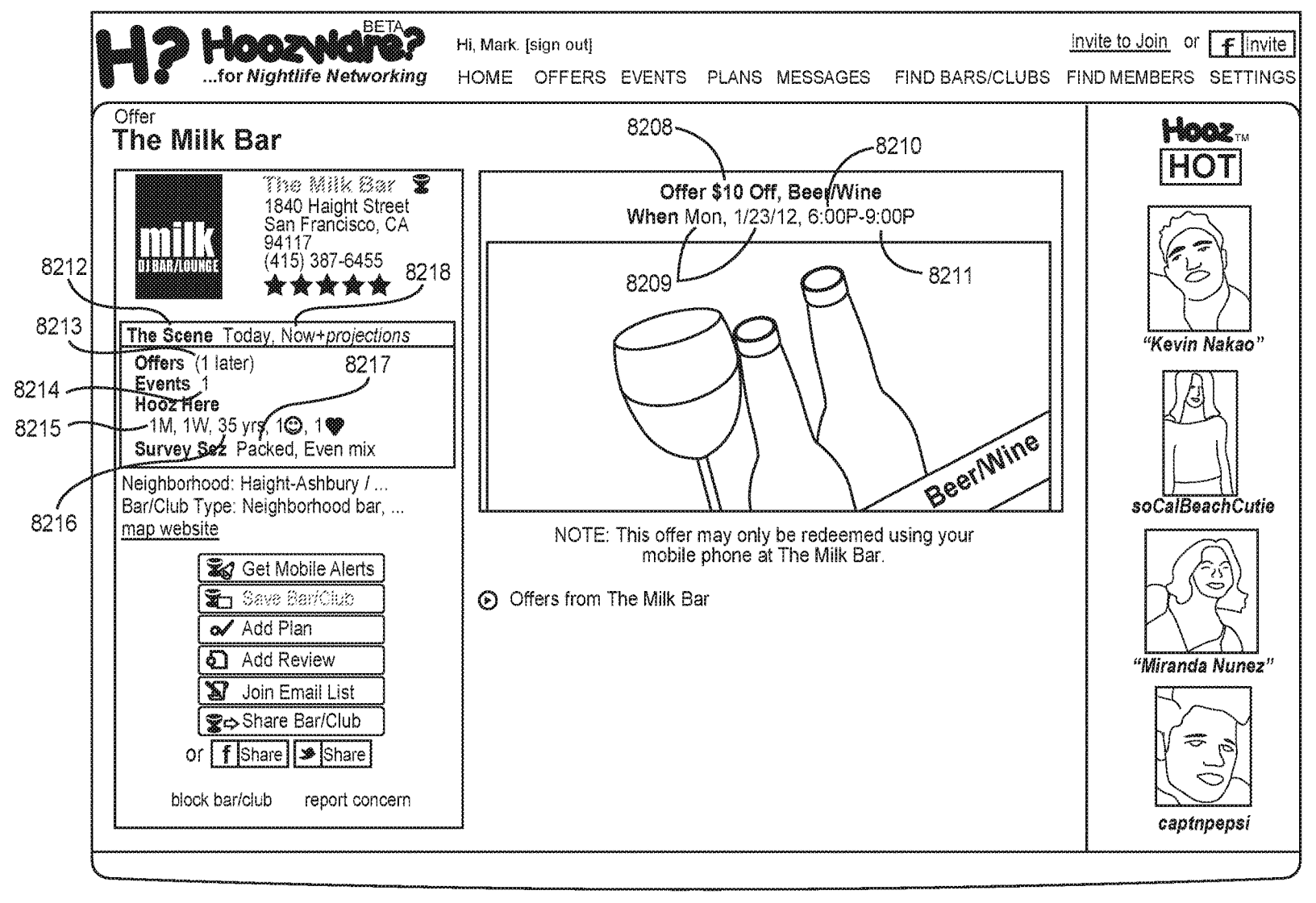

FIG. 82B shows an exemplary offer description 8208, starting day 8209 and time 8210, and ending day and time 8211 for a selected offer for a particular venue.

An exemplary venue preview listing is displayed along the left side of the web page. Central to the preview is a boxed region entitled, "The Scene" 8212. It lists the offers 8213, events 8214, checkins by gender 8215 and typical age 8216, and the consensus of surveys 8217 submitted corresponding to the selected Hooz Time timeframe, which in this example is set to "Now+projections" 8218. The Scene may also include photos, videos or other media submitted by members who were at the venue and submitted photos, videos, or other media corresponding to the Hooz Time timeframe. Other venue demographics and characteristics corresponding to the Hooz Time timeframe may be included in The Scene. In general, The Scene may include all or any portion of Packet Data, and references to The Scene data in the subject application may be replaced with references to Packet Data. When Hooz Time is set to "Now", the data in The Scene box is typically real-time information that is time sensitive and can change quickly. If Hooz Time is set to another timeframe, the data in The Scene box corresponds to that timeframe. Buttons 8219 are also shown that produce desired actions for the venue.

Figure 83A:
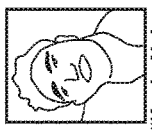
FIG. 83A provides an exemplary Event Center, FIG. 83B provides an exemplary event, and FIG. 83C exemplifies adding a plan.

FIG. 83A shows an exemplary Events Center 8300. In the exemplary Events Center 8300, when Hooz Time 8301 is set to "Now" or "Now+projections" 8302, events are classified as (1) Today 8303, (2) After Today 8304, and (3) Before Today. Events for "Today" are sub-classified as (A) Occurring Now 8306, (B) Later 8307, and (C) No Longer Occurring 8308. When the Hooz Time is set for a future timeframe, the naming convention is shifted accordingly.

Figure 83B:
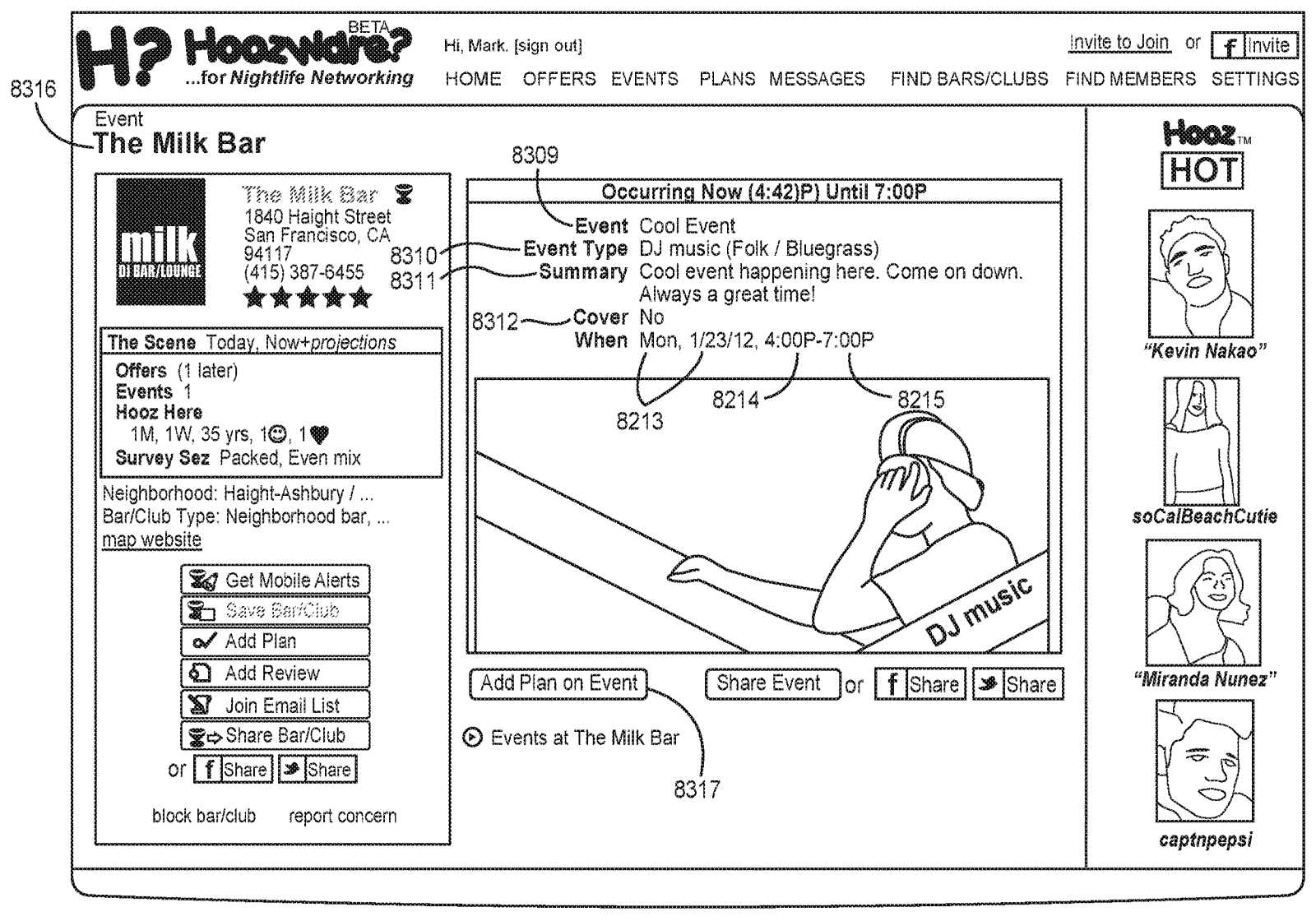

FIG. 83B shows an exemplary event name 8309, event type 8310, event summary 8311, whether there's a cover charge 8312, and the starting day 8313 and time 8314, and ending day and time 8315 for a selected event for a particular venue 8316.

Figure 83C:
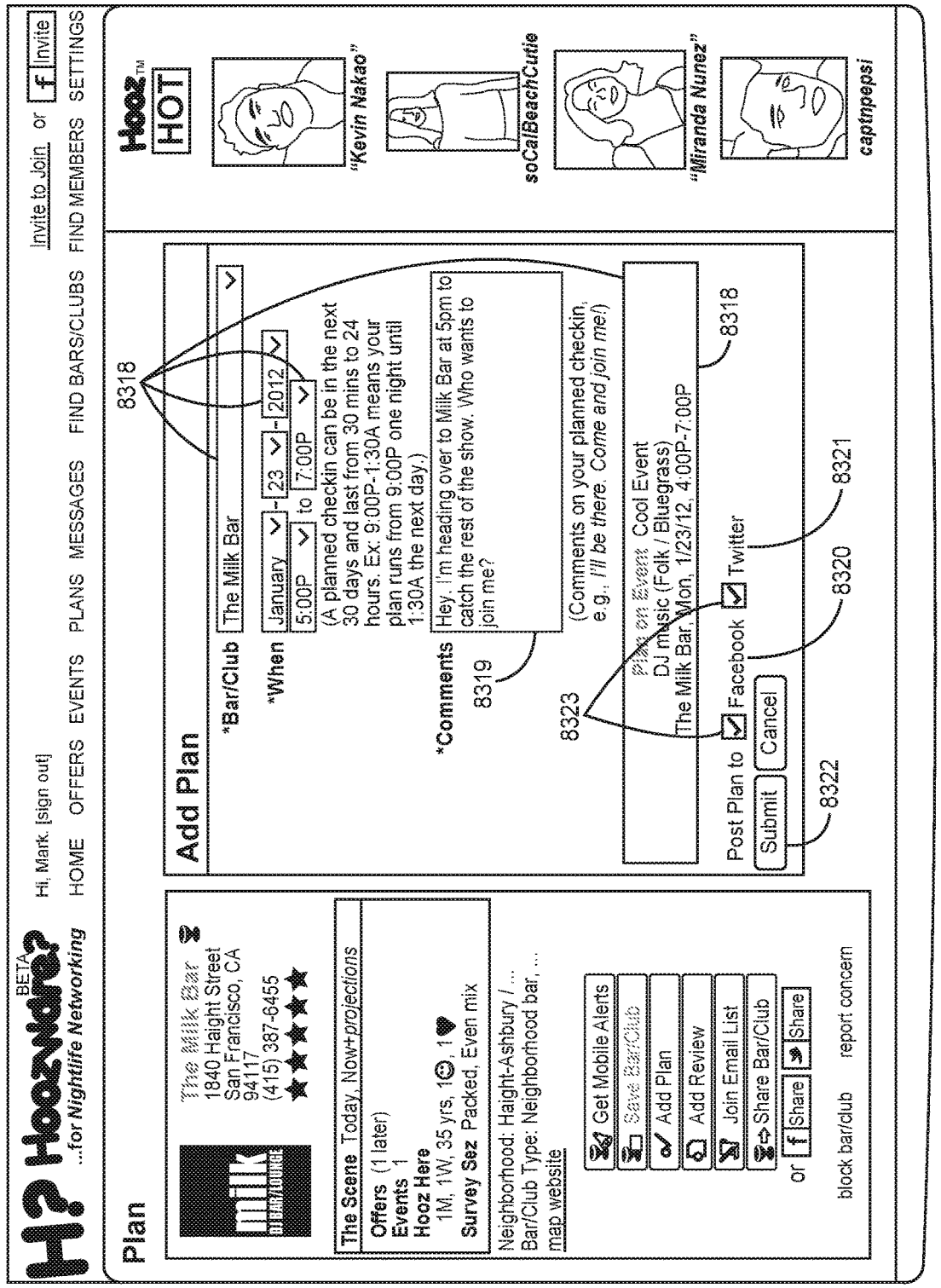

FIG. 83C shows an example of what is displayed when "Add Plan on Event" 8317 is selected in FIG. 83B. In the example, details concerning the event are pre-filled 8318, and the member is prompted to add a comment 8319. The plan can be posted to Facebook 8320, Twitter 8321 or other media-sharing services by checking the corresponding boxes 8323 before selecting "Submit" 8322.

FIG. 84A shows an exemplary Plans Center 8400. The exemplary plan added in the example of FIG. 83C is shown at the top 8401 of the list.

Figure 84B:
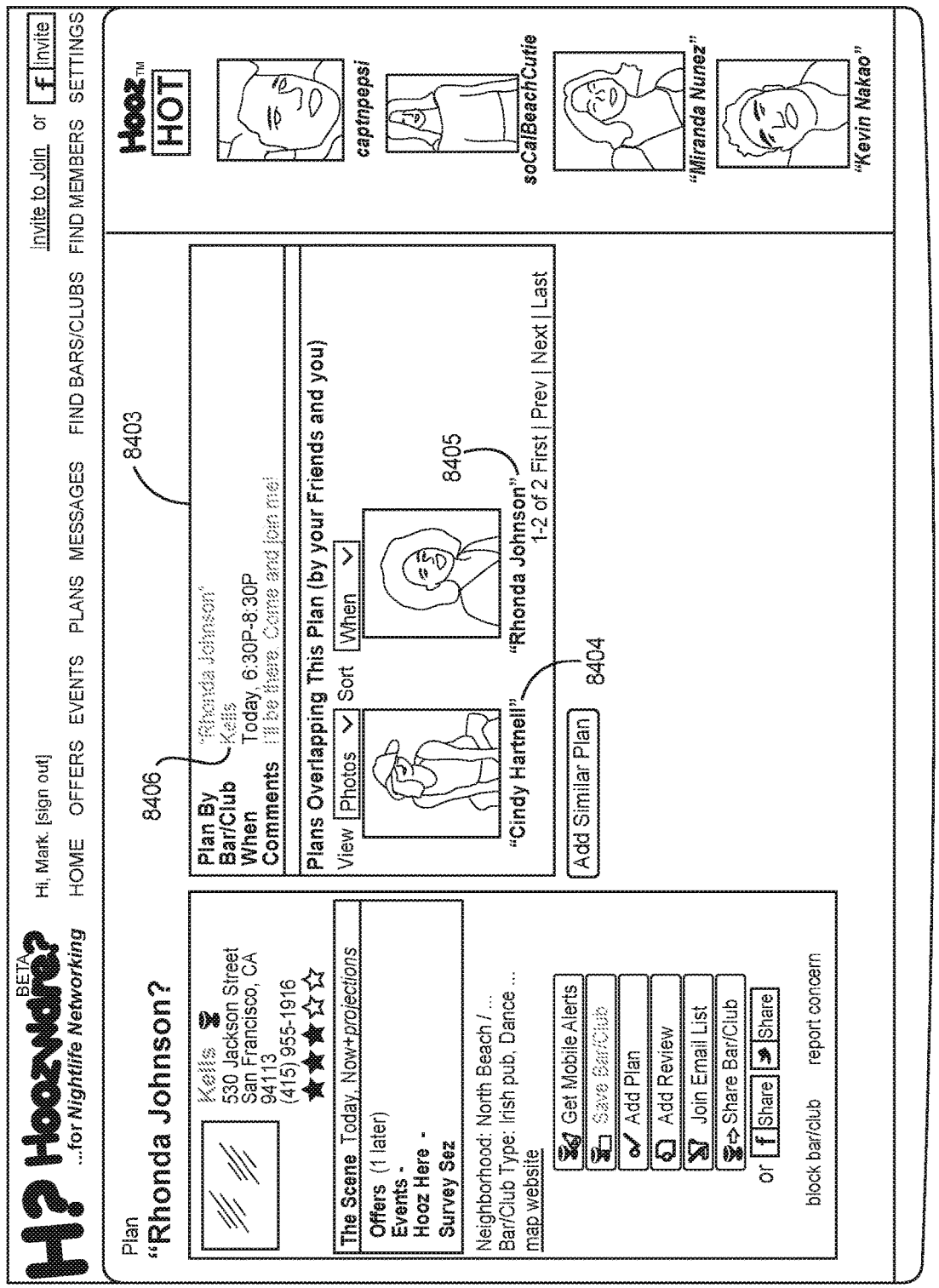
FIG. 84A provides an exemplary Plan Center, and FIG. 84B provides an exemplary plan.

FIG. 84B shows an example of what is shown when the comment field 8402 for a plan in FIG. 84A is selected. The selected member's plan 8403 is shown, and their profile picture 8404 is shown near profile pictures of other friends 8405 who have an overlapping plan, i.e., a plan for the same venue 8406 where at least portions of the timeframes of the two plans overlap.

Figure 85:
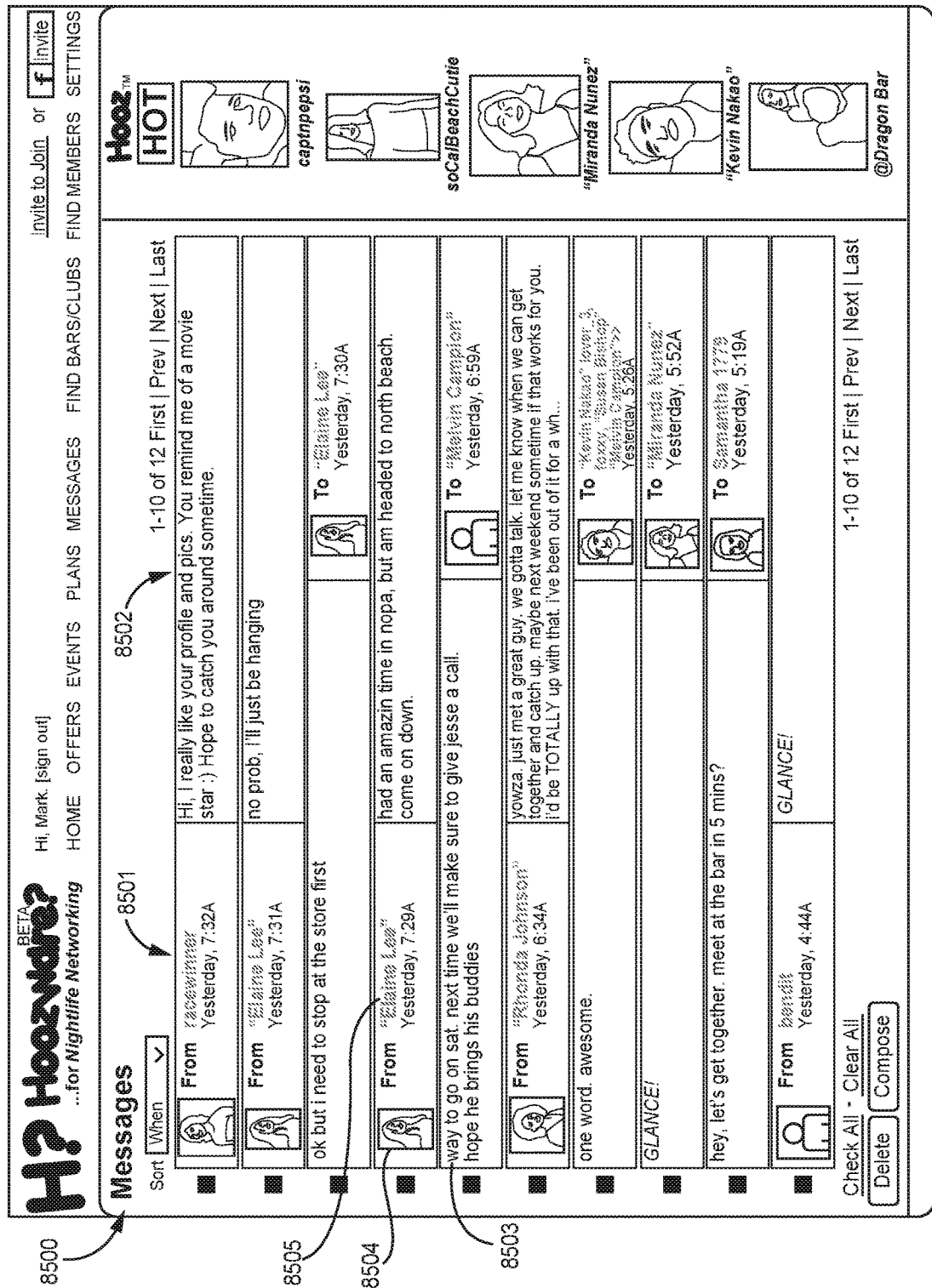
FIG. 85 provides an exemplary Message Center.

FIG. 85 is an exemplary Messages Center 8500. In the example, members shown on the left side 8501 of the web page are members the message came from. Members shown on the right side 8502 of the web page are members the message was sent to. Clicking on the text of the message 8503 displays the full message and provides buttons to Reply, Reply-All, and Compose. Clicking on the profile picture 8504 of a member or the member's name 8505 displays the member's social network profile.

Figure 86A:
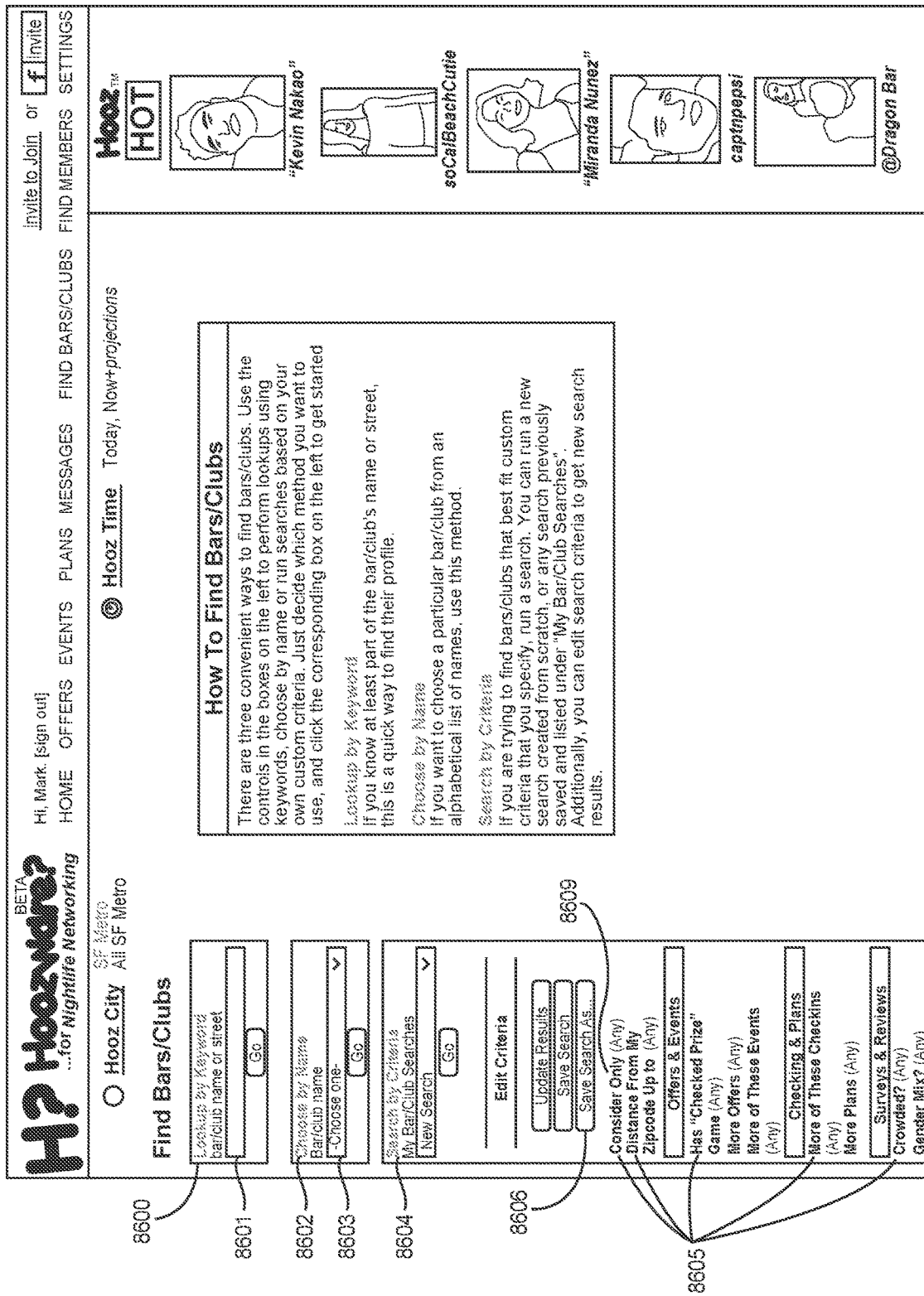
FIG. 86A provides three exemplary "find" features for finding a desire venue or list of venues.

FIG. 86A shows three exemplary "find" features for finding a desired venue or list of venues. The first is "Lookup by Keyword" 8600, where a portion of the venue name, street or venue type is entered 8601. The second is "Choose by Name" 8602, where each venue for a particular Hooz City is listed and selectable 8603. The third is "Search by Criteria" 8604, where different desired venue criteria 8605 are selected. The criteria can also be specified as a "must have" or a "preference only". To change one of the criteria 8605, the label 8609 is selected, e.g., clicked with a mouse, and the criteria choices are displayed. When a set of various criteria is selected, that set can be saved 8606 with a name to make it easy to select the same criteria in the future.

Figure 86B:
FIG. 86B provides exemplary venue search criteria.

FIG. 86B shows an exemplary set of criteria 8607 named, "My Top Bars/Clubs Search" 8608. This set of criteria corresponding to the name, "My Top Bars/Clubs Search" 8608, "My Top Places", or similar concept, may be used on the Home page 7701 to determine in real time the list of venues under the "My Top Bars/Clubs" 7716 (or related name) tab. To change one of the criteria 8607, the label 8610 is selected, e.g., clicked with a mouse, and the criteria choices are displayed and selectable.

Figure 86C:
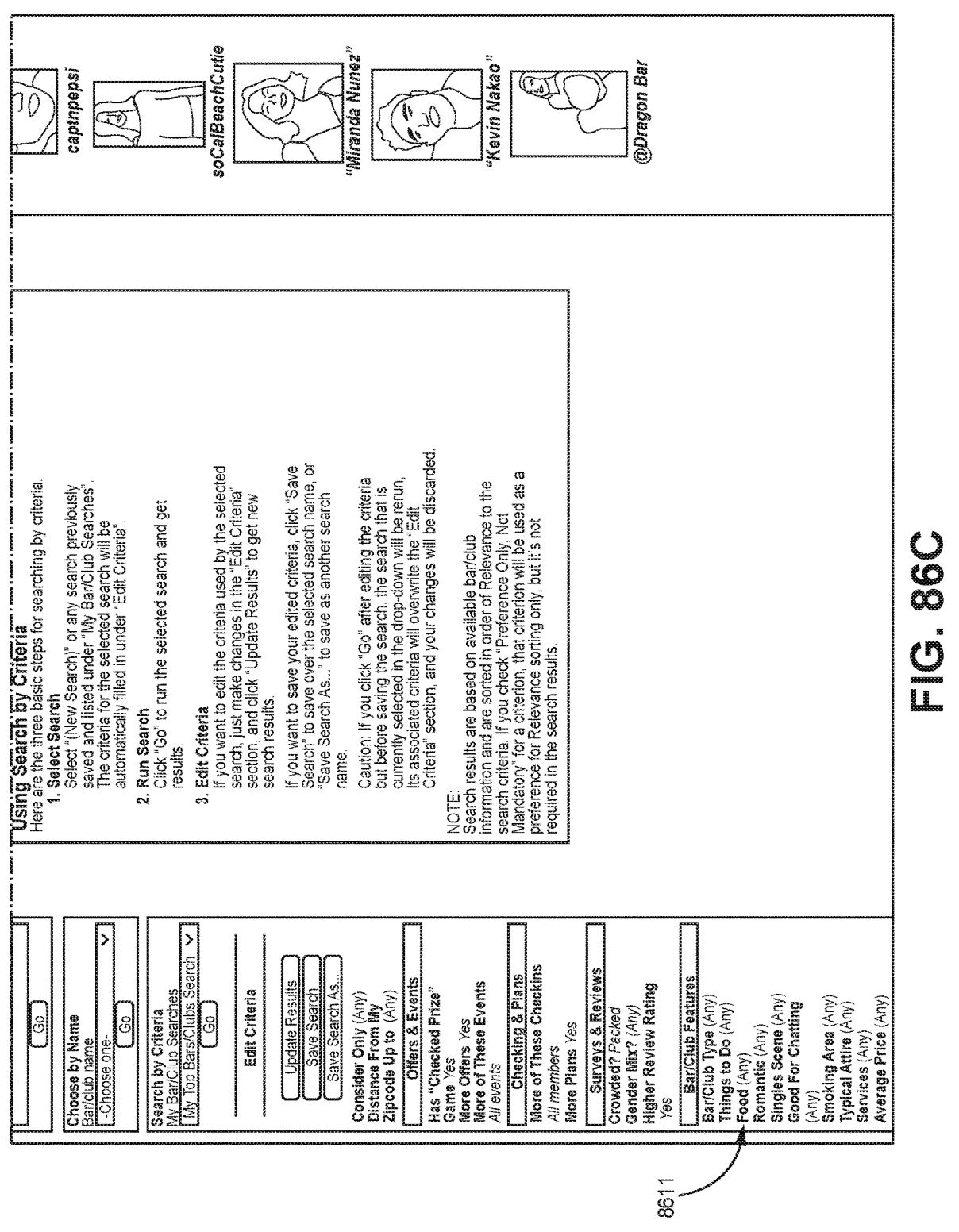

FIG. 86C shows the rest of the column 8611 of exemplary search criteria that can be selected.

Figure 87A:
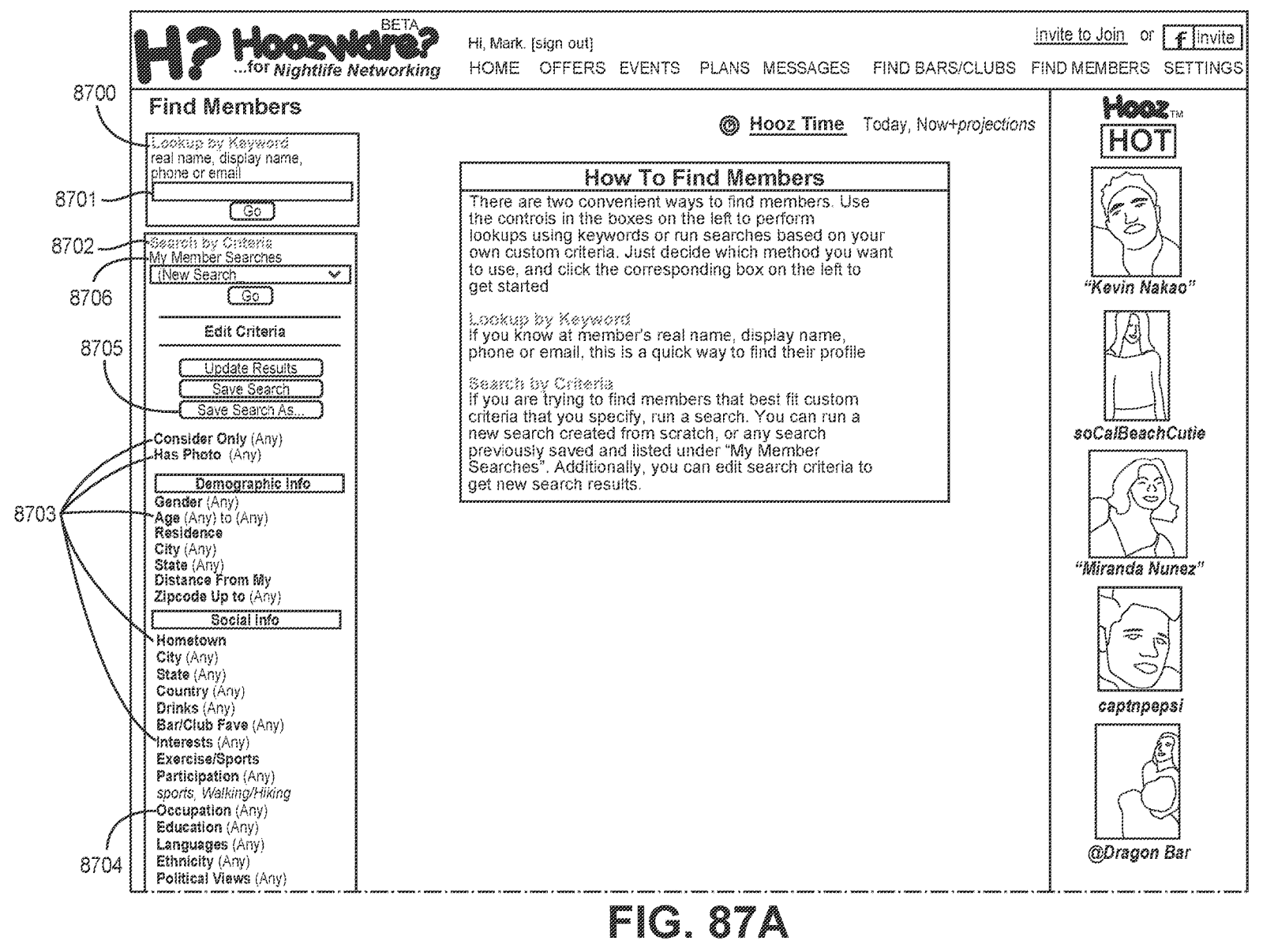

FIG. 87A shows two exemplary "find" features for finding a desired member or list of members. The first is "Lookup by Keyword" 8700, where a portion of the person's real name, display name, phone number or email address is entered 8701. The second is "Search by Criteria" 8702, where different desired member criteria 8703 are specified. The criteria can also be specified as a "must have" or a "preference only". To change one of the criteria, its label 8704 is selected, e.g., clicked with a mouse, and the criteria choices are displayed and selectable. After a set of criteria is selected, that set can be saved 8705 with a name to make it easy to select the same criteria in the future from "My Member Searches" 8706.

FIG. 87B shows an exemplary set of criteria named, "My Crush Matches Search" 8707. This set of criteria may be used on the Home page to determine the list of members displayed under the "My Crush Matches" tab 8105. To change one of the criteria, its label 8708 is selected, e.g., clicked with a mouse, and the criteria choices are displayed and selectable.

FIG. 87C shows more 8709 of the exemplary column of search criteria that can be selected.

Figure 88:
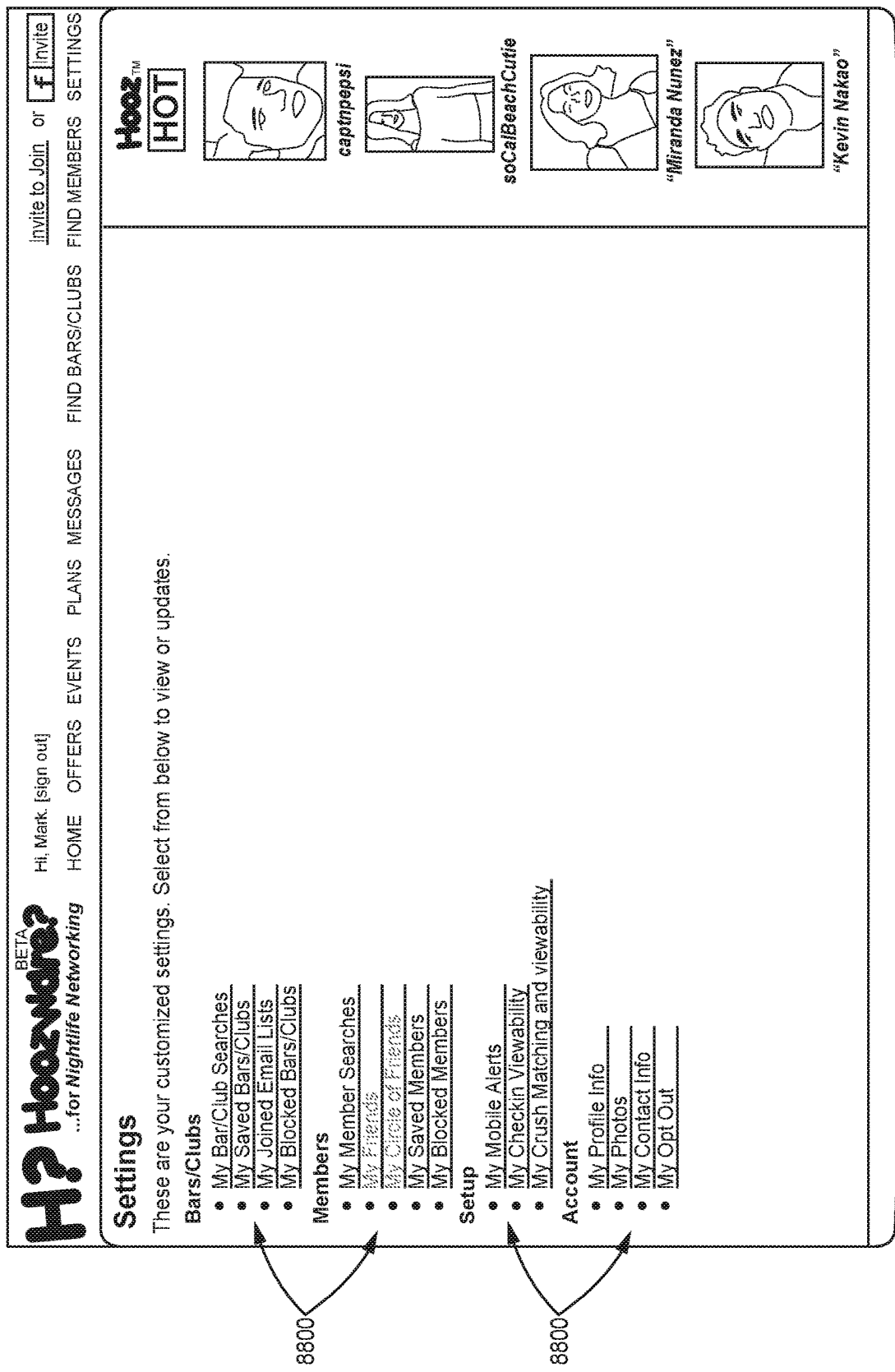
FIG. 88 provides exemplary settings which are editable.

FIG. 88 shows a list 8800 of exemplary settings which are editable by the member.

FIG. 89 shows a list 8900 of exemplary bar/club (a.k.a., venue) searches saved as described in FIG. 86A. Typically any existing search other than "My Top Bars/Clubs Search" can be deleted 8901 and a new search can be added 8902. Search criteria can be edited and saved after selecting the name of the search.

Figure 90:
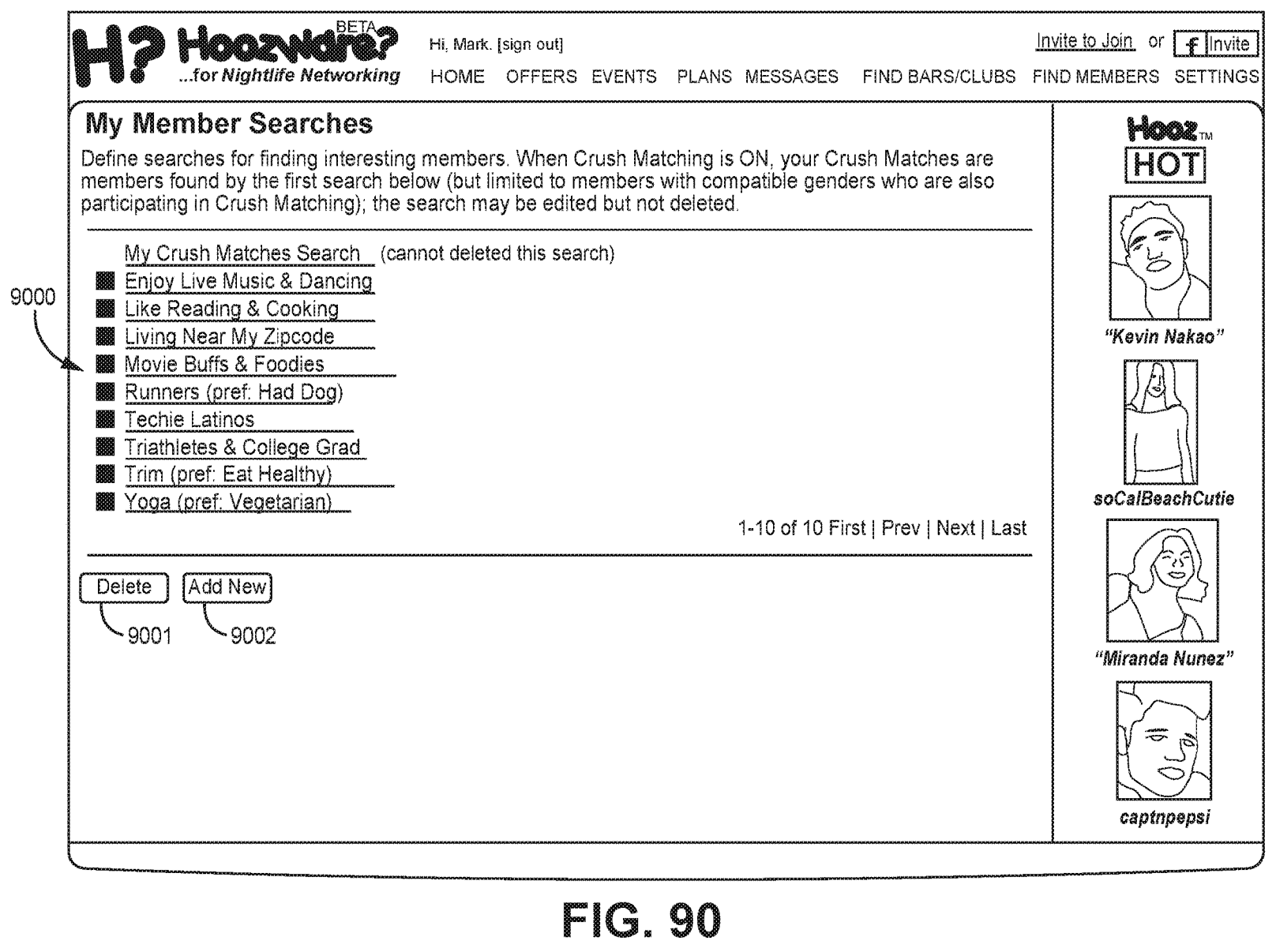

FIG. 90 shows an exemplary list 9000 of member searches saved as described in FIG. 87A. Typically, any existing search other than "My Crush Matches Search" can be deleted 9001 and a new search can be added 9002. Search criteria can be edited and saved after selecting the name of the search.

Figure 91A:
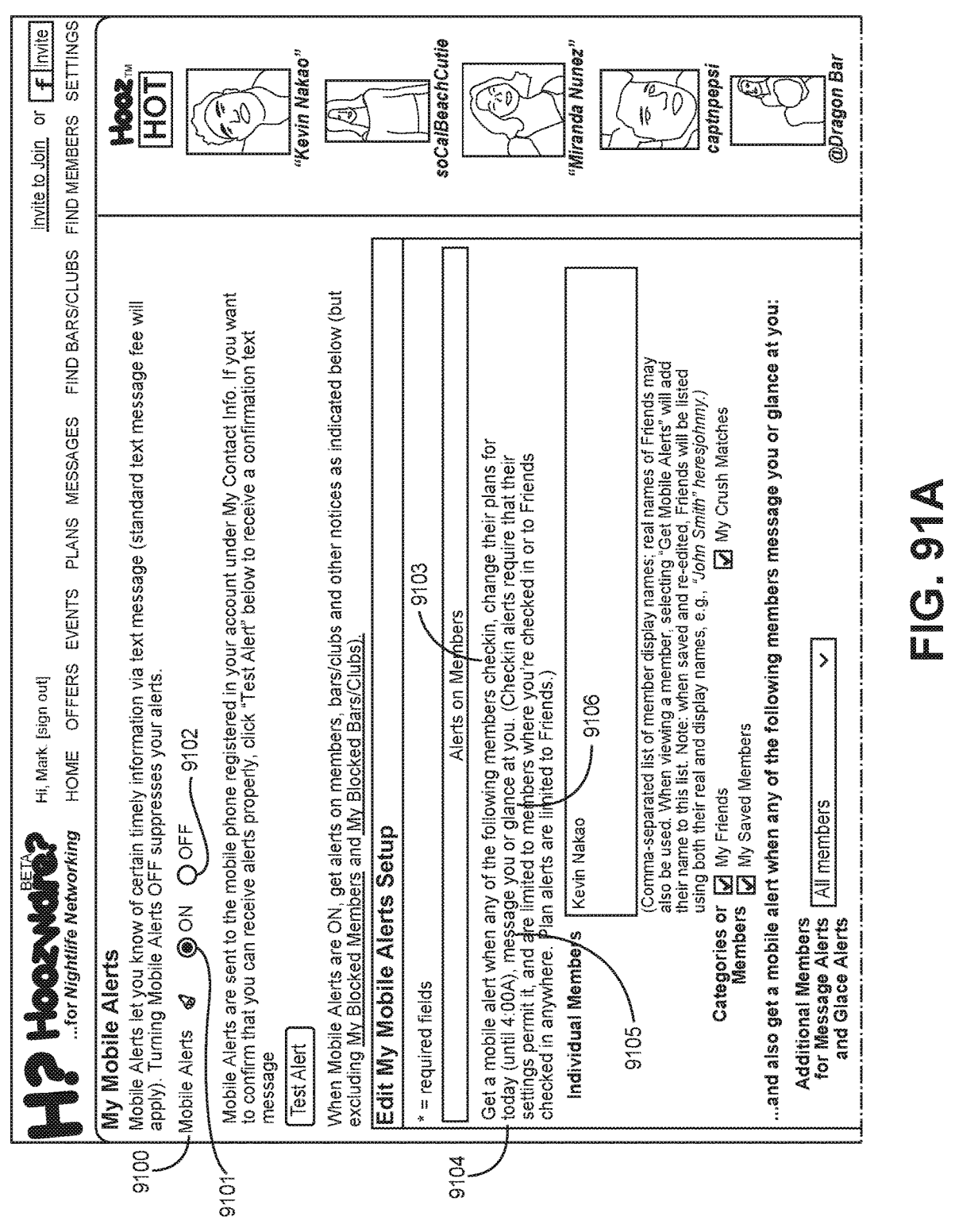

FIGS. 91A and 91B are exemplary editable mobile-alert settings for occurrence of certain trigger events related to a social network of members, including (a) member-trigger events such as members' actions, behaviors, states, and the like, and changes thereof; (b) venue-trigger events such as venues' actions, behaviors, states, demographics, characteristics, and the like, and changes thereof; (c) other-trigger events such as checkin eligibility, game eligibility, auto-checkout warning, plan reminder, and the like. The member may select and edit mobile-alert settings that provide which events are trigger events. A data processor receives indication of, or determines occurrence of, a trigger event. The data processor, which may comprise or access contact information and mobile-alert settings for members, then determines whether to communicate an alert to the mobile phone of the member based on the member's mobile-alert settings. The alert may be communicated to the member's mobile communication device, which may be a mobile phone, using a variety of convenient communication means. Such communication means include, but are not limited to a text message, including but not limited to an SMS text message; a text-based message including but not limited to a Push Notification as is available on many Smart Phones, or an email message; an image; a change in light on a mobile phone screen or other change in image; other visual alert; a haptic stimulation including but not limited to a vibration, force, jolt, or electro-cutaneous stimulation; an auditory stimulation including but not limited to a tone, buzz, chirp, music, recorded or synthesized sound or voice; and the like. The social network may allow members to send each other "friend requests" and accept received friend requests, thereby becoming "social network friends". The social network may be a social network that does not provide special dating features.

FIG. 91A shows an example of how mobile alerts 9100 may be enabled 9101/disabled 9102 and set up. A member may enable or disable all mobile alerts using a single action, such as toggling a button on their phone. The button on their phone may be a digital button displayed on their phone, or it may be a physical button. A first member can set up mobile alerts on other member actions, such as checking in 9103, changing a plan 9104, and when another member messages 9105 or glances 9106 at the first member.

FIG. 91B shows an example of how mobile alerts 9107 may be set up for bar/club behaviors, such as a bar/club having an offer that becomes valid soon 9108, crowds becoming packed 9109, or when they change a scheduled event 9110.

FIG. 92 shows an example of how checkin viewability 9200 may be enabled 9201/disabled 9202 and set up. For example, one may allow specific individuals 9203, categories of members 9204, friends 9205 and circles of friends to see when and where they're checked in.

Figure 93:
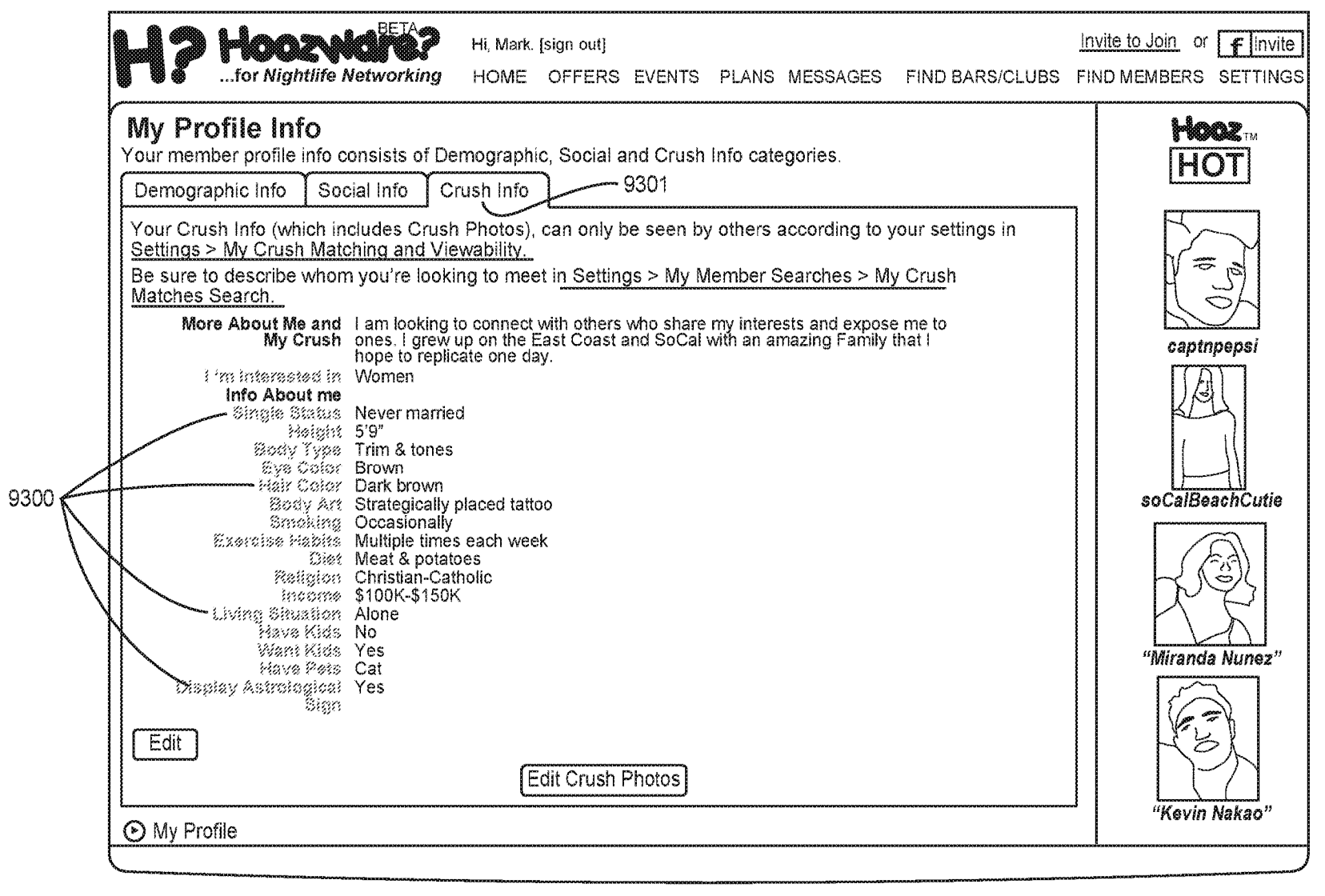

FIG. 93 shows an exemplary list 9300 of a member's own Crush Matching information 9301 that is shown to other members who are Crush Matching.

Figure 94:
FIG. 94 provides exemplary Crush Matching and viewability settings.

FIG. 94 shows an example of how Crush Matching and viewability 9400 may be enabled 9401/disabled 9402 and set up. For example, one may allow specific individuals 9403, categories of members 9404, friends 9405 and circles of friends to see their Crush Matching information, and they may allow specific individuals, categories of members, friends and circles of friends to see when and where they're checked in.

Figure 95:
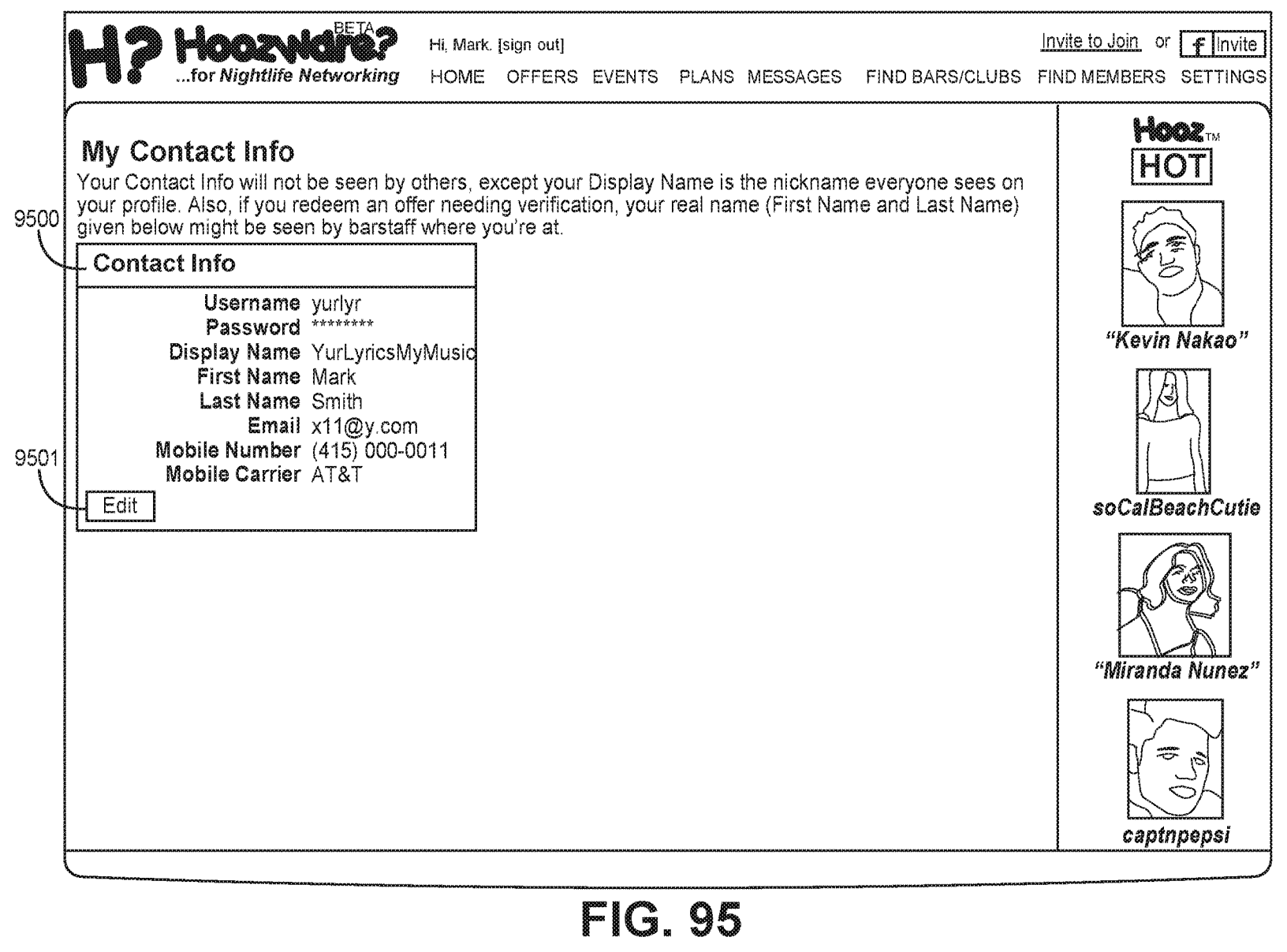

FIG. 95 shows exemplary contact information 9500 for a member that may be edited 9501.

Figure 96A:
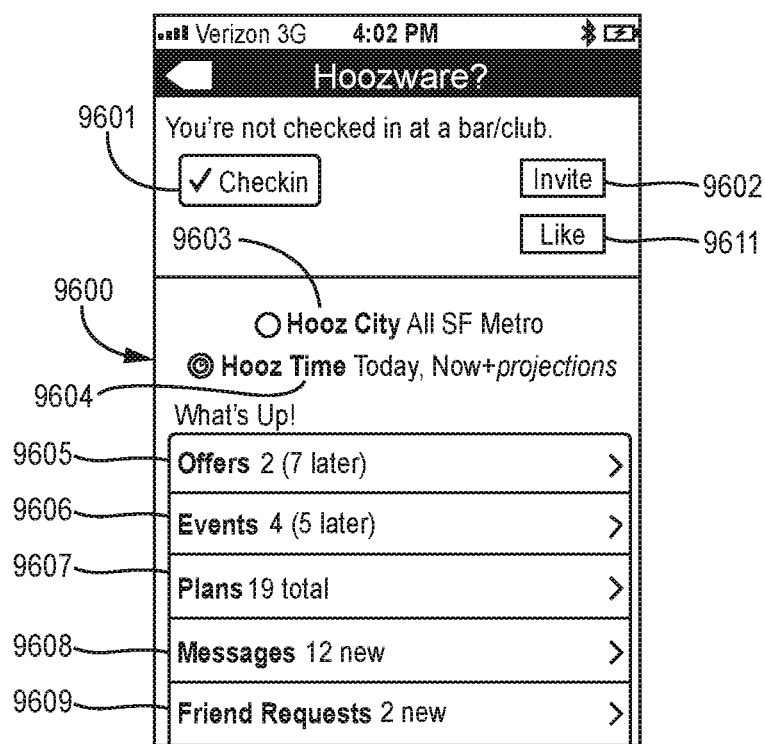
FIG. 96A illustrates an exemplary Home screen for an application for a mobile device, such as an iPhone, iPad, iPod, or other iOS, Android, or Blackberry device, or other mobile device.

FIG. 96A shows the upper portion 9600 of an exemplary Home screen for a smart mobile-phone application (i.e., the "app"). In this example, the app has a Checkin button 9601 that can access GPS or other position-sensing technology to locate the member and display a list of venues in the area. There is an Invite button 9602 to make it easy to access contacts on the phone to email or text message an invitation to others to join the social network. There is a Like button 9611 to allow following of Facebook, Twitter, and other media-sharing services. There are links to set the Hooz City 9603 and Hooz Time 9604 settings defined in FIGS. 79 and 80, respectively. When tapped, the Offers 9605, Events 9606, Plans 9607, Messages 9608, and Friend Requests 9609 buttons provide similar functionality as the links and tabs of the same names described for the desktop website of FIG. 77A.

Figure 96B:
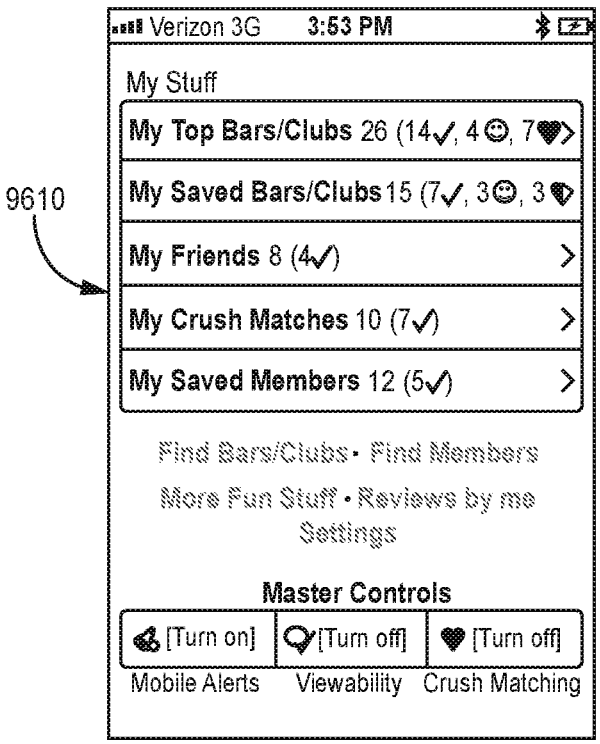
FIG. 96B further illustrates the exemplary Home screen.

FIG. 96B shows the lower portion 9610 of the exemplary Home screen for the smart mobile application. The buttons here provide similar functionality as the links and tabs of the same names described for the desktop website of FIGS. 77A and 77B.

Figure 97:
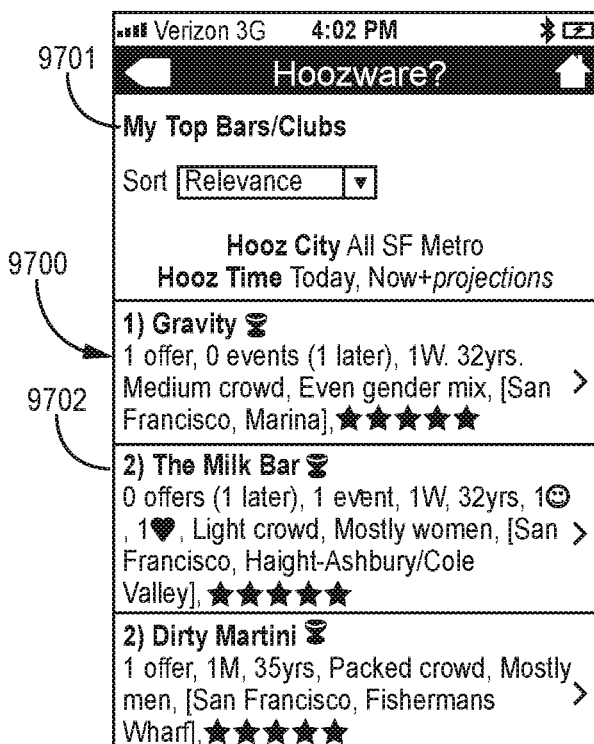
FIG. 97 provides exemplary result of a real-time venue ranking.

FIG. 97 shows some exemplary results 9700 of the real-time ranked My Top Bars/Clubs list 9701, corresponding to the tab 7716 on the desktop website shown FIG. 77A with the same name.

Figure 98A:
FIG. 98A illustrates an example view of information and button actions on a mobile device application relating to a selected venue.

FIG. 98A shows an exemplary screen 9800 of the smart mobile application that results from tapping the second listed entry of FIG. 97, i.e., for "The Milk Bar" 9702. In the example, there is a "Checkin Here" button 9801 to make it easy to indicate one's presence by checking in at the Milk Bar. The white box 9810 of the app corresponds to the "The Scene" box 8212 of the desktop website of FIG. 82B and typically displays the same data. When Hooz Time is set to "Now", the data in The Scene box is typically real-time information that is time sensitive and can change quickly. If Hooz Time is set to another timeframe, the data in The Scene box corresponds to that timeframe.

Figure 98B:
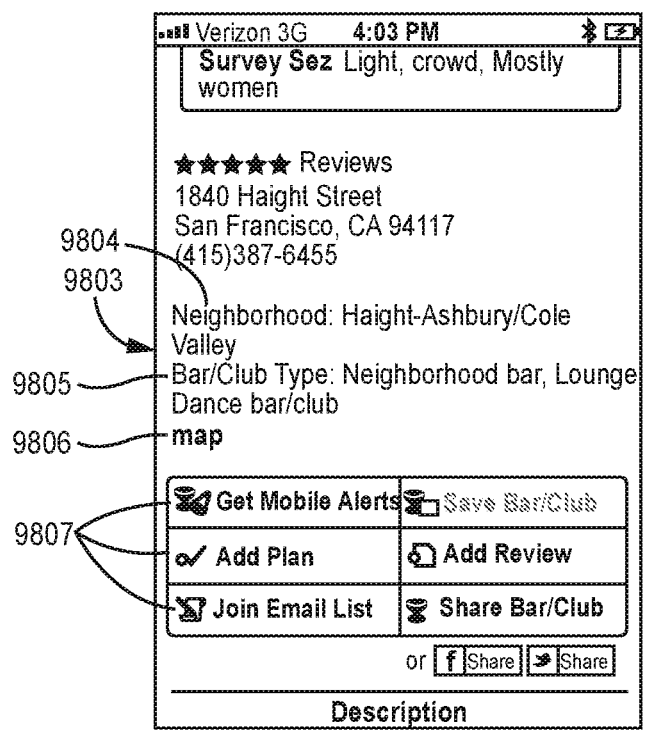
FIG. 98B illustrates another example view of the information and button actions.

FIG. 98B shows the exemplary app Home screen scrolled down midway 9803 to show the venue neighborhood 9804 and venue type 9805, a "map" link 9806, and buttons 9807 that produce desired actions for the venue.

Figure 98C:
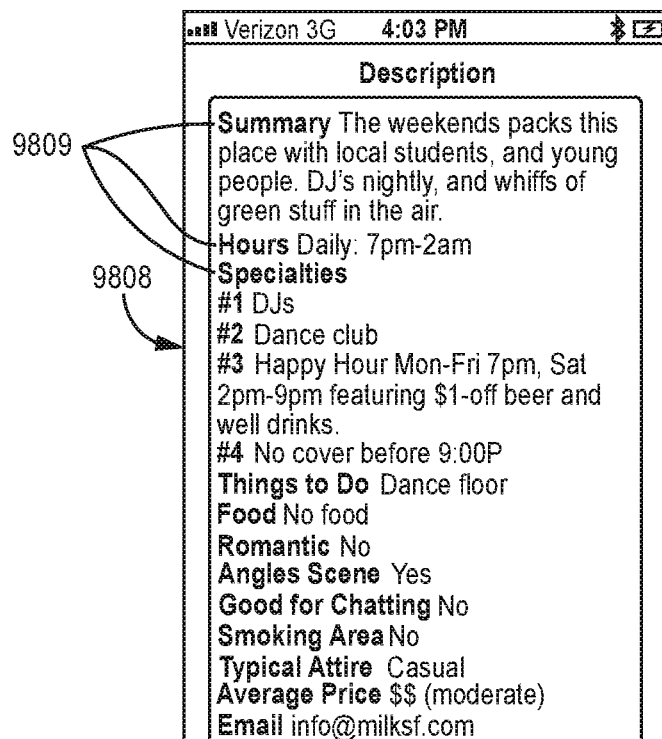
FIG. 98C illustrates another example view of the information and button actions.
Figure 98D:
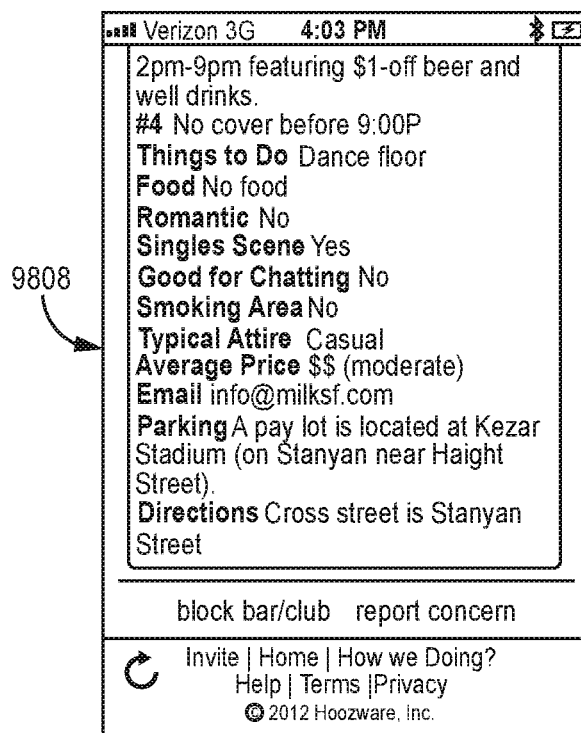
FIG. 98D illustrates another example view of the information and button actions.

FIGS. 98C and 98D show the exemplary app Home screen scrolled down even farther 9808 to display background information 9809 for the venue. In contrast to the real-time data displayed in The Scene box, this background information 9809 for a venue that doesn't change frequently, and typically doesn't change over a 2-hour period, and typically rarely changes daily, or even monthly.

Figure 99:
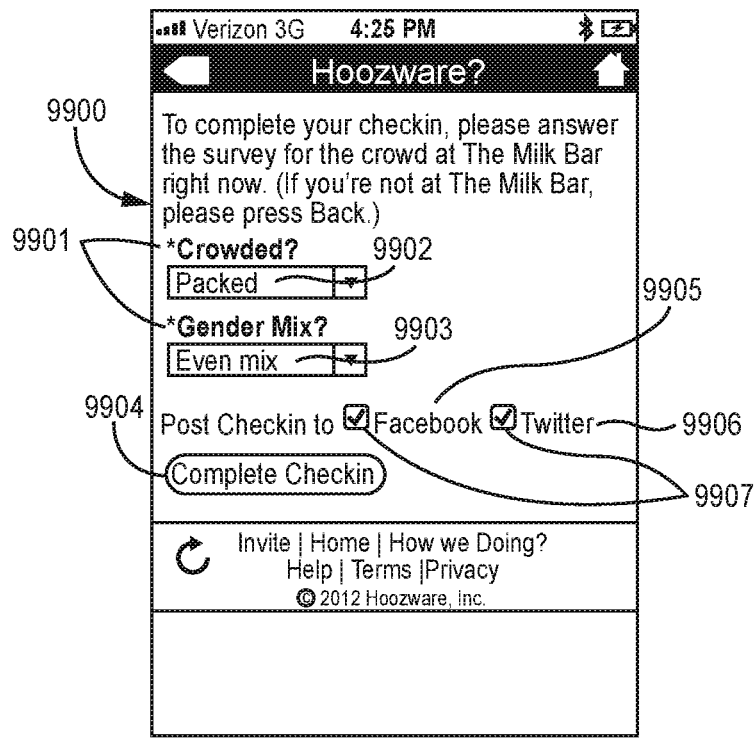
FIG. 99 provides an exemplary mobile device application screen displayed after a "Checkin" or "Checkin Here" button is selected.

FIG. 99 shows the exemplary app screen 9900 that is displayed after pressing the "Checkin Here" button 9801 of FIG. 98A, or pressing the Checkin button 9601 of FIG. 96A and selecting The Milk Bar 9702. In the example, in order to complete a checkin, typically two multiple-choice survey questions 9901 must be answered. In this example the questions are (1) "Crowded?" 9902: Is the current crowd light, medium, or packed, and (2) "Gender Mix?" 9903: Is the current gender mix even mix, mostly men, or mostly women? The submitted survey is combined with other recent surveys from other checked-in members to provide a consensus survey that is one data element of The Scene and of Packet Data. When the "Complete Checkin" button 9904 is selected, all or a portion of Packet Data, such as The Scene data, may be posted to the social network (e.g., Hoozware) for other members to see. All or a portion of Packet Data, such as The Scene data, can also be posted or otherwise shared with other social networks such as Facebook 9905, Twitter 9906, and other media-sharing services if the corresponding boxes 9907 are selected. All or a portion of Packet Data, such as The Scene data, may also be displayed on other websites, local business listings, and the like, to let others know what's going on around town right now or at some specified time or timeframe.

Figure 100A:
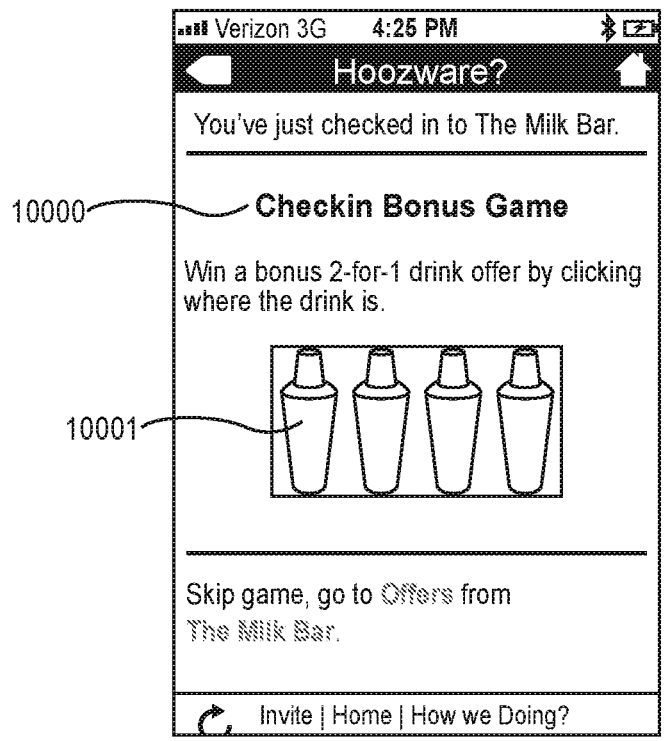
FIG. 100A provides an exemplary Checkin Bonus Game on a mobile device application, and FIG. 100B provides an exemplary screen indicating the correct element was selected.

FIG. 100A shows an exemplary Checkin Bonus Game 10000 that is an incentive and/or reward for completing the survey questions and checking in. For the particular game shown, the member checking in selects one of four drink shakers 10001.

Real-time surveys may also be asked before or after a member checks in. For instance, one or more survey questions may be asked after checking in, before checking in, after checking out, after redeeming a mobile coupon, or at any convenient or appropriate time. The survey questions are typically displayed on the member's mobile phone, but they may also be displayed on the member's desktop computer, tablet, or any other convenient computing device.

In order to encourage someone to answer a survey question, typically they are promised an incentive. The incentive may be a guaranteed mobile coupon for a free or discounted product. The incentive may be a game with a chance to win a prize such as a mobile coupon for a free or discounted product. A benefit of using a game as the incentive is that the member is given a guaranteed reward, i.e., the game, but if the member doesn't win, the venue doesn't need to provide a prize such as a coupon for a free or discounted product. The game may be a game of chance or skill. The game may be against other members each competing to win a prize, which may be the same prize or a different prize for each member.

An example survey question for a venue after a member has redeemed a mobile coupon is, "How was your service"? Multiple-choice answers may include, "poor", "ok", and "good", and the like. Another example survey question for a venue after a member has redeemed a mobile coupon is, "How was your food"? Multiple-choice answers may include, "warm", "cold", "greasy", "good", and the like. An example survey question during or after a band plays is, "Do you like the band"? Multiple-choice answers include, "no", "ok", "yes", and the like. It is particularly effective and efficient to ask a member a survey question on their mobile device while they're at a venue, just redeemed a coupon for a product, or when a particular event at the venue occurs or ends, or when the member is ready to leave or just left, and the like.

The venue may request a survey, the social network may request a survey, and 3rd-parties may request a survey, and the like. The venue, the social network, 3rd parties, and the like may provide incentives and prizes for their own survey questions as well as survey questions of others. It is particularly convenient and cost effective to ask the survey question on the member's phone, allow the member to play the incentivizing game on their phone, and allow the member to redeem on their phone any mobile coupon won. A mobile coupon given as a game prize may be made to be valid immediately after winning the prize, or it may become valid at a future date to encourage a return visit by the winning member.

Figure 100B:
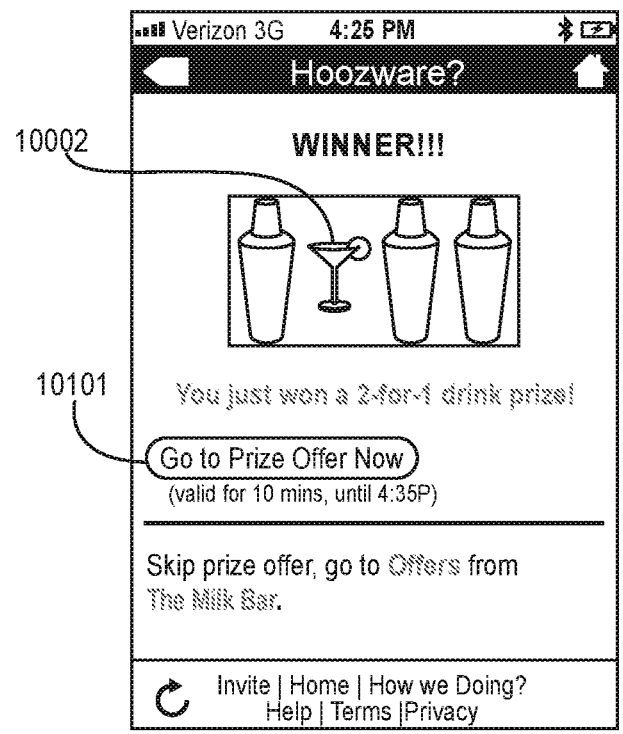

FIG. 100B shows an exemplary game-winning selection 10002.

Figure 101:
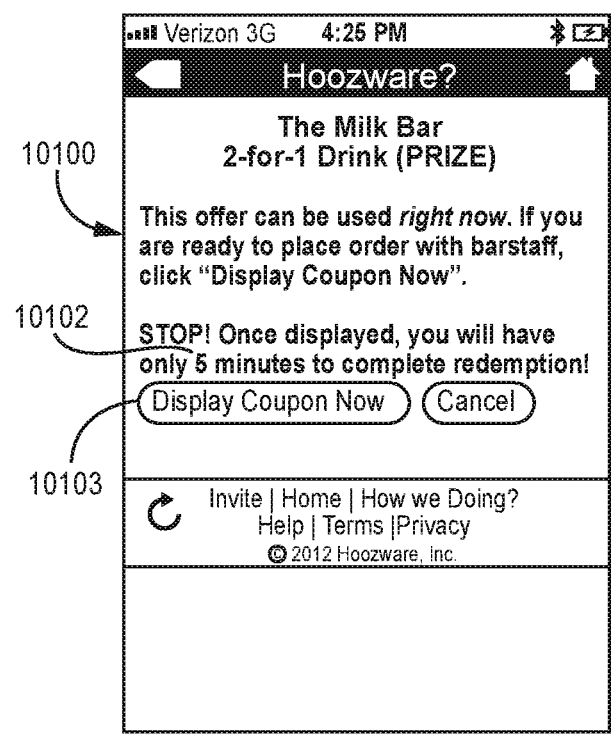
FIG. 101 provides an exemplary warning that there will be a time limitation to redeem a coupon after it is displayed on a mobile device.

FIG. 101 shows an exemplary screen 10100 displayed on the app when the "Go to Prize Offer Now" button 10101 is selected in FIG. 100B. This exemplary app screen 10100 informs the member that they will have only 5 minutes 10102 to use the coupon that is displayed after tapping the "Display Coupon Now" button 10103. The time may be 5 minutes 10102 (as shown), 10 minutes, any convenient time limit, no time limit, or a variable time limit for example where the time may depend on how busy the venue anticipates being on a particular day at a particular time.

Figure 102A:
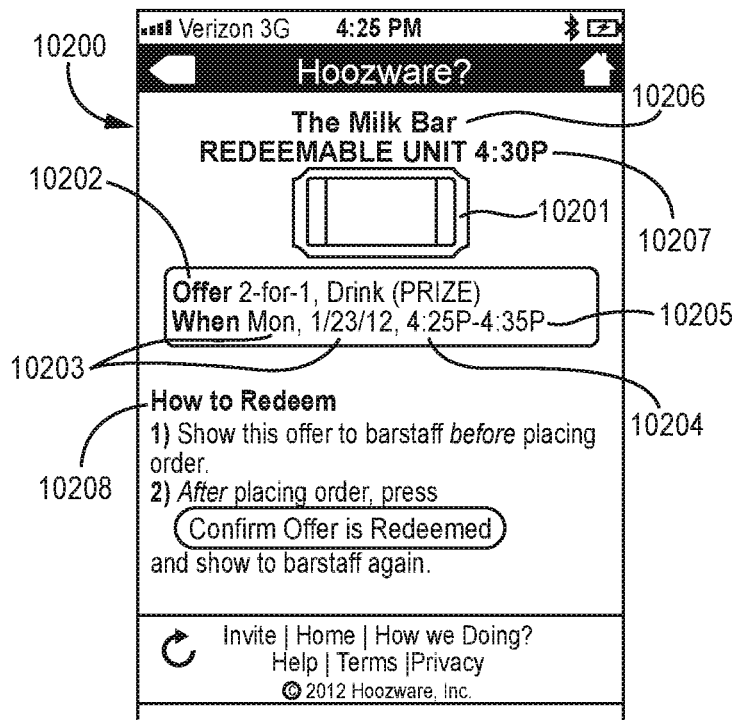
FIG. 102A provides on a mobile device an exemplary valid un-torn coupon (typically green), and FIG. 102B provides an exemplary redeemed or otherwise invalid torn coupon (typically red).

FIG. 102A shows an exemplary mobile coupon 10200 displayed by the app after tapping the "Go to Prize Offer Now" button 10101 in FIG. 101. In this example, the app displays a green un-torn coupon ticket 10201 that is easy to recognize as being valid, the offer description 10202, the day 10203 and time 10204 the offer starts and the day and time 10205 the offer ends. As shown, the coupon may also display the venue name 10206 and "Redeemable Until" time 10207 that is a set time after the coupon is displayed for the first time. The Redeemable Until time 10207 is typically 5 or 10 minutes after the coupon is displayed the first time. In this example, the coupon includes instructions 10208 for how to use it. The waitstaff typically taps the "Confirm Offer Is Redeemed" button 10208 or will instruct the member to tap it in order to redeem the green un-torn coupon 10201 and display a red torn coupon 10209, indicating that the coupon is no longer valid.

Figure 102B:
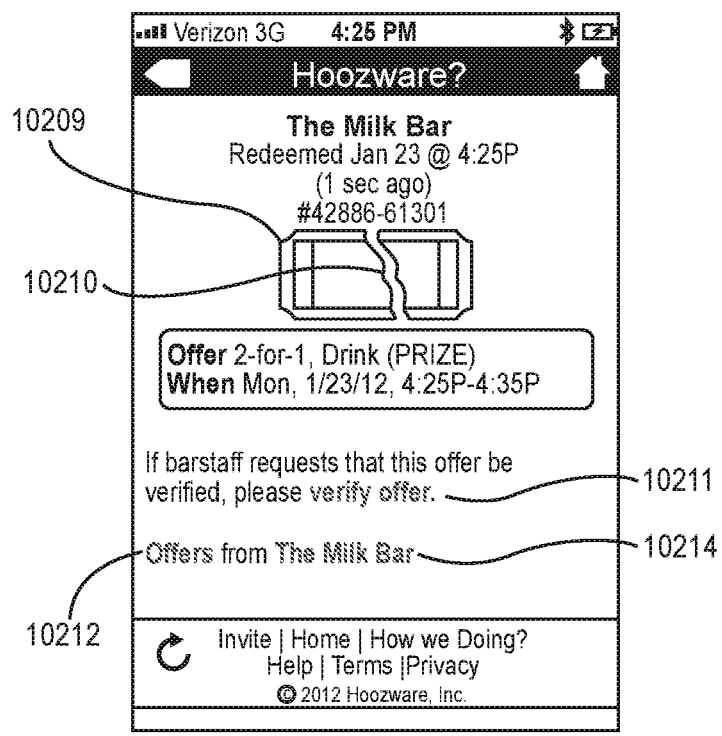

FIG. 102B shows an exemplary redeemed coupon 10209 from FIG. 102A. The coupon typically is red and torn 10210 after the "Confirm Offer Is Redeemed" button 10208 is tapped in FIG. 102A, or automatically after 5 or 10 minutes, to indicate the coupon cannot be re-used.

FIG. 102B shows exemplary links the app may display (shown in this example as red text) to "verify offer" 10211, to go to offers 10212 from the venue, and to go to the venue's (e.g., The Milk Bar's) profile page 10214.

Figure 103A:
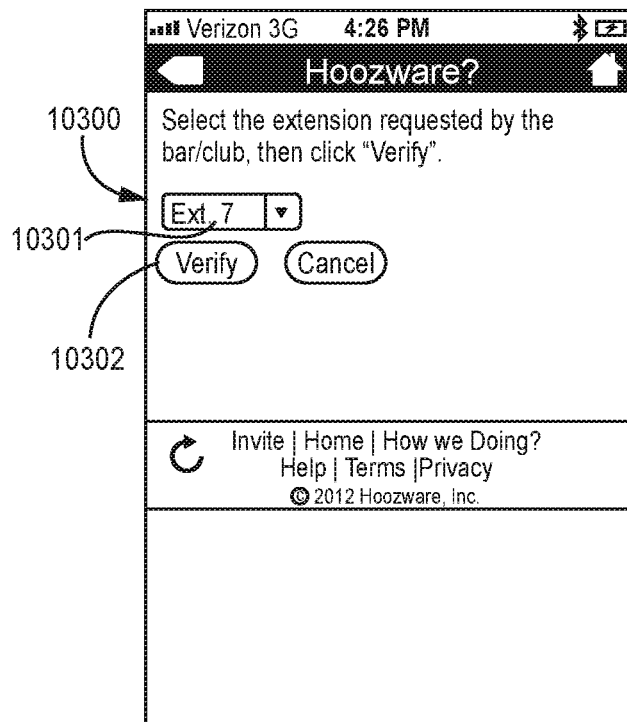
FIG. 103A provides an exemplary verification screen on a mobile device application, and FIG. 103B provides an exemplary screen indicating that the mobile coupon has been verified.

FIG. 103A shows an exemplary screen 10300 the app may display after tapping "verify offer" 10211 in FIG. 102B. Multiple extension numbers are typically then displayed that may be selected at the waitstaffs instruction. In this example, the waitstaff instructed the member (i.e., customer) redeeming the mobile coupon to verify the coupon redemption to the particular waitstaffs extension number 7 10301. When the Verify button 10302 is selected, a summary of the redemption information 10303, including all or a portion of the information about the member who redeemed it, when it was redeemed 10304, and what was redeemed 10305, may be sent to a display device that corresponds to extension 7. In a typical example, the display device corresponding to extension 7 is the waitstaff's mobile phone, and the summary data is sent as a text message or email. The correlation between extension numbers and display devices is not known to the customer, and is typically configured by the venue. In this way, any waitstaff can confirm that a redeemed offer was valid and sent out by their venue account, without telling the customer their own personal mobile phone number or device contact information.

Figure 103B:
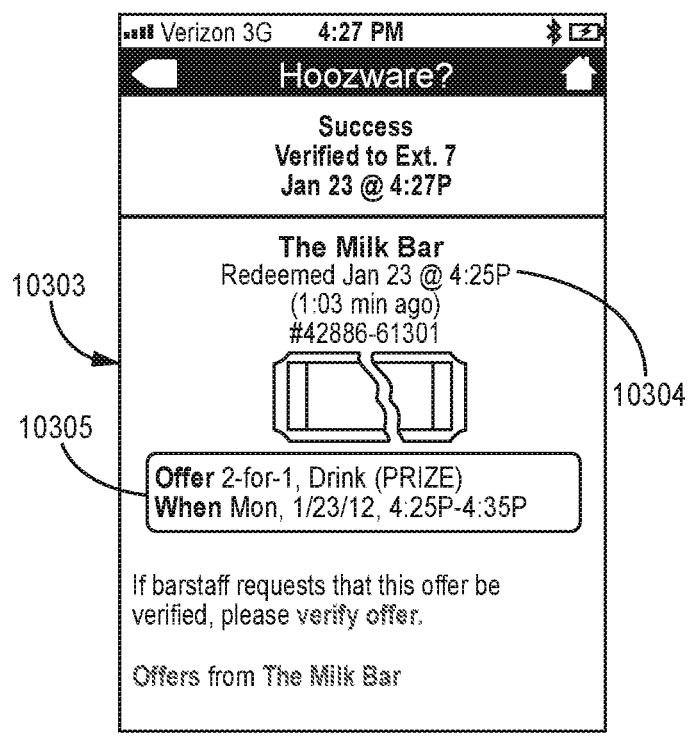

FIG. 103B shows an exemplary app screen 10303 on the customer's phone after the coupon has been verified.

Figure 104:
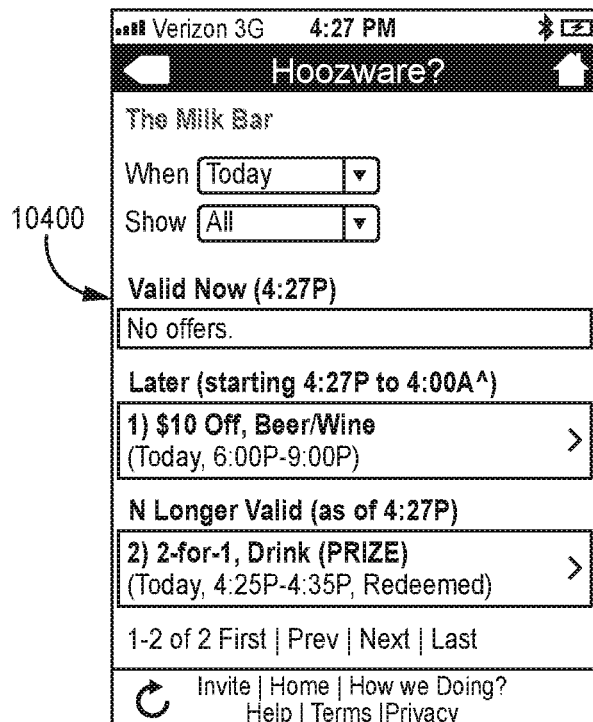
FIG. 104 provides an exemplary Offer Center on a mobile device screen.

FIG. 104 shows an exemplary Offer Center 10400 for the smart mobile application that corresponds to the desktop computer Offer Center 8200 shown in FIG. 82A.

Figure 105A:
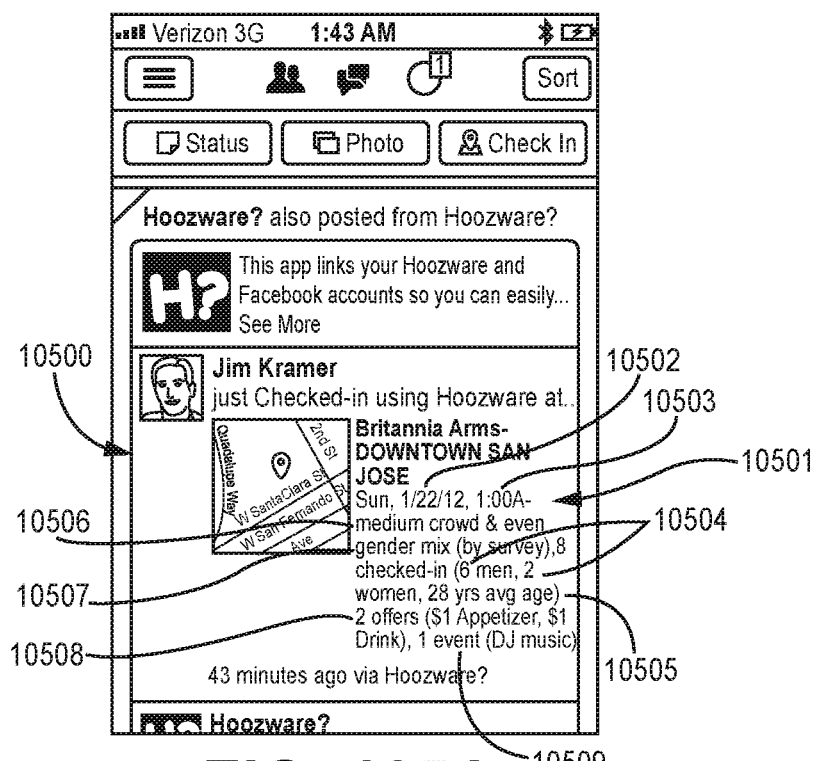
FIG. 105A provides an exemplary Facebook posting displayed on a mobile device or small screen.

FIG. 105A shows an exemplary Facebook posting 10500 displayed on a mobile device, where such posting typically occurs when the Facebook box 9907 is checked before tapping "Complete Checkin" 9904 in FIG. 99. Typically, all or a portion of Packet Data, such as The Scene real-time information 10501, is posted to the member's own Facebook wall and the newsfeeds of their Facebook (or other media-sharing or social network) friends. If a photo, video, or other media and submitted as part of the checkin process, the photo, video, or other media is typically included in Facebook and Twitter posts, or shared with other media-sharing services.

Facebook and Twitter posts are referred to in the subject application for brevity; however, indicating a post or sharing to Facebook or Twitter anywhere in the subject application may be interpreted to mean posting or sharing to any desired website, business-listing website, mobile or other application, media distributor, media-sharing service, and the like, either in existence presently or that comes into being in the future. Example popular media distributors and media-sharing services in existence at the present time include, but are not limited to Facebook, Twitter, Flickr, Tumblr, Posterous, Picasa, YouTube, LinkedIn, and Foursquare.

As shown in FIG. 105A, a typical Facebook post 10500 includes real-time information 10501 pertaining to the venue including Packet Data, and in particular or one or more of (1) the date 10502 and time 10503 the data is associated with, (2) who is currently at the venue, which may include the member posting the data as well as others there, (3) the number of each gender checked in 10504, (4) the average age 10505, (5) the number of friends (e.g., denoted by the smiley face icon), (6) the number of romantic interests (e.g., denoted by the heart icon), (7) the crowd demographics, which may include the crowd size 10506 and gender mix 10507 based on surveys, (8) which mobile coupons are redeemable now 10508 and later that day (e.g., up to 4 am the following morning), and (9) what events are occurring now 10509 and later that day. The Facebook posting may also include the answers to other survey questions, where exemplary answers to survey questions include "there is great live music", "there is no cover charge", "the appetizers are delicious", "the ballgame is on TV", and the like. Photos, videos, or other media submitted by members, which may be submitted as part of the checkin process, are typically included in the Facebook post as well. The results of games, such as a survey-incentive bonus game, can be posted, such as "Jim just won the Checkin Bonus Game!"

Figure 105B:
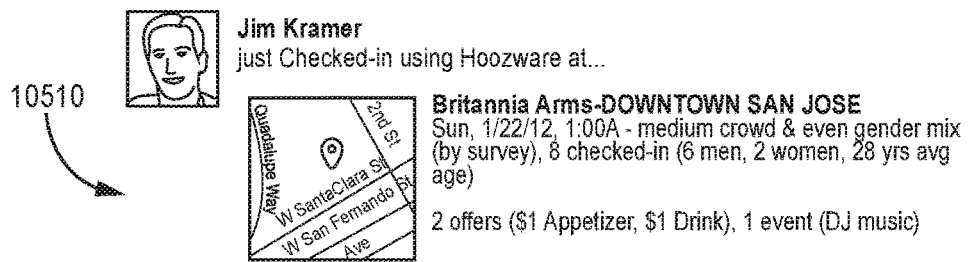
FIG. 105B provides an exemplary Facebook posting displayed on a desktop or non-small screen.

FIG. 105B shows an exemplary desktop computer Facebook posting 10510 corresponding to the smart mobile application posting 10500 of FIG. 105A.

Figure 105C:
FIG. 105C provides an exemplary re-posting to a second media-sharing service (e.g., a Facebook Fan Page) of a first media-sharing service post, (e.g., to an individual's Facebook Newsfeed).

FIG. 105C shows an exemplary social network's (e.g., Hoozware's) desktop computer Facebook Fan page "reposting" 10512 of an individual's Facebook posting. Since the Facebook Fan page of the social network is typically visible by anyone, FIG. 105C shows how the member's profile picture, name and other member-identifiable information may be replaced by a more generic image (e.g., the Hoozware logo 10513) and description to protect the privacy of the member.

Figure 105D:
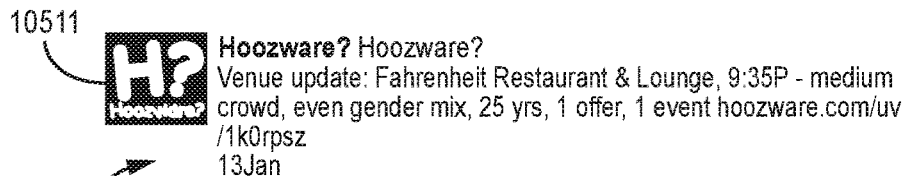
FIG. 105D provides an exemplary re-posting to a second Twitter page of a first Twitter post.

FIG. 105D shows an exemplary social network's (e.g., Hoozware's) desktop computer Twitter page "reposting" 10514 of an individual's Twitter posting. Since the Twitter page of the social network is typically visible by anyone, FIG. 105D shows how the member's profile picture, name and other member-identifiable information may be replaced by a more generic image 10511 and description to protect the privacy of the member. A Twitter post typically includes real-time information pertaining to the venue that is similar to a Facebook post, and may contain any of the information described above for a Facebook post. Likewise, posts or sharing with other media-sharing services typically include real-time information pertaining to the venue that is similar to a Facebook post, and may contain any of the information described above for a Facebook post.

Since the information reposted to the social network's Facebook Fan page and Twitter page are anonymized, data corresponding to any checkin, whether the Facebook or Twitter boxes were checked, may be posted to the social network's Facebook Fan page, Twitter page, or page or application of another media-sharing service without violating a member's privacy.

Figure 106:
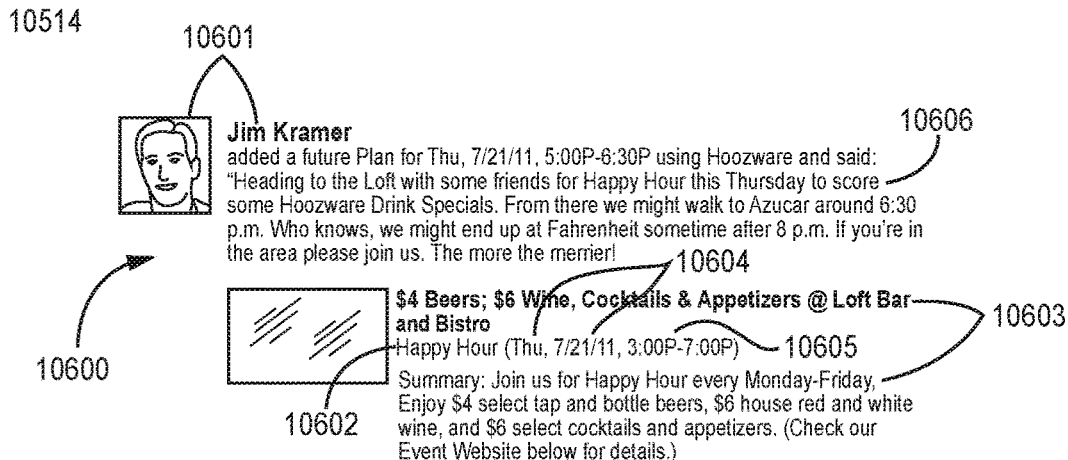
FIG. 106 provides an exemplary posting of a Plan to Facebook or any media-sharing service.

FIG. 106 shows an exemplary "Plan" 10600 posted to Facebook (or more generally, to any media-sharing service), such as typically occurs when the Facebook box 8323 is selected in FIG. 83C prior to selecting the Submit button 8322. The plan post may include a variety of information including but not limited to the member's identity 10601; the type 10602 of an event the member is planning to attend (e.g., Happy Hour, a band, watch a sporting event on the TV there, and the like); the venue's own description 10603 of the event; the day 10604 and time 10605 the member plans to attend a venue; a free-form comment 10606 by the member; all or a portion of Packet Data, such as The Scene information, including mobile coupons and events scheduled to occur at the time the member plans to be there or later in the day that the member plans to be there; and the like.

In the subject invention, systems and methods are provided for collecting and analyzing real-time information, and providing the result, which may include a projection or other Packet Data or Scene Data, to one or more venue-information providers, which may include business-listing websites, web pages, media providers, and the like. Members of an organization use their mobile communication devices to report real-time demographic and characteristic information about a venue they're at. The collected information may include the day, date and time associated with it, the number of each gender currently or recently at the venue, an estimate of crowd size and gender mix, the number of friends there, the number of friends with plans to be there, the number of romantic interests, the typical age, game results, and answers to survey questions. The information may include the offers and events at the venue, and may include current or recent photos, videos, audio recordings, text-based messages, and other media.

Figure 107B:
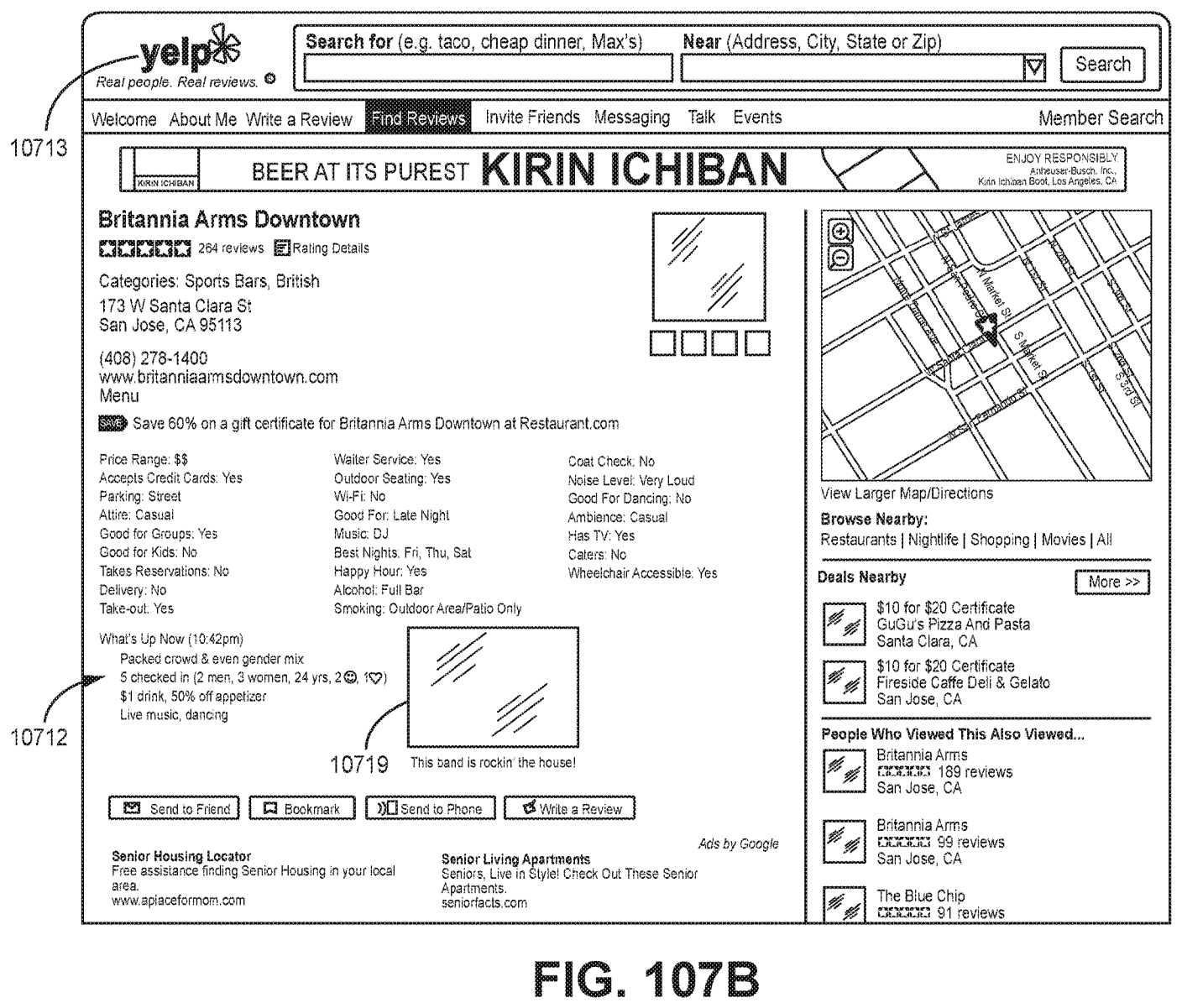
Figure 107C:
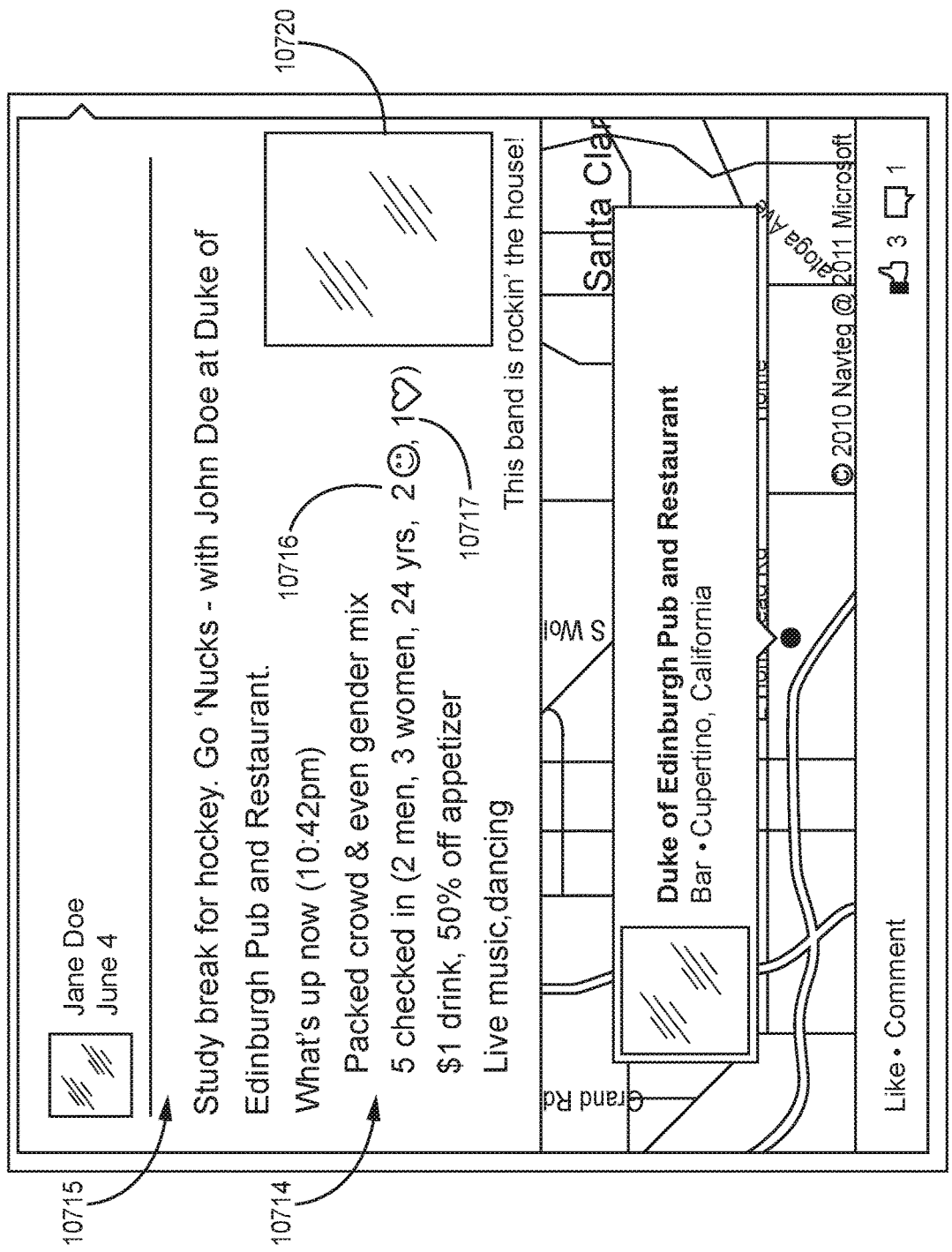
FIG. 107C illustrates an example portion of Packet Data.

FIGS. 107A-107C show an exemplary portion of Packet Data, such as The Scene data 10700, being displayed in various popular local business listings for a particular venue.

Typically, such local business listings contain static background information about the venue 10701, i.e., information that doesn't change frequently, and typically doesn't change over a 2-hour period, and typically rarely changes daily, or even monthly. By the addition of a portion of Packet Data, such as The Scene data 10700, the business listing may become a real-time dynamic listing of who's there and what's happening there right now or recently, typically within the past two hours.

FIG. 107A shows an exemplary portion of Packet Data, such as The Scene data 10700, embedded in a Google Places listing 10702. Similar to letting a user set Hooz Time on the Hoozware social network website, the timeframe of interest may be allowed to be changed by the business-listing viewer from the present time to a past or future time of interest to the viewer. If there is no recent Packet Data, such as The Scene data, for the currently selected timeframe, whether the timeframe is "Now" or whether it is a past or future timeframe of interest, a projection of Packet Data may be substituted. Such a projection may extrapolate or otherwise estimate Packet Data for the selected timeframe based on actual data points from similar or representative days and timeframes from past data. Alternately, if there is no recent Packet Data for the currently selected timeframe, then the day and time associated with embedded data may be automatically changed to reflect the time of the most recent or representative data that does exit and which is then embedded and displayed for the corresponding venue. The embedded Packet Data may auto-update a business listing web page for a venue soon after real-time data is posted or shared by a member at the venue. Alternatively, there may be an indicator on the web page that "New data is available" (or the equivalent) and an "Update" button for the business-listing viewer to press to have the web page updated with the new data that is available.

Real-time data that may be included in a business listing includes but is not limited to Packet Data, and in particular one or more of (1) the date and time 10703 associated with the rest of the data, (2) who is currently at the venue, which may include the member posting the data as well as others there, where the others there may be checked in or not, (3) the number of each gender checked in 10704, (4) the average age 10705, (5) the number of friends (e.g., denoted by the smiley face icon 10706), (6) the number of romantic interests (e.g., denoted by the heart icon 10707), (7) the crowd demographics, which may include the crowd size 10708 and gender mix 10709 based on surveys, (8) which mobile coupons 10710 are redeemable now and later that day (e.g., up to 4 am the following morning), and (9) what events 10711 are occurring now and later that day (e.g., up to 4 am the following morning). The data included in the business listing may also include the answers to other member survey questions, where exemplary answers to survey questions include "there is great live music", "there is no cover charge", "the appetizers are delicious", "the ballgame is on TV", and the like. Photos 10718, videos, or other media submitted by members, which may be submitted as part of the checkin process, may be included in the business-listing post as well. The results of games, such as a survey-incentive bonus game, may be posted, such as "10 people just won the Checkin Bonus Game!"

When the Packet Data is provided by the social network organization to a 3rd-party website or application, the application or web server of the 3rd-party website (the "Web Server") may query the data server of the social network organization (the "Data Server") for the Packet Data. Alternatively, the Data Server may send a message or an interrupt to the Web Server indicating that there is new Packet Data available. Alternately, the Data Server may place the Packet Data into a memory location known by and accessible by the Web Server, and the Web Server can check the memory location on its own schedule or when informed that there is new Packet Data in the memory location.

To include real-time data gathered by the Hoozware social network into a local business-listing website such as Google Places 10702, any of a variety of technologies may be used known to those skilled in the art. Some implementation options are as follows: (1) The Google web server may make a software programming call to the Hoozware server software API and request data. The Hoozware server then replies with a packet of real-time information that the Google web server may insert into the web page it serves to the web browser client; (2) the Hoozware server may make a software programming call to the Google web server software API to let it know there is real-time data available and where to locate it in memory or on a network; (3) use a Hoozware iframe URL, similar to the technology that YouTube uses to embed videos; (4) make a Hoozware plugin, similar to the technology used for Facebook Social Plugins, where the Google Places website user can sign in by clicking inside the Hoozware plugin or signing in elsewhere inside the browser; and the like.

If the viewer of the Google Places 10702 website links their account or otherwise associates their Google+ account with the Hoozware social network, and they are signed into their Google+ account when viewing the Google Places 10702 listing, a portion of Packet Data, such as The Scene data and other real-time information, may include categorization of which people who are checked in are Google+ friends (as indicated by the smiley face icon which is typically yellow) and Crush Matches (as indicated by the heart icon, which is typically red).

FIG. 107B shows an exemplary portion of Packet Data, such as The Scene data 10712, including a checkin photo 10719, similarly embedded in a Yelp listing 10713.

FIG. 107C shows an exemplary portion of Packet Data, such as The Scene data 10714, including a checkin photo 10720, similarly embedded in a Facebook Places listing 10715. If the viewer of the Facebook Places listing links their account or otherwise associates their Facebook account with the Hoozware social network (e.g., using "Facebook Connect"), and they are signed into their Facebook account when viewing the Facebook Places listing, a portion of Packet Data, such as The Scene data and other real-time information, may include categorization of which of the people who are checked in are Facebook friends (as indicated by the yellow smiley face 10716) and Crush Matches (as indicated by the red heart 10717).

Figure 108A:
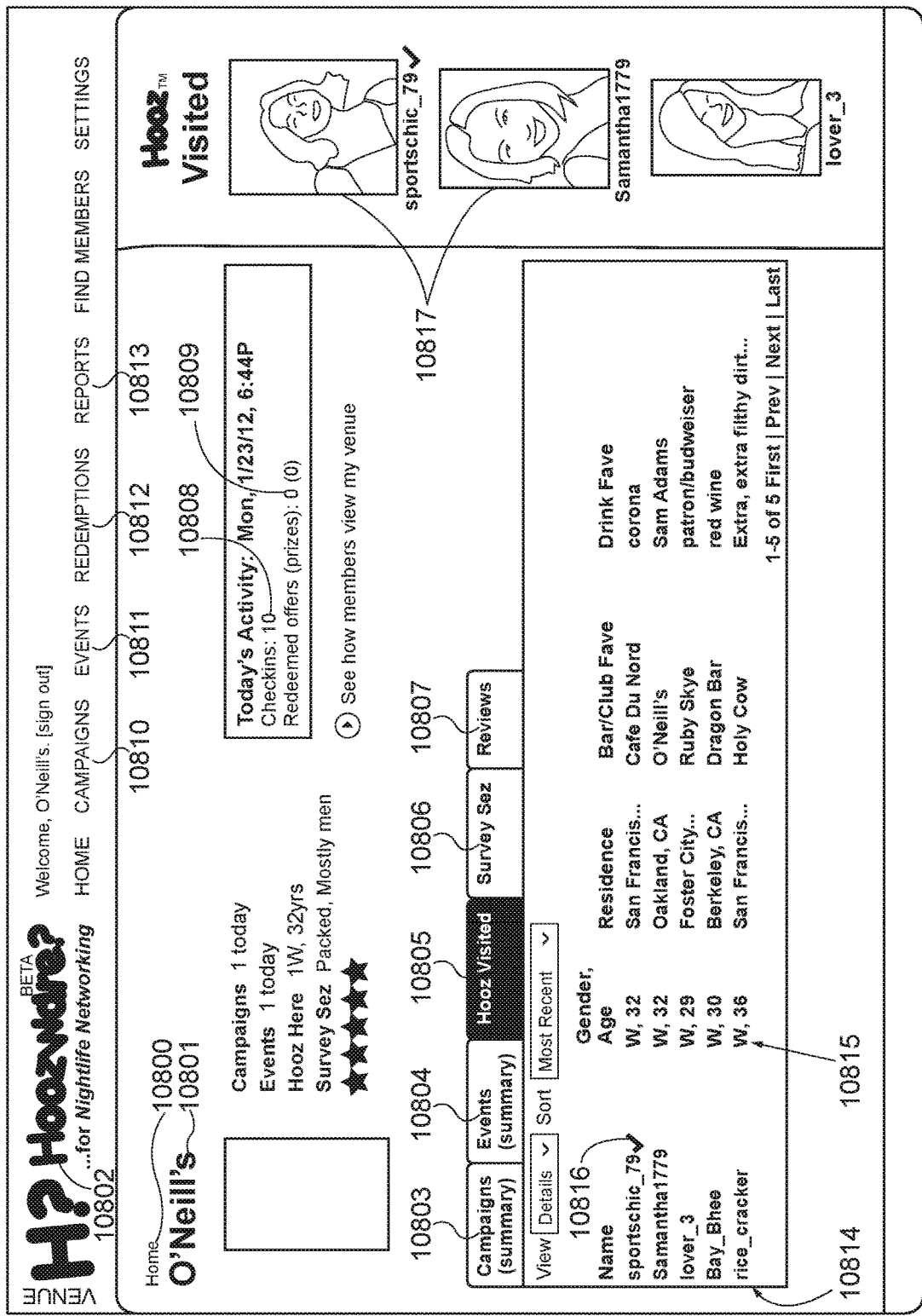
FIG. 108A illustrates an example Home page for a venue's account with a social network.

FIGS. 108A and 108B show an exemplary Home page 10800 for a venue's account 10801 with the social network (e.g., Hoozware 10802). In the example, various data are displayed including the campaigns 10803 and events going on 10804, tabs listing everyone who has checked in there in the past 10805, past surveys 10806, as well as reviews 10807. There are also listed statistics for the number of people who have checked in that day 10808 and the number of coupons redeemed that day 10809. New offer campaigns and events may be entered using the Campaigns 10810 and Events 10811 links along the top. Past redemptions may be reviewed using the Redemptions link 18012. The Reports link 10813 provides analysis tools for providing lists and charts of demographic data and redemptions by people who have checked in, which may be plotted versus the day and time they checked in or redeemed their coupons.

FIG. 108A shows an example of when the Hooz Visited tab 10805 selected. In the example, under the tab is listed in reverse chronological order everyone 10814 who has checked in together with their demographics data 10815. If there is a check 10816 next to their name, they are still checked in. The profile pictures 10817 along the rightmost column are a pictorial list of such prior checked-in members.

FIG. 108B shows an example of when the Survey Sez tab 10806 selected. The consensus 10818 of the member surveys is shown near the top of the tab, and the individual surveys 10819 are shown below. The consensus typically only includes surveys from a limited time ago, and where the older surveys provide less weight to the consensus than more recent member surveys.

Figure 109A:
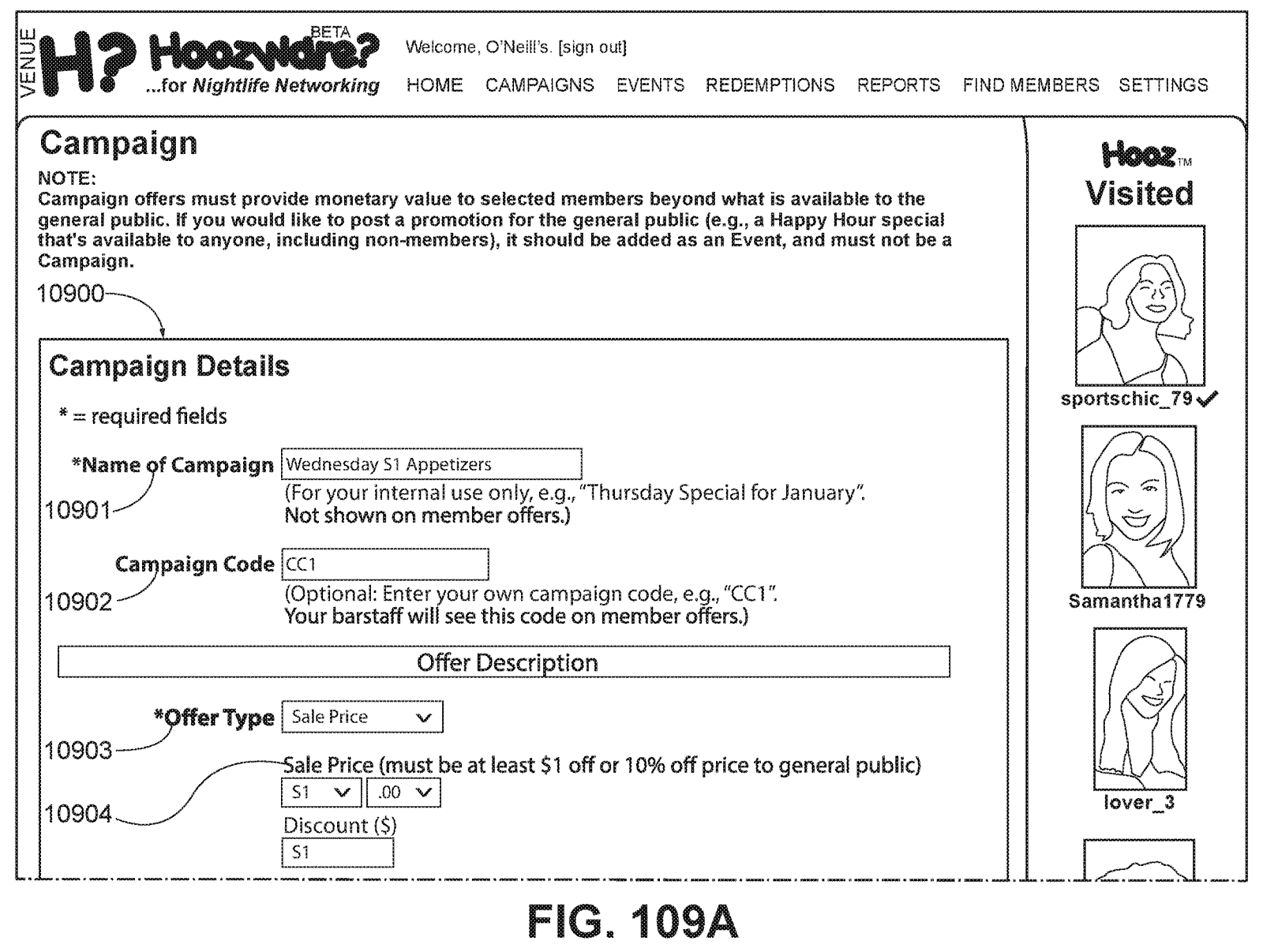

FIGS. 109A-109F show exemplary tools 10900 for specifying a new offer campaign. FIG. 109A shows an example for naming of the campaign 10901, specifying a campaign code 10902, selecting the offer type 10903 and amount 10904.

FIG. 109B shows the offer item 10905 and notes 10906. FIGS. 109B-109C shows an example of how to specify recipient limitations 10907. The recipients may be limited by personal information such as demographics 10908, interests 10909, income 10910, and the like.

FIG. 109D shows an example of how the recipients may also be limited by their behavioral information 10911 such as when they've visited 10912, whether they have alerts enabled 10913, whether they've done a search for the venue 10914, and the like. Recipients may also be limited by a guest list 10915 or if they're thought highly by others as determined by the Hooz Hot ranking 10916. The maximum number of recipients 10917 for a campaign may also be limited.

FIG. 109E shows the starting date 10918 and time 10919 and ending date and time 10920 for an offer campaign may also be selected, along with when the coupons are first sent out 10921.

FIG. 109F shows an example for how recurrence patterns 10922 for the campaigns may also be selected. If a recurrence 10923 (shown in FIG. 109E) is selected, "How to Send Out Offer" 10924 may also be selected.

There typically are similar tools for specifying a new venue event.

It is evident from the above description that the subject invention provides for an effective and efficient way for people and venues to communicate for increasing the enjoyment of individuals in visiting venues and for enhancing revenues received by the clubs. The ability to evaluate a particular venue before traveling to the venue encourages individuals to participate in the activities of the venues. Individuals are informed as to the demographics at a venue and available rewards at the venue. The system provides for location based marketing and social networking in a unique and more efficient way as compared to prior methods.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An apparatus for providing a service for identifying mobile devices utilized by particular categories of consumers and transmitting alert-generating indications to the mobile devices, the apparatus comprising at least one processor and at least one memory including computer program code, the at least one memory and the computer program code configured to, with the processor, cause the apparatus to at least:
  receive a plurality of Global Positioning System (GPS) device locations from at least one mobile communication device;
  compare the plurality of GPS device locations to a known fixed position to determine an assumed location of the at least one mobile communication device;
  identify a user profile associated with the at least one mobile communications device, the user profile comprising user trait data and user activity history data;
  classify the user profile and the at least one mobile communication device to a category of user profiles by applying a classification algorithm, the classification algorithm considering the assumed location of the at least one mobile communication device, the user trait data, and the user activity history data;
  access information indicative of a user-defined tracking time period associated with the user profile associated with the at least one mobile communication device,
  wherein the plurality of GPS device locations are received from at least one mobile communication device only during the user-defined tracking time period;
  store to a data registry the plurality of GPS device locations only during the user-defined tracking time period, wherein the classification algorithm further considers the plurality of GPS device locations stored to the data registry; and
  cause transmission of an alert-generating indication to the at least one mobile communication device upon classifying the user profile to the category of user profiles.

2. The apparatus of claim 1, wherein the alert-generating indication is transmitted to the at least one mobile communication device only during the user-defined tracking time period.

3. The apparatus of claim 1, wherein the at least one memory and the computer program code are further configured to, with the processor, cause the apparatus to:
  provide a graphical user interface (GUI) configured to be displayed upon the at least one mobile communication device,
  wherein the alert-generating indication is configured to cause rendering by the GUI of an alerts interface, and
  wherein the alerts interface comprises an offer received indication.

4. The apparatus of claim 3, wherein the offer received indication comprises at least one offer issued by a particular venue associated with the assumed location.

5. The apparatus of claim 4, wherein the at least one memory and the computer program code are further configured to, with the processor, cause the apparatus to:
  receive an indication to redeem the at least one offer; and
  create a barcode or number code associated with the at least one offer, the barcode or number code configured to be rendered by the GUI.

6. The apparatus of claim 1, wherein the at least one memory and the computer program code are further configured to, with the processor, cause the apparatus to:
  receive a signal or access information indicative of a user-defined venue threshold associated with a demographic or characteristic;

aggregate trait information associated with each user profile associated with the assumed location;

compare the aggregated trait information to the user defined venue threshold; and only in a circumstance where the aggregated trait information satisfies the user defined venue threshold and upon classifying the user profile to the category of user profiles, cause transmission of the alert-generating indication to the at least one mobile communication device.

7. The apparatus of claim 1, wherein the at least one memory and the computer program code are further configured to, with the processor, cause the apparatus to:

receive a check-in signal from the at least one mobile communication device; and cause transmission of the alert-generating indication to the at least one mobile communication device only in response to receiving the check-in signal and upon classifying the user profile to the category of user profiles.

8. The apparatus of claim 1, wherein the at least one memory and the computer program code are further configured to, with the processor, cause the apparatus to:

enable participation in a game or survey;

receive a game or survey completion signal; and cause transmission of the alert-generating indication to the at least one mobile communication device only in response to receiving the game or survey completion signal and upon classifying the user profile to the category of user profiles.

9. The apparatus of claim 1, wherein the at least one memory and the computer program code are further configured to, with the processor, cause the apparatus to:

receive third-party defined reward criteria;

determine that the third-party defined reward criteria is met; and upon classifying the user profile to the category of user profiles and upon determining that the third party defined reward criteria is met, cause transmission of the alert-generating indication to the at least one mobile communication device.

10. The apparatus of claim 1, wherein the at least one memory and the computer program code are further configured to, with the processor, cause the apparatus to:

receive venue-specified restrictions; and upon classifying the user profile to the category of user profiles, cause transmission of the alert-generating indication to the at least one mobile communication device in accordance with the venue-specified restrictions.

11. The apparatus of claim 1, wherein the at least one memory and the computer program code are further configured to, with the processor, cause the apparatus to:

map the user trait data to a user trait registry;

map the user activity history data to a user activity history registry, wherein the classification algorithm for classifying the user profile and the at least one mobile communication device to the category of user profiles further considers the assumed location of the at least one mobile communication device, the mapping of the user trait data to the user trait registry, and the mapping of the user activity history data to the user activity history registry; and cause transmission of a second alert-generating indication to a second mobile communication device associated with the assumed location.

12. The apparatus of claim 1, wherein the at least one memory and the computer program code are further configured to, with the processor, cause the apparatus to:

receive a check-in indication from the at least one mobile communication device verifying presence of the at least one mobile communication device at the assumed location.

13. A method for providing a service for identifying mobile devices utilized by particular categories of consumers and transmitting alert-generating indications to the mobile devices, the method comprising:

receiving a plurality of Global Positioning System (GPS) device locations from at least one mobile communication device;

comparing the plurality of GPS device locations to a known fixed position to determine an assumed location of the at least one mobile communication device;

identifying a user profile associated with the at least one mobile communications device, the user profile comprising user trait data and user activity history data;

classifying the user profile and the at least one mobile communication device to a category of user profiles by applying a classification algorithm, the classification algorithm considering the assumed location of the at least one mobile communication device, the user trait data, and the user activity history data;

accessing information indicative of a user-defined tracking time period associated with the user profile associated with the at least one mobile communication device, wherein the plurality of GPS device locations are received from at least one mobile communication device only during the user-defined tracking time period;

storing to a data registry the plurality of GPS device locations only during the user-defined tracking time period, wherein the classification algorithm further considers the plurality of GPS device locations stored to the data registry; and causing transmission of an alert-generating indication to the at least one mobile communication device upon classifying the user profile to the category.

14. An apparatus for providing a service for identifying mobile devices utilized by particular categories of consumers and transmitting alert-generating indications to the mobile devices, the apparatus comprising at least one processor and at least one memory including computer program code, the at least one memory and the computer program code configured to, with the processor, cause the apparatus to at least:

receive a plurality of GPS device locations from at least one mobile communication device;

compare the plurality of GPS device locations to a known fixed position to determine an assumed location of the at least one mobile communication device;

identify a user profile associated with the at least one mobile communications device, the user profile comprising user trait data and user activity history data;

classify the user profile and the at least one mobile communication device to a category of user profiles by applying a classification algorithm, the classification algorithm considering the assumed location of the at least one mobile communication device, the user trait data, and the user activity history data;

access information indicative of a user-defined tracking time period associated with the user profile associated with the at least one mobile communication device, wherein the plurality of GPS device locations are received from at least one mobile communication device only during the user-defined tracking time period;
store to a data registry the plurality of GPS device locations only during the user-defined tracking time period, wherein the classification algorithm further considers the plurality of GPS device locations stored to the data registry;
identify a reciprocal category of second user profiles based on the category upon classifying the user profile to the category, wherein the second user profiles are respectively associated with a plurality of second mobile communication devices, and wherein the plurality of second mobile communication devices do not include the at least one mobile communication device; and
cause transmission of an alert-generating indication to at least one second mobile communication device of the plurality of second mobile communication devices.

15. The apparatus of claim 14, wherein the at least one memory and the computer program code are further configured to, with the processor, cause the apparatus to:
access information indicative of a user-defined tracking time period associated with the user profile associated with the at least one mobile communication device,
wherein the plurality of GPS device locations are received from at least one mobile communication device only during the user-defined tracking time period.

16. The apparatus of claim 15, wherein the at least one memory and the computer program code are further configured to, with the processor, cause the apparatus to:
access information indicative of a second user-defined tracking time period associated with a second user profile associated with the at least one second mobile communication device; and
causing transmission of the alert-generating indication to the at least one second mobile communication device only during the second user-defined tracking time period.

17. The apparatus of claim 14, wherein the at least one memory and the computer program code are further configured to, with the processor, cause the apparatus to:
store to a data registry the plurality of GPS device locations only during the user-defined tracking time period,
wherein classification algorithm further considers the plurality of GPS device location stored to the data registry.

18. The apparatus of claim 14, wherein the at least one memory and the computer program code are further configured to, with the processor, cause the apparatus to:
provide a GUI configured to be displayed upon the at least one second mobile communication device,
wherein the alert-generating indication is configured to cause rendering by the GUI of an alerts interface, and
wherein the alerts interface comprises an offer received indication.

19. The apparatus of claim 18, wherein the offer received indication comprises at least one offer issued by a particular venue associated with the assumed location.

20. The apparatus of claim 19, wherein the apparatus is further configured to:
receive an indication to redeem the at least one offer;
create a barcode or number code associated with the at least one offer, the barcode or number code configured to be rendered by the GUI.

21. The apparatus of claim 14, wherein the at least one memory and the computer program code are further configured to, with the processor, cause the apparatus to:
receive a signal or access information indicative of a user-defined venue threshold associated with a demographic or characteristic;
aggregate trait information associated with each user profile associated with the assumed location;
compare the aggregated trait information to the user-defined venue threshold; and
only in a circumstance where the aggregated trait information satisfies the user-defined venue threshold and upon classifying the user profile to the category of user profiles, cause transmission of the alert-generating indication to the at least one second mobile communication device.

22. The apparatus of claim 14, wherein the at least one memory and the computer program code are further configured to, with the processor, cause the apparatus to:
receive a check-in signal from the mobile communication device; and
cause transmission of the alert-generating indication to the at least one second mobile communication device only in response to receiving the check-in signal and classifying the user profile to the category of user profiles.

23. The apparatus of claim 14, wherein the at least one memory and the computer program code are further configured to, with the processor, cause the apparatus to:
enable participation in a game or survey;
receive a game or survey completion signal; and
cause transmission of the alert-generating indication to the at least one second mobile communication device only in response to receiving the game or survey signal and classifying the user profile to the category of user profiles.

24. The apparatus of claim 14, wherein the at least one memory and the computer program code are further configured to, with the processor, cause the apparatus to:
receive third-party defined reward criteria;
determine that the third-party defined reward criteria is met; and
upon the determination that third party defined reward criteria is met and upon classifying the user profile to the category of user profiles, cause transmission of the location-based content to the at least one second mobile communication device.

25. The apparatus of claim 14, wherein the at least one memory and the computer program code are further configured to, with the processor, cause the apparatus to:
receive venue-specified restrictions; and
upon classifying the user profile to the category of user profiles, cause transmission of the alert-generating indication to the at least one second mobile communication device in accordance with the venue-specified restrictions.

26. The apparatus of claim 14, wherein the at least one memory and the computer program code are further configured to, with the processor, cause the apparatus to:
map the user trait data to a user trait registry;
map the user activity history data to a user activity history registry;
wherein the classification algorithm for classifying the user profile and the at least one mobile communication device to the category of user profiles further considers the assumed location of the at least one mobile communication device, the mapping of the user trait data to the user trait registry, and the mapping of the user activity history data to the user activity history registry; and cause transmission of the alert-generating indication to the second mobile communication device associated with the assumed location.

27. The apparatus of claim 14, wherein the at least one memory and the computer program code are further configured to, with the processor, cause the apparatus to:

receive a check-in signal from the at least one mobile communication device verifying presence of the at least one mobile communication device at the assumed location.

28. A method for providing a service for identifying mobile devices utilized by particular categories of consumers and transmitting alert-generating indications to the mobile devices, the for the method comprising:

receiving a plurality of GPS device locations from at least one mobile communication device;

comparing the plurality of GPS device locations to a known fixed position to determine an assumed location of the at least one mobile communication device;

identifying a user profile associated with the at least one mobile communications device, the user profile comprising user trait data and user activity history data;

classifying the user profile and the at least one mobile communication device to a category of user profiles by applying a classification algorithm, the classification algorithm considering the assumed location of the at least one mobile communication device, the user trait data, and the user activity history data;

accessing information indicative of a user-defined tracking time period associated with the user profile associated with the at least one mobile communication device, wherein the plurality of GPS device locations are received from at least one mobile communication device only during the user-defined tracking time period;

storing to a data registry the plurality of GPS device locations only during the user-defined tracking time period, wherein the classification algorithm further considers the plurality of GPS device locations stored to the data registry identifying a reciprocal category of second user profiles based on the category upon classifying the user profile to the category, wherein the second user profiles are respectively associated with a plurality of second mobile communication devices, and wherein the plurality of second mobile communication devices do not include the at least one mobile communication device; and causing transmission of an alert-generating indication to at least one second mobile communication device of the plurality of second mobile communication devices.

* * * * *